(12) United States Patent
Grimm et al.

(10) Patent No.: US 7,946,476 B1
(45) Date of Patent: May 24, 2011

(54) AUTOMATED BANKING MACHINE SYSTEM AND MONITORING METHOD

(75) Inventors: Jacqueline Grimm, Broadview Heights, OH (US); Mike Jones, Massillon, OH (US); Dane Davisson, Uniontown, OH (US); Jeffery M. Enright, Akron, OH (US)

(73) Assignee: Diebold, Incorporated, North Canton, OH (US)

( * ) Notice: Subject to any disclaimer, the term of this patent is extended or adjusted under 35 U.S.C. 154(b) by 950 days.

(21) Appl. No.: 11/825,616

(22) Filed: Jul. 6, 2007

Related U.S. Application Data

(60) Provisional application No. 60/819,699, filed on Jul. 7, 2006, provisional application No. 60/819,698, filed on Jul. 7, 2006, provisional application No. 60/819,696, filed on Jul. 7, 2006.

(51) Int. Cl.
*G06Q 40/00* (2006.01)
*G07D 11/00* (2006.01)
*G07F 19/00* (2006.01)

(52) U.S. Cl. .......... 235/379; 235/375; 235/380; 705/35; 705/39; 705/43

(58) Field of Classification Search .................. 235/379; 705/39–45
See application file for complete search history.

(56) References Cited

U.S. PATENT DOCUMENTS

| | | | | |
|---|---|---|---|---|
| 5,216,502 A * | 6/1993 | Katz | ............................ | 348/150 |
| 6,317,152 B1 * | 11/2001 | Hobson et al. | ................ | 348/150 |
| 7,319,477 B2 * | 1/2008 | Katz | .......................... | 348/14.01 |
| 7,609,941 B2 * | 10/2009 | Matsukawa et al. | ............ | 386/94 |
| 2003/0071896 A1 * | 4/2003 | Hunter | ............................. | 348/88 |
| 2004/0164141 A1 * | 8/2004 | Egami et al. | .................. | 235/379 |
| 2006/0209178 A1 * | 9/2006 | Katz | .......................... | 348/14.1 |

* cited by examiner

*Primary Examiner* — Thien M. Le
*Assistant Examiner* — Tuyen K Vo
(74) *Attorney, Agent, or Firm* — Ralph E. Jocke; Daniel D. Wasil; Walker & Jocke

(57) ABSTRACT

A cash dispensing automated banking machine actuated by user cards is in operative connection with a system usable to capture images related to activity that is conducted at or adjacent to the machine. The automated banking machine is positioned at a banking facility including a vault and an entrance. A plurality of cameras are positioned at the facility. Images captured may be analyzed at the bank facility or the remote monitoring center. The monitoring center may operate to assure that employees of the bank facility or others can safely access and/or leave the bank facility.

21 Claims, 87 Drawing Sheets

| Menu Item | Description | Privideges | | |
|---|---|---|---|---|
| | | Admin. | Operator | Service |
| Image Search | Search for images stored on the hard disk drive of AccuTrack | ✓ | ✓ | — |
| View Log Files | View the system's log files for the diagnostics and log on activity | ✓ | ✓ | ✓ |
| Camera Setup | Set up custom names for the cameras that are easily identifiable. | ✓ | — | — |
| E-mail Setup | Set up e-mail addresses for use in sequences. During sequences, you can automatically send a system-written message to the appropriate personal. | ✓ | — | — |
| User Access Setup | Add delete, and change user IDs, passwords and access rights | ✓ | — | — |
| ATM Setup | Set up the communications for any ATM connections. | ✓ | — | — |
| Sequence Setup | Set up sequences for the camera routines and for alarms | ✓ | — | — |
| Motion Setup | Define the areas for cameras that detect motion. | ✓ | — | — |
| Image Removal | Delete selected old images on AccuTrack to make room for new images. | ✓ | — | — |
| Diagnostics | Check systems diagnostics. Often used to trouble shoot the system. | ✓ | — | ✓ |
| Apply Changes | Apply all recent configuration changes made to the system. Note that during application of the changes, recording of images will be temporarily halted. | ✓ | — | ✓ |
| Help | Access to on-line help. | ✓ | ✓ | ✓ |

FIG. 16

| Buttons | Description |
|---|---|
|   | Use these button to go to the beginning or the end of a series of events or images (depending on the direction of the arrow). |
|   | Use these buttons to go forward or backward by ten events or images (depending on the direction of the arrow). |
|   | Use these buttons to go forward or backward by one event or image (depending on the direction of the arrow). |
| Jump to Image # Jump to Event # | Type the number of the image or events you want to view, and click on this button to display that image as the large image. The image or event number displays next to each thumbnail frame (for example, Image 7 of 48). |
| Save Comments | To store comments with the image, type your comments in the comments field, and click on this button. The next time this image is retrieved, the comments display with the image. |

AccuTrack Toolbar Items

| ITEM | NAME | COMMENTS |
|---|---|---|
| MENU BOX [1] | | |
|  Make Selection → ▼ | Menu box with drco-down arrow | Click on the drop-down arrow for a list of main menue items. The access level of the user determines the displayed menus items. |
| MAIN MENU ICONS [1] | | |
|  374 | Home Icon | Click on the Home Icon to go to the AccuTrack home page. |
|  376 | Logoff Icon | Click on the Logoff Icon to log off the AccuTrack. The AccuTrack logon page re-displays. |
|  378 | Perform Image Search Icon | Click on the Perform Image Search Icon (binoculars) to access the Image Search function. |
|  380 | Camera Check Icon | Click on the Camera Check Icon to access the Camera Check function. |
|  382 | System Configuration Icon | Click on the System Configuration Icon to display the DVR System Config submenu in a menu panel on the left side of the page. |
|  384 | DVR System Tools Icon | Click on the Tools Icon to display the DVR Tools submenu in a menu panel on the left side of the page. |
| ❓ 386 | Help Icon | CLick on the Help menu to display on-line help. |

AccuTrack Toolbar Items (continued)

| ITEM | NAME | COMMENTS |
|---|---|---|
| STATUS [2] | | |
| Status: /388 | Display status warning messages | Toggle (click once to turn off and click again to turn on) on the word Status to display status warning messages in a pop-up dialog box. |
|  —390 | Green light status icon | AccuTrack is capturing images properly. |
|  —392 | Thermometer status icon | AccuTrack is nearing maximum storage capacity and not storing images. The disk is full. |
|  —394 | Yellow hand (caution) status icon | AccuTrack is running with errors. Check the diagnostics log file for more information. |
|  —396 | Red diskette status icon | Pending changes have not been applied. |
|  —398 | Stop sign status icon | An application error has occurred. Check the diagnostics log file for more information.<br>NOTE<br>• This icon may display temporarily if you attempt to use AccuTrack while AccuTrack is applying changes. Wait a few moments and then try again.<br>• If you are logged on from a remote PC, this icon may indicate a communications problem. AccuTrack may still be functioning correctly. |

[1] Each main menu icon is represented by text in the drop-down menu. Click on a main menu icon or select from the drop-down menu to access the menu option.

[2] The current status icon displays each time you refresh your Web page or navigate to a new AccuTrack page. Sometimes AccuTrack updates the status while you remain on the same AccuTrack page.

| Image Type | Override | Priority | Retain for |
|---|---|---|---|
| Normal | ☑ | Delete First ▼ | 7 Days ▼ |
| Alarm | ☐ | Delete Last ▼ | 14 Days ▼ |
| Transaction | ☐ | Delete If Necessary ▼ | 90 Days ▼ |

G568

402 — Example of Auto Delete Settings for Image Types

Setup Auto Delete

{Auto Delete} Is Enabled when this box is checked ☑

When you would like {Auto Delete} to begin deleting Images?

*Begin deleting Images when the DVR disk space is below
1MB is 1,048,576 bytes or 1,024(KB) Kilobytes.   [100] MB When would you like {Auto Delete} to stop deleting Images?

*Stop deleting Images when the DVR disk space is above
[1000] MB

| Image Type | Override Priority | | Retain for |
|---|---|---|---|
| Normal | ☐ | delete Last ▼ | 7 Days ▼ |
| Alarm | ☐ | delete Last ▼ | 14 Days ▼ |
| Transaction | ☐ | delete Last ▼ | 90 Days ▼ |

[Update] [Reset]

G207

Default Settings

FIG. 34

| | |
|---|---|
| Enable Security<br>☑ | Check this box to enable Image Security. If the box is not checked, all other parameters below are ignored and no Security Signatures will be applied to Images. |
| Normal Images<br>☐ | Causes DVR to perform security algorhythms on Normal Images. |
| Alarms<br>☑ | Causes DVR to perform security algorhythms on Alarm Images such as <u>Input</u> and <u>Motion</u> Alarms. |
| Transactions<br>☑ | Causes DVR to perform security algorhythms on Images captured from ATM Transactions. |

[ Update ] [ Reset ]

Camera Setup

| Cam | Description | Cam | Description |
|-----|-------------|-----|-------------|
| 01  | VESTIBULE DOOR | 13 | Unavailable |
| 02  |             | 14  | Unavailable |
| 03  |             | 15  | Unavailable |
| 04  |             | 16  | Unavailable |
| 05  |             | 17  | Unavailable |
| 06  |             | 18  | Unavailable |
| 07  |             | 19  | Unavailable |
| 08  |             | 20  | Unavailable |
| 09  |             | 21  | Unavailable |
| 10  |             | 22  | Unavailable |
| 11  |             | 23  | Unavailable |
| 12  |             | 24  | Unavailable |

Click on a Camera Number to perform an image check!

| Update Camera Names | Cancel Form Changes |

Output Setup

| OP | Description | OP | Description |
|----|-------------|----|-------------|
| 01 | VESTIBULE LIGHTS | 05 | UNAVAILABLE |
| 02 | Output 2 | 06 | UNAVAILABLE |
| 03 | Output 3 | 07 | UNAVAILABLE |
| 04 | Output 4 | 08 | UNAVAILABLE |

[ Update Output Names ]   [ Cancel Form Changes ]

↖ 410

Output Setup Page

FIG. 37

Input Setup

| IP | Description | IP | Description |
|----|-------------|----|-------------|
| 01 | TELLER PANIC BUTTON | 05 | UNAVAILABLE |
| 02 | Input #2 | 06 | UNAVAILABLE |
| 03 | Input #3 | 07 | UNAVAILABLE |
| 04 | Input #4 | 08 | UNAVAILABLE |

[ Update Input Names ]   [ Cancel Form Changes ]

↖ 412

Input Setup Page

FIG. 38

ATM Monitoring Setup Page

Edit E-mail address

| Cole, Ted - colet@diebold.com ▼ | [          ] E-mail Address |
| [Edit] Individual E-mail Address | [          ] Name |
| [Delete] Individual E-mail Address | [Update] E-mail Address |

Edit E-mail Groups

[ ▼ ]  [                    ]

[Edit] Members of Group    [Add] E-mail Group

[Delete] E-mail Group

G141

E-mail Setup Page (for individuals)

Sequence Progamming Page

422

Daily Program Page

426

Everyday #1 Page

428

Input Setup Block (Sequence Programing page)

Schedule for Input #2 Page

FIG. 47

Input #2 Page

446

Motion #1 Page

448

Before Selecting the Camera

After Selecting the Camera

456

458  AccuGuard Setup Page

Transaction Setup Block (Sequence Programming page)

Transaction Page #1

466

468

1 Select time range for search ☑ Provide Count ☐ Valid Time Range
Start Time Mar▼ 17▼ 1999▼ 12▼ 51▼ Start:02/19/99 14:11:23
End Time Mar▼ 17▼ 1999▼ 14▼ 51▼ End:03/11/99 14:51:11

2 Select cameras for search
All
01-Camera #1

Image Search

Search    Clear Form    ☐ Quick Viewer

3 Select one of the following filter conditions ☑ Group Events Images

Alarms
None
All

Transactions
No Transactions ▼    Enter Transaction Selection Details

○ Image Name         Enter Image Name/Comments
○ Image Comments

← 470

Image Search Page

FIG. 61

Images Page Including AVI Symbols for AVI Files

Standard Events Page

Quick Viewer Page

Image Cart Page

Search Results Pages and Views

| Page | Figure/View | Comments | Procedures |
|---|---|---|---|
| Images page (standard) | FIG 62 | Note the following items.<br><br>• This page displays up to eight single thumbnail images.<br><br>• Images display with single black borders.<br><br>• If you do not select Group Events Images on the Image Search page or you do not modify the default filter conditions, the images on the first search results page that displays. | To display an enlarge single image, click on a thumbnail image displayed on the images page. |
| Images page for AVI mode | FIG 63 | When a sequence is captured in AVI mode. Images are saved in the following format:<br><br>• The first image is saved as a JPEG. file<br><br>• All images between the first image and the last image are saved as an AVI clip.<br><br>• The last image is saved as a JPEG file. | To view the AVI clip, click on the AVI symbol. |
| Events Page (standard) | FIG. 64 | Note the following items:<br><br>• This page displays up to eight events.<br><br>• For each event, a thumbnail image of the first image in the event displays.<br><br>• Images display with black feathered borders that suggest group images.<br><br>• If you select Group Event Images on the Image Search page and modify the default filter conditions, the events page is the first search results page that displays. Otherwise, this page is not accessible. | To display the expanded view of a specific event, click on a thumbnail image displayed on the events page. |
| Events page including events captured in AVI mode | FIG. 65 | Note the following items:<br><br>• The AVI symbol indicates that AccuTrack captured an event in AVI mode.<br><br>• If you anticipate that your search results include a lot of AVI files, it is preferable to de-select Group Event Images on the Images Search page. Then the JPEG files captured before and after the AVI clip display files on the first search results page (the images page). | To view the AVI clip, click on the AVI symbol on the events page, and then click on the AVI symbol on the expanded event page. |

FIG. 73

Search Results Pages and Views (continued)

| Page | Figure/ View | Comments | Procedures |
|---|---|---|---|
| Expanded event page | FIG. 66 | Expands an event group from the events page. Displays to eight thumbnail images for an event group selected on an events page. | To display an enlarge single image, click on a thumbnail image displayed on the expanded event page. |
| Single image page. | FIG. 67 <br><br> FIG. 68 | Displays a single enlarge image with information about the image. | Use the following options as desired. <br><br> • Type comments in the Comments field that can be used as a filter condition in a subsequent image search. <br><br> • Download the image cart from this page <br><br> Print images from this page. |
| Quick Viewer page | FIG. 69 | Note the buttons that are enabled on the AccuTrack Image Control Panel when Quick Viewer is selected on the Image Search page | To view the search results using Quick Viewer, use the AccuTrack Image Control Panel. |
| AVI viewer window | FIG. 70 | You must have a Web browser plug-in such as QuickTime™ to view AVI clips. [2] | Use this window to view AVI files. Refer to specific documentation for your AVI viewer |
| Image cart page | FIG. 71 | Note the following items: <br><br> This page displays thumbnail images for JPG files in the image cart and AVI symbols for AVI files in the image cart. <br><br> Images display with single red borders. | |
| Print preview page | FIG. 72 | This page displays a print preview of a single image. The displayed information also prints with the image. | |
| [2] You can download QuickTime from http://www.apple.com/quicktime/. | | | |

FIG. 74

Data Stored or Displayed with an Enlarged Single Image

| FIELD | DESCRIPTION |
|---|---|
| Event Type | Type of sequence that generated the image capture. May be one of the following types<br><br>• SCHEDULED. Daily program sequences<br>• INPUT. (Alarm) input sequence<br>• MOTION. Motion (detection) sequence<br>• BLOCKEDCAM. Blocked camera sequence<br>• CARD READ. Transaction sequence initiated by a card reader at the ATM<br>• PRINTER. Transaction sequence initiated by printing of ATM receipt |
| Capture Time | Date and time the image was captured, to thousandths of a second |
| Image Name | Filename of the image on the AccuTrack hard disk |
| Camera # | Camera number (01 through 24) |
| Camera Description | Camera description entered under the Camera Setup menu option |
| Image Comments | Comments typed on a single menu page |
| Alarm Description | Alarm description entered under the Sequence Setup/Input Setup menu option. |
| Number of Images | The Number of Images is one of the following values: [1]<br><br>• Number of images in the current cache of search results<br>• Number of images in the search results<br>• Number of images in the selected event |
| Image Number | Sequential number of images in the Number of Images |
| ATM Description | ATM description entered under the ATM setup menu option. |
| ATM Card Number | ATM card number for the transaction |
| ATM Transaction Type | Description of the ATM activity, such as deposit, withdrawal, or card retained. This field may be unknown. |
| ATM Print Receipt | ATM receipt associated with the image. This option must be configured under the Sequence Setup/Transaction Setup menu option. |
| [1] On the single image page, the Number of Images also displays on the image counter. | |

FIG. 75

AccuTrack Image Control Panel

Buttons
Buttons on the AccuTrack Image Search Control Panel display with one of the following colors:

- White - Enabled
- Yellow - Enabled and selected. Click to activate.
- Gray - Disabled Image Counter

AccuTrack Image Control Panel Buttons

| BUTTONS | IMAGES PAGE | EVENTS PAGE | EXPANDED EVENT PAGE | SINGLE IMAGE PAGE | QUICK VIEWER PAGE |
|---|---|---|---|---|---|
| *AccuTrack Image Control Panel* | | | | | |
| 476 — [icon] | View images in the cart. (If there are no images in the cart, this button is disabled.) | | | | |
| 477 — [icon] | Save images in the image cart to disk with the a digital signature that authenticates the image and associated data. (If there are no images in the image cart, this button is disabled.) | | | | |
| [control bar] | | | | | |
| [◀‖] | Get first frame | Get first event | Get first frame in event | Get first frame | Get first frame in the group |
| [◀] | Get previous frame | Get previous event | Get previous frame in the event | Get previous frame | Get previous image in the group |
| [●] | Clear image cart (if enabled) | Clear image cart (if enabled) | Clear image cart (if enabled) | Clear image cart (if enabled) | Play (view images in current group) [1] |
| [■] | (disabled) | (disabled) | (disabled) | Save comments | Stop |
| [▶] | Get next frame | Get next event | Get next frame in the event | Get next event | Get next image in the group |
| [▶‖] | Get last frame | Get last event | Get last frame in the event | Get last event | Get last image in the group |

FIG. 78

AccuTrack Image Control Panel Buttons (continued)

| BUTTONS | IMAGES PAGE | EVENTS PAGE | EXPANDED EVENTS PAGE | SINGLE IMAGE PAGE | QUICK VIEWER PAGE |
|---|---|---|---|---|---|
| ◄ | Get previous set of 8 frames | Get previous set of 8 events | Get previous set of 8 frames in the event | Show events (if enabled) | Reverse frames |
| ► | Get next set of 8 frames | Get next set of 8 events | Get next set of 8 frames in the event | Show ATM visit (if enabled) | Forward frames |
| ▲ | View event images (first frame) | (disabled) | Return to events (up one level) | Return to the previous level | Get previous group |
| ▼ | Perform a new search | Perform a new search | Perform a new search | Check in or check out an image (toggle button) for the image cart | Get next group |
| 🖨 | Disabled | Disabled | Disabled | Print preview | Disabled |
| Image Counter (when Provide Count is selected and default filter conditions are modified on the Image Search page) | Displays the number of images that meet the search criteria | Displays the number of events that meet the search criteria | Displays the number of images in the event | Displays the number of images from the previous level (images page or expanded event page) | Displays the number of the current images in the current group |
| Image Counter (when Provide Count is not selected on the Image Search page) | Displays the number of images in the current cache [2] | Displays the number of events in the current cache [2] | Displays the number of images in the event | Displays the number of images from the previous level (images page or expanded event page) | Displays the number of the current images in the current group |

FIG. 79

AccuTrack Image Control Panel Buttons (continued)

| BUTTON | IMAGES PAGE | EVENTS PAGE | EXPANDED EVENT PAGE | SINGLE IMAGE PAGE | QUICK VIEWER PAGE |
|---|---|---|---|---|---|
| ◄ Hrs. Min. Sec. ► | | | | | |
| ◄ | Select hours, minutes, and seconds, and the then click on this button to go backward the selected amount of time. | | | | |
| ► | Select hours, minutes, and seconds, and the then click on this button to go forward the selected amount of time. | | | | |

[1] To view an AVI clip from the Quick Viewer page, navigate to the AVI symbol and then click on the Launch AVI button.

[2] When you perform an image search, up to 100 images or events (as applicable) are cached to improve search results access times. When you do not select Provide Count on the Image Search page, the image counter displays information about the cached images or events.

FIG. 80

Note

- Rectangles represent the images pages.
- Numbers represent image numbers for the thumbnail images on the images page.
- The example shows a total of 84 images in the search results.

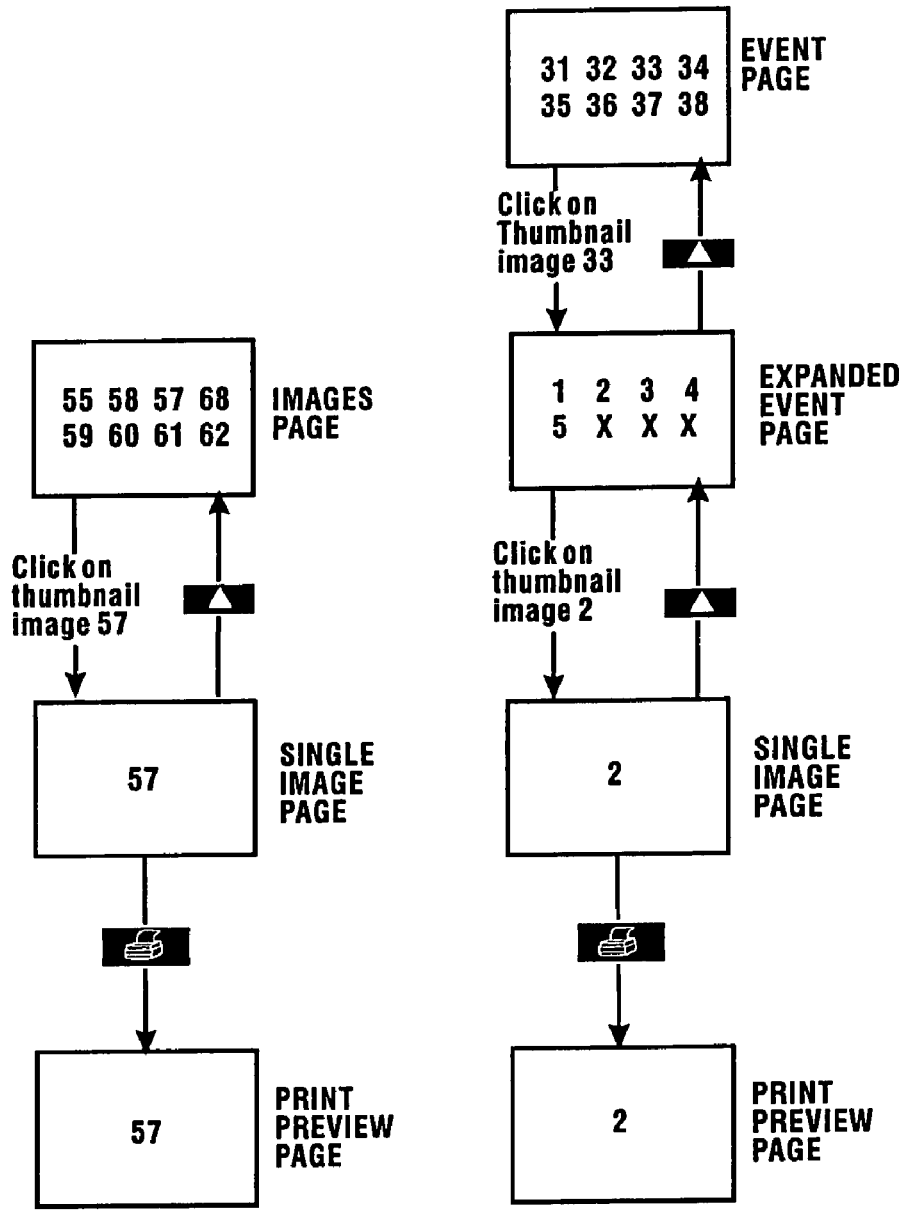

474

Image Cart Symbol

| SYMBOL | IMAGES PAGE | EVENTS PAGE | EXPANDED EVENT PAGE | SINGLE IMAGE PAGE | SINGLE CART PAGE |
|---|---|---|---|---|---|
| Black Image cart symbol | Image is not in the image cart.<br><br>Click on the black image cart symbol to check out the image (add the image to the image cart). | Click on the black image cart symbol to check out all the images in the event (add the images to the image cart). [1] | Image is not in the image cart.<br><br>Click on the black image cart symbol to check out the image (add the image to the image cart). | ..[2] | Image is not in the image cart. [3]<br><br>Click on the black image cart symbol to check out the image (add the image to the image cart). |
| Red image cart symbol | Image is in the image cart.<br><br>Click on the red image cart symbol to check in the image (remove the image from the image cart). | (does not display) | Image is in the image cart.<br><br>Click on the red image cart symbol to check in the image (remove the image from the image cart). | ..[2] | Image is in the image cart. [3]<br><br>Click on the red image cart symbol to check in the image (remove the image from the image cart). |

[1] On the events page, the color on the image cart symbol is not significant.

[2] The image cart symbol does not display on the single image page. If the image is in the image cart, Image Checked Out displays in red italics with the displayed data.

[3] On the image cart page, all images initially display with the red image cart symbols. If you click on a red image cart symbol on the image cart page, the symbol changes to black and the image is removed from the image cart. The image continues to display on the image cart page until you re-access the page.

FIG. 84

AUTOMATED BANKING MACHINE SYSTEM AND MONITORING METHOD

CROSS REFERENCE TO RELATED APPLICATIONS

This application claims benefit pursuant to 35 U.S.C. §119(e) of provisional application Ser. Nos. 60/819,699; 60/819,698; and 60/819,696, each of which was filed Jul. 7, 2006 and the disclosures of each of which are incorporated herein by reference.

TECHNICAL FIELD

This invention relates to transaction systems. Specifically exemplary embodiments relate to a system for an automated banking machine that is actuated by user cards and which provides image records as well as data records related to transactions and other activities. Exemplary embodiments further relate to a system which captures images and enables images and data to be stored, remotely accessed and selectively processed and analyzed. Exemplary embodiments further relate to systems that monitor facilities and individuals.

BACKGROUND ART

Automated banking machines are known in the prior art. A common type of card actuated automated banking machine used by consumers is an automated teller machine ("ATM"). ATMs enable customers to carry out banking transactions such as dispensing cash, making deposits, making transfers of funds, depositing checks and other instruments, cashing checks or other documents, payment of bills and account balance inquiries. Other types of automated banking machines are used for purposes of dispensing tickets, scrip, travelers checks, airline tickets, gaming materials and other items of value. Other types of automated banking machines are used by service providers such as cashiers or bank tellers for purposes of dispensing or receiving currency, counting currency and determining the genuineness of currency. For purposes of this disclosure an automated banking machine will be considered as being any machine which accomplishes the handling or transfer of items having or representative of value.

Automated banking machines sometimes have camera systems associated with them. Such systems may benefit from improvements.

Surveillance systems are also sometimes used in banking environments as well as other environments. Such systems may benefit from improvements.

DISCLOSURE OF INVENTION

It is an object of an exemplary embodiment to provide a transaction record system for an automated banking machine.

It is a further object of an exemplary embodiment to provide a system for recording image data related to transactions conducted at an automated banking machine.

It is a further object of an exemplary embodiment to provide a system for recording image and transaction data related to transactions conducted at an automated banking machine.

It is a further object of an exemplary embodiment to provide a system for enabling access to image and transaction data related to transactions conducted at an automated banking machine remotely through a network.

It is a further object of an exemplary embodiment to provide a system for accessing image and transaction data in response to events that occur at an automated banking machine.

It is a further object of an exemplary embodiment to provide a system for obtaining image data and for taking actions in an appropriate programmed sequence in response to events at an automated banking machine.

It is a further object of an exemplary embodiment to provide a system for obtaining image data and for taking actions in a sequence which can be programmed more readily.

It is a further object of an exemplary embodiment to provide a system which achieves greater assurance of capturing useful image and transaction data related to transactions conducted at an automated banking machine.

It is a further object of an exemplary embodiment to provide a system that provides selective remote notification of events and conditions occurring at an automated banking machine.

It is a further object of an exemplary embodiment to provide a system that simplifies the recording, storage and analysis of transaction and image data generated at an automated banking machine.

It is a further object of an exemplary embodiment to provide a system for imaging documents at an automated banking machine.

It is a further object of an exemplary embodiment to provide a system that enables analysis of documents presented at an automated banking machine.

It is a further object of an exemplary embodiment to provide a system for obtaining and storing image data related to servicing activities conducted at an automated banking machine.

It is a further object of an exemplary embodiment to provide methods of recording, storing and analyzing image and transaction data produced in the operation of an automated banking machine.

It is a further object of an exemplary embodiment to provide an image capture system that captures images in response to triggering events and which captures images in accordance with a programmed sequence of actions.

It is a further object of an exemplary embodiment to provide an image capture system in which the triggering event is the occurrence of an image condition within a field of view of a camera.

It is a further object of an exemplary embodiment to provide an image capture system in which images are captured in response to a triggering event which includes changes within a selected detection area within a field of view of a camera.

It is a further object of an exemplary embodiment to provide an image capture system which captures images in response to a triggering event which includes the presence of a particular characteristic, object, facial feature or color within an image.

It is a further object of an exemplary embodiment to provide an image capture system that can provide remote notification of a triggering event and to include with the notification an image associated with the event.

It is a further object of an exemplary embodiment to provide an image capture system which provides for selective deletion of images by the type of event with which the image is associated.

It is a further object of an exemplary embodiment to provide an image capture system in which images may be sorted and searched by parameters or combinations of parameters.

It is a further object of an exemplary embodiment to provide an automated banking machine that issues documents including indicia corresponding to an image of at least a portion of a user operating the machine.

It is a further object of an exemplary embodiment to provide an image capture system which provides for transferring images in a manner which provides enhanced assurance that the transferred images have not been altered.

It is a further object of an exemplary embodiment to provide an automated banking machine that provides documents including indicia corresponding to an image of at least a portion of a user operating the machine.

It is a further object of exemplary embodiments to provide systems and methods for monitoring facilities and individuals.

Further objects of exemplary embodiments will be made apparent in the following Best Modes for Carrying Out Invention and the appended claims.

The foregoing objects are accomplished in one exemplary embodiment by a system which includes an automated banking machine. The automated banking machine carries out transactions by performing several transaction functions. At least one camera is positioned adjacent to the automated banking machine. The camera operates to produce camera signals which represent images within a field of view of the camera.

The exemplary system further includes a computer in operative connection with a data store. The computer includes a server operating in connection with the computer. In some embodiments of the system the server may be resident and a part of the computer within the automated banking machine. In other embodiments the server may reside in a location adjacent to or disposed from the automated banking machine. The computer is in operative connection with the machine and the camera. The computer operates in accordance with programmed instructions to include image data corresponding to the camera signals in the data store. The image data is stored in response to the machine carrying out transaction functions.

The server is in connection with an electronic communications network. In some embodiments this may be a direct connection, local area network or an intranet. In other embodiments the network may be a telecommunications network, wide area network or the Internet. Alternatively the network could include a wireless network such as an RF network or satellite network. A user terminal disposed from the automated banking machine is connected to the network. The user terminal may be connected directly to the network or may be connected through one or more intervening networks and servers. The user terminal includes a computer with a browser operating therein as well as an output device such as a screen or printer. The user terminal through the browser accesses the image data through the server. The user terminal operates to output the image data through its output device. The user terminal also is used to access transaction data related to transactions corresponding to image data stored in the data store associated with the server. The user terminal may be operated to more rapidly analyze and sort image and transaction data, as well as to conduct a more detailed analysis of image or transaction data.

Embodiments of the system may also operate in accordance with sequences of instructions. The sequence instructions provide for a sequence of actions to be taken in response to certain conditions. For example if in the course of capturing image data, a camera adjacent to the ATM is unable to produce usable video, such as because it is covered or due to glare, the instructions in the sequence may cause the system to begin capturing image data from another nearby camera. Other sequence instructions may avoid recording the image data for selected transactions. Other sequence instructions may cause the recording of images associated with service activities. This may be done with cameras located in service areas such as behind an automated teller machine or within the automated teller machine itself. Selective motion detection and other hard and soft triggers may be used to initiate recording of images and/or other actions which are part of a sequence.

Alternative embodiments may also provide messages through the network indicative of conditions or events occurring at the automated banking machine. Further embodiments of the system operate to manage available memory. This may include projecting when available memory will likely be depleted and sending a message which indicates such condition. Other embodiments may reconfigure available memory or may automatically delete selectively certain image data or off-load data in memory through the network to a remote storage location. Further alternative embodiments may provide for imaging of documents deposited in the machine. Image and transaction data associated with the deposit of documents may be recovered. Analysis of document image data such as signature analysis may be conducted through the network remotely from document verification terminals which include data usable to verify the genuineness of deposited documents.

Alternative exemplary embodiments may be used independent of an automated transaction machine to capture image data selectively in response to triggering events. Such triggering events operate to cause the system to execute sequences which may include the capture of additional images or to take other actions including the remote notification of persons electronically of the occurrence of triggering events. Such notifications may include or have attached thereto at least one image file corresponding to an image associated with the event for which notification is being given.

In certain exemplary embodiments the triggering events include certain image conditions. Image conditions may correspond to the blocking of a camera in a way that prevents the delivery of usable video. Alternatively image conditions may correspond to the detection of motion, colors, objects, facial features, clothing, body positions, or other characteristics or items within a field of view of a camera. Exemplary embodiments may enable a user to select one or more subsets of the field of view as a detection area and to sense for motion or other image conditions only within the detection area while ignoring image conditions outside the detection area. This facilitates the detection of desired events and avoids the use of available image storage in response to capturing images which are not of interest.

Exemplary embodiments may also store image data and other data associated therewith so as to provide enhanced searchability of images. Some embodiments may enable searching through images selectively by one or more parameters. Such parameters may include the type of triggering event causing the image to be captured. Other exemplary parameters may include transaction types with which an image is associated, or time periods during which images are captured. Other parameters for the searching of images may include searching by color, object type, facial features or other characteristics. Such capabilities enable images to be identified, recalled and analyzed selectively, more quickly or in greater detail than is possible with existing systems.

Exemplary embodiments may also enable the transfer of images that have been captured in a manner that provides greater assurance that the images have not been subject to alteration. Such capability assures that the image has greater evidentiary value in the event that it is used to establish liability related to the occurrence of transactions or events.

Exemplary embodiments may also provide for the providing of documents in or from an automated banking machine that include indicia corresponding to an image of a user of the machine. This may facilitate verifying the authority of the person presenting the document at another location for purposes of obtaining value, goods or services. Exemplary embodiments may also operate to compare image data corresponding to an image of at least a portion of a user to data corresponding to a plurality of users stored in a data store. The user may be allowed to receive documents from the machine, only if the data in the data store corresponds to image data associated with the user. Alternatively or in addition, the machine may operate to prevent providing at least one document to a user if the data corresponding to the image of the user corresponds to data for an individual stored in the data store.

Other exemplary embodiments may also provide for assuring the security of facilities such as banking facilities as well as users. Some embodiments, may enable remote visual inspection of a banking facility, for example, prior to a user's arrival. The user may be informed of abnormal conditions which suggest that the user should not enter the facility. In some embodiments a system may operate to track the movements of an authorized user and observe the user entering and moving within the facility. This may help to assure that the user is not subject to attack or robbery upon approaching the facility. In still other embodiments exemplary systems may operate to monitor the activities of a user leaving a facility to assure that they are able to exit the facility safely. In still other exemplary embodiments systems may be operated to monitor a user's movements toward a destination, assure that a destination facility is safe and monitor the user's approach and entry into the destination. Still other embodiments may operate to determine that the user's movements are not consistent with traveling to the destination. This enables the system to assure that the user has not been subject to robbery or some other event which presents a problem.

Other exemplary embodiments will become apparent from the following disclosure.

BRIEF DESCRIPTION OF DRAWINGS

FIG. 16 is a screen presented in an exemplary embodiment at a user terminal describing functions performed by an exemplary system of the invention and categories of persons generally authorized to perform such functions.

FIG. 18 is a screen presented at a user terminal in an exemplary embodiment for purposes of explaining the functions of icons shown in FIG. 17.

FIG. 30 is a detailed view of the tool bar and icons presented in the screen shown in

FIG. 29.

FIGS. 31 and 32 are a chart showing the icons presented in the tool bar shown in FIG. 30 and the functions and operations in the programming of the exemplary system associated with each.

FIG. 33 is an exemplary screen presented to a user in operation of the exemplary system shown in FIG. 28 for purposes of configuring the selective deletion of image data.

FIG. 34 is an exemplary screen presented at a user terminal in the system of FIG. 28 for purposes of setting up an automatic delete function for selectively deleting types of captured images.

FIG. 35 is an exemplary screen presented at a user terminal for configuring and programming the exemplary system to apply enhanced security to captured images.

FIG. 36 is an exemplary screen presented at a user terminal for purposes of applying descriptive names to cameras, which descriptive names may be used in programming sequences.

FIG. 37 is an exemplary screen presented at a user terminal which enables a user to assign descriptive names to outputs which may be provided by the system as part of sequences.

FIG. 38 is an exemplary screen presented at a user terminal which enables a user to assign descriptive names to inputs which the image capture system may receive.

FIG. 40 is an exemplary screen presented at a user terminal for purposes of establishing e-mail addresses and groups of e-mail addresses which are to receive e-mail messages in response to the occurrence of certain triggering events in the system.

FIG. 47 is an exemplary screen presented at a user terminal for purposes of displaying the times during which the sequence applicable to a particular input will cause a system to operate.

FIG. 61 is an exemplary embodiment of a screen presented at a user terminal for purposes of a user selecting the recovery of images by various parameters.

FIGS. 73 and 74 are a chart indicating the features associated with the different search results shown in FIGS. 62 through 72 and the features and capabilities of the images associated therewith.

FIG. 75 includes a chart of indicia and information displayed with images which can be searched in the exemplary embodiment.

FIGS. 78 through 80 are charts showing the various functions performed by selection of icons in the exemplary control panel when particular image pages are being displayed.

FIGS. 81 through 83 are schematic views showing the operation of the icons included in the exemplary control panel screen in navigating through images which are presented to a user at a user terminal.

FIG. 84 is a chart explaining variations in an icon used in connection with designating images for deposit into an image cart for purposes of downloading images as a group, and the functions associated with the icon.

BEST MODES FOR CARRYING OUT INVENTION

Figure 1:
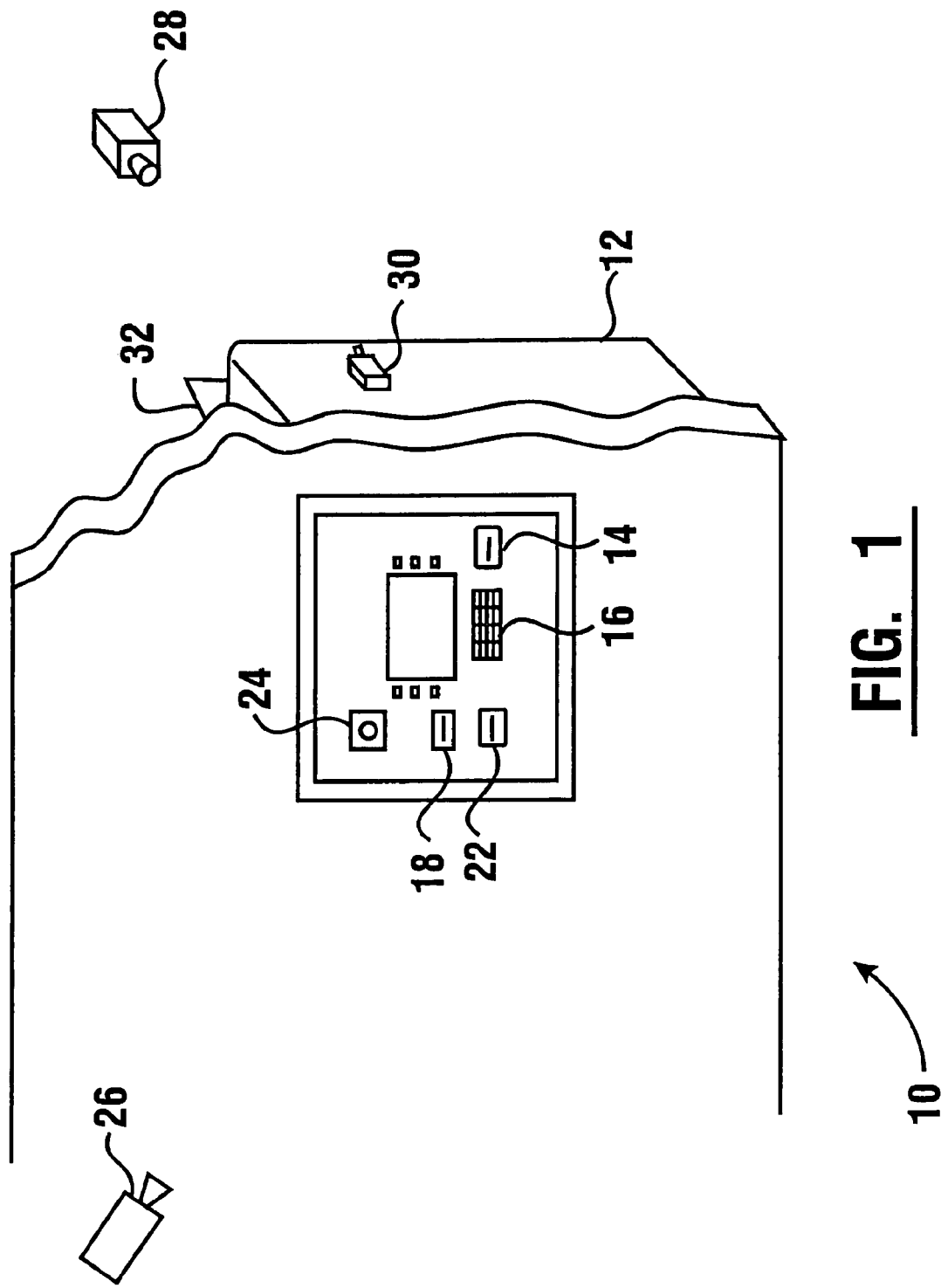
FIG. 1 is a schematic view of an exemplary embodiment of a transaction record system used in connection with an automated banking machine.

Referring now to the drawings and particularly to FIG. 1 there is shown therein an exemplary embodiment which operates as a transaction record system for an automated banking machine generally indicated 10. The system of this embodiment includes an automated banking machine 12 which in this example is an ATM. It should be understood that in other embodiments other types of automated banking machines may be used. ATM 12 includes a number of transaction function devices. These transaction function devices are associated with components of the machine such as a card reader 14 and a keypad 16. The card reader and keypad serve as input devices through which users can input instructions and information. It should be understood that as referred to herein the keypad includes function keys or touch screen inputs which may be used in other embodiments to input data into the machine.

ATM 12 further includes additional transaction function devices. Such transaction function devices may include a presenter schematically indicated 18 which operates to present cash or other documents of value to a customer. The presenter 18 in the embodiment shown is associated with a dispenser schematically indicated 20 (see FIG. 2). The dispenser is operative to obtain sheets such as currency bills from within the machine and to deliver them to the presenter in the described embodiment. In alternative embodiments only a presenter or a dispenser may be used. The exemplary ATM 12 further includes a depository 22. The depository 22 accepts deposits from customers. In the embodiment shown the depository is generally configured to accept cash and other instruments such as checks from a customer. It should be understood that in other embodiments other types of depositories which accept various types of items representative of value may be used. Exemplary ATMs and transaction function devices are shown in U.S. Pat. Nos. 7,044,366; 7,044,367; and 7,028,888 the disclosures of each of which are incorporated herein by reference. Exemplary ATMs may operate to carry out transactions in a manner described in U.S. Pat. No. 7,062,464 the disclosure of which is incorporated herein by reference.

The transaction record system of the described embodiment further includes a first camera 24. Camera 24 is positioned within or behind the fascia of the ATM or otherwise adjacent the ATM so as to have a field of view which generally includes the face of the user operating the ATM. A further camera 26 is positioned adjacent to the ATM and includes a field of view which includes a profile or other view of the user operating the ATM. It should be understood that while in this exemplary embodiment cameras are used for acquiring image data corresponding to a portion of a user, other embodiments may include other types of devices, such as biometric scanners for example, that can acquire data which corresponds to an image of a portion of a user.

A further camera 28 in this exemplary system is shown positioned adjacent to the ATM with a field of view to observe a service area of the ATM. Camera 28 in the exemplary embodiment shown is directed to observe the back of the ATM and is usable for observing or detecting service activities. Camera 28 may be for example positioned within a vestibule or room which is accessed by service personnel for purposes of servicing the ATM. A further camera 30 shown schematically, is positioned adjacent the ATM and within the interior of the cabinet of the ATM. Camera 30 is shown having a field of view which is directed generally opposite to that of camera 28 and enables it to view areas which would normally include the face and hands of servicing personnel. Camera 30 preferably operates when a service door 32 is open and a servicer is accessing the interior of the machine. This enables capturing image data related to persons servicing or accessing the interior of the machine.

In the embodiment shown each of the cameras 24, 26, 28, 30 provides camera signals which are analog signals representative of what is observed within the field of view of the respective camera. It should be understood that the camera configuration shown in FIG. 1 is exemplary and other configurations of cameras, or greater or lesser numbers of cameras, or other types of devices for capturing image data, may be used in connection with other embodiments. It should further be understood that embodiments may include digital cameras, iris scanners, fingerprint scanners or other types of devices from which data corresponding to images may be acquired and/or reproduced.

Figure 2:
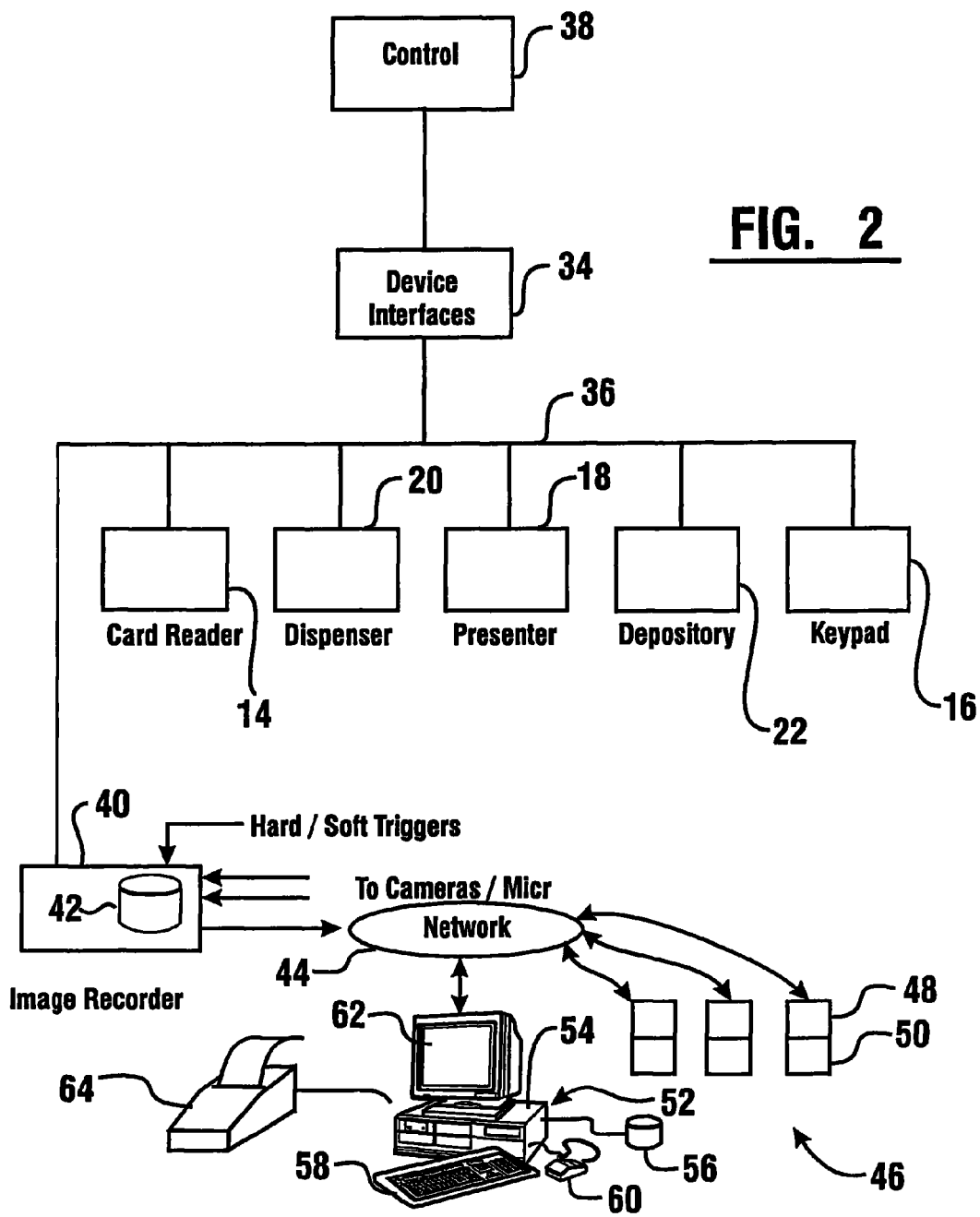
FIG. 2 is a schematic view of a control system for devices within an automated banking machine which incorporates a first embodiment of a transaction record system.

FIG. 2 shows a schematic view of a first hardware configuration of a transaction record system. The automated banking machine 12 includes the transaction function devices 14, 16, 18, 20, 22 which communicate through and are operated responsive to signals passed through device interfaces 34. The device interfaces communicate with the transaction function devices on an interface bus 36. The messages which control operation of the various transaction function devices are communicated through the interface bus. At least one computer which is referred to as a terminal controller 38 operates the ATM by sending messages to the device interfaces to control the transaction function devices.

In the embodiment shown in FIG. 2 an image recorder device 40 is shown connected to the interface bus 36. Image recorder device 40 in the embodiment shown is a separate hardware component from the automated banking machine. Image recorder device 40 includes a computer which includes a server operating therein, and further includes at least one data store schematically indicated 42. The data store holds programmed instructions. The data store also holds data representative of image data, transaction data and other data as later described. It should be understood that although a data store within the image recorder device is described in the exemplary embodiment, reference to a data store herein encompasses either a single data store or a plurality of connected data stores from which data may be recovered.

Image recorder 40 receives the analog signals from the connected cameras 24, 26, 28 and 30 as shown. It should be understood that embodiments may include devices which in addition to image data, acquire sound data, infrared signal data and other types of data which can be sensed by sensing devices, stored, recovered and analyzed by the system. Image recorder device 40 further includes inputs which are schematically represented as hard and soft triggers. Hard triggers, examples of which are hereinafter described, are signals from "hard devices" such as sensors. Such devices can generally sense actions or conditions directly such as that a service door on the ATM or to a service area has been opened. The image recorder device also receives soft triggers which may include signals representative of conditions or instructions which are being sent as signals to other devices. Such soft triggers may further include the signals on the interface bus 36 in the embodiment shown or timing signals or other signals usable to operate the image recorder responsive to programmed instructions, time parameters or other conditions or signals.

Soft triggers may also include timing functions. In some embodiments the image recorder may monitor other types of transaction messages and may operate in response thereto. Such alternatives may include for example, systems where the image recorder device 40 is not connected to the bus with the transaction function devices, but instead monitors transaction messages being sent between an automated banking machine or other device and a remote computer, and extracts information concerning the operation of transaction function devices from such messages. Other configurations and operational capabilities of the image recorder device will be apparent to those skilled in the art from the description herein.

Image recorder 40 in the exemplary embodiment is in communication with an electronic communications network schematically indicated 44. Network 44 in the described embodiment may be a local area network such as an intranet or may be a wide area network such as the Internet. In the embodiment shown network 44 is a network that communicates messages in protocols such as TCP/IP. The network is used to further communicate HTTP messages including records such as HTML, XML and other markup language documents. Of course in other embodiments other communications methods may be used.

The image recorder device 40 includes a computer operating at least one server. The server is connected to the network and has at least one uniform resource locator (URL) or other system address. This enables the server to be accessed by other terminals connected to the network as well as to selectively deliver messages to connected terminals. It should be understood that network 44 may be connected through intermediate servers to other networks. This enables the image recorder device 40 to communicate with other types of remote terminals including terminals connected to wireless interfaces such as pagers and cellular phones. If network 44 is an intranet, intermediate servers which operate as a firewall may be included in the system. Access to the Internet enables the communication of messages to terminals located anywhere in the world. Such communications capability may be valuable in embodiments of the invention for purposes of image and transaction data recovery and analysis, and for purposes of sending messages to individuals to be notified of conditions which exist at the automated banking machine.

A plurality of terminals 46 are shown connected to the network 44. Terminals 46 may include a user terminal for purposes of programming parameters into the data store 42 of image recorder device 40. Alternatively terminals 46 may include user terminals which may be used to analyze and recover image data and transaction data from the image recorder device. Alternative terminals 46 may include data stores for storing image and transaction data which is downloaded from the image recorder device for purposes of storage as later described herein. Alternative terminals 46 may include document verification terminals for verifying the authenticity of documents, identifying user data or for carrying out other functions described herein. Typically terminals 46 include computers including a browser component schematically indicated 48. The browser communicates with the server in the image recorder device to access the image data. Such a browser component may be commercial browsers such as Netscape Navigator™, Microsoft Internet Explorer™, Mozilla™ or other types of browsers. Terminals 46 also include other software and hardware components schematically indicated 50 suitable for processing image data, transaction data and other data that may be obtained by accessing the server in the image recorder device 40.

An exemplary terminal indicated 52 is shown in greater detail in FIG. 2. Exemplary terminal 52 may be a user terminal, document verification terminal, data storage terminal, data analysis terminal or other type of terminal for inputting instructions or analyzing data available in the system. Terminal 52 in the exemplary embodiment includes a computer schematically indicated 54 which includes an associated data store schematically indicated 56. As with other data stores described herein, data store 56 may be a single data store or a number of operatively connected data stores. Terminal 52 further includes in operative connection with the computer 54, input devices 58 and 60 which include a keyboard and mouse respectively in the embodiment shown. Of course in other embodiments other types of input devices may be used. Terminal 52 further includes output devices. The output devices in the embodiment shown include a monitor with a display 62 and a printer device 64. Of course in other types of terminals other types of output devices may be used. The terminal 52 includes a computer with a browser component as previously described. The browser in the terminal communicates with the server in the image recorder device 40 through the network 44 for purposes of carrying out the functions later described in detail herein. Terminal 52 may also have a server operating therein as well as other software components.

Figure 3:
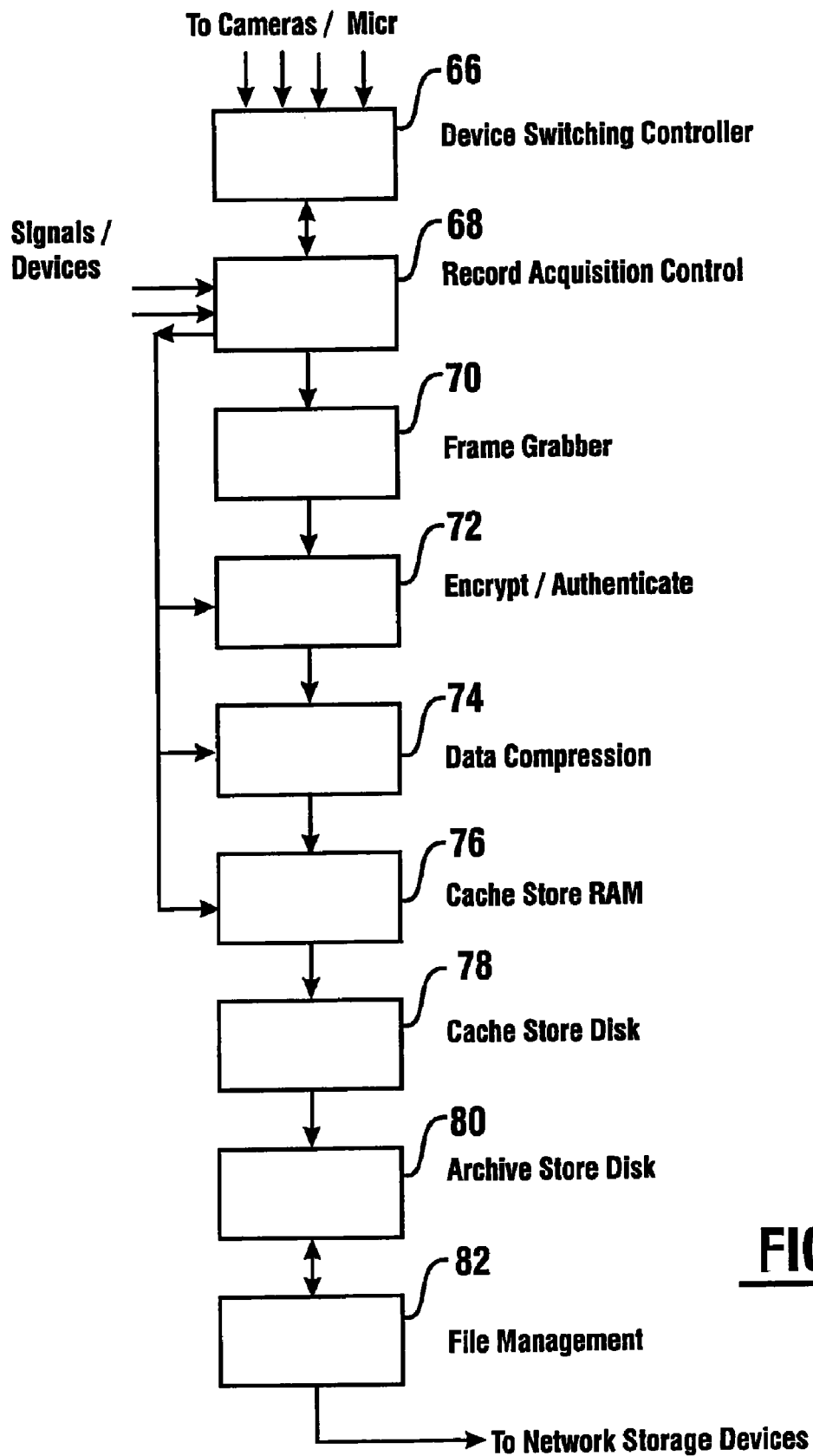
FIGS. 3 and 4 are schematic views of the relationship between the logical components which make up exemplary embodiments of the transaction record system.

The operation of exemplary embodiments are further described with regard to the interaction of logical components of the system described in connection with FIGS. 3 through 9. It should be understood that the logical components are generally combinations of software and hardware used in carrying out the described functions. As shown in FIG. 3 the input signals from the cameras, microphones or other input devices are input to the device switching controller component 66. The device switching controller component in exemplary embodiments may include several components. The switching controller delivers signals, which in the described exemplary embodiment are analog signals, selectively in response to a record acquisition control component 68. The record acquisition 68 component receives hard and soft trigger signals including signals which control or otherwise indicate the operation of the transaction function devices in the automated banking machine or other signals which are used as an indicator to initiate a sequence of actions. The record acquisition component executes the instructions which indicate which image signals are desirable to process and record in response to the trigger signals. The record acquisition component further includes or works in connection with stored instructions, which are operative to detect conditions such as loss of usable video from a camera or other input device, and to begin acquisition of data from other devices in response thereto.

The exemplary record acquisition component also operates in connection with stored programmed instructions to sense motion in the field of view of selected cameras or other input devices. As later described such instructions may include limiting the area of analysis to one or more selected detection areas within a field of view, and disregarding other areas. The record acquisition component may further process and pass off other data such as transaction data related to the operation of an automated banking machine for storage in correlated relation with image data. In some embodiments transaction and other numerical type data is selectively captured and stored in file records that are maintained separately from image data. Such transaction data may be correlated with image data at the time (which also indicates a date or other period of time) associated with the activity which is recorded for both image and transaction data. However, in other embodiments of the invention other methods for such correlation may be used.

In this exemplary embodiment the record acquisition component in accordance with programmed instructions further controls encryption techniques used in connection with image data, as well as data compression techniques which are used for storing images. The record acquisition component may further operate to store data and control other activities such as the sending of e-mail or other messages in response to the occurrence of certain conditions.

The record acquisition component 68 in this embodiment operates to send one or more camera signals to a frame grabber component 70. The frame grabber component is operative to generate digital image data corresponding to the analog camera signals which are passed to the frame grabber by the record acquisition component. Of course in embodiments where digital cameras are used the image data does not need to be digitized by a separate component. The image data from the frame grabber in this exemplary embodiment is passed to an encryption/authenticate component 72 which may be operated to include authenticating information within the image data. Such authentication data may include digital signatures, digital watermarks or other data which can be used to verify that an image has not been tampered with since it was acquired. In addition component 72 may operate to encrypt image data so as to minimize the risk of such data being accessed by unauthorized persons. In alternative embodiments such an encryption component may not be used.

A data compression component 74 may operate to compress the image data to minimize the amount of storage required for holding it. Such data compression may be performed through a number of different standard or nonstandard schemes. The degree of data compression may be selectively controlled. In this exemplary embodiment, the degree of data compression is programmable and may be changed through real time inputs or may be programmably controlled to change the degree of data compression. For example instructions stored in connection with the record acquisition component 68 may dictate that in response to certain events which are detected through hard or soft triggers, high quality image acquisition is required. In such cases data compression may not be used or a lesser degree of data compression may be used, to increase the quality of the images. Of course in such circumstances the record acquisition component may also increase the frequency at which images are captured from various input devices. In some instances, the image capture frequency may be increased to the extent that clips of generally visually continuous images are captured and stored.

After the image data is compressed in the exemplary system, it is transferred to a RAM cache store component 76. The RAM cache store stores the image and transaction data (and other system data that the record acquisition component may dictate be stored for a period of time). It should be understood that embodiments may operate to analyze cache store data for purposes of detecting and analyzing image and transaction data and for taking action in response thereto in accordance with programmed instructions. In some embodiments the record acquisition control component 68 operates to place images in storage from all cameras on a regular or nonregular periodic basis. These records initially do not correspond to any triggering event. However, some embodiments may operate in response to programmed instructions when a triggering event occurs to associate one or more images immediately preceding the triggering event to be associated with the images captured in response to the triggering event. This enables embodiments of the system to capture and retain those images of conditions which existed prior to an event. Such images may often provide valuable information concerning activities that preceded and/or caused the event.

In this exemplary embodiment, from the RAM cache store, image and transaction data is transferred in the system to a disk cache store 78. From the disk cache store 78, image and transaction data is subsequently transferred to an archive store component 80. The archive store component may in some embodiments be a permanent or temporary storage media such as a removable storage media as hereinafter described. Alternatively the archive store disk may be a CD-R/W type device or similar storage media which may provide temporary or permanent non-modifiable storage of image and/or transaction data. Alternatively various types of storage devices that may be off loaded or overwritten may be used.

The archive store component operates in connection with a file management component 82. The file management component 82 operates in accordance with programmed instructions to perform various operations. The file management component works in connection with other components to provide access to stored image and transaction data. The file management component also enables control of available memory to facilitate storage of data and minimize the risk that transaction and image data will be lost.

Figure 4:
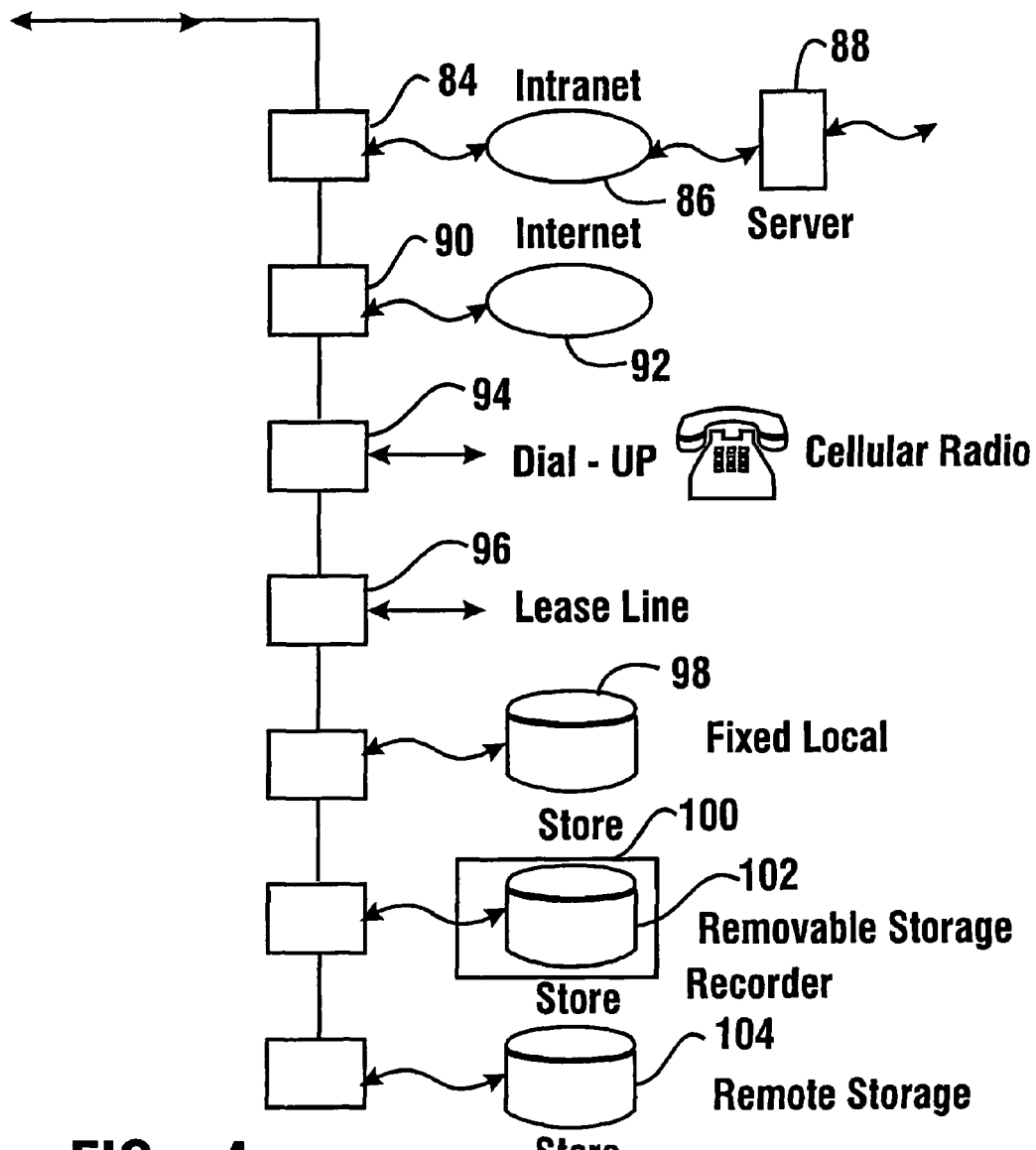

As represented in FIG. 4 the file management component 82 may work in connection with interface 84 to provide access through an intranet schematically indicated 86. As previously mentioned, terminals connected to the intranet may be used to access the stored data. A server 88 which operates as a firewall may be used to provide selective access to the intranet and to provide access to other networks. Such other connected networks may include a wide area network such as the Internet.

Alternatively an interface 90 may be used to provide access directly to the Internet schematically indicated 92. Appropriate controls may be used to minimize the risk of unauthorized access such as passwords and/or public key encryption. Digital signatures, session keys and the like may also be used to limit access to authorized persons.

An interface 94 may be provided to telephone communications networks. This may be accomplished through a dial up connection or a cellular connection. Such an interface may be provided for purposes of sending messages such as pager, fax or voice mail communications selectively to remote users or facilities.

An interface 96 to a lease line or other dedicated communications line may be provided for purposes of providing for both messaging and data communication. Of course in other embodiments other types of communications interfaces for communicating messages and for providing access to image and transaction data may be used. The particular configuration used will depend on the needs of the system and the capabilities of the remote communications method.

As discussed previously, the file management component 82 may be in operative connection with a fixed local storage component such as a data store schematically indicated 98. The local data store 98 in some embodiments may include database software operating in a data store in connection with a processor or computer in the automated banking machine. Alternatively the database may operate on the computer within the image recorder device 40 or in other computers operatively connected with the image recorder device.

In some embodiments, the image recorder device 40 or a connected device may include an image and transaction data recorder schematically indicated 100 in FIG. 4. The transaction data recorder operates to record image and/or transaction, or other data on a removable storage medium 102, such as a CD-R/W or other storage device. Such a removable storage device may include a permanent storage media which requires periodic replacement, but which is not subject to later possible modification as is the case with erasable storage. Such removable storage media may work in conjunction with other local storage or remote storage. Operating under the control of the file management component 82, this feature may in some embodiments enable storage of data in other data stores which accept overflow data on a temporary basis when the removable storage medium has become filled. When the removable storage media is changed, the recorded data in temporary storage in the other data store is transferred thereto. Alternatively, the file management control component may operate to periodically erase images and data as storage space is needed. This may be done selectively based on the age of the image, the nature of the event causing image capture or other parameters. Of course other approaches may be used.

As previously discussed, the file management component 82 may alternatively operate to cause the computer within the image recorder device to off-load image and transaction data. The off-loading of data may be made to remote storage devices schematically indicated 104 associated with connected terminal devices to which data may be sent through the network 44. Of course in alternative embodiments other approaches and techniques may be used.

Figure 5:
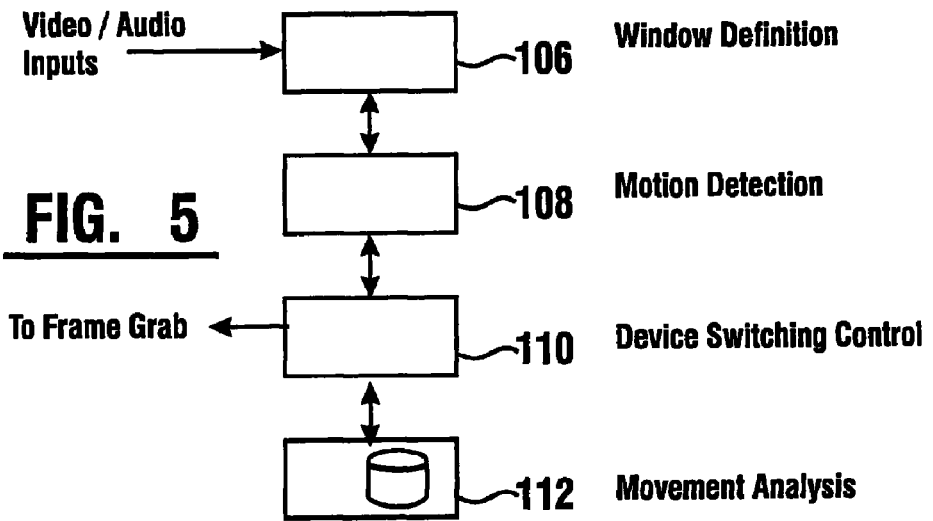
FIG. 5 is a schematic view of the operation of the logical components of an exemplary embodiment operating to detect motion in the field of view of a camera used in connection with an embodiment.

FIGS. 5 through 9 are schematic views which represent the operation of components comprising executable instructions in exemplary embodiments of the system. These components are preferably software components which operate in connection with the record acquisition component 68 and the device switching control component 66. In FIG. 5 a logic flow associated with motion detection is shown. The inputs from the cameras or the other input devices are processed by a detection area definition component 106. The definition component contains data and instructions representative of one or more detection areas in the field of view of particular cameras that are to be analyzed and/or disregarded for purposes of detecting motion.

In some systems motion may be occurring fairly frequently within a field of view of the camera, but such motion is not of interest and it is desirable to not capture image data in response to such motion. For example when a camera is located in the security area from which the serviceable components of the banking machine are accessed, motion may normally occur within a portion of the field of view of the camera while in other portions of the field of view motion only occurs when the machine is being accessed. A camera located in an ATM vestibule may have a window within its field of view. Activity occurring, outside the window may not be of interest and optimally should not result in image data being recorded. Motion detected through the window is disregarded responsive to programmed instructions in the motion detection component which excludes from the analysis movement detected within the window portion of the field of view.

A camera positioned in the interior of an ATM housing may detect motion even when the service door of the machine is not open. This may occur due to flashing LEDs or other indicators within the interior of the machine. The detection area definition component 106 may define detection areas that exclude such sources of light or motion from the motion detection analysis. In certain systems vibration or other regular movement may cause certain fixed objects to appear to move relative to a camera's field of view. The detection area definition component may be used to exclude from the analysis images of known objects within an area of normal movement. The detection area definition component establishes those areas of the field of view of each camera in which changes in the image indicative of motion are to be analyzed and/or those areas in which changes indicative of motion are not to be analyzed. It should be understood that the definition component may in alternative embodiments apply to other sensing devices such as infrared sensors or other sensor types which have a field of view for sensing regions in which activities are to be disregarded. It should also be understood that the definition component 106 may also be set such that all regions in a field of view which make up an image are analyzed for purposes of motion detection.

The detection area definition component in the exemplary system may be configured remotely by authorized users at user terminals connected to the network. This is preferably accomplished by inputs which divide portions of the field of view of each camera into one or more areas where detected motion is of interest and not of interest. Such areas are preferably designated graphically on the output screen of a user terminal and are readily changed by inputs from authorized users.

The detection area definition component communicates with a motion detection component 108. The motion detection component includes instructions which operate to compare sequential images obtained from the camera inputs. In one exemplary embodiment this is done by comparing intensities or color of corresponding pixels in one or more sequential or related images. The sequential or related images may be analyzed at periods fairly close in time. Changes in intensity or color of corresponding pixels of greater than a threshold amount are counted or otherwise mathematically analyzed. Changes above the selected threshold for at least a selected number of pixels in the entire image or selected detection area(s) of the image, indicate a substantial enough change such that motion is considered to have been detected. When motion is detected in an area of interest, the motion detection component signals a device within control component 110 which operates the device switching controller 66 and the record acquisition component 68 to acquire image data from the camera at which motion has been detected. The system may also move into more permanent storage image data captured prior to the triggering event depending on its programming.

It should be understood that the motion detection feature is only used to capture images from those cameras for which the system has been programmed to acquire image data based on motion detection. In the exemplary system shown, this is generally in the secure areas within the machine or an exterior area adjacent the area where a servicer performs operations. If the system is not programmed to acquire image data based on motion detection from a particular camera, motion within the field of view of that camera will not result in the more permanent storage of image data.

As previously discussed alternative systems or devices may operate to capture images on a generally continuous periodic basis. Such images may be temporarily stored in a queue or other memory and erased after a period of time. Exemplary systems may be programmed such that motion detection may be determined based on comparisons of pixels which make up these digitized images. The detection of motion may also cause the system to operate in accordance with programmed instructions to retain one or more images from the queue that preceded image in which motion was detected, and to store these prior images in correlated relation with the images captured in response to the triggering event. This feature enables an operator to review the conditions in the field of view of the camera prior to the triggering event. Such information will often prove useful in determining conditions or activities which led up to the triggering event.

The memory configuration of the described embodiment provides advantages in that the system is enabled to capture image and transaction data while delivering image and transaction data from storage. As a result unlike some prior art systems, the capture of image data does not have to be suspended while images are recovered or downloaded from the system. Further, the configuration of the system enables capturing image data from a number of sources virtually simultaneously. This solves a problem associated with certain prior systems which when configured to detect motion, operate to record only from a particular camera where motion has been detected. Other image data cannot be captured while image data is being captured from the camera where motion was detected. This presents opportunities for compromise of such systems by creating a diversion at a first camera and then carrying out improper activities within the field of view of another camera. The exemplary embodiment does not suffer from this deficiency as image data may be captured in a plurality of cameras virtually simultaneously, and triggering the capture of images based on detection of motion at one camera does not suspend image capture from other cameras. The system can also be delivering image and transaction data to a remote location while concurrently capturing such data from a plurality of sources.

The motion detection feature may operate in connection with an analysis component 112. The analysis component 112 may be used in various embodiments to determine various information of interest. This may include for example to measure how long it takes a particular servicer to perform particular service functions within a machine or within a service access area. Alternatively, the analysis component may be used to determine how long customers remain watching an output device on the banking machine before, during or after a transaction is completed. This may be used to provide information concerning the degree of interest that a particular customer or customers in general may have in a particular type of promotional presentation that is made at the automated banking machine or other output device. Such information may be recorded in connection with the data store and later used for further analysis. Such analysis may include in the case of the servicer, comparing performance of service providers or determining the relative ease of servicing of various types of machines or components. It can also be used to determine if, or for how long, a servicer had activity related to a component in the machine. In the case of customers and users, the analysis data may be used for targeting promotional type information to users in the future and/or for evaluating the effectiveness of marketing type activities presented through the automated banking machine. The functions performed by the analysis component 112 on the captured data will depend on the particular nature of the data to be analyzed, but such analysis may be facilitated by the availability of image and transaction data which is stored in correlated relation in the data store with the movement analysis data so that the validity of any conclusions made can be verified.

Figure 6:
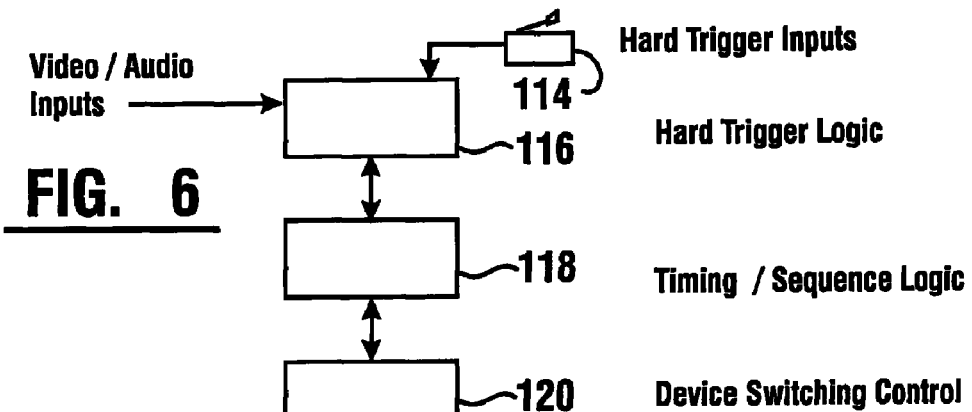
FIG. 6 is a schematic view of the operation of logical components of an exemplary embodiment responding to a hard trigger type input.

FIG. 6 schematically represents a further aspect of the operation of certain exemplary embodiments. FIG. 6 represents an example of how the system operates to capture image and transaction data in response to hard trigger inputs. Such hard trigger inputs generally correspond to sensors which sense conditions or other activities adjacent to the machine. As schematically represented in FIG. 6, a sensor 114 provides an input signal which is received by a hard trigger logic component 116. The hard trigger logic component is operative to determine the nature of the input and to communicate with a timing/sequence logic component 118 which controls what occurs in response to the particular input corresponding to a triggering event.

For example the sensor 114 may be representative of a sensor which senses when a service door on an automated banking machine is opened. The executable instructions programmed in connection with the system include instructions which comprise a sequence which controls what is to happen when this event is sensed. The timing/sequence logic component 118 will generally include information that may be time dependent, and/or a sequence of actions which are to occur. The sequence may include for example having image data captured generally continuously from particular designated cameras while the door is open. The sequence may further include sending one or more e-mail messages to particular e-mail addresses through the network so that individuals are notified that the machine has been accessed. As different entities may have responsibility for servicing machines depending on the date of the week or time of day, the routing of such messages may be time dependent and the programmed instructions may operate to send the messages to different addresses depending on the time that the event occurs. Such messages may include electronic mail messages which have one or more of the images captured included therewith.

The timing/sequence logic component 118 works in connection with a device switching control component 120. The device switching component 120 is operative to work in conjunction with the device switching controller 66 and the record acquisition control 68 to acquire image data from the selected cameras through the frame grabber. The device switching control component 120 may also be programmed in other embodiments to take other actions such as to operate or interface with alarm systems, automatic locking systems or other types of devices. In addition as previously described the timing/sequence logic component may also operate to temporarily acquire images from various cameras or other image capture devices on a periodic basis. The programmed instructions associated with the particular triggering event may include storing on a more permanent basis one or more images captured prior to the triggering event. These images may then be stored in correlated relation in the data store with the images related to the event. Such information enables an analysis to be made as the causes or events preceding the triggering event.

Figure 7:
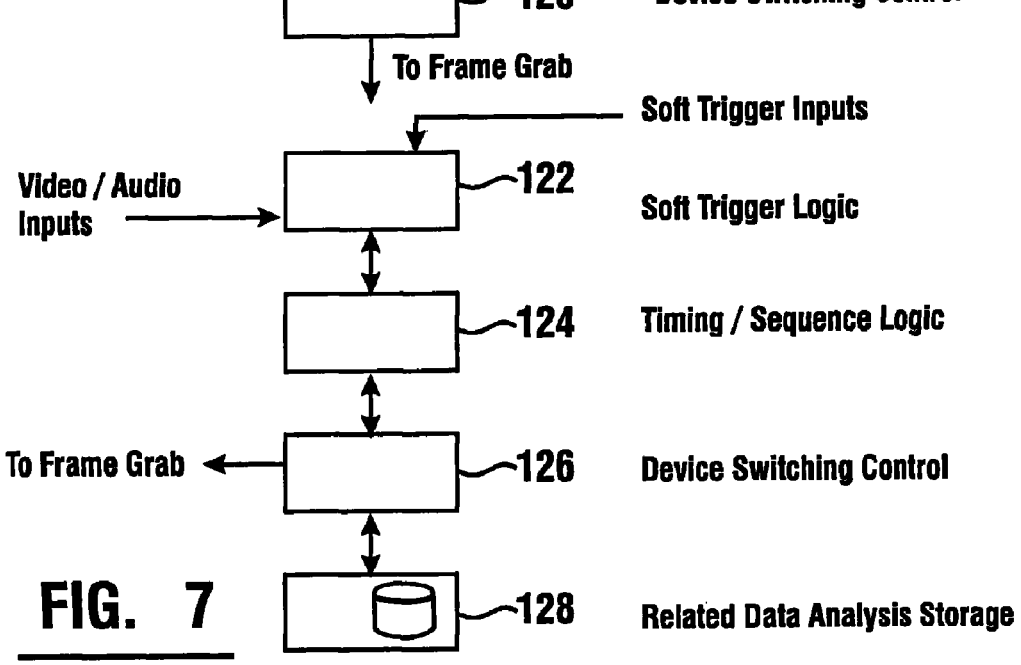
FIG. 7 is a schematic view of the logical components of an exemplary embodiment responding to a soft trigger input.

FIG. 7 is a schematic view of the operation of the system to acquire image and transaction data in response to soft trigger inputs. Such soft trigger inputs may include for example messages to or from transaction function devices on the interface bus within an automated banking machine. Alternatively such soft trigger inputs may include transaction messages transmitted between an automated banking machine and a host. Other types of soft trigger inputs may include receipt of other electronic messages either alone or in relation to other messages, so as to indicate a condition which requires image or transaction data acquisition. Other types of soft trigger events may be initiated in response to timing functions which operate based on programmed instructions and the current time, or which are timed from other events.

The soft trigger logic component 122 is operative to receive the soft trigger inputs and to analyze the nature of the conditions represented by the inputs received. For example the soft trigger logic component may determine based on software instructions stored in memory that particular signals on a bus or line being monitored represent the input of a customer card to a card reader and the account number associated with that card. In certain embodiments such account data is captured as part of the transaction record data and the input of such a card to the card reader is used as a trigger to capture image data so that there is a record of the user that input the card. Likewise messages indicative of the presentation of cash to a customer by a presenter may be detected and used as a further triggering event to capture image data.

In certain exemplary embodiments a series or set of images is captured in connection with a transaction carried out by a user in an automated banking machine. Such images in the set are preferably captured in response to the operation transaction function devices on the machine. Such images are stored and may be recovered and displayed together for later analysis. The storage of multiple images in a set related to customer transactions increases the likelihood that suitable images of the user and/or background will be acquired which may prove useful later if such images require analysis. In addition, the fact that account data and/or other transaction data is captured in connection with the image data and can be correlated therewith, enables searching the transaction data to recover the image data associated therewith. For example, because the transaction data commonly captured may include the account number as well as the user name encoded on the card, the transaction data may be searched using these parameters. This enables readily identifying transactions corresponding to these parameters and retrieval of the image data associated therewith. This greatly reduces the time to locate pertinent images compared to other systems. In addition, other types of sorting parameters may be used to recover images. These include for example, time periods during which transactions were conducted, amounts of deposits, amounts of withdrawals or other transaction parameters. Any of these transaction parameters that are stored in connection with or which may be correlated to image data may be used to selectively identify and recover images. Some exemplary embodiments may utilize face recognition software, such as is available from Lernout & Hauspie or other commercial sources, such that images may be searched for individuals based on data corresponding to an individual's facial characteristics. Other embodiments may include image acquisition devices such as biometric readers and scanners and image data from such image acquisition devices may be searched for corresponding biometric data. Of course in other embodiments other approaches to the capture of image data, transaction data and other types of soft trigger and/or search logic may be used.

Soft trigger logic component 122 operates in connection with a timing/sequence logic component 124. The timing/sequence logic component is operative responsive to programmed instructions input by a user during setup of the system. The timing/sequence logic component operates to capture image and transaction data selectively from various cameras and/or transaction function devices depending on events that are occurring and/or the date and time of such events. For example if particular transactions are occurring the timing/sequence logic component may take special actions different or in addition to those taken with regard to other actions. An example may be when a customer seeks to deposit more than a certain amount of funds in the machine or seeks to cash or obtain value for an instrument. The timing/sequence logic component may capture more frequent images or images from additional cameras during the transaction. Another example may be in the case of a reportedly stolen card. If the soft trigger logic identifies the input card as stolen, the logic component may operate to not only acquire additional image data, but also to send messages through the system or through other communications channels to police or other authorities. Exemplary embodiments may be in connection with at least one data store, which includes data corresponding to one or more images of users that are and/or are now allowed to operate the machine. For example, a data store may include image data corresponding to at least a portion of an image of a plurality of users authorized to carry out one or more transactions. The captured image data for a user of the machine may be compared to stored data and the machine enabled to operate and/or capture certain image data in response to the authorized user's image data being sensed. Stored image data may also or alternatively include data corresponding to individuals who would not be able to conduct some or all transactions. This may include for example, known or suspected criminals, and in response to sensing image data associated with such an individual, the operation of the machine or the carrying out of one or more transaction types by the machine, would be prevented in accordance with the programming of the machine.

An alternative embodiment may be used in connection with a banking machine which includes check accepting or other document accepting devices where the authenticity of the inserted document may require verification. The timing/sequence component may work in connection with an imaging device within the automated banking machine to capture an image of indicia on the inserted document, and to transmit an image of the document while the transaction is ongoing to a verification terminal in the network. Such a document may be viewed at such a terminal and/or electronically analyzed to compare the image of the document to verification information such as a handwriting or signature database for purposes of determining authenticity. The destination where such messages are sent may be varied depending on the nature and/or amount of the document, the time of day and other parameters depending on the instructions associated with the timing/sequence logic component 124.

Other exemplary applications of timing/logic sequence include minimizing the use of available image data storage by reducing or eliminating the amount of image data acquired related to certain transactions. For example the timing/logic sequence may include instructions to capture fewer or no image data related to transactions conducted that are of certain types. This may be appropriate for example in the case of an account balance inquiry. Likewise the instructions may provide that a dispense of cash below a particular amount, such as for example $100, may not result in the acquisition of image data. Likewise, certain deposit transactions for certain customers within certain limits may not require the capture of image data, or may have the system capture a lesser number of images than is captured in connection with other transactions, or the same transaction carried out by another user.

The timing/sequence logic component 124 may operate in connection with instructions that capture additional image data in connection with certain transactions by certain individuals. Additional image or transaction data may be captured based on selected time of day, or a combination of time and day, amount or the nature of the individual customer. Various schemes for using customer profile data, time of day data and other information accessible through the network may be used in combination with the soft trigger inputs to selectively control the image and transaction data capture capabilities, and the message sending and device control capabilities of the system in response to selected circumstances that may arise in the operation of the automated banking machine.

A device switching control component 126 operates responsive to the timing/sequence logic component to capture image data during the transaction. The device switching control component further operates to capture transaction data in connection with the transaction. This may include for example time and date data, account number data, amount data, transaction number data, user name data, machine location data and other data which can be derived from the soft trigger inputs or other information available to the machine. Such data may also include multiple items of similar data such as time data. This may be desirable for example when the ATM has an internal clock and the image storing device has its own associated system clock which may not be perfectly synchronized with the ATM clock. Capturing time data corresponding to both clocks may avoid confusion. Alternatively, programming may be provided for automatic clock synchronization and/or for obtaining time data or setting signals from another source.

Figure 25:
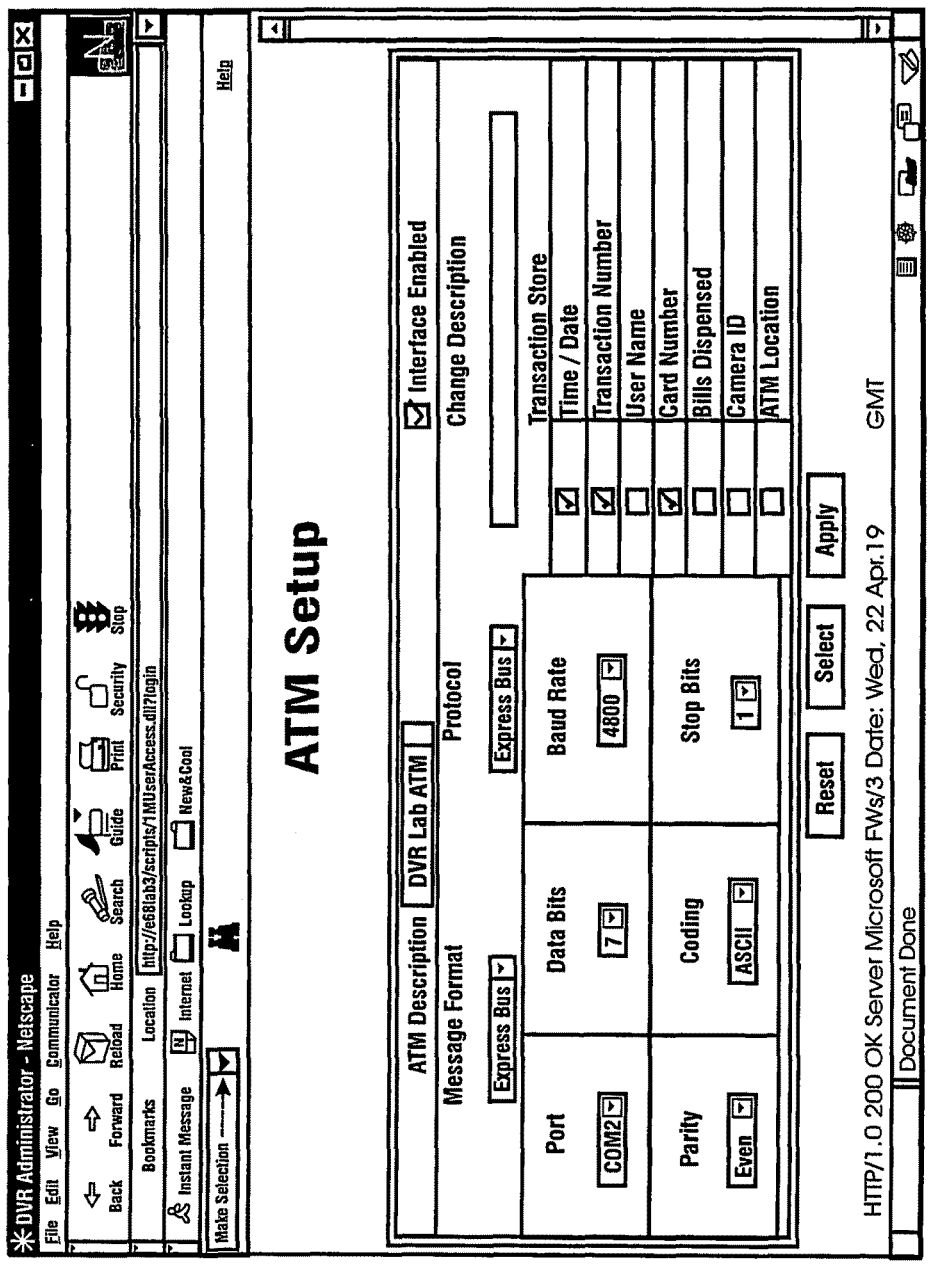
FIG. 25 is an exemplary screen presented at a user terminal for purposes of establishing image and data capture parameters during the carrying out of transaction functions at an automated banking machine.

In exemplary embodiments, the nature of the related data analysis can be set by the user during setup of the system. This is done through a user terminal and is preferably accomplished by selecting options in a setup window such as shown in FIG. 25. The related data analysis and storage component 128 operates to capture and store the selected data. The data analysis and storage component is further operative to store the related transaction and other data in correlated relation with the image data. In certain embodiments of the invention such correlation is provided by storing data representative of the time and date associated with the image data and transaction data. In other embodiments other approaches to correlate the image and transaction data may be used.

In alternative embodiments the data storage and analysis component 128 may also include instructions for analysis of received data such as to provide statistical analysis related to use of the machine. Such data may be used in connection with developing a historical use pattern for the machine which may be used in connection with the memory allocation activities performed by embodiments of the system as later discussed herein.

Figure 8:
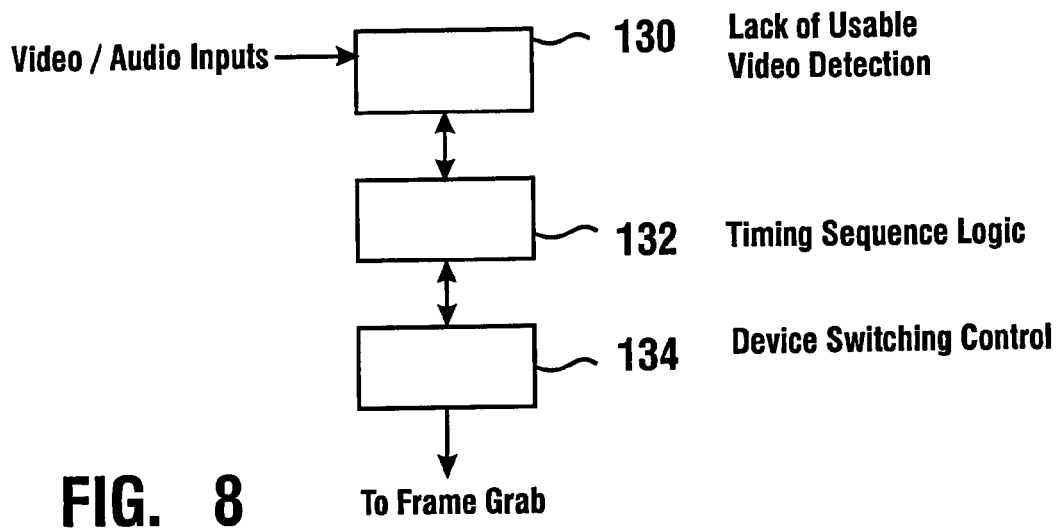
FIG. 8 is a schematic view of the operation of the logical components of an exemplary embodiment responding to loss of usable video from a camera.

FIG. 8 is a schematic view of the logic flow associated with operation of embodiments where a lack of usable video information is detected with a camera that is to be operated in the course of a transaction. It should be understood that the lack of a usable video logic may operate in connection with the motion detection logic, hard trigger logic or soft trigger logic previously described.

A lack of usable video detection component 130 operates in response to executable instructions to determine if a camera that is or may need to be operated is not providing suitable image data. This is done in an exemplary embodiment by comparing pixel data from the areas of the image that are indicated to be of interest by the detection area definition component 106 or from the entire field of view. The lack of usable video component 130 determines if pixels which comprise an image are generally all above or all below certain intensity or color levels and/or are lacking in contrast across the image so as to not provide a suitable image. The logic may check for example if generally all pixels are indicated as dark, which may suggest that a camera is being blocked or a lens has been spray painted so as to obscure the camera. Likewise the logic may check to determine if the pixels are generally all above a certain intensity value which may indicate that a glare condition created by reflected sunlight or a light operated by a person is obscuring a camera. The lack of usable video components may also operate based on detecting a rapid, large change in the field of view, or such a large change followed by an extended period without any change. A lack of usable video may also be based on detection of certain relatively unchanging high contrast images or sensing an unchanging image in a selected portion of a field of view. The lack of usable video component 130 may also be operative to detect that the camera signals have been interrupted. Various approaches may be taken to making a determination that there is a lack of usable video.

A timing sequence logic component 132 operates responsive to component 130 to take action in response to the condition. The action is taken in accordance with a programmed sequence which in the exemplary embodiment is set up by a user and stored in a data store. The sequence may include for example responding to a lack of usable video by capturing image data from additional cameras. For example if in FIG. 1 camera 24 is unable to provide usable video, image data may be captured from camera 26. The programming of the system may also operate in response to detecting a lack of usable video event to store in connection with the event one or more prior images that had been obtained and stored temporarily from the camera which is considered to be no longer providing usable video. Such images may be useful in determining the cause of the loss of usable video and/or the identities of persons which may have caused the loss of video.

In some exemplary embodiments the timing sequence logic component in response to the lack of usable video may cause the server component to generate a message to selected addresses in the network to indicate the nature of the condition. Such messages may include therewith one or more images. Likewise the timing sequence component may formulate messages to service entities responsible for repairing the system to indicate that there is a problem. In alternative embodiments the timing sequence component 132 may operate to perform activities through additional interfaces or computers such as turning on alarms, actuating additional lighting, contacting police authorities and/or disabling the automated banking machine. Such activities may be performed depending on the setup of the system as programmed by user.

The timing sequence logic component 132 operates in connection with a device switching control component 134. The device switching control component operates to capture image data responsive to programmed instructions and may also interface with other devices and systems to carry out functions determined by the timing sequence logic.

Figure 9:
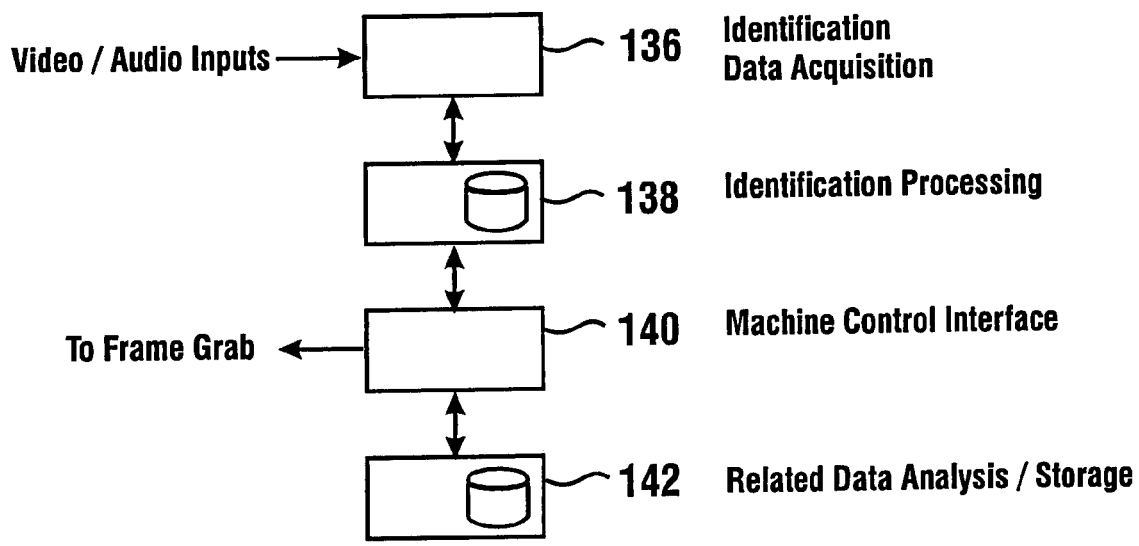
FIG. 9 is a schematic view of the logical components of an exemplary embodiment operating in connection with a user identification system which identifies a user based on visible properties associated with the user.

FIG. 9 shows an alternative logic flow used in connection with embodiments in which features of a user are used to identify and/or authenticate the user or actions carried out thereby. The logic flow represented in FIG. 9 includes an identification data acquisition component schematically represented 136. The identification data acquisition component in an exemplary embodiment operates to acquire data with a camera or other device for acquiring image data concerning a physical feature of the user. For example camera 24 may be used to acquire camera signals corresponding to a face of the user. An identification processing component 138 is used to compare the image data acquired to image data corresponding to a set of authorized users. Such authorized user data may be stored in a data store. As schematically indicated this data store may be within the automated banking machine or may be accessible through a network. Such identification processing may process not only user image data but also other data such as data from an object provided by a user, voice data, iris scan data, retina scan data or other data that can be used to indicate that a transaction is authorized.

If the identification processing component 138 is unable to identify the user then such information is provided to a machine control interface component 140. The interface component prevents operation of the machine but operates the system to capture image data related to the person who was unable to operate the machine. Alternatively if the user is identified as an authorized user by component 138, the machine control interface may authorize further operation of the machine, or may authorize such further operation if other indicia such as voice, numeric or other inputs correspond to the authorized user. Again the machine control interface component will operate to acquire image data concerning the authorized user. A data analysis storage component 142 operates to store data related to the transactions conducted by the authorized user and is operative to store transaction data in the data store. This may include the various types of transactions conducted by the user and may further include storing in correlated relation with the user data, data representative of instruments deposited by such a user, instruments produced for such an authorized user or other information related to the user's transaction which is stored for later recovery. The nature of the transaction information captured will depend on the nature of the automated banking machine and the image and transaction data captured in connection therewith.

The capture of images from the various cameras on a continuing basis in embodiments of the system may also be used for other purposes. For example, the facial features of criminals, missing persons or other individuals of interest may be stored in connection with the data store. The system may operate so that content of images captured on a continuing basis from cameras, or alternatively images captured in response to triggering events, are analyzed so that the facial features of persons in images are compared to images stored in the data store. Responsive to finding a match the system may operate in response to programmed instructions to trigger a sequence which may include capturing additional images, sounding alarms or sending messages electronically to selected individuals or entities. In some embodiments the machine may also operate to avoid carrying out one or more transactions for such individuals such as preventing delivery of one or more documents to such individuals, for example tickets for transportation. Messages sent may include therewith the captured images as well as information concerning the person who was indicated to be recognized. Such facial recognition may be carried out for example in some embodiments using software such as Face-It™ software which is commercially available from Lernout & Hauspie. Of course in other embodiments, other components and approaches to recognizing persons and images may be used.

In addition, because some embodiments may include image data stored in response to transactions and other triggering events, the stored data may be retrieved using the parameter of facial features or a particular individual's appearance. This may be done for example to identify instances where a particular service person has worked on a particular machine. Alternatively transaction data may be reviewed to determine instances where a particular individual may have used the debit or credit cards of another person in conducting transactions. Numerous uses of searching through the image data using such parameters may be used.

Alternatively or in addition, the image data received by the system may be analyzed on a real time or periodic basis for the presence of other features in images. For example, images captured from a camera adjacent to an automated banking machine may be analyzed for the presence of certain objects which appear in the field of view of the camera. Such objects may include for example certain types of criminal tools used to attack the automated banking machine. Alternatively, objects which may be recognized may include certain types of weapons or other objects. Various body positions such as a person raising their arms or lying down might also be recognized. In response to a captured image having the image condition of including an object or characteristic which corresponds to one which is recognized by the system responsive to stored logic, appropriate responsive actions may be taken. Again, such actions may include sounding alarms, shutting down the automated banking machine and/or sending messages including messages which include images to programmed addresses or devices. Embodiments of the invention may operate in conjunction with or as part of a system as described in U.S. Pat. No. 5,984,178 which is owned by the assignee of the present invention and the disclosure of which is incorporated herein by reference as if fully rewritten herein. The identification of particular individuals, objects or features in the field of view of a camera may be operative to cause the dispatch of messages through one or more types of message media to predetermined recipients of such information. The dispatch of messages may include synthetic voice messages dispatched by phone or similar media, paging, radio messages or other types of messages. In addition, the responses to such messages may be monitored and tracked in accordance with programmed parameters to assure an appropriate response occurs.

A further advantage of some embodiments is that the stored image data is capable of being searched for other visual conditions or appearance features. For example, stored image data may be searched to uncover images which were stored of users with certain facial characteristics. Such characteristics may include features that may be recalled by another person of a potential witness to an activity which occurred in the area where the image capture system is operating. Such image capture capability enables images to be sorted to look for persons with features such as certain hair color, facial hair, skin color, tattoos, earrings, jewelry, or glasses as well as for certain types or colors of apparel. This may include for example hats, ski masks, bandanas, ties and jackets. Of course, as previously discussed such features may also include features of a face of a particular individual. The ability of certain embodiments to sort through image data and to recover images based on one parameter or a combination of parameters enables the recovery of images that using prior systems would require considerably greater time and effort. As can be appreciated from the foregoing description, embodiments may provide many uses and advantages compared to prior art systems.

Figure 10:
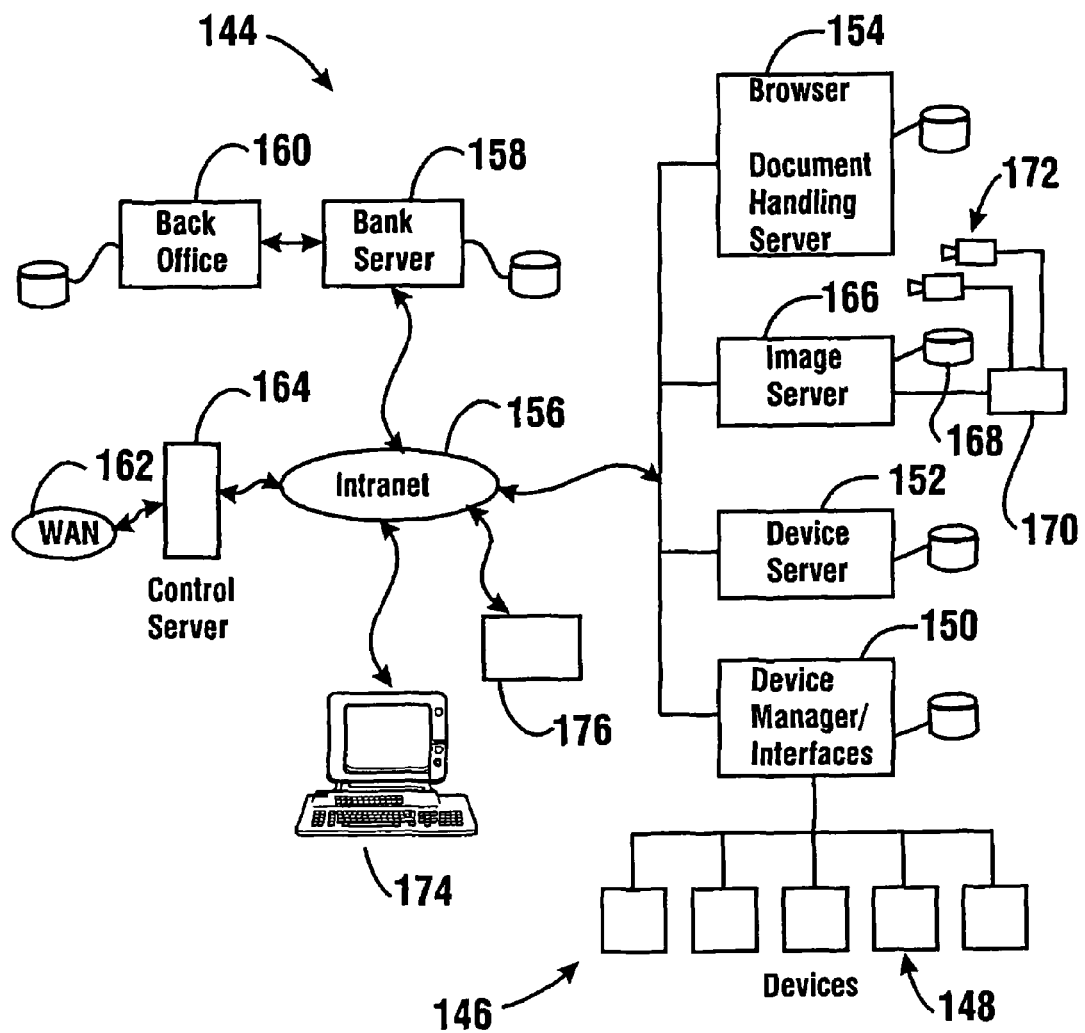
FIG. 10 is a schematic view of an alternative embodiment of a transaction record system in which an image server resides with other servers which operate the automated banking machine.

FIG. 10 is a schematic view of an alternative form of a transaction record system generally indicated 144. System 144 includes an automated banking machine which in the exemplary system is an automated teller machine schematically designated 146. Automated teller machine 146 is similar to the ATM described in the previous embodiments in terms of its outward appearance and configuration. However, the computer and software architecture of ATM 146 differs.

ATM 146 includes a plurality of transaction function devices 148. The transaction function devices include devices which can be used to carry out transaction functions with the machine. These may be similar to the transaction function devices of the previous embodiment. The transaction function devices generally include input devices such as a card reader, keypad, touch screen and/or function keys. The transaction function devices may also include devices for dispensing sheets and currency such as a bill dispenser and bill presenter. The transaction function devices may also include a depository, printing devices for printing transaction receipts, printing transaction records and other documents. The transaction function devices may also include a number of other devices.

The transaction function devices are operative in response to a device manager/interface component 150. The device manager interface component may be comprised of applets, programs or other applications written in a language such as JAVA by Sun Microsystems or Active X and/or C# by Microsoft. Component 150 preferably includes data and instructions which represent operational relationships among the devices, and such data and instructions are schematically represented by a data store in connection with component 150.

The device manager/interface component 150 preferably operates the devices in response to HTTP format messages which are delivered by a device server 152. The device server 152 similarly includes a plurality of applets or other programs which operate responsive to messages received by the device server. The device server contains the instructions which generally operate to control, coordinate and limit the operation of the transaction function devices within the ATM.

ATM 146 further includes a document handling portion 154. Document handling portion 154 is operative to process HTML documents and HTTP messages which the document handling portion selectively accesses. The document handling portion 154 includes a browser for selectively processing HTML documents or other documents. The documents accessed by the browser may include therein instructions such as JAVA script which are processed by the browser and which are operative to cause a computer to output messages through an output device such as a screen display of the ATM. The document handling portion 154 of this example further includes a server device that is operative to output messages to the other components of the machine as well as to a network 156 to which the machine is connected. The document handling portion 154 may access HTML or other documents through a bank server 158 or other servers which are connected to the network 156. The bank server 158 may also send and receive messages from the device server 152 and other components of the machine. As shown schematically, the bank server 158 is in operative connection with a back office processing system 160. The back office processing system is operative to maintain data records and account information, as well as to provide information for generating documents and messages which are delivered by the bank server 158.

It should be understood that ATM 146 may be operated through messages exchanged with plurality of servers which are connected to the network 156. This may include other bank servers directly connected to the network 156 as well as bank servers which are connected to a further network 162 which can be transmitted through a control server 164. An example of such a system would be a system in which network 162 is a wide area network such as the Internet and control server 164 serves as a firewall limiting the servers from which the automated teller machine 146 may receive instructions.

It should further be understood that the document handling portion 154, device server 152 and device manager/interface component 150 may in some embodiments comprise components which communicate through the operating system of the computer on which the components reside, or may communicate on a local area network which operatively connects the components of the machine. It should further be understood that in other forms of the invention the machine may be connected directly to the wide area network.

In the exemplary embodiment shown in FIG. 10, the server component associated with an image recorder device resides on the computer which operates at least some of the transaction function devices of automated teller machine 146. An image server component 166 is resident on the computer within the automated teller machine and is accessible through the network 156 at an address on the machine. As in the prior embodiment, the image server is in operative connection with at least one data store 168. The data store 168 includes executable instructions carried out by the image server as well as image and transaction data. It should be understood that the data store 168 may represent a portion of overall memory available in connection with the computer operating the automated teller machine 146. Alternatively data store 168 may include a separate data store such as a recorder with a removable storage media or a combination of allocated storage available on the computer in the machine and a separate data storage device.

It should be understood that in certain embodiments the computer in the automated teller machine 146 operates in a Microsoft Windows NT® 2000, or XP software environment and data storage is allocated between the components operating in the machine. Further the transaction data storage associated with the captured images accessible through the image server is shared with other transaction data storage maintained for transactions carried out by the machine, to reduce duplicate storage of data. Such transaction data storage information may be stored in the machine for purposes of archiving or accumulating batch data which may be later transferred to the back office 160 through the bank server 158 or to other locations. It should further be understood that in some embodiments, image data may be downloaded to other devices connected to the network 156 and accessed therefrom while transaction data may be maintained in storage at the ATM or in a different data store within the network. The downloaded data may be erased or overwritten after downloading to provide added storage space at the machine. Alternatively image data may be downloaded with or at generally the time of each transaction at the machine.

The exemplary embodiment enables accessing image and transaction information from different locations. This is accomplished by coordinating image data and transaction data which may be accomplished in some embodiments by including with the image data, data representative of source as well as information corresponding to a time associated with the transaction as previously described. This enables correlating the image data with the source transaction data corresponding thereto based on time and date. Of course other alternative approaches to recovering and correlating transaction and image data may be used.

As shown in FIG. 10 image server 166 is connected to a hardware interface schematically represented 170. Hardware interface 170 is shown connected to cameras 172 as in the previous embodiment. Hardware interface 170 of the exemplary embodiment performs the switching, acquisition control, digitizing and hard trigger receiving functions described in connection with the previous embodiment. Interface 170 may also be used to provide outputs for controlling camera aiming devices (such as pan/tilt/zoom), focus devices, lighting and other devices. It should be understood however that the allocation of such functions between a plurality of hardware and software components may be achieved in various ways within various embodiments.

In the embodiment shown in FIG. 10 the image server 166 is in operative connection with components 150, 152 and 154 which are primary operational components of the ATM. Such configuration readily enables configuring the image server to cause the capture of image and/or transaction data in response to soft triggers which are in the form of events which are fired to components in connection with the server. Such programming may be readily accomplished through visual programming tools used in connection with programming in JAVA and other languages. Such programming tools may include Visual Age® by IBM and Visual Studio™ by Microsoft. Use of such programming enables readily establishing and changing the soft triggers for image and other data acquisition as well as readily changing actions which may be taken in response thereto.

As shown in FIG. 10 other terminal devices may be connected to the network 156. This may include user terminals 174 of the type previously described as well as verification terminals, data storage terminals and other types of terminals that work in connection with the system. Network 156 may be connected to interface devices schematically represented 176, which provide gateways to other communications mediums of the type previously described. Such gateways may be used for sending messages to servicers, police authorities or other persons who are to receive messages in response to events which occur at the ATM based on the sequence of configuration data for the capture of image data stored in connection with the image server or other computer.

As can be appreciated from the configuration in FIG. 10 an authorized user operating a user terminal can access image data by accessing the image server with a browser and recovering image data from memory. This configuration further facilitates analysis of image data by being able to correlate transaction activity and the operation of transaction function devices with image data. Further the capability of the exemplary embodiment of the invention to capture image and transaction data while virtually simultaneously delivering image and transaction data to a remote user, facilitates maintaining ATM 146 in operation. Actions in response to triggering events may include panning, tilting or zooming cameras which may be used to verify suspect lack of usable video events or as actions in a sequence. Other advantages of this embodiment due to the flexibility and the ability to readily make changes in configuration will be appreciated by those skilled in the art.

Figure 11:
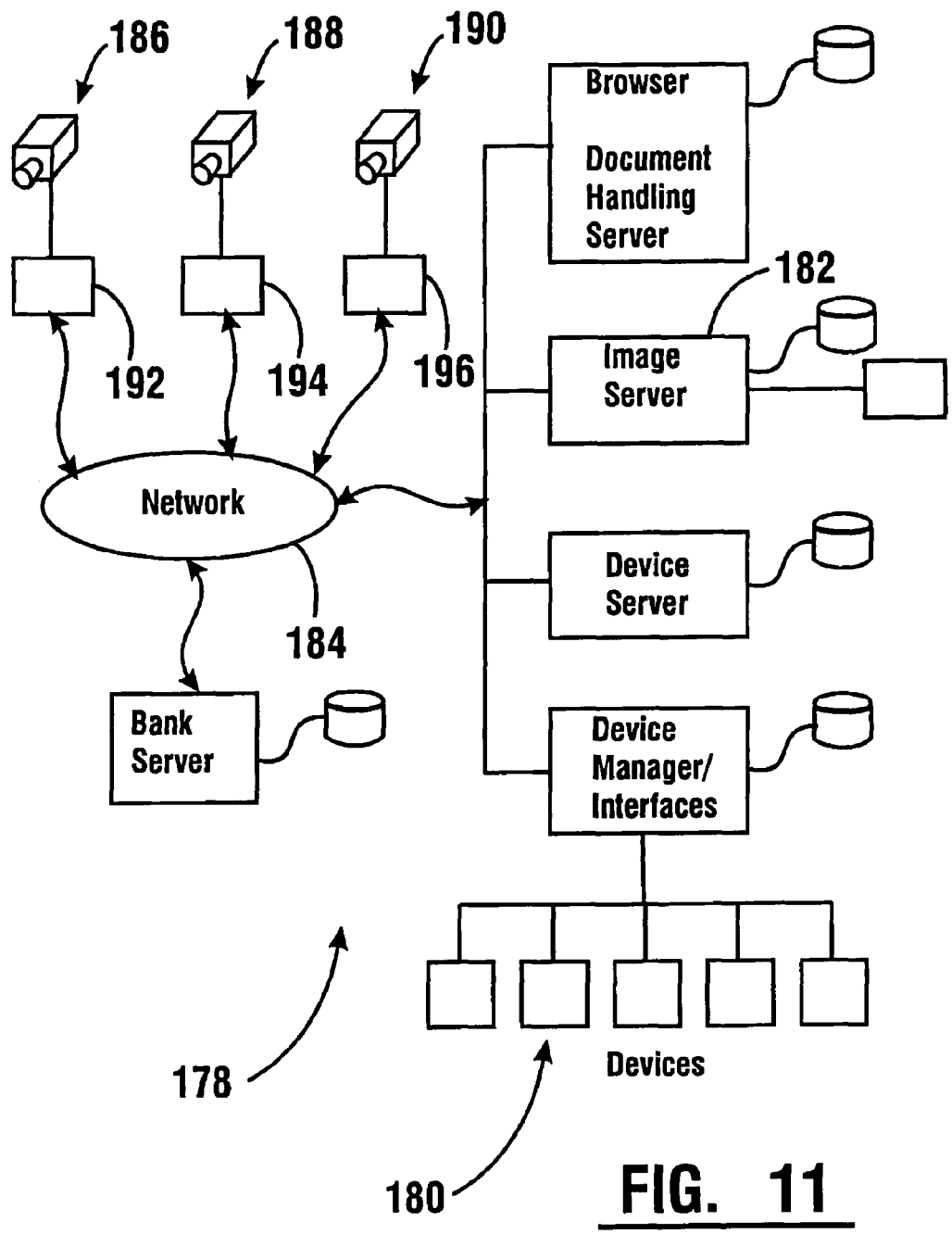
FIG. 11 is a schematic view of a further alternative embodiment of a transaction record system in which the image acquisition devices are separate nodes on a network.

An alternative embodiment generally indicated 178 is shown in FIG. 11. The system 178 includes an automated banking machine which is an automated teller machine generally indicated 180. ATM 180 is similar to ATM 146 previously described except as discussed herein.

ATM 180 includes a computer which includes an image server 182. Image server 182 operates in a manner similar to image server 166. However image server 182 instead of acquiring image signals through a hardware device obtains image signals from a connected network 184. In the system shown in FIG. 11 cameras 186, 188 and 190 are each connected to a mini server 192, 194 and 196 respectively. The cameras and mini servers are each operative to function as a network node in connection with network 184. Each network node includes hardware and software which converts the camera signals to image pages or similar image files that can be transmitted through the network 184. These images can be relatively spaced in time or close enough together to be considered as full motion. The programmable instructions executed in connection with image server 182 are operative to selectively access the cameras through the associated mini server and to download images therefrom. Such images may be stored as image data in correlated relation with transaction data in the data store within the automated teller machine. Alternatively image data may be stored in data stores associated with each of the mini servers so that it may be selectively accessed therefrom by image server 182 as well as from other authorized terminals within the network.

As can be appreciated, this alternative configuration further distributes the acquisition of image data and transaction data. However as the transaction data is accessible through the image server 182, and the system location of the mini servers 192, 194 and 196 are each known from their associated URL or similar system address, correlation and recovery of image and transaction data may be readily accomplished. It should further be understood that while in the configuration of the system shown in FIG. 11 each camera is shown with an associated mini server, a group of several cameras may be interconnected and may selectively deliver image data through a single mini server to the network. Alternative configurations may be used to suit the particular nature of the system being operated.

Figure 12:
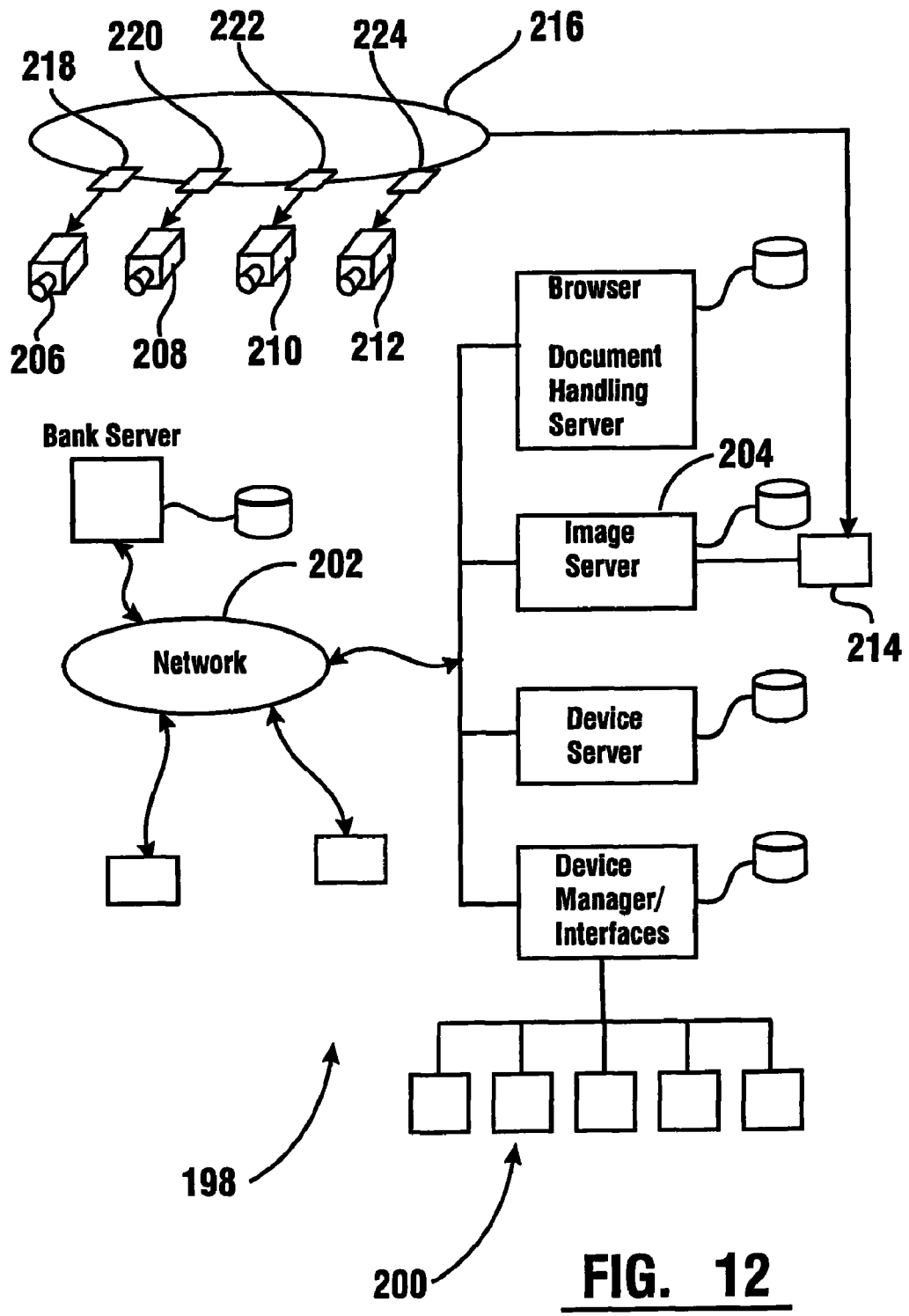
FIG. 12 is a schematic view of a further alternative embodiment of the transaction record system in which the image acquisition devices reside in a second network.

FIG. 12 shows yet another alternative system generally indicated 198. System 198 includes an automated banking machine which is indicated as ATM 200 which may be generally similar to ATM 146. ATM 200 is connected to a network 202. A computer including an image server 204 generally similar to image server 166, operates on ATM 200. Cameras 206, 208, 210 and 212 operate to supply camera signals which are received by image server 204 through an interface 214. In this embodiment the interface 214 is an interface to a second network schematically indicated 216 in which the cameras are connected. The interface 214 may include an interface to a power supply network to which cameras are connected. Interface 214 may be for example an interface to a power distribution system within a facility in which the ATM is operated. An X-10 technology type of communication may be used for example. Signals from the cameras 206, 208, 210 and 212 are superimposed on the power distribution line through a plurality of impedance matching interfaces 220, 222 and 224 respectively. Signals sent by interface 214 are operative to cause selected ones of the cameras to output camera signals superimposed on the power distribution lines. Such image, signals may be received at interface 214 and processed in the manner similar to other camera signals as previously described. Camera signals sent in the second network may take various forms of analog and digital signals and may be multiplexed or otherwise sent simultaneously so that image data may be acquired and captured selectively by each of the cameras as described in connection with the previous embodiments. Signals for controlling or positioning cameras may also be transmitted through the network as well as image data.

Figure 13:
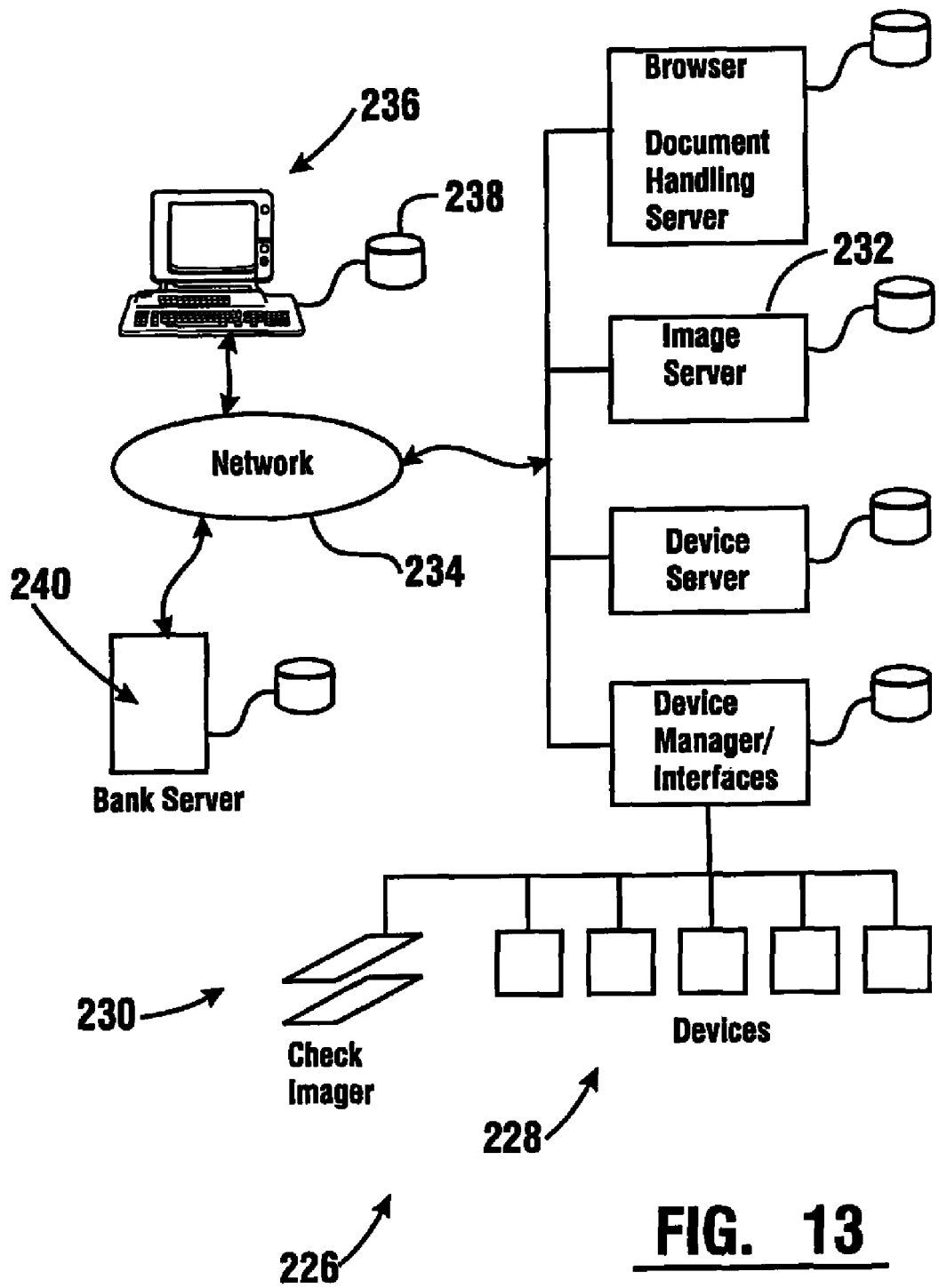
FIG. 13 is a schematic view of a further alternative embodiment which includes an automated banking machine with a document imaging device.

FIG. 13 shows yet another embodiment referred to as system 226. System 226 includes an automated banking machine 228. Machine 228 is an ATM similar to ATM 146 except that it includes among its transaction function devices a check or other document imager schematically indicated 230. ATM 228 operates to accept checks or other instruments from users of the machine in response to control by the other components. The imaging device 230 operates to produce document image signals representative of documents that may be deposited or received by a user in the machine. An image server 232 or a computer in which it operates is operative to cause the capture of images produced by the imaging device and store image data responsive thereto in the associated data store. In addition, the computer is operative to cause the machine to capture transaction data and/or to correlate transaction data captured by other components of the machine, with image data. Image server 232 and the associated computer may also operate in connection with cameras and other input devices similar to those discussed in connection with the previously described embodiments. The computer may further store camera image data in memory in correlated relation with document image data generated from the imaging device.

Image server 232 is in operative connection with a network 234. Network 234 is in operative connection with a terminal 236. Terminal 236 may serve as a document verification terminal. Terminal 236 has in connection therewith a verification data store schematically indicated 238. Verification store 238 includes therein data representative of indicia which can be used to verify genuineness of documents input to the machine through the imaging device. For example verification data store 238 may include data representative of customer signatures and/or other identifying data for customers authorized to provide checks into the machine. Document verification terminal 236 includes a computer including a browser therein.

The terminal 236 is controlled responsive to input devices that access document image data through the image server 232. The document verification terminal 236 operates responsive to the document image data to compare indicia in or associated with the document image data, to indicia stored in the verification data store. This may be done for example by comparing image data related to checks or similar documents input to the check imager 230 to images of known genuine signatures stored in data store 238. Such indicia may be compared for genuineness by human comparison on a side-by-side basis by outputting such information to an output device such as a screen. Alternatively the data may be manipulated to place such signature data in overlapping relationship or in other relative positions so as to facilitate analysis thereof. Alternatively, verification terminal 236 may include instructions such as software programs which are operative to compare indicia in document image data to indicia stored in data store 238. Such verification software may compare the signature data from the input document and the known genuine signature and provide an indication of suspect signatures or possible forgeries. This may be accomplished by comparing the image data corresponding to contours of letters, portions of letters or combinations of letters within a signature, and indicating when a level of correspondence does not exceed a particular threshold.

Image server 232 may have associated instructions which cause document image data to be provided automatically periodically to verification terminals 236. Alternatively image server 232 may be configured to operate in connection with other components of the machine to provide an indication during a transaction involving an instrument, and to forward such document image information through the network 234 so that the character or genuineness of the deposited document may be verified before the transaction is completed. This has the advantage in that when cameras are used in connection with the machine, one or more images of at least a portion of the individual operating the machine as well as the document image data may be viewed or processed before crediting or charging the customer's account for the value of the deposited or dispensed document respectively. The ability to capture the image of the customer along with the document image and to store the two in correlated relation further facilitates tracking and minimizes fraud. In addition, the verification terminal 236 may operate in the manner previously described in connection with user identification software which enables identifying a user by image, physical and/or other characteristics. This further minimizes the risk of fraud.

It should be further understood that although the exemplary embodiment has been described in connection with a document imager and an attended verification terminal 236, other embodiments may operate using unattended verification terminals such as terminal 240 which operates to carry out verification activities according to stored instructions without human interactions. Alternatively other embodiments may verify the authenticity of deposited documents through watermarks, holograms, inks having magnetic, fluorescent or other characteristics or other indicia which is indicative of genuineness of deposited documents. Other approaches and configurations may be used depending on the nature of the documents being accepted or dispensed and the indicia which must be compared or processed in order to determine the genuineness of the accepted document.

It should further be understood that features of the system shown in FIG. 13 may be applied to systems in which documents are printed with identifying indicia so as to enable more ready verification of their genuineness. This may include for example printing indicia corresponding to an image of at least a portion of a user on a check or other document dispensed by the machine. This may be done for example, by the image server in response to image data from a camera or other image data acquisition device, which has a portion of the user, for example the user's face, in its field of view during the transaction. Such image data may be delivered by the image server to the printer which is one of the transaction function devices in the machine. The image data may be used by the printer to produce a document which includes indicia corresponding to the image of the authorized user. The indicia corresponding to the user may in some embodiments comprise a visual representation of the user. In other embodiments the indicia may comprise a code, arrangement, design, color or other perceptible indicator(s) that correspond to all or selected portions of a user image data. Indicia may be human readable, machine readable, or combinations of both. This indicia reduces the risk of the document being presented by unauthorized persons. In addition or in the alternative a computer in connection with the image server may obtain image data concerning an authorized user, watermarks or other information from memory or from terminals connected to the network 234 or may generate one or more identifying numbers or other indicia, and include such information or indicia in printed documents it produces.

Embodiments may produce an image of the user on various types of documents. For example, machines that deliver checks, vouchers, tickets, scrip, food stamps, paychecks or other items may include indicia corresponding to an image of the user on the item. This can be used to assure that the person who redeems the item is the proper person. This may also be used for example with coupons or other premiums which are provided by the machine. If a particular person is issued such an item, the entity who redeems it can verify that the person who uses it is the person to whom the item was issued. Thus the entity or device for whom a person having the document seeks to redeem such an item for value, goods or services can have greater assurance that the person seeking to redeem the item is the proper person by comparing indicia on the item to data concerning the person. Of course, additional indicia such as symbols, codes, numbers or other characters may also be included on items issued by some embodiments. Such further indicia may include indicia which corresponds to the particular transaction and/or the image of the user, and perhaps other data, on the document dispensed by the machine. Such indicia may be read or scanned at the time of redemption for purposes of tracking the item. In addition, if at least a portion of the indicia is related to the image, such indicia and the image may be analyzed for the corresponding relationship to assure that the item presented is not fraudulent. Such comparisons may be made through operation of one or more computers connected to appropriate reading devices and appropriately programmed at a location away from the ATM issuing the document, where the document including such indicia is sought to be redeemed.

In some embodiments indicia corresponding to an image of the user may be included in transaction receipts produced by the machine. For example, producing an image of the user on the transaction receipt may provide the user with greater assurance that evidence of their transaction has been recorded. Such transaction receipts also provide the user with additional evidence that they conducted the transaction or transactions reflected by the receipt. The printing of the image of the user on the receipt may also serve as a deterrent to theft or fraud. This is because the presentation of the image on the receipt will make the user of the machine aware that images have been captured during the transaction. As a result, a user may find it difficult to later claim they did not conduct the transaction or that their card or other item which enables conducting transactions, was used by an unauthorized person. Likewise, criminals who may steal cards or other items may be reluctant to use them because they know that their image will be captured by the system if they attempt to conduct a transaction.

Exemplary embodiments may be used to enable the conduct of additional transaction types. For example, persons are now enabled to conduct many types of transactions through the use of electronic signatures. Automated banking machines or other devices may enable a user to agree that an image may serve as their electronic signature. The image may be, for example, an image of the user's face. Alternatively, the image may be an image of another portion of the user such as a fingerprint, iris scan, retina scan of other anatomical portion.

The operation of the machine may present one or more outputs or inquiries to the user in carrying out a particular type of transaction that would normally require a signature to be legally binding on the user. The user may be advised by the one or more outputs that their recorded image at the machine will constitute their electronic signature. In addition or in the alternative, the user may be required to provide one or more inputs through an input device on the machine to agree or acknowledge that their recorded image will serve as their electronic signature. Of course, the image of the user may be captured at one or more points in the transaction sequence to document the user's agreement. The machine may then proceed with the transaction steps. One or more inputs by the user to the machine to indicate the user's assent to particular transaction terms (along with their image) will constitute a binding electronic signature. By preserving records in a data store corresponding to the user's inputs and image along with the relevant terms, the operator of the machine may later establish formation of a contract on terms that would otherwise require a signature. Likewise, a user may receive from the machine a printed transaction receipt or other document (s) that show the details of the particular transaction and their image as their electronic signature.

An example of such a transaction may be the opening of an account with a financial or other institution at an automated banking machine. The machine may present the user with the relevant terms through one or more output devices. Instead of signing a document to indicate agreement, the user may indicate through one or more inputs through one or more input devices on the banking machine that their image or portion thereof will be their electronic signature. In some such transactions where a record or endorsement of the user's signature is required for legal effect, such as for cashing paper checks, the user may provide one or more inputs to indicate that their image data in conjunction with the transaction will constitute their electronic signature for purposes of endorsing the check. In other embodiments the user may insert a document with a written signature. The written signature may be captured with an image capture device and used for later verification in lieu of a written signature card. Alternatively or in addition, images of the user producing their written signature may be used to provide further evidence that the written signature is genuine. Other examples of transactions in which a user's image may serve as an electronic signature include endorsement of checks, taking out loans, purchasing securities, purchasing insurance, acknowledging privacy notices and any other transaction that may be legally consummated using an electronic signature. In some embodiments indicia corresponding to at least one image of at least a portion of a user may be recorded in a data store and/or recorded on a document in the machine to record such user's electronic signature, endorsement or agreement to contract terms. In some exemplary embodiments, an automated banking machine may operate to produce or receive documents for which a signature has legal effect. An example of such a document may include a negotiable instrument such as a check to which an endorsement or signature must be applied by the holder to cash the check. Of course in other embodiments automated banking machines may operate to issue negotiable instruments or other documents in which an electronic signature applied through operation of the machine serves as the maker's electronic signature.

In an exemplary embodiment an automated banking machine may be used for receiving checks from a user to be cashed by the machine. In such an embodiment the controller of the machine may cause the machine to operate in accordance with its programmed instructions to instruct the user on the operation of the machine and to prompt the user to provide inputs. In this exemplary embodiment the user provides the check into the machine where it is acted upon by a document processing device. In the exemplary embodiment the document processing device includes an imager which is operative to produce data which corresponds to a visual representation of the document. In some embodiments this visual representation may comprise the entire document (including in some cases both sides) while in others the data may represent selected portions thereof. The machine presents to the user outputs through one or more output devices asking the user if they agree that one or more inputs that they provide to the banking machine will be all or a portion of the user's electronic signature for purposes of the document. In response to receiving such an output the user may provide one or more inputs through input devices on the machine to indicate that they do not agree or that they do agree that the user's electronic signature will include at least one input to the machine.

In an exemplary embodiment if the user indicates such agreement, the controller is operative to cause an image acquisition device to acquire data corresponding to at least one image of a portion of the user. Such an image acquisition device may in some embodiments include a camera. In other embodiments the image acquisition device may include a biometric reading device or other type of input device that can capture image data from the user. In the exemplary embodiment the data corresponding to the at least one image of the user is stored by the controller in a data store along with data corresponding to the input provided by the user indicating agreement as to their electronic signature. In some embodiments the data corresponding to the user's one or more inputs, the images of the user and the data corresponding to the image of the document may be stored in correlated relation with one or more of the other items of such data for purposes of documenting the transaction and for purposes of establishing the genuineness of the user's electronic signature in connection with the document.

In the exemplary embodiment the controller operates in response to the data corresponding to the at least one image of the user to operate a marking device in the banking machine. The marking device in the exemplary embodiment operates to apply indicia corresponding to the at least one image to the document. In some exemplary embodiments this indicia may correspond to a visual representation of a portion of the user such as the user's face. In other embodiments the indicia may correspond to a user's fingerprint or iris scan depending on the type or types of image acquisition devices utilized by the automated banking machine. In other alternative embodiments the indicia may include codes, symbols or other arrangements produced by processing the data corresponding to the image or images of the user (and perhaps with other data) so as to produce such items that can be later documented as genuine. In addition or in the alternative the indicia may include machine readable indicia which may later be read through the aid of a machine and correlated with the image data and/or other data to establish the genuineness of the user's electronic signature.

In some exemplary embodiments the indicia which corresponds to the user's electronic signature may be printed on the document by the marking device. The document may then be imaged by the imager in the automated banking machine so as to produce a record of the check and its endorsement. Thereafter in some embodiments the check may be stored in a storage location in the machine. In alternative embodiments the check may be permanently marked or otherwise rendered unsuitable for further use and either stored in the machine or returned to the user. By returning the cancelled check to the user the need for storing checks within the automated banking machine may be reduced or eliminated. Further as can be appreciated the imaging of the check provides data which can be provided to the maker of the check for purposes of establishing that the check was cashed by the holder. In some embodiments the maker of the check may be able to access image data online in the manner previously discussed so as to review checks which have been cancelled through operation of the machine. In some embodiments the maker of the check may also be enabled to access data corresponding to images of the machine user presenting the check should it be necessary to establish the identity of the holder that cashed the check. Alternatively schemes may be devised for recovering image data or producing image data or other information to establish the identity of the person cashing the check based on the indicia which corresponds to the electronic signature that is applied to the check.

It should be understood that the principles of having a user of an automated banking machine provide an input indicating agreement that the user's electronic signature shall include at least one input to the machine, may be applied to other types of transactions other than check cashing. In addition the use of data corresponding to at least one image of a portion of a user as a user's electronic signature may be applied to many types of transactions that can be carried out through an automated banking machine.

Exemplary embodiments may also provide additional capabilities. For example, an automated banking machine may acquire images at times not necessarily related to transactions. The one or more cameras associated with the machine may be used as a surveillance system. For example, a retail establishment may use the one or more cameras on or in connection with the banking machine as a premises surveillance system as well as for use in connection with transactions. As will be appreciated from the discussion herein, the capabilities of embodiments to capture images from multiple cameras generally simultaneously facilitates use for this purpose as surveillance of other areas of the premises may continue even when the machine is being used to perform transactions.

Exemplary embodiments may also be used for other functions. For example, embodiments may be used instead of a time clock for workers in a particular location. For example, workers entering or leaving work may pass by or stop at the machine so that their image is recorded. This may be in conjunction with the employee having to provide certain inputs, or conduct a particular specified type of transaction sequence at the machine. For example the worker may have a special employee card that is used by the machine to record data indicating that the person is arriving or leaving the work site. Alternatively, a card normally used by the employee for banking or other transactions may be used in the machine to record arrival or departure. The machine may be programmed to conduct a particular non-financial transaction to record such activities. Alternatively, the user could be paid on a daily or other periodic basis directly from machine for work done. This may be done by the machine dispensing to the user items of value such as cash, a check or scrip for time worked. Such documents may include visual representations of a payee's face or other indicia corresponding to the payee or individual authorized to cash or redeem the document as previously discussed. Alternatively or in addition, embodiments may use face recognition or other biometric recognition techniques for purposes of identifying persons who pass the machine. Of course, it should be understood that while in this exemplary embodiment the machine is used for timekeeping purposes, the principles of the described system may be applied to other functions as well.

Embodiments may also be used to make payments. This may include, for example, making payments for payroll, public or private benefits, gaming winnings or other amounts. For example, an automated banking machine may be used to make payroll payments to employees. Such function may be integrated with the timekeeping function previously discussed so that employees are issued payment for work on a periodic basis. Likewise, persons who are entitled to receive payments may conduct particular transaction sequences at the machine or otherwise elect to receive payments from the machine.

Captured image data at the machine may be used to identify or verify the identity of the user at the machine. This can be done through access to image data in local or remote data stores. If the machine issues instruments such as checks, for example, an image of the person to whom the instrument is issued may be recorded by the system. An image of the user at the machine who receives the instrument may also be produced on the instrument. Alternatively or in addition, a previously stored image of the person to whom the instrument is authorized to be issued may be produced on the instrument. In this way a person redeeming the instrument may compare the images on the instrument and/or the appearance of the person presenting the instrument, to verify that the instrument is properly issued and redeemed. In addition or in the alternative, one or more images may also be produced on the receipt related to the instrument as well.

In some embodiments the user may receive cash at the machine in the amount they are entitled to receive. In such circumstances images may be captured to document the payment and to minimize the risk or fraud. In some embodiments the amount that may be paid out by the machine may not be able to match exactly what the user is entitled to receive. This may be due to the fact that the amount the user is entitled to receive may require payment to be made at least in part in coin or some other type of value which the machine does not dispense. Likewise, the machine may dispense only certain bill denominations and the payment to the user requires some smaller denominations to be paid in full. In such circumstances the machine may dispense an amount as close as possible but below the amount which the user is entitled to receive. The machine may also produce a document which can be redeemed by the user for cash, goods and/or services for the balance. Such a document may include an image of the person or other indicia corresponding to the person entitled to receive such amount. Such a user may take the document to a teller, check-out counter, machine or elsewhere and receive the cash, goods, services or other value for the balance. The image of the user and/or other indicia on the document may be used to help assure that the document is redeemed by an authorized person.

Further alternative embodiments may enable correlating image and transaction data for documents received or produced by the machine. This enables users at other terminals which have access to the network 234 to verify the appearance features, such as the appearance of a person to whom a document was issued. This enables persons accepting such documents to verify the authority of the person presenting the document to possess it. In addition if the document is redeemed at another terminal, the image of the person redeeming the document may be compared to the image of the person who received the document to verify that the document is being redeemed appropriately. This may be done visually using an output device at the terminal where the document is redeemed or may be done at a remote verification terminal in the network by an operator or by image comparison software. Alternatively identifying indicia in a presented document may be checked for genuineness and/or validity. For example, the redemption of documents may be recorded and tracked, so that upon presentment a check is made as to whether the presented document has already been redeemed.

Similar principles may be applied with regard to data representative of value which is loaded onto smart cards or similar instruments. Data representative of the image of the person who has received the value may be stored in correlated relation with indicia corresponding to the transaction in which value is loaded and/or with identifying indicia associated with the card. Later when an individual presents that same card at the same or a different terminal, an image of the person presenting the card may be captured and/or the appearance of at least a portion of the person may be compared to the image data stored in memory. Image data of the authorized user may also be stored in memory on the smart card. Such image data may correspond to facial features. Alternatively image data may correspond to other features that are capable of being viewed by eye or read with the aid of a machine such as fingerprints and iris scans. Similar principles may be applied to other types of transaction systems and devices to minimize the risk for fraud and abuse.

Figure 14:
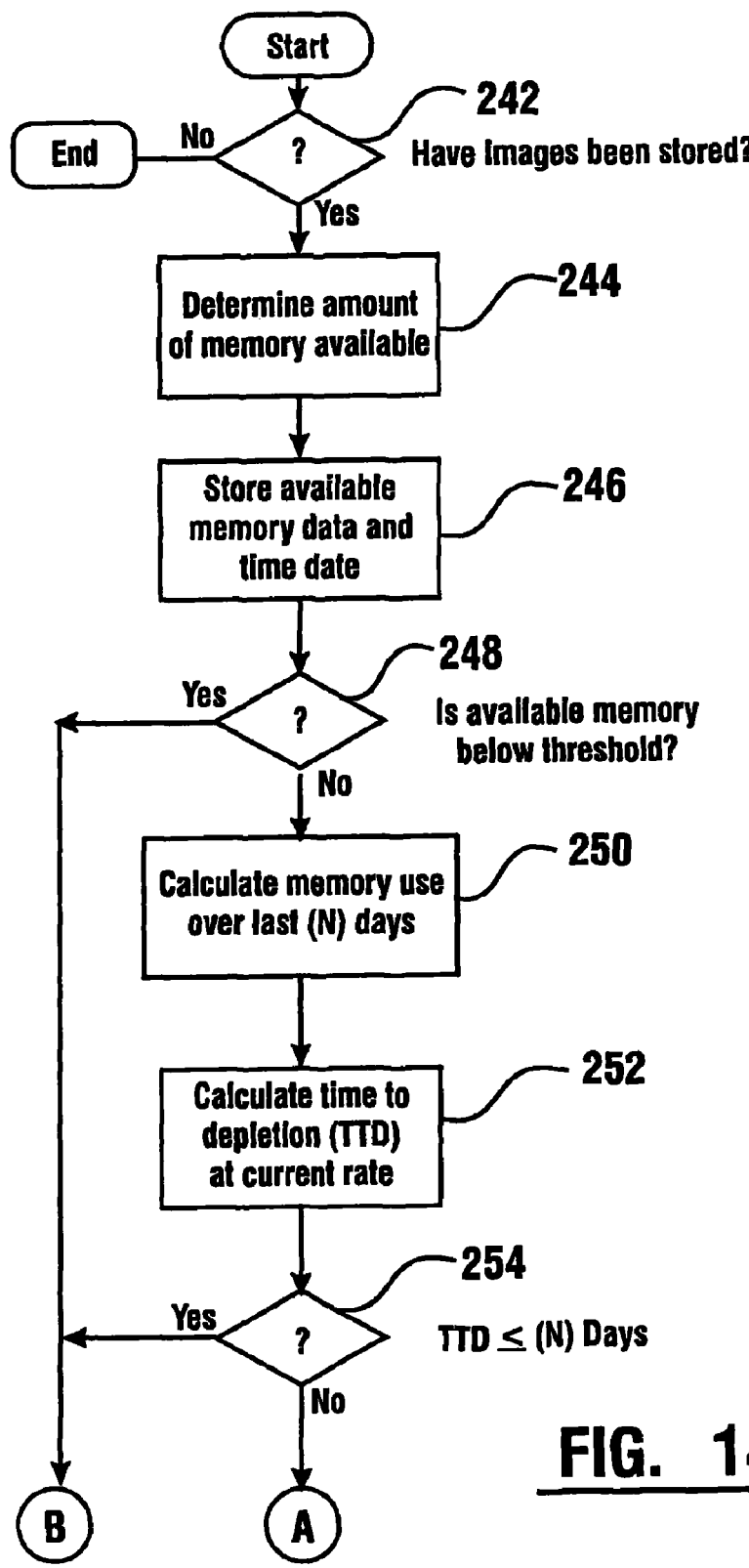
FIGS. 14 and 15 are a schematic view of logic flow associated with memory allocation and control used by an exemplary embodiment to provide greater reliability in storing image and transaction data.
Figure 15:
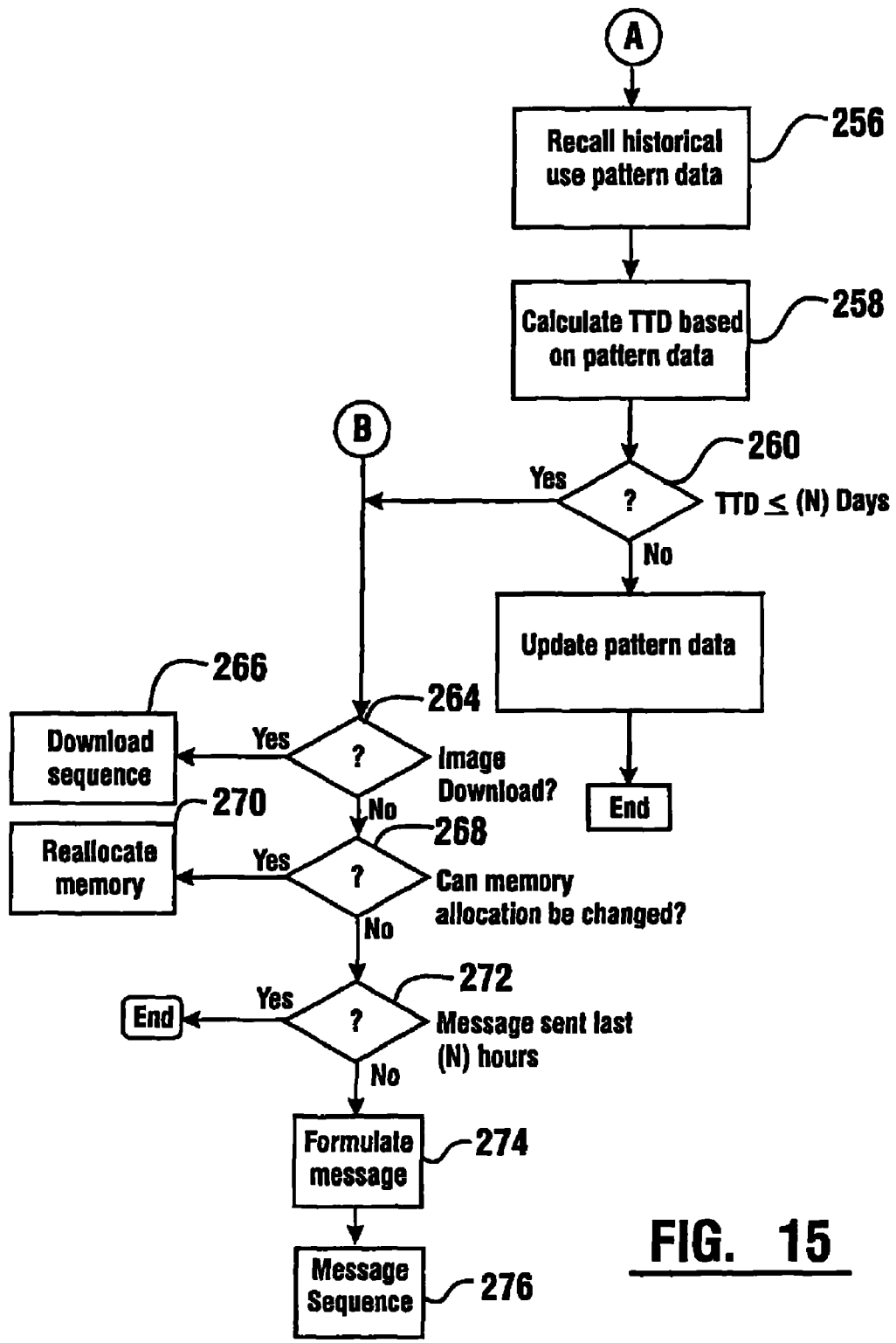

Some embodiments may enable the management of available memory to minimize the risk that image data and/or transaction data related to transactions conducted at the machine will not be captured and stored in memory. FIGS. 14 and 15 schematically represent steps performed by certain embodiments to manage the amount of memory resources and to selectively off-load image data when necessary. In addition the exemplary form of the logic described in connection with FIGS. 14 and 15 is operative to estimate when memory resources such as a permanent image storage medium will become full based on transaction rates, and to forward a message to appropriate personnel of such impending loss of memory capability.

Referring to FIG. 14, the logic flow commences with a step 242 in which a decision is made as to whether image data has been stored. If so, a determination of available memory is made in a step 244. In addition a record is made as of the available memory as of the time and date of the transaction. This is done at a step 246. The decision is then made at a step 248 as to whether the available memory is below a particular threshold. If so, certain actions are taken as described in connection with FIG. 15.

If the available memory is not below the threshold as determined in step 248 a determination is made at a step 250 to calculate memory use over the preceding set number of days, hours or other time period. At a step 252 the calculation is then made as to a time to depletion (TTD) based on the current rate of memory use. The determination is then made at a step 254 as to whether the time to depletion (TTD) is less than a set number of days. If so, actions are taken similar to those taken when the available memory is below a threshold as described in connection with FIG. 15.

If the time to depletion is less than the set threshold, the logic flow then operates to recall from memory historical use pattern data. This is done at a step 256. This historical use pattern data may be information regarding the level of use of the memory based on the day of the week or other correlatable data for the machine over a period of time. Such pattern data may involve fuzzy logic or other programming which may make allowances for pay periods, holidays, vacation periods and other activities which are used to establish the historical model on which the pattern is based. Using the historical pattern data the logic flow calculates an estimated time to depletion based on the pattern data in a step 258. The time to depletion based on the pattern data is then compared to the threshold in a step 260. If depletion is expected to occur based on the pattern data in less time than the set threshold, action is taken. If the time to depletion is longer than the set threshold the pattern data is updated in a step 262 and the logic flow is repeated the next time a transaction occurs.

It should be understood that although in this described logic flow three determinations are made as to available memory, in other embodiments a lesser number of tests or additional tests may be made. In addition the tests may be correlated or combined using fixed or fuzzy logic type principles to calculate a time when depletion is expected.

In the event that there is concern about lack of memory as determined in steps 248, 254 or 260 a determination is made at a step 264 concerning whether the instructions associated with the image server include executing an image download sequence prior to the memory reaching capacity. If so an image download sequence is executed at a step 266. This image download sequence may be to a remote terminal through the network. Alternatively the download sequence may be to a hard or soft permanent or temporary storage device. Such download sequence also includes clearing the portion of the memory that becomes available after data is downloaded or otherwise allowing the memory to be overwritten such that additional image data may be stored. Banking machine data which identifies the particular machine which generated the image and transaction data may be added to or stored in correlated relation with the downloaded data in accordance with programmed instructions to facilitate analysis after the data is downloaded.

If the computer and associated image server is not configured to conduct an image download, a determination is made at a step 268 concerning whether available memory may be reallocated. In some circumstances the memory allocated for storage of images may be expanded to include additional memory. This may include for example a dynamic reallocation of memory storage by the operating system of the machine based on resources being utilized. Such memory may be allocated on a temporary or permanent basis. If memory reallocation functionality is provided a reallocation sequence is executed in a step 270.

If memory reallocation is not available, a determination is made at a step 272 as to whether a notification message concerning impending depletion of the memory has been sent within a given time window. If a message has been sent within the time window then no further action is taken. However if a message has not been sent within a given time window a message is formulated by the image server at a step 274. This message preferably includes data as to the particular machine and when the available memory will reach depletion based on the current rate of transactions, historical data, threshold value or other basis upon which the determination to send the message was made. After the message is formulated, the device server executes the message sequence and operates to send the message to the users who are to receive it based on the image server configuration and the instructions stored in the system. Generally such messages will be sent as one or more e-mail messages to selected e-mail addresses in the network. Of course in alternative embodiments other types of messages may be sent.

Figure 26:
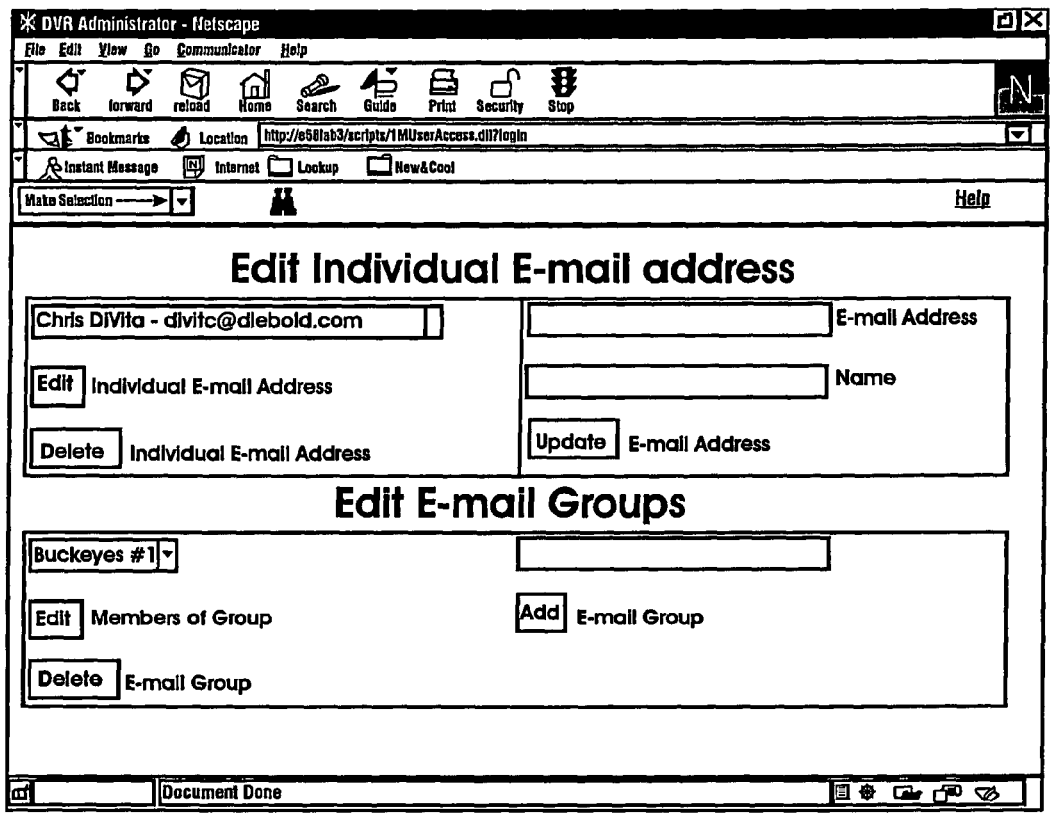
FIG. 26 is an exemplary embodiment of a screen presented at a user terminal for purposes of input and editing e-mail addresses used for sending messages related to conditions and events occurring at an automated banking machine.
Figure 27:
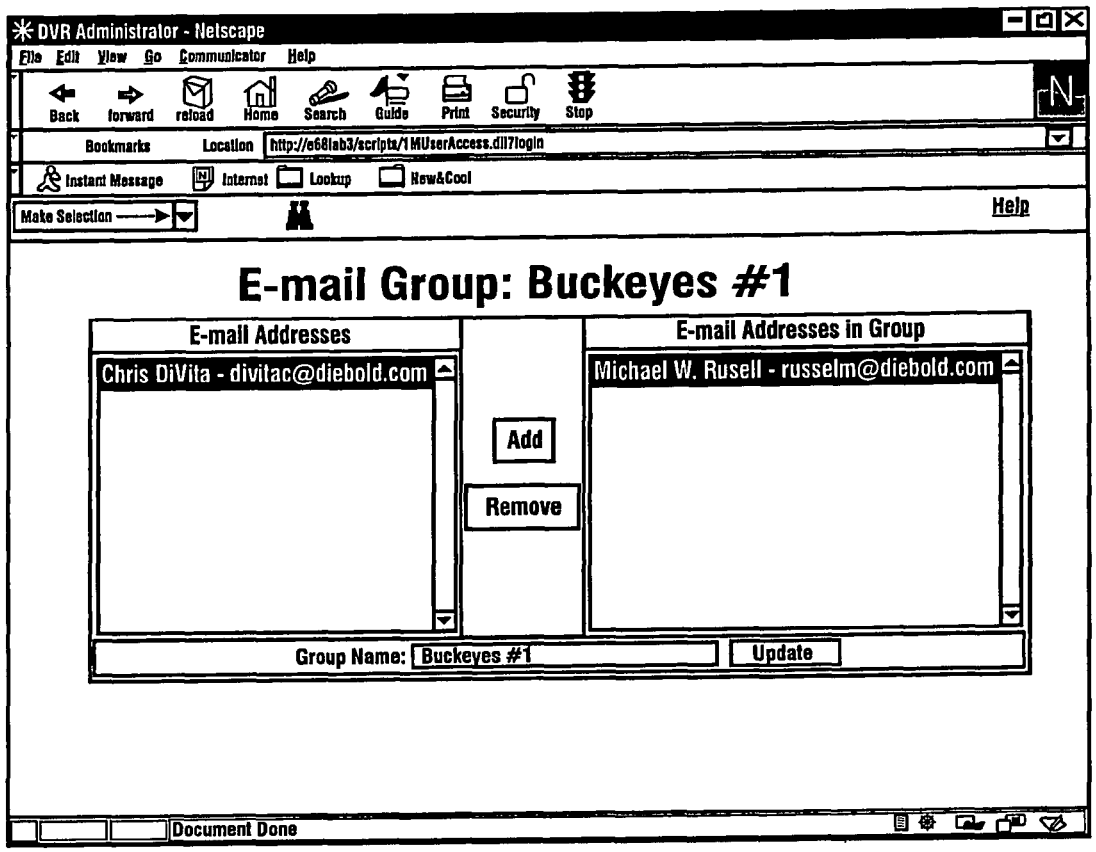
FIG. 27 is an exemplary embodiment of a screen presented at a user terminal for purposes of setting up an e-mail group including e-mail addresses of persons to be notified in response to the occurrence of conditions and events at an automated banking machine.

FIGS. 26 and 27 show examples of user screens which are presented by the image server to user terminals as part of a configuration sequence. Through use of the templates established through these setup screens users are enabled to configure individual e-mail and group e-mail lists. These lists include persons to be notified in the event that particular events occur. The notification of particular individuals at e-mail addresses is included as part of the timing and sequence instructions stored in connection with the image server which determine what is done in response to particular events.

As later discussed in detail alternative embodiments may operate to selectively delete stored image and/or transaction data. For example, transactions may be identified by selected parameters and image and/or transaction data associated with those transactions may be deleted. This may be done based on parameters such as elapsed time since the transaction was executed. Alternatively, transaction data may be deleted based on the type of transaction, amount or other triggering event associated with the image data. Thus, for example, data associated with drawal transactions which are under a certain amount and which occurred more than a particular number of days previously, may be deleted in response to programmed instructions. This frees up available space for storing data associated with additional transactions while preserving image and/or transaction data related to other transactions which may be more significant. Similarly, image or transaction data captured in response to other types of triggering events such as alarms, servicing activities, issuing or cashing instruments or other conditions which correspond to a particular parameter or combination of parameters may be stored for longer periods of time prior to deletion and/or downloading from a local memory. Various parameters for the preservation or deletion of data may be developed based on the nature of the system, the transactions conducted and the needs of the system operator.

Alternative embodiments may operate to advise a person who is setting up sequences or operation of the system, about how long the system will be able to run before image data will need to be deleted or off loaded. The computer operating to store data or in connection therewith, may store historical use data for the ATM or other machine. Such historical use data, combined with the number of images that the system is configured to capture and the degrees of associated data compression (as well as possibly other data) may be used to calculate a period of time until the available memory is used. Alternatively, and particularly when no historical use data is present, the computer may be programmed to prompt a user to provide estimates of the number or frequency of triggering events and/or transaction rates. This information may be used by the computer to calculate how long the system can operate without deleting or off-loading images. The user in response to the output of such estimates may choose to change settings or sequences to capture more or fewer images in response to each transaction or event, or to change the degrees of data compression. In addition the computer may be configured to send a message to a selected user or address if transaction rates change from the historical or estimated rates by more than a set amount, and advise of the time period available based on the actual rate of memory use. In response to such a message a user may choose to reconfigure the system.

The described exemplary embodiment presents a useful user interface which may be used to set up the system configuration. Generally such configuration is established from a user terminal which is connected to the image server through a network. In this example the image server configuration provides for three levels of activities which users are authorized to perform. These levels correspond to categories of privileges and are "administrator," "operator" and "service." A screen 278 shown in FIG. 16 shows the categories of activities and the user groups which are permitted to perform them in accordance with the configuration of an exemplary embodiment.

Figure 20:
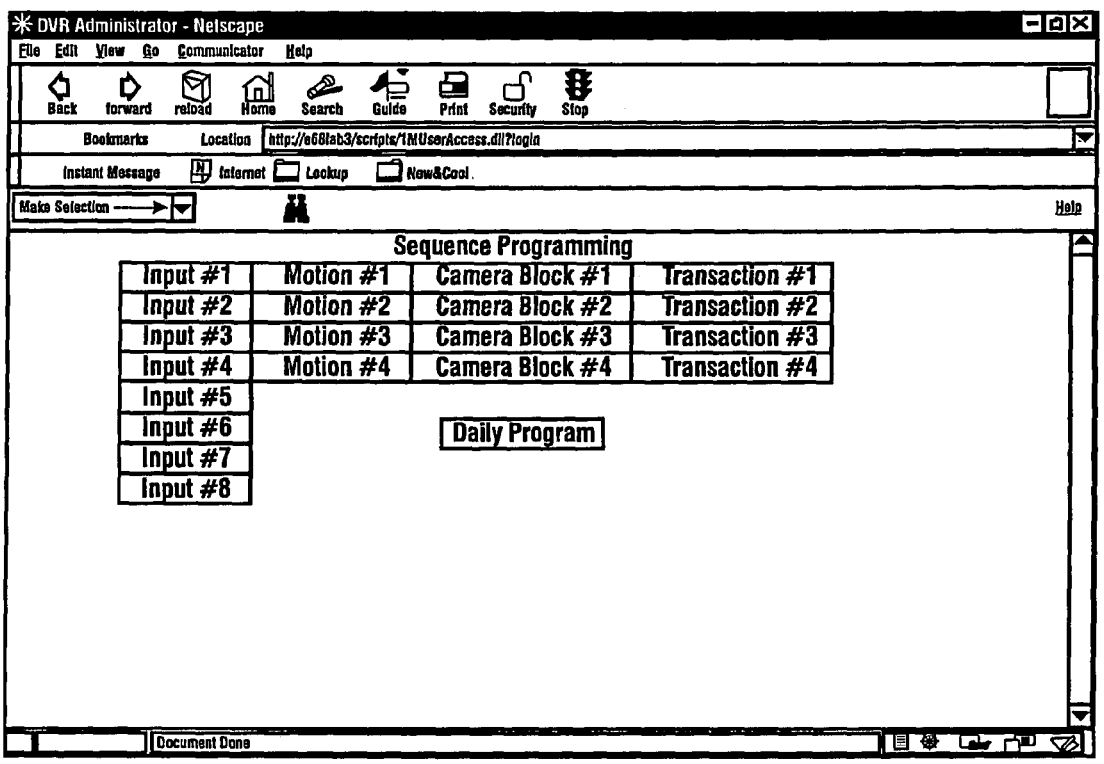
FIG. 20 is a view of an exemplary programming screen used in an exemplary embodiment.

As previously discussed, certain embodiments enable the configuration to include timing and sequence data which specifies what images and data to capture, as well as what further actions to take in response to certain triggering events. FIG. 20 shows a screen 280 which may be displayed at a user terminal to establish a sequence of events that occur in connection with particular events. Such sequences may be programmed so that the sequences are different based on the day of the week and/or the time of day.

Figure 21:
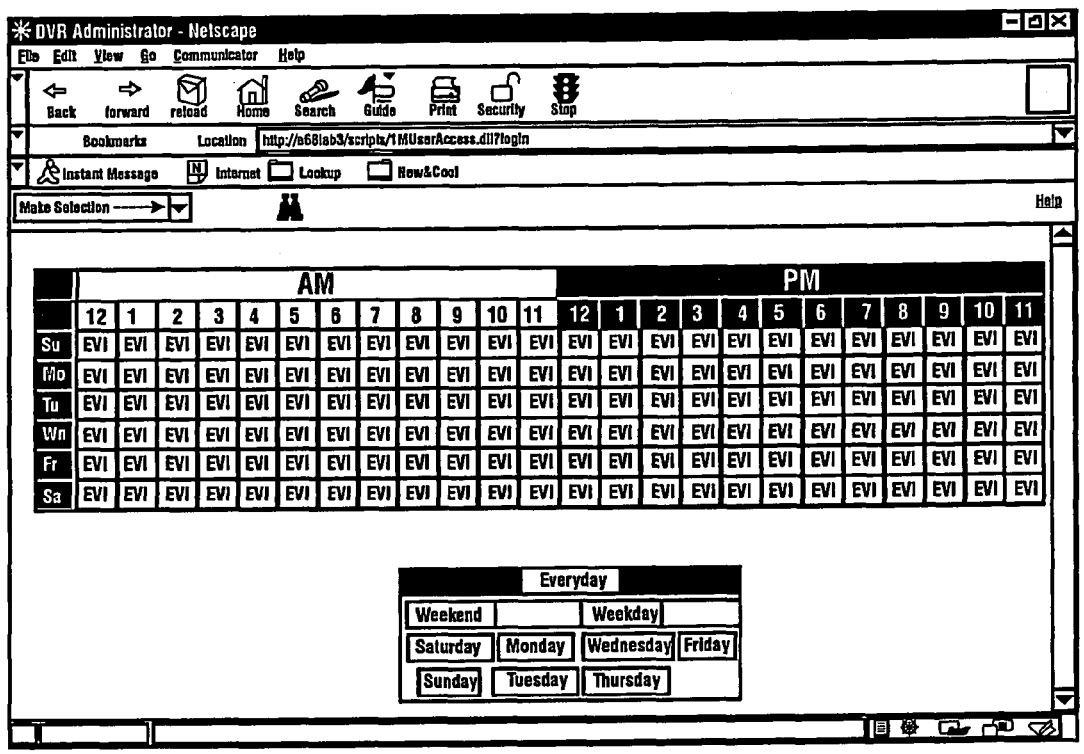
FIG. 21 is an exemplary embodiment of a daily program screen presented at a user terminal.
Figure 22:
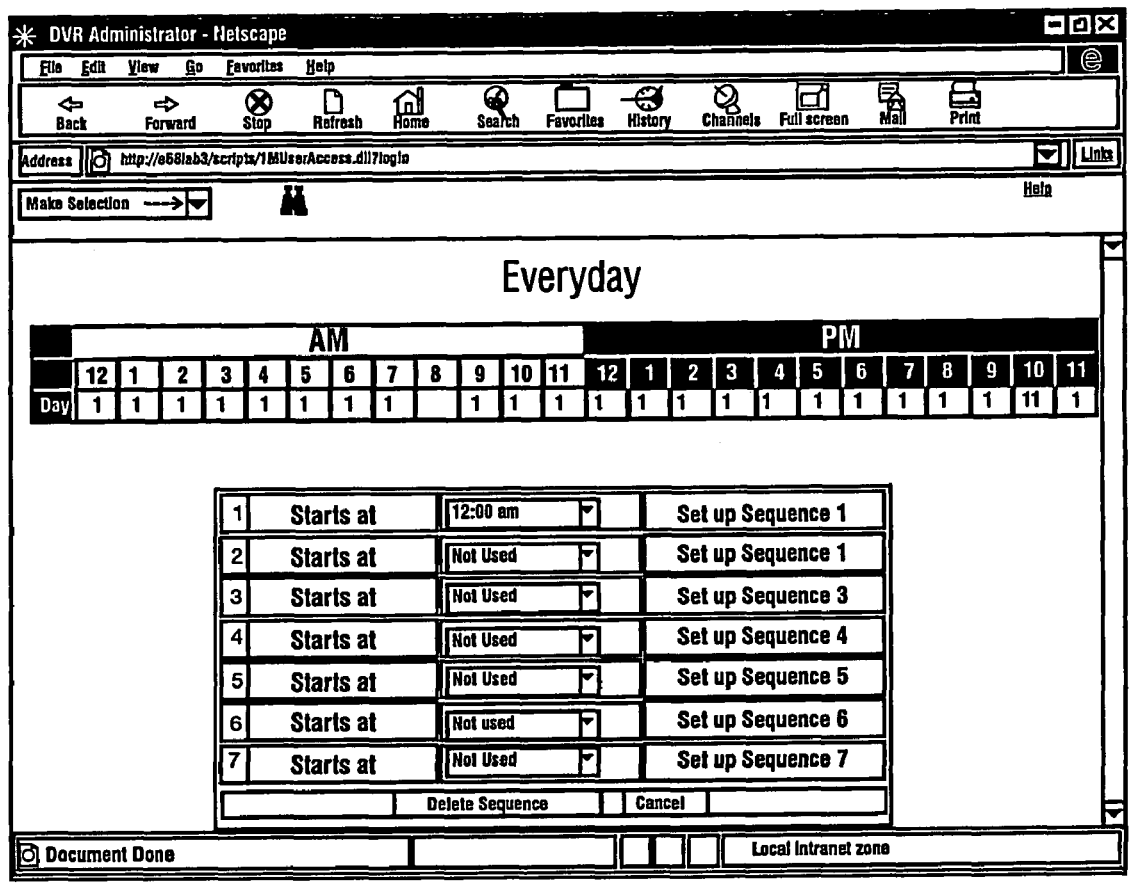
FIG. 22 is an exemplary embodiment of a setup screen displayed at a user terminal.

In accordance with the user interface in this exemplary embodiment, sequences are programmed by establishing a daily schedule of what is to occur in response to events. FIG. 21 shows a screen 282 which is presented in response to clicking on the "daily program" icon from screen 280. Screen 282 enables a user to configure the program to establish what is to occur if particular events occur within a given time window. In programming of this embodiment, if multiple sequences overlap days, the narrowest schedule overrules broader schedules. For example if a schedule is configured for weekdays but a different schedule is configured for a specific day, the specific day schedule will overrule the general schedule for that day. Likewise to prevent inadvertent overlap of sequences, the programming of this embodiment provides entering only a start time for a sequence. An end time is not required and a sequence will continue until a new sequence is begun. FIG. 22 shows a screen 284 used in an exemplary embodiment. Screen 284 is generated responsive to selection of the "every day icon" from screen 282.

Figure 23:
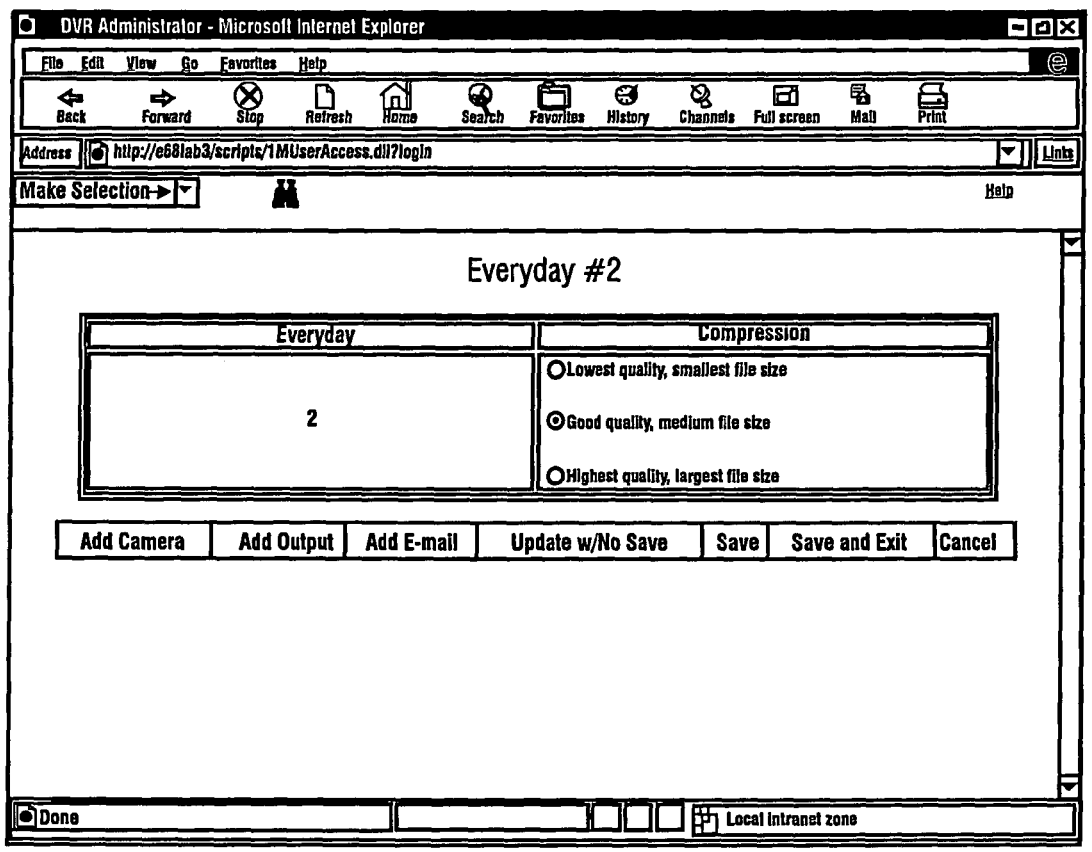
FIG. 23 is an exemplary embodiment of a setup screen presented at a user terminal for purposes of setting image compression types and for programming sequences.

Actions in a sequence are established by selecting the "setup sequence" icons shown in screen 284. Selecting such an icon that is active generates a screen 286 of the type shown in FIG. 23. Screen 286 enables a user to establish the degree of data compression for images captured during the sequence. The compression level can be modified such that different sequences of events cause images to be captured at different compression levels which produce different image quality levels. Generally the less the data is compressed the higher the image quality. However available memory is used more quickly when the degree of data compression is less.

In this exemplary embodiment a plurality of actions may be added to a sequence by clicking on icons such as "add camera," "add output" or "add e-mail." In alternative embodiments, additional actions may include "repeat sequence" and "wait" type actions. Clicking on such icons changes the system configuration so the system will take actions in a sequence such as those previously discussed. Such sequences may include for example input of instructions for capturing images from cameras, sending e-mails to individuals or groups of individuals, providing selective outputs to the control devices, or sending messages through the network. As can be appreciated from screen 280 various sequences may be executed responsive to triggering events such as detection of motion in fields of view of various cameras, the blocking of one or more cameras (at any time or during a time of desired image capture), in response to various transaction functions carried out by transaction function devices or on a periodic time schedule. Screen 288 shown in FIG. 25 is an exemplary screen presented at a user terminal which enables a user to set up the transaction data to be captured as well as to facilitate communication between the image server and the automated banking machine. Of course various types of transaction data can be selectively captured. This is done from screen 288 by selecting types of transaction data to be captured. Image data may also be captured in response to the operation of selected transaction function devices and responsive to the type of transaction function devices resident in the machine.

In the event that the sequence configuration includes sending e-mail messages to selected addresses, the image server is operative to send such messages in accordance with e-mail information which has been stored in connection therewith. Screen 290 shown in FIG. 26 is a template for a user to use in inputting e-mail address information for individuals. Individual e-mail addresses may be combined into e-mail groups and a screen 292 shown in FIG. 27 may be accessed to show the groups of individuals who are notified responsive to events which may occur at the terminal. The configuration of the terminal is such that a plurality of individuals may be sent an e-mail message in response to the occurrence of a single event or other activity at the terminal. This facilitates the notification of individuals in the event that several individuals may be required to respond.

As previously discussed, the timing aspect of programmed sequences enables different individuals to be notified of events at different times and on different days. This facilitates notifying the persons who have the most direct responsibility for the condition at the time it occurs. Forms of the invention may also be configured to attach or include in e-mails, images which correspond to the triggering event which causes the notification to be sent. This may immediately provide the person receiving the e-mail with useful information about what is occurring at the machine. A series of images or applets for the modification of images may also be transmitted with the notification. This may include for example images which occurred prior to the triggering event. Such e-mails may also include information about the nature of the triggering event, the location or banking machine where such event is occurring and other pertinent data. In this way, the entities notified will receive a record of what has or is happening at the machine. This record will also be available even if the machine is compromised and rendered inoperative shortly thereafter. Embodiments of the invention may also include with such image files, digital watermarks or other indicia of authenticity so that the accuracy of the information provided and the images associated therewith have enhanced assurances that they have not been tampered with. Further, included in e-mails or attachments thereto may be sound or other files with which images are associated. This may be accomplished through the programming of sequences which include the capture of audio or other data in response to the occurrence of triggering events. Numerous alternative approaches may be taken utilizing the principles described herein. Of course, embodiments of the system may carry out communication in ways other than through e-mail such as by RF, fax or simulated voice communication through telephone connection.

Figure 24:
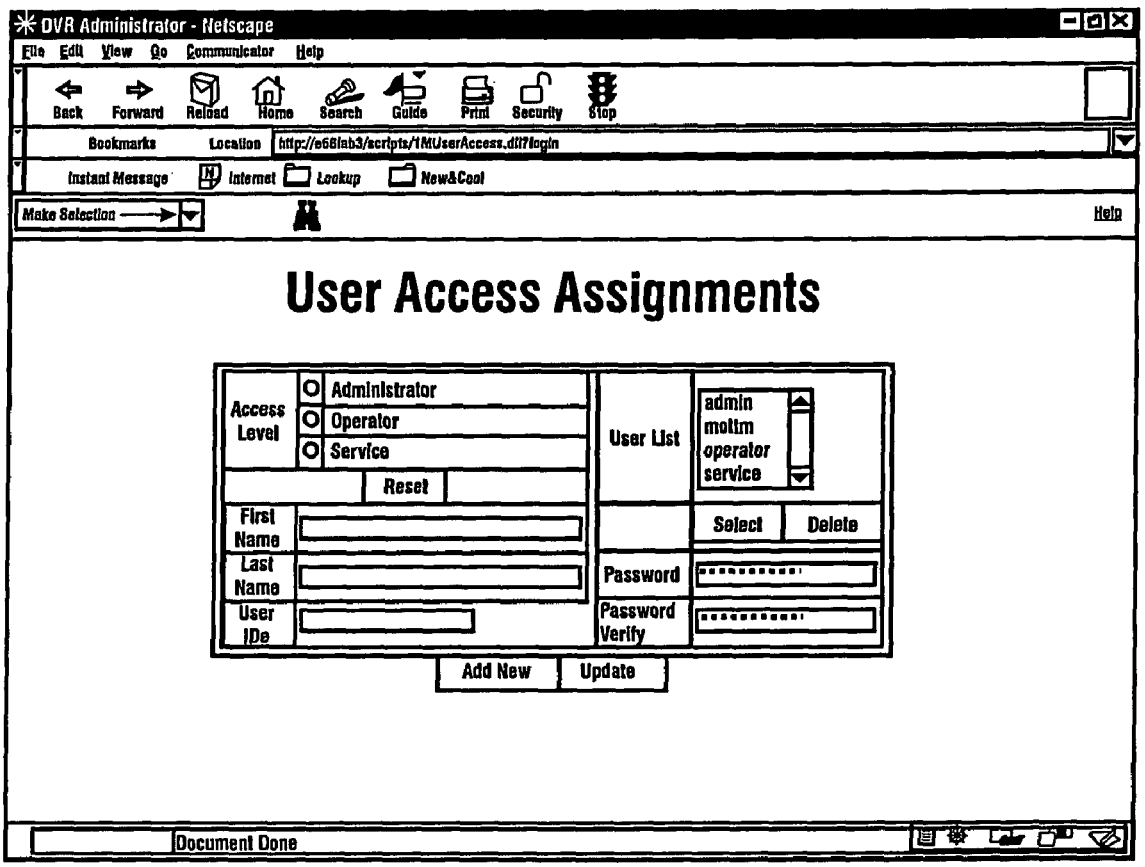
FIG. 24 is an exemplary embodiment of a screen presented at a user terminal for purposes of establishing user access capabilities.

As previously mentioned, security associated with the image server may be important to prevent accessing by unauthorized individuals. In the exemplary embodiment password protection is provided to minimize the risk of unauthorized use. Of course in other embodiments other security techniques such as public key encryption, encryption of image and transaction data and digital signatures may also be utilized. FIG. 24 shows a screen 294 which is used in an embodiment to establish access for particular users. A system administrator is enabled to gain access to screen 294 and to input information concerning additional users. Screen 294 also enables the system administrator to establish passwords to be used by each authorized user.

Embodiments may also restrict certain users, or certain categories of users, in the type of image data that may be reviewed. This may be done in exemplary embodiments by limiting access to image and/or transaction data selectively to users, based on the types of triggering events associated with the storage of images. Alternatively, certain users may be precluded from viewing images captured from certain cameras or other image acquisition devices. This capability may be used to prevent certain users from observing certain sensitive image data such as images which may include customer PINs, fingerprint data or the combination to a lock on an ATM. By preventing selected users from accessing certain image data based on the type of triggering event or camera or device associated therewith, images captured by the system that need not be restricted may be made available more broadly and used for potentially more purposes.

Figure 17:
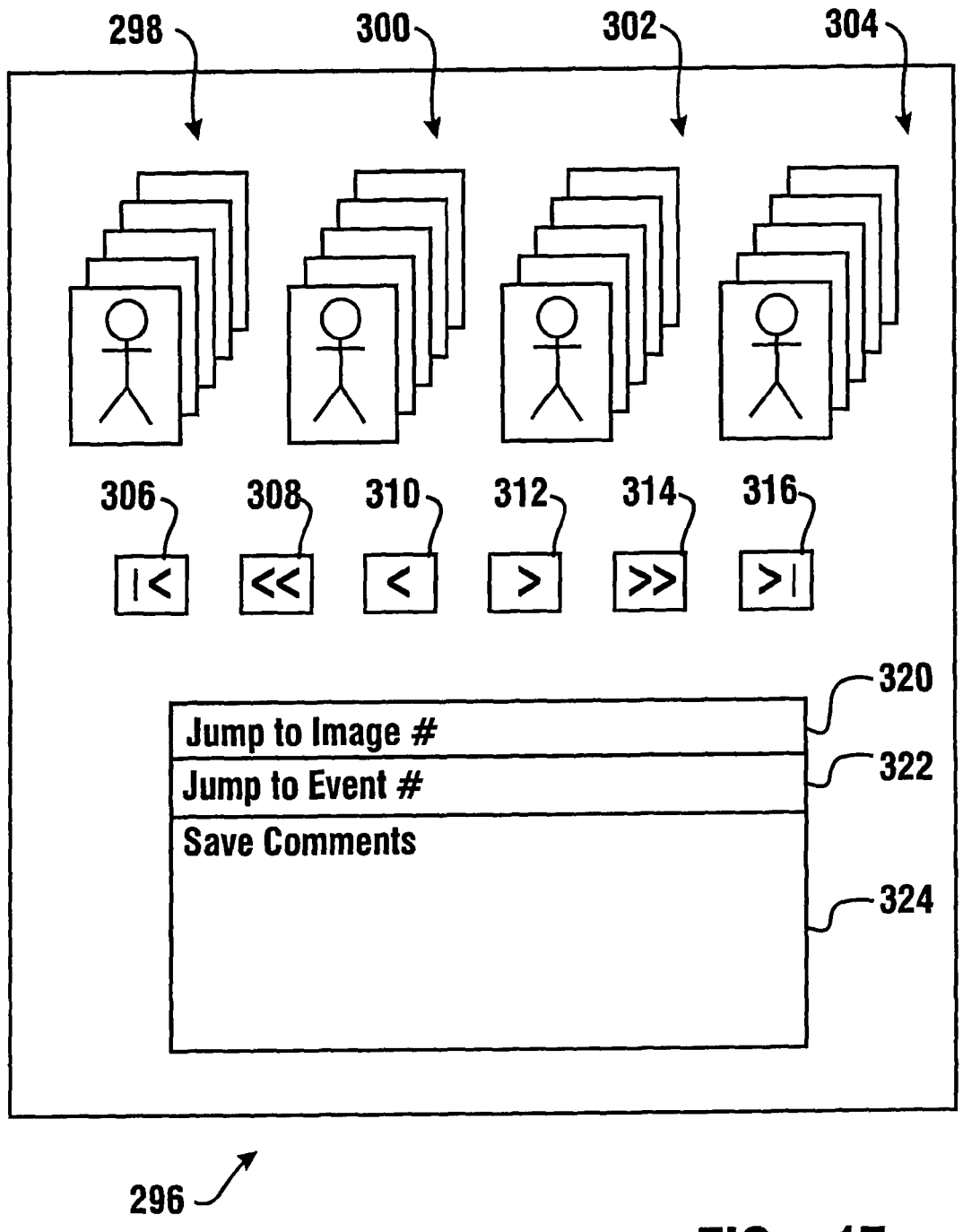
FIG. 17 is an exemplary embodiment of a screen presented at a user terminal for purposes of viewing and analyzing image data.

A useful aspect of some embodiments is the ability of the system to provide screens or displays of image and transaction data that can be readily sorted, viewed and analyzed at user terminals within the network. FIG. 17 discloses a screen or display 296. Display 296 includes sets of images 298, 300, 302 and 304. Each image set includes "thumbnails" of five images. Each set corresponds to a transaction carried out by a particular user and each set of thumbnail images which comprises a set, corresponds to images of the particular user during that transaction. Of course it should be understood that in situations where the timing and sequence programming require a lesser or greater number of images, the number of images which comprise a set may differ. In addition as previously discussed, some transactions or triggering events may have no corresponding images at all. Other events which do not correspond to ATM transactions may have a large number of images spaced closely in time depending on the configuration of the system. This may include full motion or image frequencies approaching full motion.

The images which have been captured and stored by the system may be preferably arranged in one or more series. A series may be a collection of all stored images arranged chronologically. Alternative series may be produced by segregating images that correspond to one or more types of triggering events or transaction parameters. Images included in such a series may be ordered chronologically, may be ordered in a hierarchy in accordance with one or more search parameters, or other ordering scheme. A useful aspect of some embodiments is that the user terminal enables a user to scroll through a series of images, displaying one or more of the images on the display at a time, by selecting certain icons with an input device. The icons enable the user to selectively display images and to move to display one or more different images at points forward or backward in the series from an image or images currently being displayed. In exemplary embodiments, selection of certain icons cause the display to change and display images in different increments and in different directions in the series from one or more images currently displayed.

In an exemplary embodiment screen 296 includes icons 306, 308, 310, 312, 314 and 316. The icons may be used to selectively scroll through sets of images and images in the sets. As explained with reference to an exemplary help screen 318 shown in FIG. 18, selecting icons 310 and 312 enable scrolling backwards and forwards respectively by one event. Selecting icons 308 and 314 enable scrolling backwards and forwards respectively by an increment of ten events. Icons 306 and 316 enable scrolling backward and forward respectively to the beginning or end of a series of events or images.

Exemplary screen 296 also includes "jump to image" and "jump to event" input boxes 320 and 322, respectively. As explained in FIG. 18 boxes 320 and 322 may be used to select images that are to be displayed. A "save comments" box 324 is used to selectively store comments in correlated relation with particular images. Comments can be manually input, input by voice as sound files, input through voice to text conversion software or may be generated and stored in response to programmed instructions based on parameters and/or triggering events.

Figure 19:
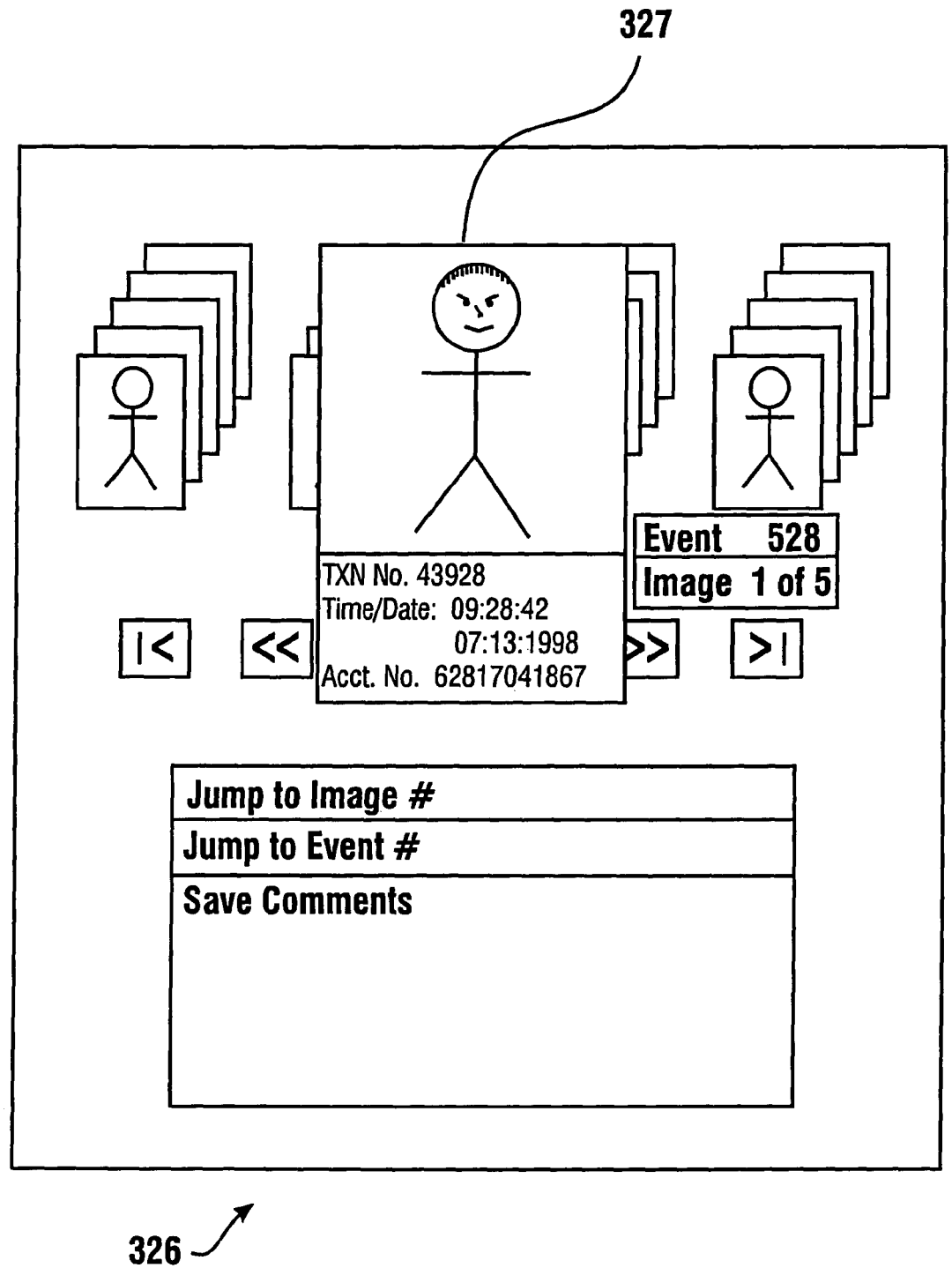
FIG. 19 is a view of an exemplary screen similar to FIG. 17 but with a selected image enlarged for purposes of analysis.

Screen 326 shown in FIG. 19 shows a selected image 327 which has been enlarged by selecting one of the images from the sets. This may be done in the described embodiment by clicking on an image with a mouse or through other inputs. As shown in screen 326, the enlarged image 327 is displayed with corresponding transaction data which corresponds to the image. In addition event and image data corresponding to the image is also displayed. A user reviewing the image data is enabled to review any of the available image and transaction data.

Advantages of the described embodiments include the ability of a user terminal to access image and transaction data selectively. For example through operation of the browser and/or other programs within the user terminal, an authorized user is enabled to search for selected parameters such as user name, account number, time and date and other data which may be stored in the data store. Image and transaction data may also be searched by combinations of parameters or ranges of parameter values. This enables the operator of the user terminal to find selected image data rapidly or more selectively, and without having to scan through large volumes of information. In addition the exemplary embodiments may enable holding image and transaction data for substantially longer periods of time with minimum inconvenience. As a result this enables such data to be analyzed for much longer time periods and potentially much more inexpensively than is currently possible.

A further advantage of some embodiments is that image data is readily accessible and searchable. This facilitates identification in connection with issued documents such as bank checks or value loaded to smart cards as previously discussed. This enables users having access to the data to verify that a document or other item is being presented by an authorized user by accessing and visually or automatically comparing image data. Further advantages and novel aspects will be apparent to those having skill in the art.

Figure 28:
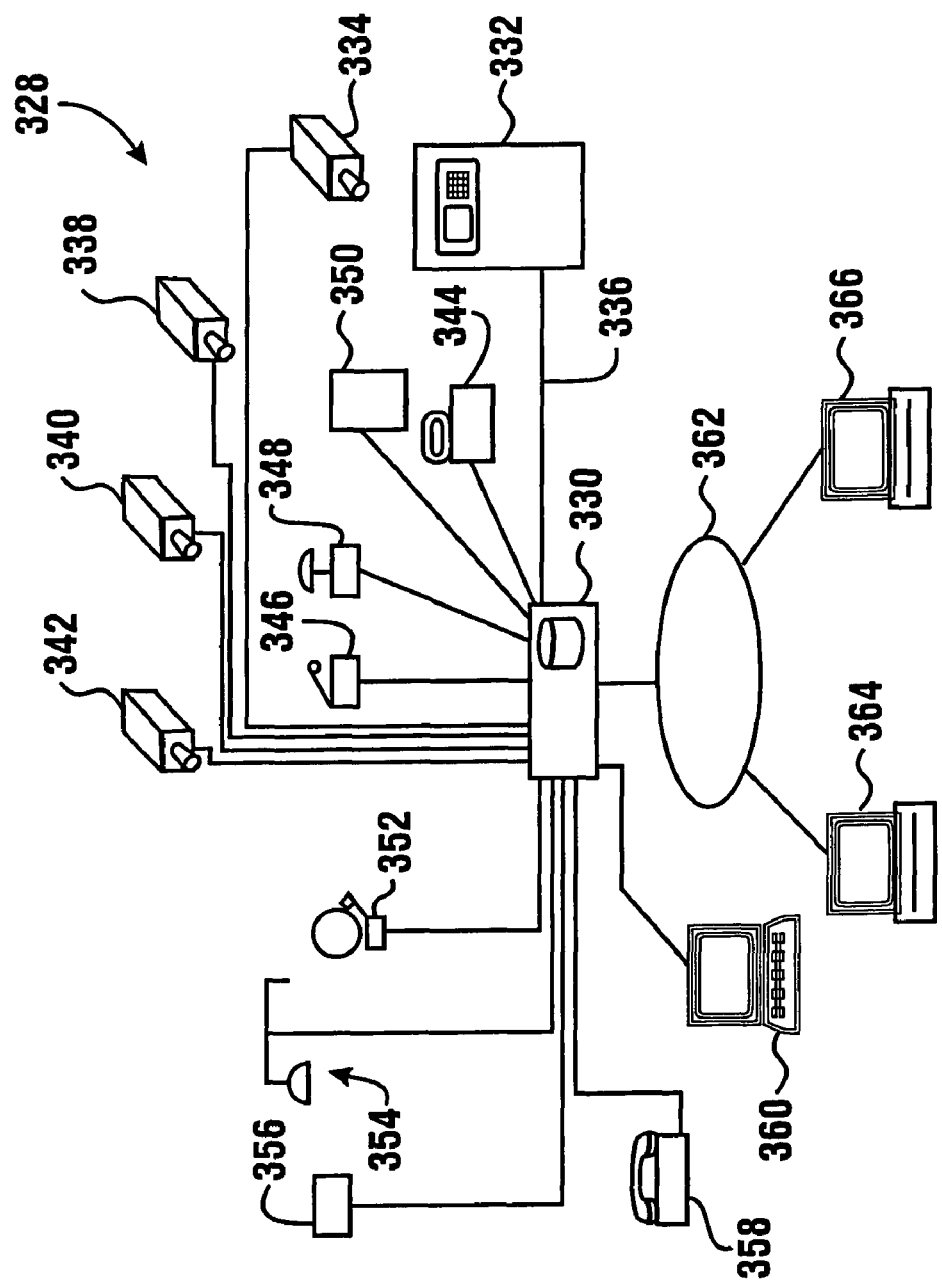
FIG. 28 is a schematic view of an alternative embodiment of an image capture system.

FIG. 28 shows yet another example of a system designated 328. System 328 is similar to other systems previously described except as discussed herein. In system 328, image capture and delivery functions are performed by a separate device 330. Device 330 in this embodiment includes one or more computers, which are alternatively referred to herein as processors, including one or more servers, and is operative to capture and store image data, transaction data and other information from devices to which it is connected. Device 330 also includes appropriate interfaces to communicate with the devices to which it is connected for purposes of receiving inputs and outputs. As schematically indicated in FIG. 28, a computer included in device 330 is in operative connection with a data store for purposes of storing instructions as well as image and transaction data. It should be understood that while a single device for performing the functions is shown in system 328, other embodiments may include a plurality of operatively connected devices including a plurality of processors and operatively connected data stores as well as other computers and interfaces, to perform the functions similar to that of device 330 described herein.

In system 328, device 330 is connected to one or more automated banking machines schematically indicated 332. Automated banking machine 332 is similar to the machines previously discussed and includes a plurality of transaction function devices. Automated banking machine 332 may have one or more cameras or other image acquisition devices adjacent thereto as represented by camera 334. As will be appreciated, a number of cameras may be positioned adjacent to the machine by being within and/or near to automated banking machine 332 for purposes of capturing image data related to users, documents, surroundings or other types of visual inputs that may be desirable to capture and analyze. Camera 334 is operatively connected to device 330 such that device 330 may receive and capture image data therefrom. It should be understood that additional types of data capture devices may also be included adjacent to or within automated banking machine 332. This may include for example microphones for capturing sound or voice information as well as devices which capture data related to transactions. Some embodiments may use voice recognition software to detect sounds from the microphone representative of words or the stress levels of sounds emanating from persons near the automatic banking machine. Such voice or sound data may be used in combination with images or other data to further detect and evaluate conditions at or near the automated banking machine. The data or information which is captured is also communicated to the device 30 through one or more appropriate electronic connections schematically indicated 336.

In addition to capturing images or other data from one or more automated banking machines, system 328 may also be operative to monitor one or more other transaction devices, as well as to monitor and record activities which occur within a facility. One or more cameras represented by cameras 338, 340 and 342 are shown and are representative of cameras used for this purpose. The cameras may be used for capturing images in response to triggering events, which may be either hard or soft triggers from one or more types of input devices. Alternatively, the cameras may capture images on an ongoing basis in one or more sequences for purposes of providing a generally continuous record of overall activity within an area. As in previous embodiments, this embodiment also provides the capability of capturing images from multiple cameras generally simultaneously as well as the capability to both capture images and be delivering messages or image data from the device 330 on a generally simultaneous basis. As will be appreciated, the capabilities of the system may be increased by the addition of components or enhanced capabilities of the components which comprise device 330. This may include, for example, additional interfaces for digitizing image data received from cameras, additional and faster interfaces for input and output devices and increased processing capabilities and data storage to facilitate enhanced function. The required capabilities of device 330 depend on the particular type of system that a user desires to operate and the number and type of connected cameras and other devices.

In the exemplary embodiment shown, a number of different types of input devices are provided. These input devices provide inputs indicative of one or more triggering events to device 330. Such triggering events cause or may affect the manner in which image data is captured by the system. Generally the input devices include appropriate interfaces in connection therewith to enable the device 330 to receive signals indicative of the triggering event. The exemplary input devices shown include a cash register 344. Cash register 344 which may also be considered a banking machine, is connected to device 330 by a communications link such as a local network. This enables the device 330 to cause images to be captured from a corresponding camera when signals indicative of transactions are occurring at the cash register. It should be understood that cash register 344 is representative of but one of numerous types of devices that may be used in a sales, service provider or banking environment and for which it may be desirable to make a record of activity occurring adjacent to such devices when activities are conducted.

Additional representative input devices include sensors schematically indicated 346. Sensors 346 may include sensors for detecting the opening of doors, windows, ventilation ducts or other activities for which it is desired to capture images. Another exemplary input device includes an alarm input 348. The alarm input 348 may be, for example, a device which is actuated by person to indicate an alarm condition. This may be, for example, a panic button which is pressed to indicate a hold-up in a banking or other establishment. Alarm input devices may take various forms and may include sequences input to computer terminals or other devices which are connected to device 330.

Sensors used in connection with the systems may include photosensors, infrared sensors, radiation beams or similar detectors. Such detectors may be used to sense when a person or item passes or occupies a particular space or area. For example, a detector may detect when an invisible beam type sensor is interrupted. Such an invisible beam may extend, for example, across a counter or bank teller window. As a result, a signal may be given to capture images in response to each occurrence of something passing over the counter or through the teller window. Similarly, such a beam may extend across a cash drawer or similar device. Alternatively, such invisible beams may extend in areas known only to an employee of the facility. This may enable the employee to give a signal to capture images (and perhaps activate an alarm) while not making physical contact with any device. Numerous systems may be developed using these principles.

Other input devices schematically indicated 350, may include other devices which detect or receive indications of activity and provide appropriate electrical outputs which can be received by device 330. These may include for example heat sensors, infrared sensors, weight sensing pads, electronic beams or other types of sensors which can detect conditions for which an operator of the system may wish to capture images or other data.

In this embodiment, the cameras themselves may also serve as input devices. The cameras provide inputs which enable the detection of certain image conditions. Image conditions may include for example, the detection of motion within the field of view of the camera. Alternative image conditions may include a lack of usable video. This may be for example a lack of contrast in an image, brightness or darkness beyond selected limits or other images or circumstances such as previously discussed. Alternatively as previously mentioned, image conditions may include the presence within a field of view of persons with particular clothing or features, the presence of persons with certain body orientations, the presence of a particular individual based on facial features or other features, the presence of certain objects such as weapons or the presence of particular types of colors or arrangements of colors. Numerous types of image conditions which may be determined through analysis of the digital images which are available from the cameras connected to the system may be used as triggering events.

In the embodiment shown, device 330 is also connected to output devices. Exemplary types of output devices shown include an audible and/or visual alarm schematically indicated 352. Such an alarm may give persons in an area notice of an alarm condition. An alternative form of an output device as shown may include lighting devices schematically represented 354. Lighting devices may be turned on for example in response to programmed sequences to illuminate an area where an alarm condition is detected.

Other types of output devices may include blocking mechanisms schematically indicated 356. Blocking mechanisms 356 may operate to block certain areas to prevent access or escape. Alternatively in response to some alarm conditions as set through sequences programmed in device 330, other alarms may cause blocking mechanisms to open to facilitate escape of persons from selected areas. Other output devices include, for example, communications devices schematically represented 358. Communications devices 358 may include, for example, police alarms or dial-up devices to notify fire or security agencies of alarm conditions which are detected.

As schematically represented in FIG. 28, device 330 is connected to a user terminal device 360. User terminal 360 may be used for providing inputs from users of the system as well as outputs to users, as later discussed in detail. Device 330 is also shown in connection with a network 362. Network 362 like other networks discussed herein, may be a communications link suitable for communicating, and may be a local network or a plurality of interconnected networks through which device 330 is enabled to communicate through an appropriate interface. Remote terminals 364 and 366 are connected to the network 362. The remote terminals may be used for providing inputs and outputs to the device 330. Such terminals may also be used for purposes of programming and receiving images from device 330 in ways which are later discussed. Other terminals in the network may be used to hold data which may be used to identify persons, signatures, documents or provide other functions or information as previously discussed.

Figure 29:
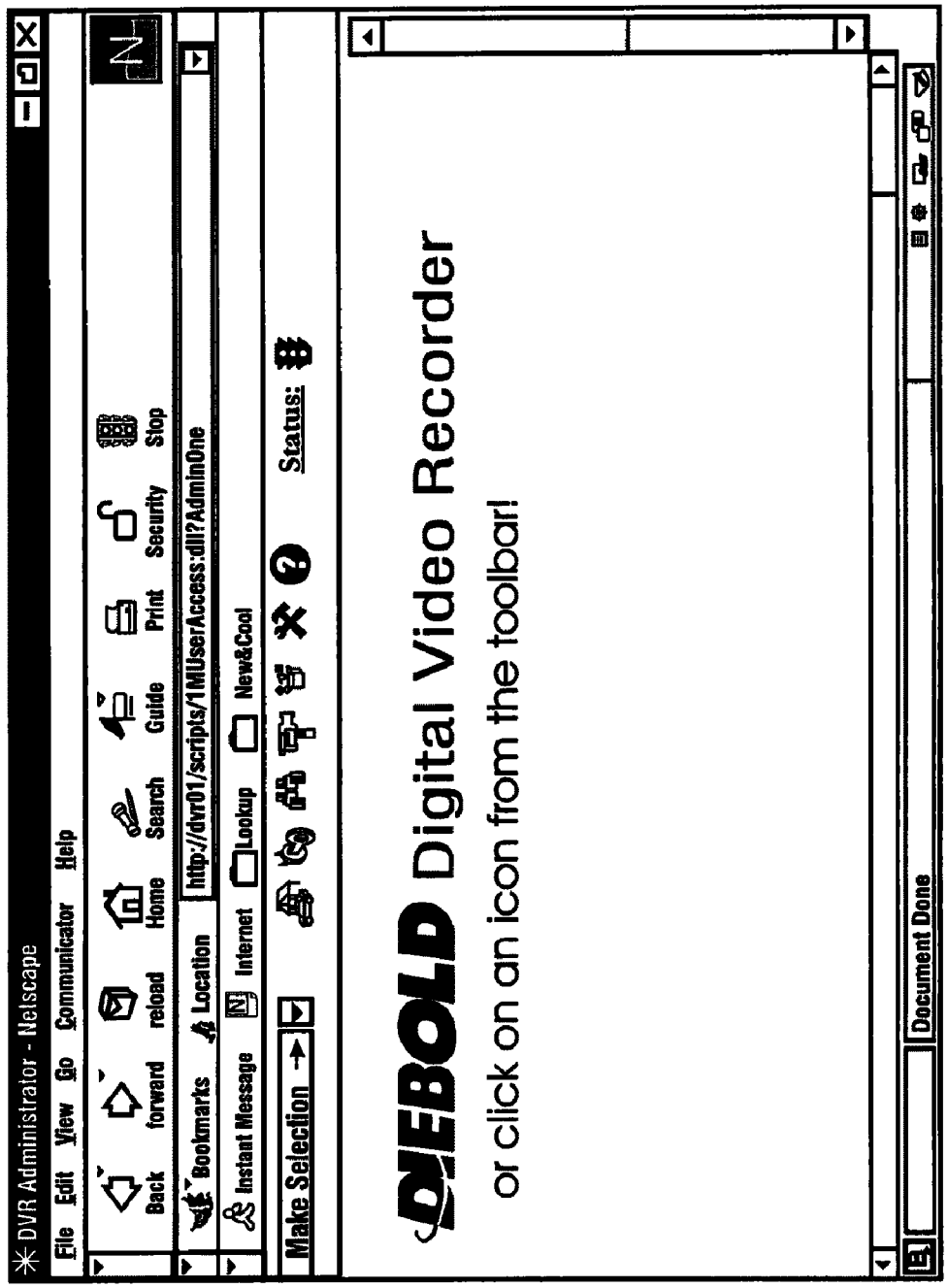
FIG. 29 is an exemplary screen presented at a user terminal for purposes of operating and controlling the capture and presentation of captured images in the system of FIG. 28.

It should be understood that system 328 is exemplary of many possible system configurations. In one exemplary embodiment, device 330 includes a Diebold AccuTrack™ digital video system which is commercially available from Diebold, Incorporated, the assignee of the present invention. Device 330 operates to provide a helpful user interface for communicating with and programming the system. Such communications may be carried out through the interface at a local terminal such as terminal 360 or remotely from terminals connected to device 330 through a network such as terminals 364 and 366. FIG. 29 shows an exemplary introductory screen 368 produced on an output device of a user terminal in connection with device 330. The user terminal, like those previously discussed includes a computer with a browser operating therein, which can communicate with device 330. Screen 368 provides a useful interface for a user of the system to configure the operation of the system. It also provides a useful interface with which users may interact to recover and sort images that have been captured by the system as well as to carry out other functions.

Screen 368 as well as other screens presented by the exemplary device 330 includes a set of icons and indicators referred to as a tool bar 370. As shown in greater detail in FIG. 30, tool bar 370 includes a plurality of icons 372. Icons 372 include a home icon 374, a log-off icon 376 and an image search icon 378. Other icons included in the tool bar include a camera check icon 380, a system configuration icon 382, a system tools icon 384 and a help icon 386. Generally, the icons include an image or representation of an object which suggests to a user the function of each. For example, the log-off icon 376 includes a representation of a key that can be turned. The exemplary form of the search icon 378 is a representation of a pair of binoculars. Similarly, the icon 380 that is selected to conduct a camera check is a visual representation of a camera. Each of the icons 372 and the functions that a user is enabled to accomplish through the selection of each is explained in greater detail in FIG. 31.

Figure 30:
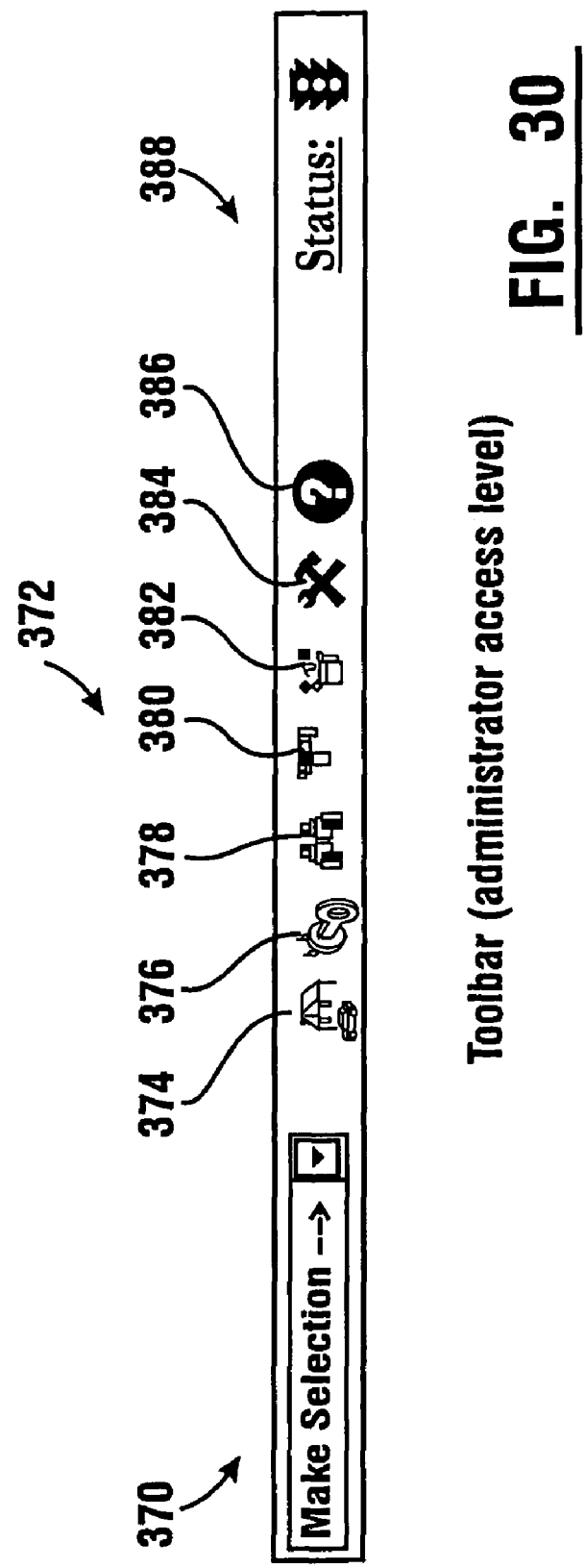

The tool bar 370 includes among icons 372 a status icon referred to as 388 in FIG. 30. The status icon 388 indicates to a user the status of the system. Several status icons are provided responsive to the then current status of device 330.

The various status icons presented in the exemplary embodiment are shown in FIG. 32. For example, a visual representation of a traffic light showing a green light 390 is displayed to indicate that the system is operating to capture images in the normal manner. A representation of a thermometer approaching the top of its range is included in an icon 392. This icon is displayed to indicate that the storage capacity of the data store within device 330 is reaching its maximum capacity and is not storing images in the usual manner.

An alternative icon 394 is displayed to indicate that there is a need for a user to exercise caution as the system is running with errors. Another icon 396 which is a visual representation of a diskette is displayed to indicate that input changes to the configuration of the device 330 have not been applied. An icon 398 which is a visual representation of a stop sign is displayed to indicate to a user that an application error has occurred or that some other problem has happened such that the system is not operating or communicating normally.

In this exemplary embodiment, a user at a terminal is enabled to program or configure operational features of the device 330. Preferably a user will be enabled to configure many features and operations of the system. This is accomplished in the exemplary embodiment by the user making selections and inputs from screens or pages in a graphical user interface through which a user sets up or changes the programming of the system. These interface screens and pages are displayed to the user responsive to selection of icons in the tool bar and through subsequent selections as a user operates the automated banking machine in response to the interface.

In the exemplary embodiment, one of the aspects of the system that a user is enabled to configure is the period of time that image data and other data including transaction data is stored. In this exemplary embodiment, the device 330 is configured to store data for at least certain programmed periods of time prior to deletion. FIG. 33 shows an exemplary screen 400 which is presented to a user of the system. Screen 400 includes image type categories 402. The image type categories correspond to the types of triggering events which caused an image to be captured. For example, in FIG. 33 the types of images corresponding to "normal" are those images that are captured in response to programmed sequences which are done periodically on a routine basis such as for a periodic surveillance of an area. Those image types which are captured in response to alarms correspond for example to images captured in response to trigger inputs such as a panic alarm or an intrusion into a secure area within a facility. Other image types correspond to transactions. These may include for example in the exemplary embodiment transactions conducted at automated banking machine 332 or at cash register 344. Through inputs in response to screen 400 a user is enabled to input and select which types of images are to be deleted first and last. The user is also enabled to set up minimum periods during which images corresponding to particular image types are to be retained.

FIG. 34 shows an expanded screen 404 which further enables a user to configure the auto deletion feature of the invention. Through inputs in response to screen 404 a user is enabled to set the unit to accomplish automatic deletion of images in accordance with the parameters that have been input. The user is further enabled to input when the auto deletion activity is to begin as well as when available disk space is considered sufficient such that auto deletions should stop. As a result in response to the user selecting to have auto deletion activity occur, the device 330 will operate to selectively begin deleting images in accordance with the priorities that have been established for the retention of images so that additional storage space may be made automatically available.

It should be understood that the parameters and deletion capabilities shown in connection with screens 400 and 404 are exemplary and other embodiments of the invention may operate to store image data and delete it selectively in response to other parameters. In addition, the auto deletion function may be combined or integrated with an automated downloading function so as to selectively transfer images prior to deletion to another storage area that is connected to device 330. This may include, for example, the transfer image and transaction data to other terminals connected in network 362 so that such image data may be stored at a remote location prior to deletion of the image data from the device 330. Other approaches and techniques appropriate for systems of the invention will be apparent to those skilled in the art from the foregoing description.

Another aspect of the exemplary embodiment that may be configured by an authorized user is the security applied to various types of images. In the exemplary embodiment device 330 allows a user to selectively apply authenticating algorithms to selected types of images. A screen presented to a user in the course of configuring the system to establish this capability is represented 406 in FIG. 35. In response to screen 406, a user is enabled to set the system so that digital signatures are applied to any of several different image types. For example as represented in screen 406, a user may elect to include digital signatures in images captured in response to triggering events such as alarm conditions, detection of motion or other hard trigger alarms. Likewise as shown in screen 406, the user may configure the system to apply digital signatures into images captured in response to transactions conducted at an automated banking machine. In the particular example, shown in FIG. 35, digital signatures are not applied to "normal" images which are those captured in response to routine periodic sequences. As represented in screen 406, the user may also elect to apply digital signal security to no images or all of the images captured in the operation of the system. It should be understood that the categories of images shown in screen 406 are exemplary and in other embodiments other types of image parameters may be used.

A further useful aspect of the exemplary embodiment of device 330 and the system 328 represented in FIG. 28 is the ability of an authorized user of device 330 to program sequences in which images or other information are captured. As is the case in embodiments previously discussed, sequences include a triggering event and a series of actions that are taken by the system in response to a triggering event. Triggering events may include, for example, sensing image conditions such as motion, lack of usable video or a blocked camera and taking a series of actions in response thereto such as capturing images from other cameras, turning on lights, placing in more permanent storage temporary image data that was captured prior to the triggering event, sending messages such as e-mails or performing other actions. Similarly, triggering events may include activities conducted at an automated banking machine or other transaction machine, during which times it is desirable to capture and permanently retain images from cameras which have a field of view that includes the area where the machine is positioned. Similarly triggering events may include inputs to or from alarms or sensors. Other triggering events may include sequences which operate on a timed or other periodic basis in a routine manner such that image data is stored in relatively permanent storage from each of the cameras in the system as a routine matter of course. Numerous types of sequences can be programmed by an authorized user using the exemplary embodiment of the invention.

For purposes of the particular exemplary embodiment of system 328, triggering events are cataloged by type as either "normal," "alarms" or "transactions." Normal images are those that are captured in accordance with routine sequences that are carried out on a periodic basis in accordance with the programming of device 330. Different routine sequences may be operative at different dates and times in accordance with the system configuration. Such routine sequences may, for example, capture an image from a particular camera so as to store it in relatively permanent memory every so often, then subsequently capture an image from another camera and so on. Because these "normal" images are captured on an ongoing basis, care is generally exercised by the operator of the system to be sure that not so many images are stored that the available storage space is occupied too quickly by images that are of no particular interest.

The images classified as "alarms" are those that correspond to alarm type inputs. These can include hard trigger alarms such as those provided by switches, invisible beams and buttons that may be tripped as activities occur. Similarly, the category of "alarms" include image conditions such as motion detection, loss of usable video, detection of particular features, clothing, body orientation, colors or objects within the field of view (or a detection area smaller than an overall field of view) of a particular camera. Each alarm sequence may include appropriate actions such as actuating lights, blocking devices, alarms, contacting police or fire departments and/or sending e-mail messages and/or images to predetermined addresses.

In the exemplary embodiment, images associated with "transactions" are images associated with devices at which transactions are carried out. These may include transactions conducted at automated banking machine 332, cash register 344 or other devices where it is desirable to make a record of the transactions. With regard to transaction images the sequence typically involves a triggering event related to operation of a component of a transaction function device or terminal, and the actions may include capturing the image to store it in memory and perhaps additional steps depending on the nature of the transaction being conducted. Again, it should be remembered that the categories of triggering events in this embodiment are exemplary and other triggering event categories may be used in embodiments of the invention.

In the exemplary embodiment, device 330 operates in a manner like that previously discussed to digitize image data received from all or a selection of cameras on an ongoing basis. This image data is digitized as image frames on an ongoing basis and remains stored in the memory associated with the computer of device 330 for a fairly limited period of time. These temporarily captured and stored images may be more permanently captured by being moved to relatively permanent storage at the time that they are received or alternatively may be moved into relatively permanent storage at any time prior to their deletion. The value in digitizing and temporarily capturing images on an ongoing basis as often as possible from selected cameras include the ability to recover image data from a time prior to a triggering event. Thus for example if an image condition such as a blocked camera is detected, one or more prior images from the same camera that are still in temporary storage may be transferred in response to the triggering event to more permanent storage and correlated with data representing the triggering event. This may enable detection of an image which includes a person who caused a camera to be blocked. The ability to retain on a more permanent basis images which occurred prior to a triggering event is configurable in the exemplary system, as are the number of images prior to the triggering event which may be transferred to more permanent storage. Of course the ability to transfer prior images depends on the number of image frames that are available in temporary computer storage from each camera prior to the deletion of such images. Of course the duration that such temporary images are stored can be increased with the addition of additional storage and processing capability. Likewise, the frequency of these temporary images from any given camera depends on the processing capabilities of the computer operating in device 330. Faster processing may similarly increase the frequency at which temporary images are captured.

A useful aspect of the exemplary embodiment includes the ability to program sequences using descriptive terminology which is established by a user of the system. FIG. 36 shows a screen 408 that is displayed to a user in configuring system 328. Screen 408 is a camera set-up screen in which a user is enabled to give descriptive names to the particular cameras or field of view of a camera connected to the system. From screen 408, a user is enabled to select a camera through use of an input device such as a mouse and to "see" the field of view that is associated therewith. The user is also enabled to input a descriptive name for that field of view such as is shown in connection with "camera 01" shown in FIG. 36. As subsequently explained in detail, a user is enabled to configure sequences including triggering events and actions to be taken in response thereto using the descriptive names that the user has given to various cameras in the system. This capability greatly simplifies the programming of the system as users are not required to learn any special conventions or terminology.

As is the case with cameras, users are also enabled to apply descriptive names to outputs which are provided from the device 330. These outputs may include for example a descriptive name for the particular item or action which is triggered by the output. For example, in FIG. 37 there is shown a screen 410 in which an authorized user of the system is presented with output numbers for the various contacts and connections that may be made to device 330. By making an appropriate selection and input, the user is enabled to apply descriptive terminology to these outputs. For example, in screen 410 "output 01" has been named to indicate that it operates to turn on lights in a vestibule. Of course this is exemplary and any appropriate name may be input in the discretion of the operator.

Similarly, the user of the system is enabled to provide descriptive names for the inputs which serve as triggers for executing sequences by device 330. Screen 412 in FIG. 38 shows the capability of a user to give a descriptive name to a particular input device. For example, in FIG. 38 "input 01" to device 330 is indicated as associated with a teller panic button. Having this descriptive information available and usable to program sequences in the invention makes it much easier for a user to set up and check that the desired activity is happening in response to a triggering event in any given sequence.

Figure 39:
FIG. 39 is an exemplary embodiment of a screen presented at a user terminal for purposes of capturing images in response to triggering events which occur in the operation of an automated banking machine.

FIG. 39 also shows the capability of device 330 to execute sequences that are triggered by operation of automated banking machine 332. A screen 414 in FIG. 39 shows an ATM monitoring set-up screen. In response to the presentation of screen 414, a user is enabled to give the automated banking machine a particular descriptive name. This descriptive name may include the particular street address where the automated banking machine is located. Similarly, if there are several automated banking machines at the same address, each machine may be assigned a descriptive name representative of its location. Such terms used may include names such as "lobby ATM," "drive-through ATM" and "walk-up vestibule ATM." Of course many other types of names and designations may be used depending on the particular type of automated banking machine involved.

In the exemplary embodiment of screen 414 shown in FIG. 39, the system 330 is shown configured to operate in connection with an ExpressBus™ interface which is used in automated teller machines manufactured by Diebold, Incorporated, the assignee of the present invention. Of course in other embodiments of the invention other appropriate set-up screens suitable for configuring the programming of the system to work with other types of machines may be presented.

As was discussed in connection with other embodiments, actions performed as part of a sequence may include sending e-mails to one or several persons notifying them of the occurrence of the triggering event. Screen 416 shown in FIG. 40 may be used by an authorized user of the system to input e-mail addresses that are to be notified of triggering events. Further as represented in screen 416, a user is able to designate groups of persons who are to be notified of particular events. These descriptive names for groups enable an authorized user to readily configure the system so that a number of people receive an e-mail message notifying them of a triggering event. Such actions are readily programmed into a sequence by referring to the name of the group.

Figure 41:
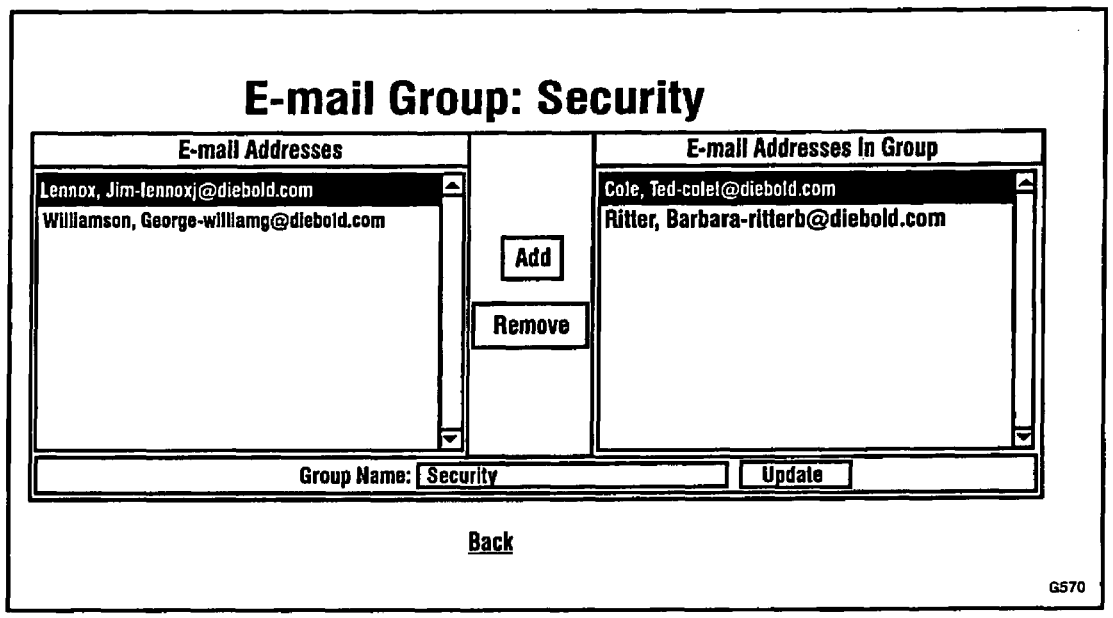
FIG. 41 is an exemplary embodiment of a screen presented at a user terminal for purposes of setting up a group of e-mail addresses for persons who are to be notified of certain events occurring at the system.

Screen 418 shown in FIG. 41 shows an example of an e-mail group which has been named "security." This would be, for example, a group of persons or entities that are to be notified in the event that a triggering event detected by the system indicates a breach of security or some activity that should be investigated by a security organization responsible for the facility. As can be appreciated by screen 418, an authorized user of device 330 is enabled to add, delete and edit e-mail addresses which compromise the groups which are to be notified.

In some exemplary embodiments where images corresponding to documents are captured by an automated banking machine, the system may operate to deliver images of documents accepted by the machine to authorized persons. This may include for example delivering e-mail messages which include or have attached thereto data corresponding to an image of a document. For example in some embodiments e-mail address data may be resolved by an automated banking machine based on routing numbers or other data or indicia included on checks or other instruments presented to an automated banking machine. Based on programmed instructions in the machine such data may be utilized to resolve the appropriate e-mail address associated with the maker of the document. In this way the maker of the document may be advised that the particular document has been cashed. Further, as previously discussed in exemplary embodiments a maker of an instrument so notified may also access and/or transfer data corresponding to at least one image associated with the individual presenting the document to the machine. This may enable greater assurance that the particular document has been presented or cashed by an authorized person. Likewise some embodiments may provide e-mail notifications and/or image data when a document has been deposited for the benefit of a user. Such approaches enable the persons involved to manage their account balances more closely and in some exemplary embodiments to reduce the risk of fraudulent or inappropriate activities.

Figure 42:
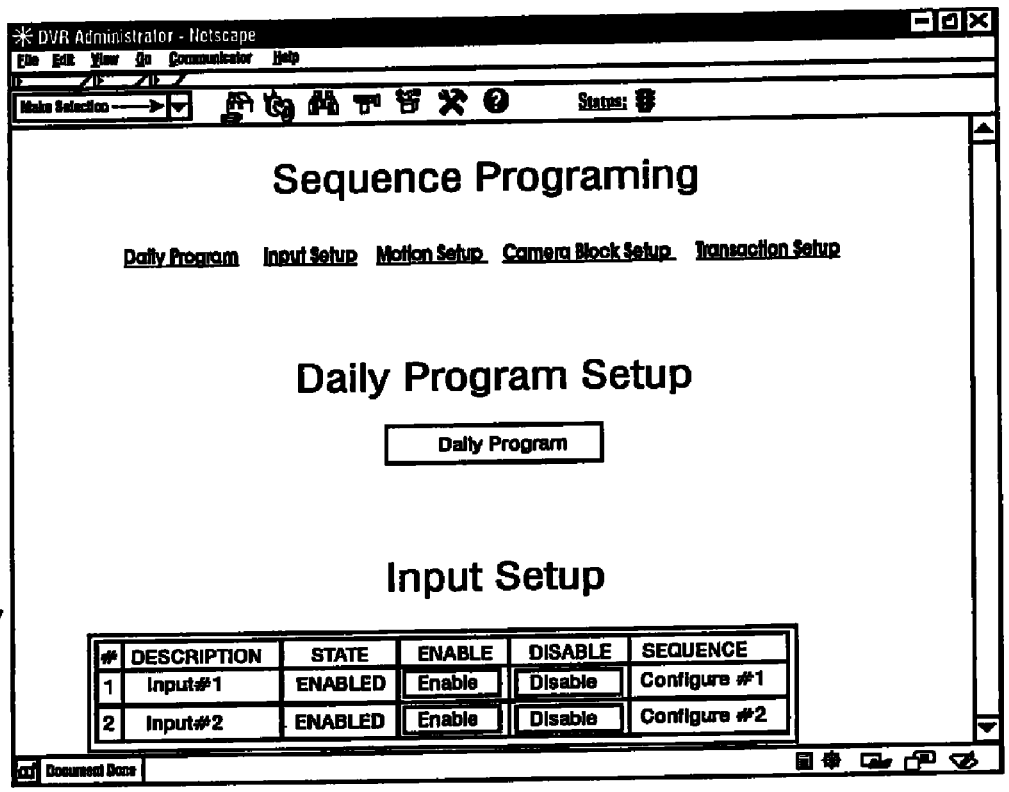
FIG. 42 is an exemplary embodiment of a screen presented at the user terminal for purposes of programming the system with sequences.
Figure 43:
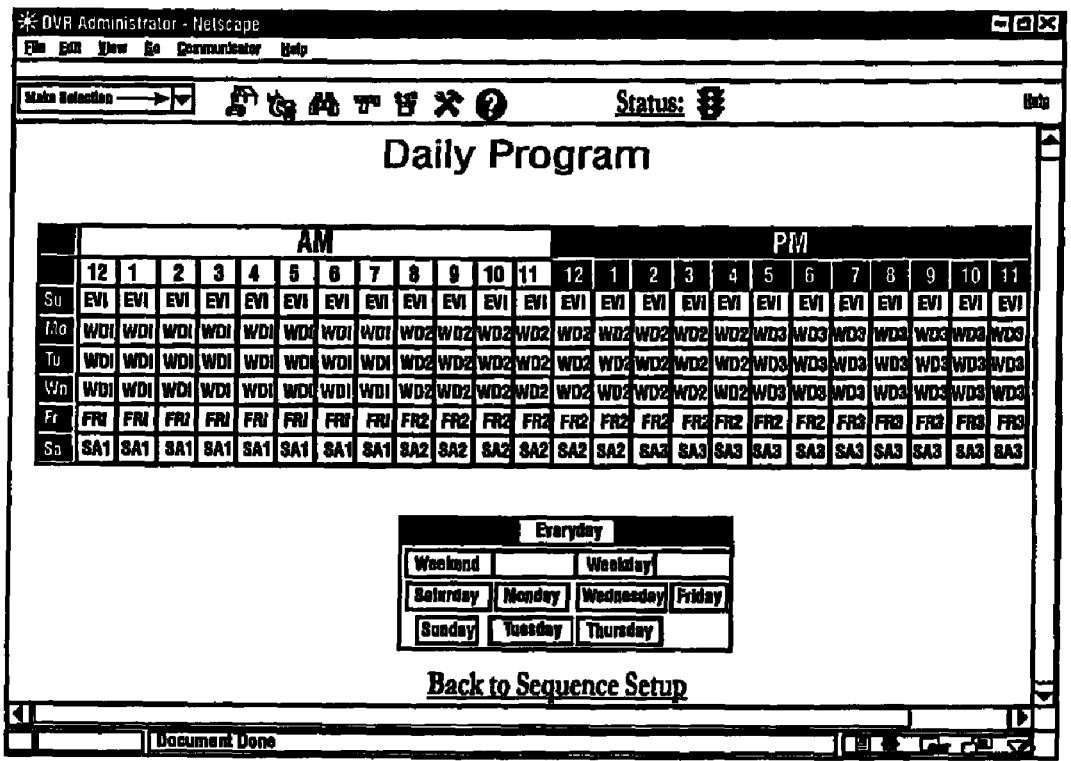
FIG. 43 is an exemplary screen presented at a user terminal which graphically displays sequences applicable to particular times and dates that have been programmed into the system.

The exemplary embodiment of device 330 enables an authorized user to readily program the system to carry out various types of sequences. These sequences include sequences associated with the capture of "normal" or routine images that are stored on a timed or other periodic basis while the system is operating. The user is also enabled to program sequences in response to the various types of triggering events such as inputs, motion detection, lack of usable video and the conduct of transactions. FIG. 42 shows a screen 420 which is presented to a user in connection with establishing routine sequences for the capture of images and storage on a relatively permanent basis. Screen 420 also shows the beginning point for the programming of sequences in response to input devices which will be later discussed in detail.

In response to user selection of the "daily program" box in screen 420 a screen 422 shown in FIG. 3 is presented. Screen 422 shows a visual representation of a weekly layout for hours in each day and the names of programs or sequences which are operated to capture routine or "normal" images during the indicated times. In addition to viewing the sequences that are operative at various times during the week from screen 422, the user is enabled to view the sequences applicable during any selected day of the week or in groups of days such as by weekdays or weekends. In the exemplary programming of the system, sequences are configured to continue until a time when another sequence is to be initiated. Further, the programming is set up so that a more specific program for a given time period will override a more general program during the selected period.

Figure 44:
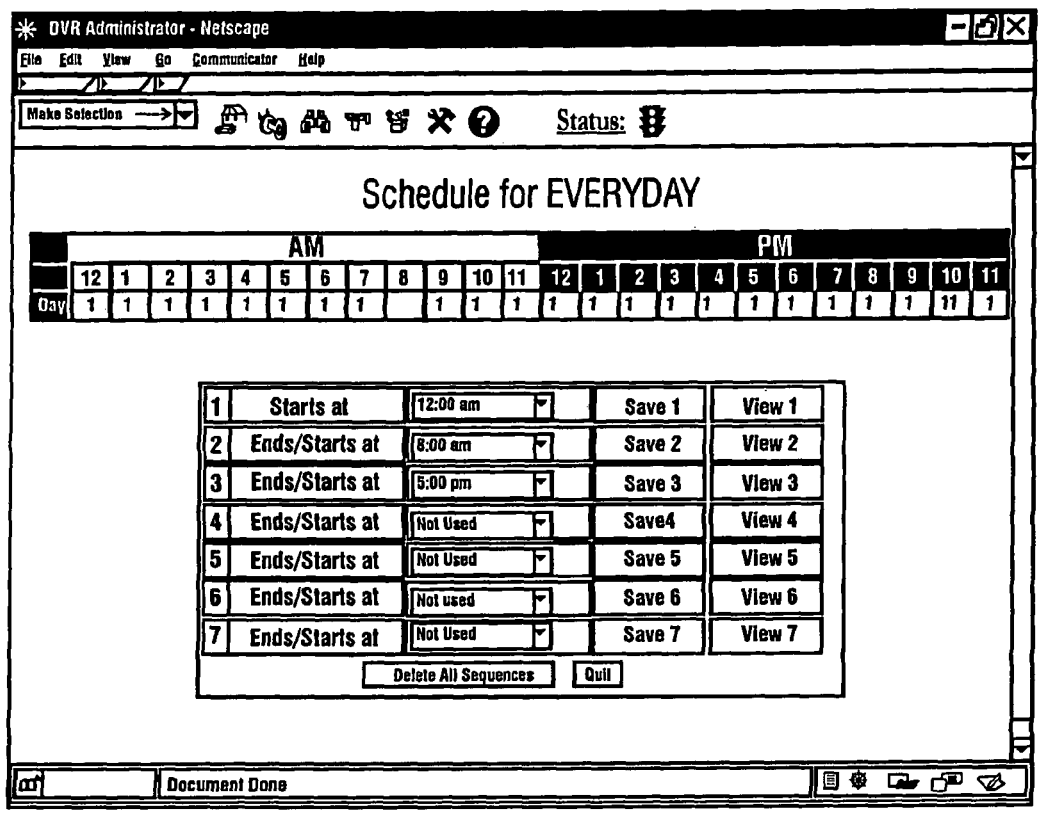
FIG. 44 is an exemplary screen presented at a user terminal showing the times each day certain routine program sequences are carried out.

By selecting a particular day of the week from screen 422, the exemplary embodiment of device 330 is operative to display to a user a screen 424 shown in FIG. 44. This screen shows for the selected day the sequences for the routine capture of images that occur on that day and the time periods when each sequence starts and ends. A graphical indication is also provided so that the user may readily see the times during the selected day when particular sequences are operative.

Figure 45:
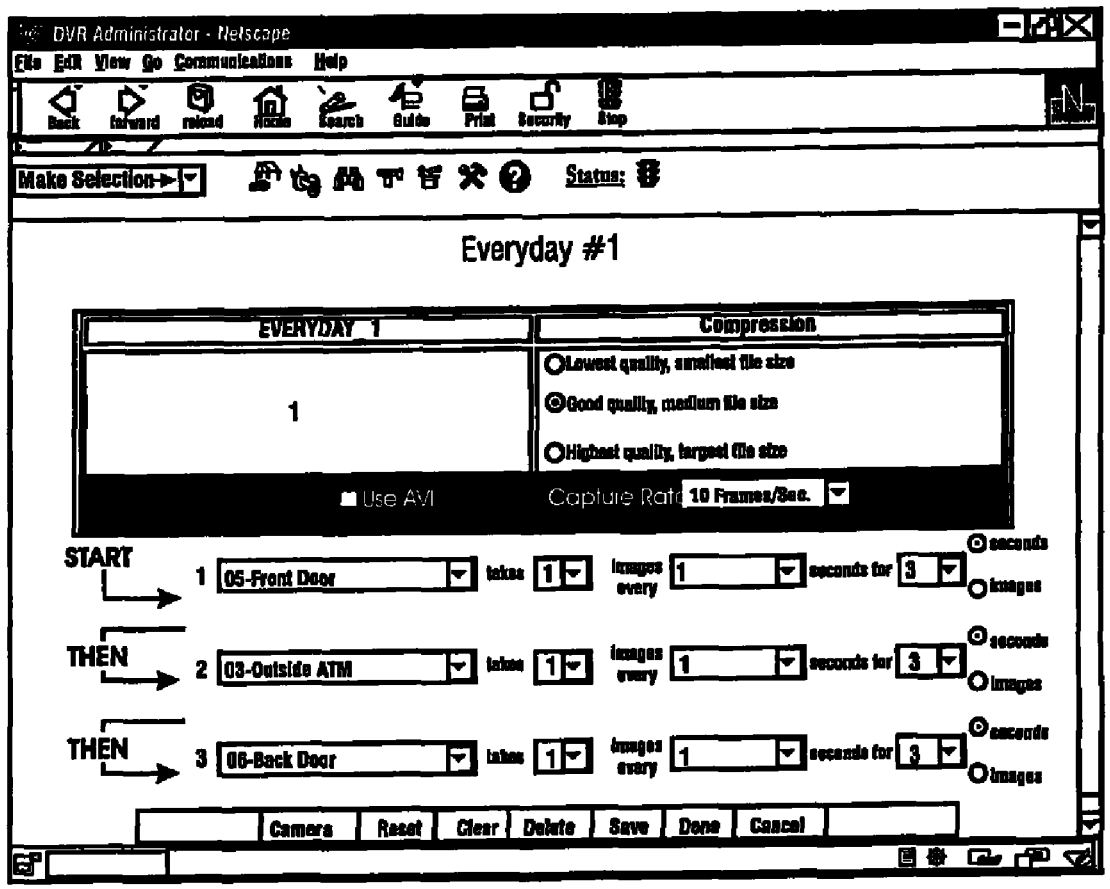
FIG. 45 is an exemplary embodiment of a screen presented at a user terminal representative of the steps taken by a user in programming a sequence.

From screen 424, a user is enabled to select to view any of the selected sequences. For example, by selecting to view sequence indicated "1" in screen 424 the device 330 causes the screen 426 shown in FIG. 45 to be displayed. Screen 426 indicates to the user a graphical representation of the steps involved in the routine sequence. Screen 426 also indicates the data compression level that is to be applied to the images that are captured and stored on a relatively permanent basis. By selecting the compression level the user may choose to have lower quality images in exchange for utilizing less of the available data storage space with images corresponding to the particular sequence. Various levels of data compression are selectable by the user for the sequence as shown in screen 426.

As represented in screen 426, the user is also enabled to set an image capture rate which controls the frequency of image capture and storage during time periods which are indicated in the sequence as periods during which images are to be captured by a particular camera. In the exemplary embodiment, the user has the option to capture a certain number of images or to set the system to capture images for a period of time. If the user configures the system to capture images based on time, the indicated rate reflects the number of images captured and stored in relatively permanent memory during each second. The exemplary embodiment also enables a user to select AVI which is an image capture rate sufficiently high such that it appears to capture full continuous motion in a manner similar to a video clip. In the exemplary embodiment the capture of ten or more images each second corresponds to what generally appears to a user to be full motion. Of course, higher rates of image capture may be used.

Screen 426 represents the sequence which is carried out routinely by the system on an ongoing basis using the passage of time as the triggering event for each sequence. As can be seen, the particular cameras in the exemplary sequence are shown by the numbers as well as the descriptive names which have been applied by a user thereto. In this exemplary sequence, a camera which views a front door takes one image every second for three seconds. Thereafter, a camera which takes pictures of an outside ATM takes one image every second for three seconds. After that, a camera which views the back door takes one image every second for three seconds. After completing the sequence, the sequence repeats. An authorized user is enabled to modify the sequence by changing the number and timing of images in the sequence. The user is also enabled to delete and modify steps in the sequence by selecting the "buttons" at the bottom of screen 426. For example, a user is enabled to selectively or completely delete steps in the sequence, add cameras, add steps and save the revised sequence. Of course in other embodiments additional options for steps or actions in sequences may be provided.

In the exemplary embodiment of the routine sequences, provisions are not made for notifying a remote location via e-mail. This is because routine sequences are continuously executed gathering and storing images at all times while the system is operating. This includes times in which images are being captured in response to other events. In other embodiments however, the system could include as part of the capture of normal images, provisions for providing periodic reports via e-mail or otherwise, to functions or individuals who need to know that the system is operating normally. In addition, such messages may also include one or more images enabling the person receiving the message to visually verify the current condition in the area or facility monitored by the system.

Figure 46:
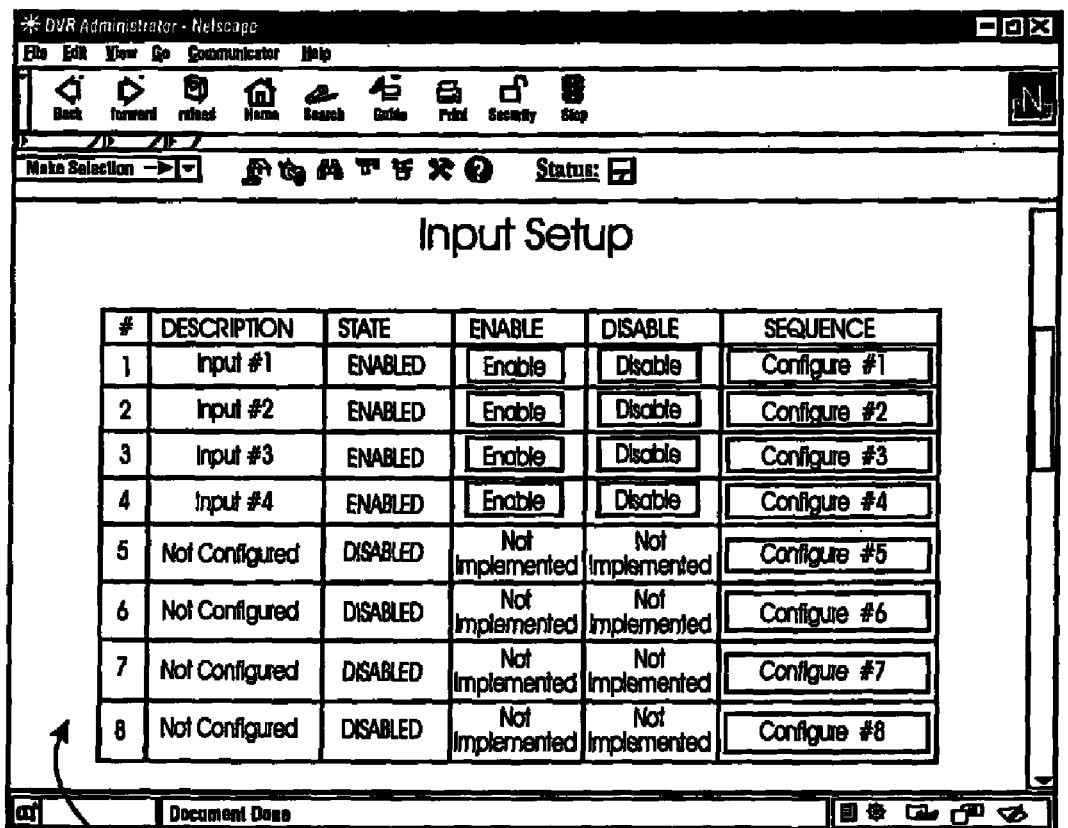
FIG. 46 is an exemplary embodiment of a screen presented at the user terminal for purposes of establishing a programmed sequence in response to inputs received by the system.

FIG. 46 shows a screen 428 at which a user is enabled to review sequences associated with inputs that correspond to triggering events. Such triggering events may include, for example, the inputs from various sensors sensing activity in various areas under surveillance, inputs from panic buttons or other types of inputs. By providing inputs in response to screen 428 an authorized user is enabled to selectively enable execution of the sequences in response to the triggering events which cause the listed inputs.

Figure 47:
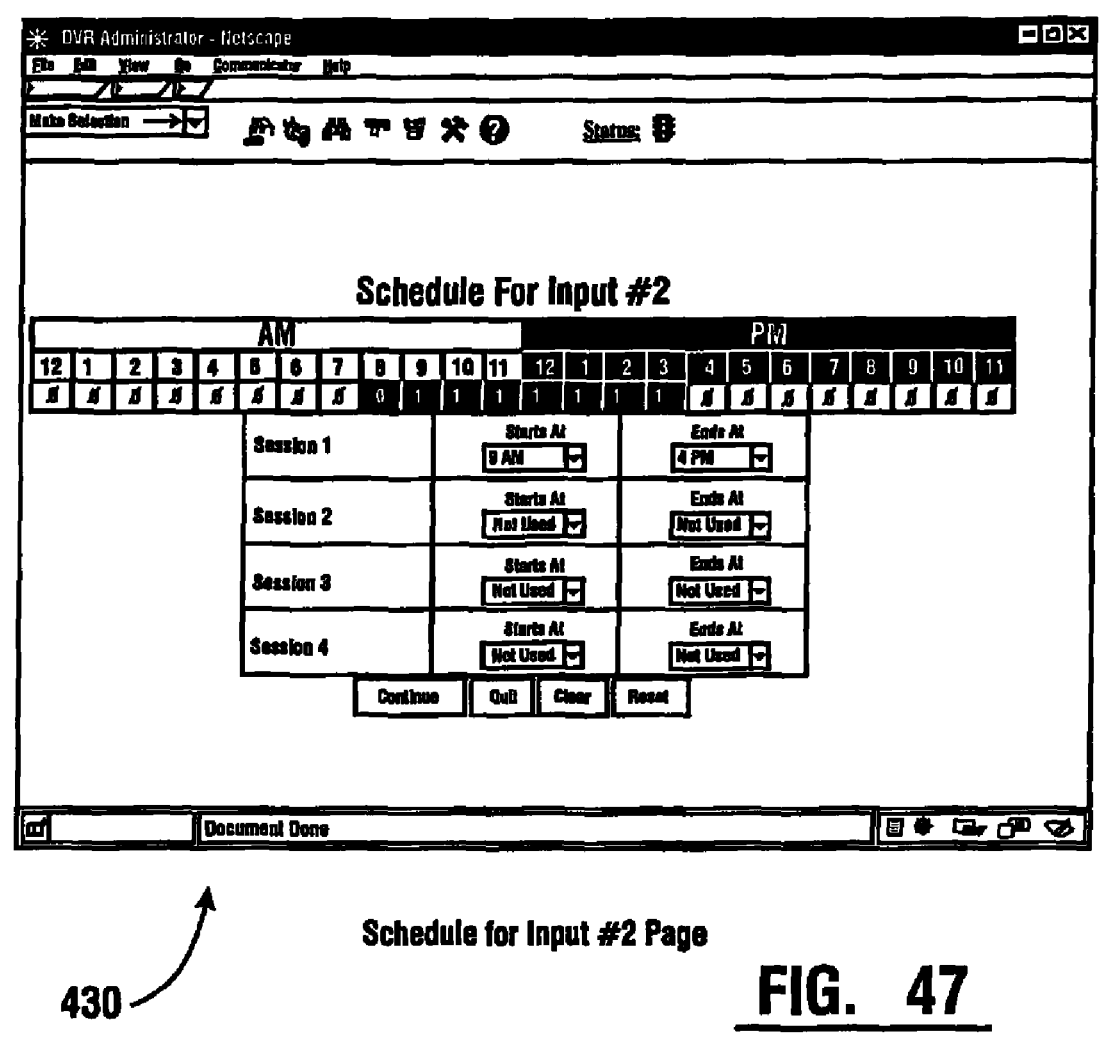

By providing inputs to screen 428 a user is enabled to configure the sequences associated with particular inputs. This includes establishing a schedule during which a selected input will cause a selected sequence to be executed. The schedule for the execution of a particular sequence is shown in screen 430 in FIG. 47. Through inputs to screen 430, the user is enabled to indicate the time periods during which the system will execute the sequence if the input is received. For example, if the particular input is associated with opening a door, it may not be desirable to capture images during the time periods when the door is frequently opened by employees or customers who access a facility. The configuration associated with the input enables the input to cause the execution of the sequence only at the times when the capture of images is likely to yield useful information. In the exemplary screen 430 shown in FIG. 47 an input number 2 is configured to cause its corresponding sequence to be executed only between 9 a.m. and 4 p.m. Through inputs to screen 430, an authorized user is enabled to modify these time periods as well as to select separate discrete times periods during which the input will cause the sequence to be executed.

Figure 48:
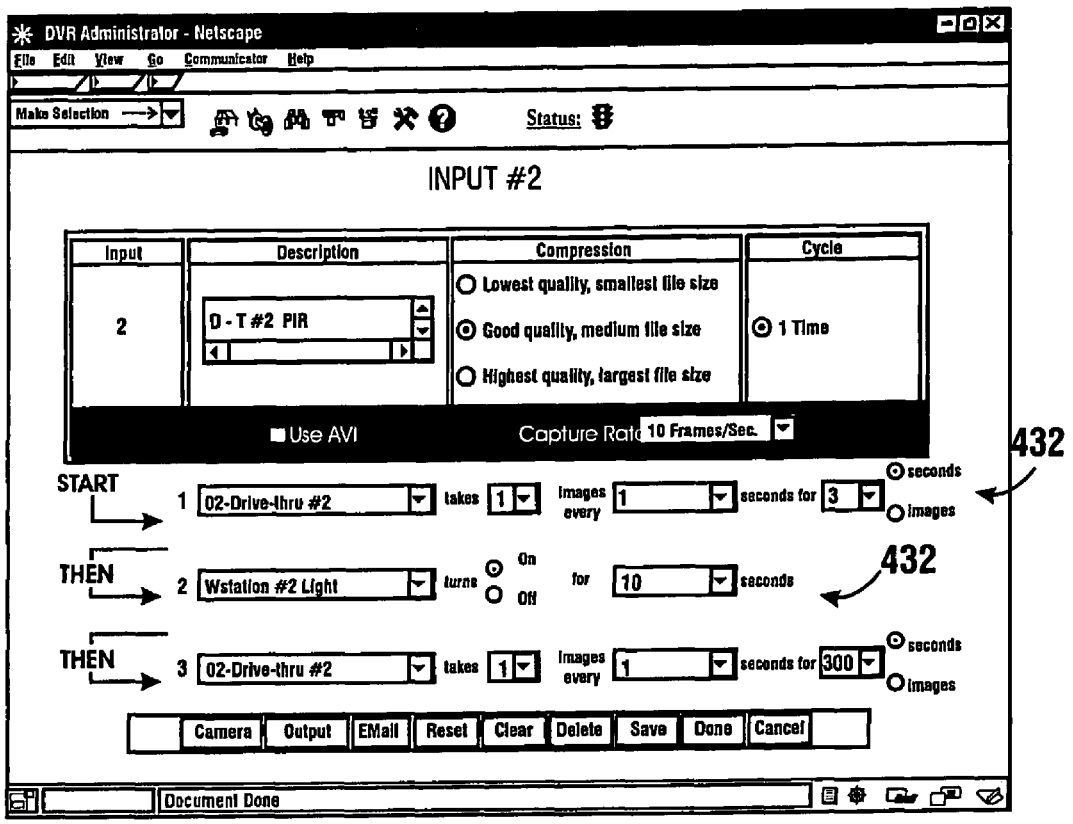
FIG. 48 is an exemplary screen presented at a user terminal associated with programming a sequence in response to receipt of a particular input by the system.

The user is also enabled to set up or modify the sequence that is associated with the input. This is accomplished from screen 430 by an appropriate input that causes the screen 432 shown in FIG. 48 to be displayed. Screen 432 includes a description of the particular event which is associated with the input. Also as is the case with the routine sequences previously discussed, a user is enabled to set the image quality of the images captured and stored in response to the triggering event. Further in the exemplary embodiment, an authorized user is enabled to set the number of times that the sequence will be executed in response to the triggering event. As previously discussed screen 42 also includes provisions for the user to set the image capture rate associated with the capture of images that are done in the corresponding sequence on a timed basis.

The user is enabled to set up a sequence by selecting the "buttons" at the bottom of screen 432. These buttons correspond to various actions related to cameras, outputs and e-mails that the system is enabled to capture images from, provide and send, respectively. In response to selecting one of these buttons, a particular configuration step or action which a user may populate with instructions by making selections therein is included in the sequence. For example, in response to selecting a "camera" button a sequence frame designated 434 in screen 432 is displayed. The sequence frame includes five areas for inputs that can be provided by the user. This includes the camera selection, the number of images, the frequency of the images and the duration or number of images involved. By populating these five spaces in the image frame with data the user is enabled to provide the necessary programming information for carrying out an action in a manner that is readily understood in a sentence format. For example, as shown in screen 432, sequence frame 434 indicates that the camera designated "drive-thru #2" takes one image every one second for two seconds. Of course by making selections and inputs the user is enabled to change the five input areas within the sequence frame to suit their particular requirements.

Similarly, as represented in screen 432 selection of the "output" button enables a user to include a sequence frame 436 in an action the sequence. The sequence frame includes three inputs that can be made by a user to select the nature of the output that is to be included as an action in the sequence. In the case of sequence frame 436 the user is shown as having populated the information for causing the "W station # 2 light" to turn on for ten seconds. Thus again the sequence frame enables the user to provide in a sentence format those instructions which correspond to a selected output. Further the outputs are enabled to be selected in accordance with the descriptive names that have been applied to the outputs by a user.

As can be appreciated from screen 432 numerous action steps can be selectively added or deleted from a given sequence as desired by the user in response to the triggering event. It should further be understood that similar sequence frames are provided for e-mails which is a selected action step that can be taken in response to a triggering event. Further in other embodiments additional types of steps can be taken, each of which may have its own sequence frame which a user may populate with particular data to accomplish the carrying out of a particular action step. For example, additional actions may include repeating one or more steps in a sequence one or more times, and waiting for other actions or delaying for a time before taking further actions. Similar principles are carried out in connection with the programming of the various types of sequences by the system of the exemplary embodiment.

Figure 49:
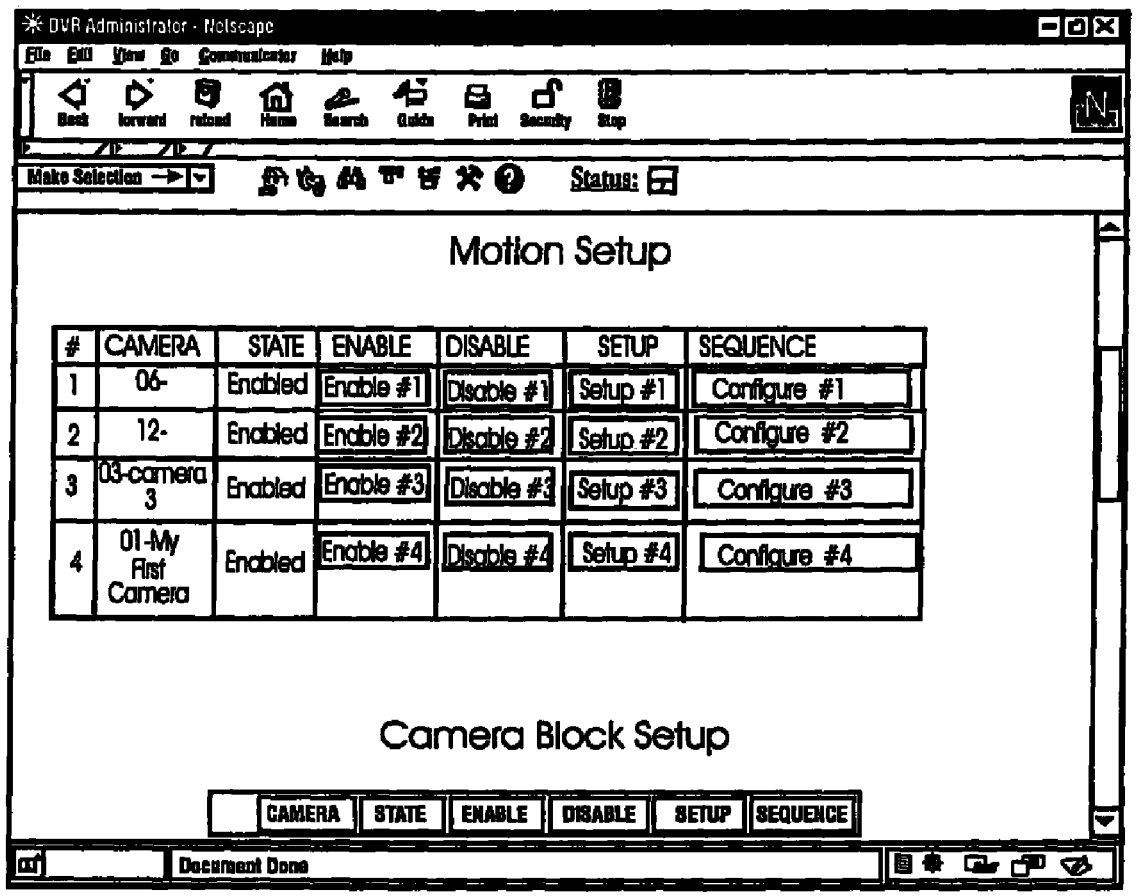
FIG. 49 is an exemplary screen presented at a user terminal for purposes of configuring a sequence for capturing images in response to detection of motion.

FIG. 49 shows a screen 438 which is associated with establishing a sequence in response to the detection of motion in the exemplary system. The motion set-up sequences enable a user to establish when detected motion within a particular area causes images to be captured and stored on a relatively permanent basis, and other actions to be taken as part of a sequence.

In screen 438, the cameras which are included in the system are presented using the descriptive naming terminology applied by a user. In response to the motion set-up screen 428 a user is enabled to select which sequences are enabled or disabled for particular cameras. In addition a user is enabled to access other screens for purposes of setting up selected detection areas in which motion is to be detected, as well as to configure the sequences that are executed in response to motion detection.

In response to selecting a set-up button for an appropriate camera from screen 438, a set-up screen showing a field of view currently obtained from the camera selected is displayed at the user terminal. An example of such a set-up screen is indicated for 440 in FIG. 50.

Screen 440 includes a field of view of the designated camera generally indicated 442. The field of view of the camera includes the entire image field that the camera is currently viewing. Through use of a mouse or other input device, a user is selectively enabled to select one or more detection areas schematically indicated 444 within the field of view 442. The detection areas 444 are one or more areas to be analyzed and in which a determination concerning the detection of motion is to be made. An advantage of providing a selected detection area for purposes of determining the presence of motion is that it avoids problems associated with monitoring in areas where motion may commonly be occurring in some areas, but where in other areas the occurrence of motion is an event for which images should be captured. In the exemplary embodiment the system is operative to compare the images only within the selected detection areas on an ongoing basis between the temporary captured images that are stored temporarily from each of the cameras. Comparison of the image in one or more successive ones of these temporary images are preferably analyzed through operation of the computer for differences. In this embodiment the computer operates to analyze the pixels which make up these images for a degree of change. If more than a set degree of change between one or more of these images which are spaced in time is detected, this is an image condition indicative and motion and a triggering event which causes the corresponding sequence to be executed.

An advantage of the exemplary embodiment shown in connection with screen 440 is that the user is enabled to selectively set the degree of change in the image in the detection area which will result in a determination that motion has been sensed. Specifically in the exemplary embodiment the user is enabled to selectively input values as to a percent of sensitivity which corresponds to a change in property such as intensity or color (or a combination of both) among pixels in the detection area that will be considered for purposes of determining whether motion has occurred. Likewise the user is enabled to set the percent of activity which corresponds to a quantity such as a number or percentage of pixels subject to analysis experiencing the set change in intensity or sensitivity which is indicative of motion. In this way the user of the system is enabled to set the motion detection parameters for the degree of change which will cause a triggering event indicative of motion detection. A user may thereby avoid motion from being considered detected in circumstances where it is not desirable to capture images.

An exemplary embodiment includes a service program which enables a servicer or authorized user to test the suitability of the motion detection settings in particular circumstances. This program runs in one or more computers operatively connected to the camera of interest. The user inputs into the computer running the program the selected sensitivity and activity settings. The user may then cause activity to occur in the field of view of the camera. The program then causes a display to operate so as to indicate whether the activity resulted in motion being considered to have been detected. In this way a user may adjust the settings to suit their requirements. Alternatively the system may be operated in a test mode to capture a series of images from a selected camera. The settings may be applied by a test program to these captured images in a controlled manner to evaluate the settings versus the nature of image change. In an exemplary embodiment, captured images may be compared in the sequence originally captured or may be compared in a different sequence to determine the appropriate motion detection settings. Once selected, the selected settings for sensitivity and activity may be set in the system and applied on an ongoing basis.

Figure 50:
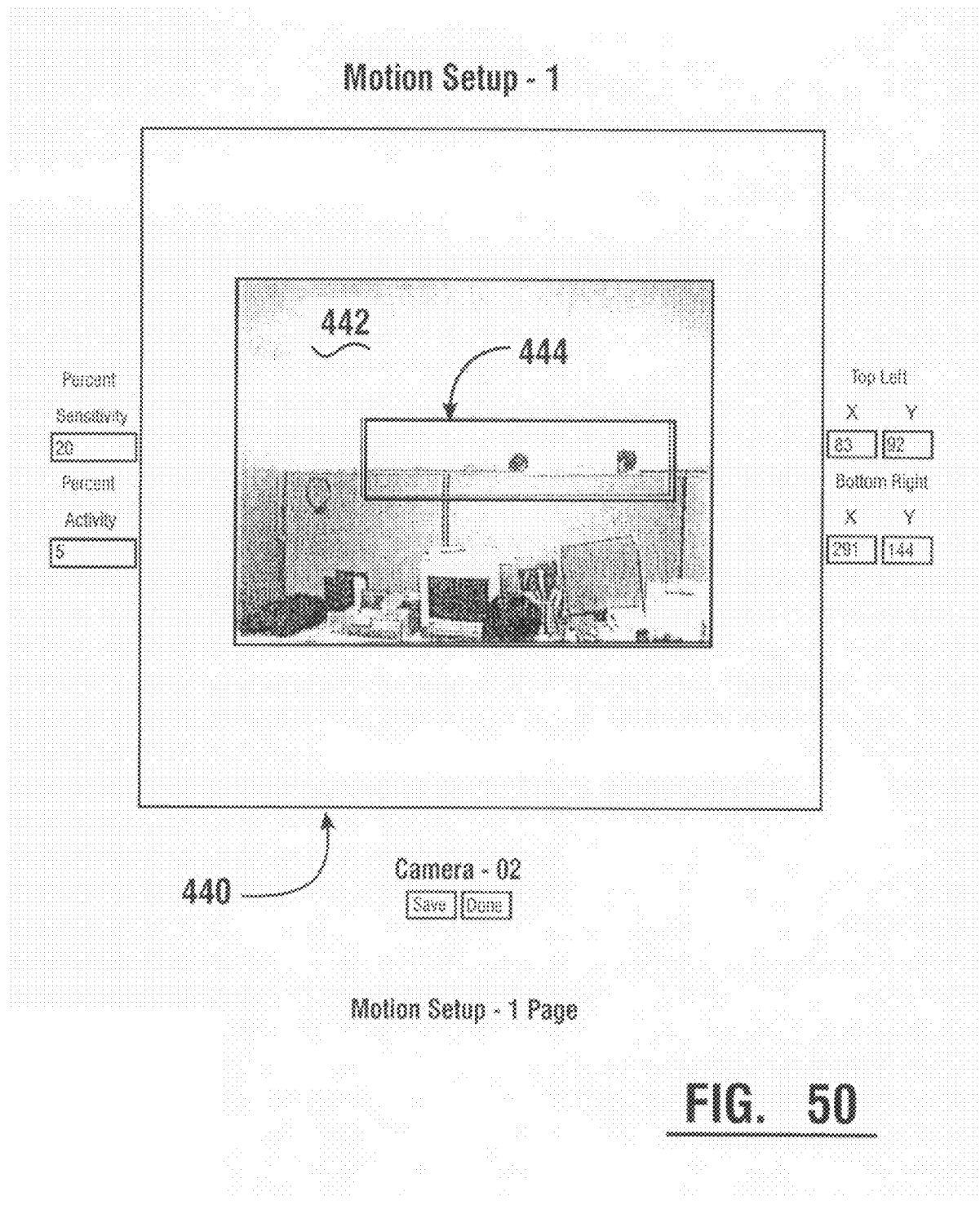
FIG. 50 is an exemplary screen presented at a user terminal for purposes of establishing a detection area as a subset of a field of view of a camera for purposes of selectively detecting motion within the detection area.
Figure 51:
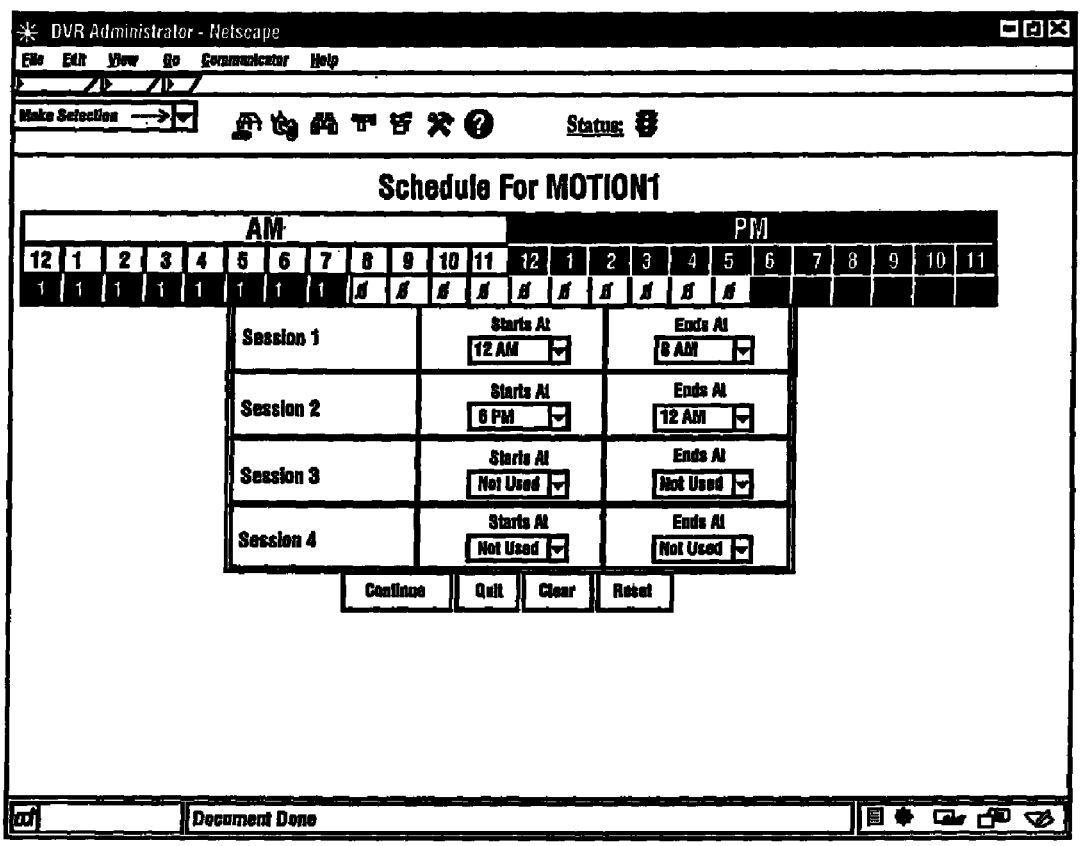
FIG. 51 is an exemplary screen presented at a user terminal for purposes of showing when a sequence applicable to detection of motion will be operative within the system.

Returning to the discussion of FIG. 50, from screen 440 a user is enabled to display a schedule for selected days in which motion is to be detected. This is represented in screen 446 which is shown in FIG. 51. Through inputs responsive to screen 446 the user is enabled to set the periods during which motion detection is accomplished for purposes of carrying out a sequence. As can be appreciated in many circumstances there are particular times of day during which motion is likely to be going on in a particular area and other times during which the detection of motion may represent an usual event for which images should be captured. Through inputs of screen 446 an authorized user is enabled to selectively set the times during which motion detection analysis will be conducted.

Figure 52:
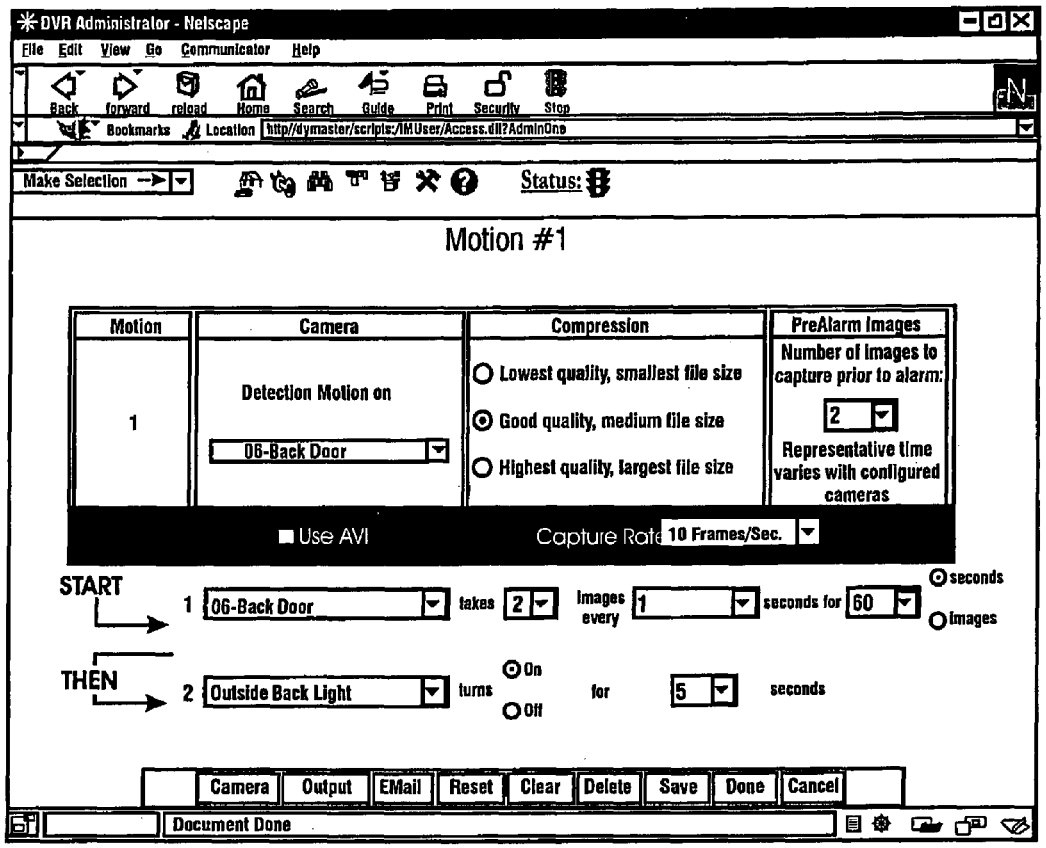
FIG. 52 is an exemplary screen presented at a user terminal for purposes of programming a sequence to be carried out in response to detection of a motion event.

From screen 446 a user is enabled to set the sequence that is carried out in response to a motion detection event. This is done in response to a screen 448 shown in FIG. 52. Screen 448 includes the ability of a user to set the parameters associated with the detection of motion using the descriptive names for cameras which were set-up by the user. The user is also enabled to set the image quality parameters for the storage of images. In addition to parameters associated with other screens, in screen 448 the user is also enabled to set the number of images captured prior to the detection of motion which will be moved from temporary storage into relatively permanent storage in connection with images captured in response to the motion event. Using inputs directed to the "buttons" in screen 448, the user is also enabled to set up the sequence frames associated with cameras, outputs and e-mails by populating the information in the frame. A sequence frame enables the user to program using a sentence type structure, the actions which will occur in response to the triggering event. For example, in the sequence shown in 448 in response to motion being detected at the camera which watches the back door of a particular facility, the back door camera takes two images every second for sixty seconds. Thereafter the outside back light turns on for five seconds. In addition to capturing the images from the back door camera, two pre-alarm images are transferred, from temporary storage into relatively permanent storage with data which describes the triggering event. Of course, it should be understood that the sequence parameters and actions are exemplary and in other embodiments other approaches may be used.

Figure 53:
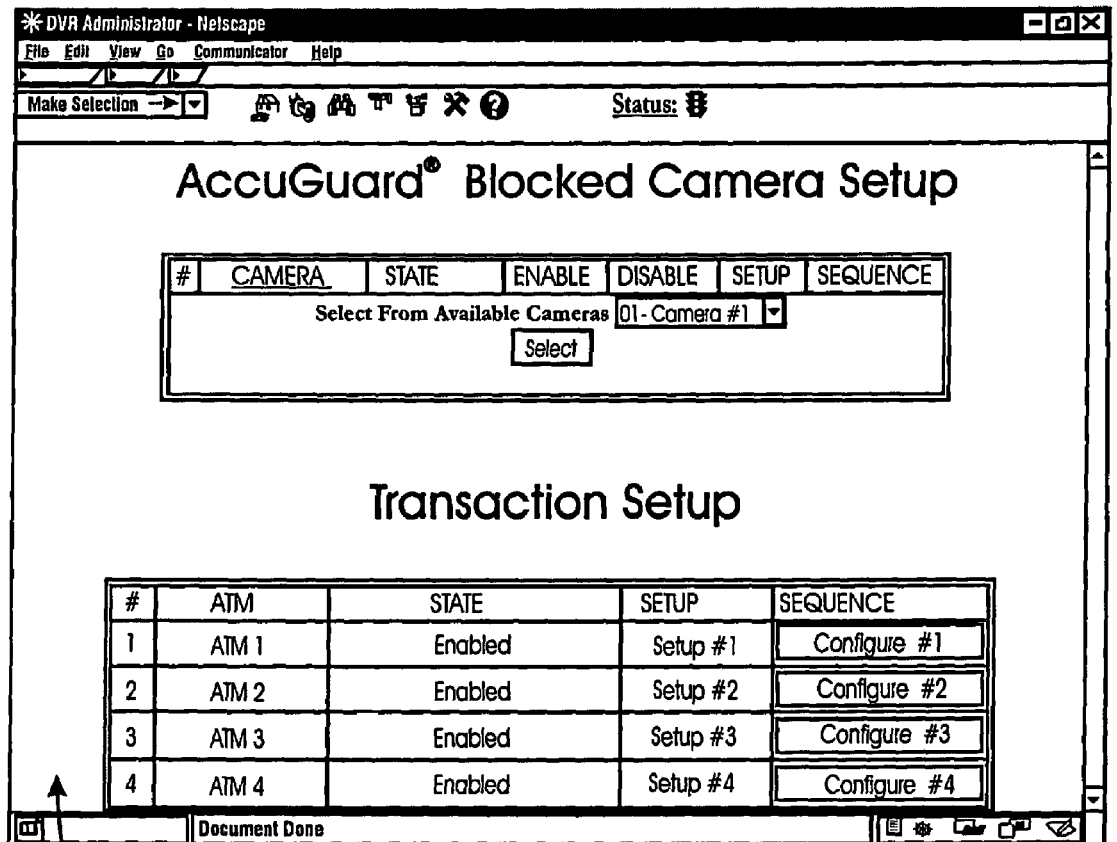
FIG. 53 is an exemplary screen presented at a user terminal associated with programming a sequence for detecting lack of usable video from a camera in which a camera is selected.

Embodiments may also capture images in response to triggering events which are indicative of cameras being blocked. Such blocked camera events which are alternatively referred to herein as a lack of usable video, generally result from an image condition in which the image presented is either unduly light or dark, or otherwise lacking in contrast, not changing or otherwise appearing so as to suggest that usable video data is not being received. The sequence as associated with blocked cameras is configured in the exemplary embodiment with inputs responsive to a screen 450 shown in FIG. 53. In response to presentation of the screen 450 a user is enabled to select the particular camera at which a blocked camera event will be detected.

Figure 54:
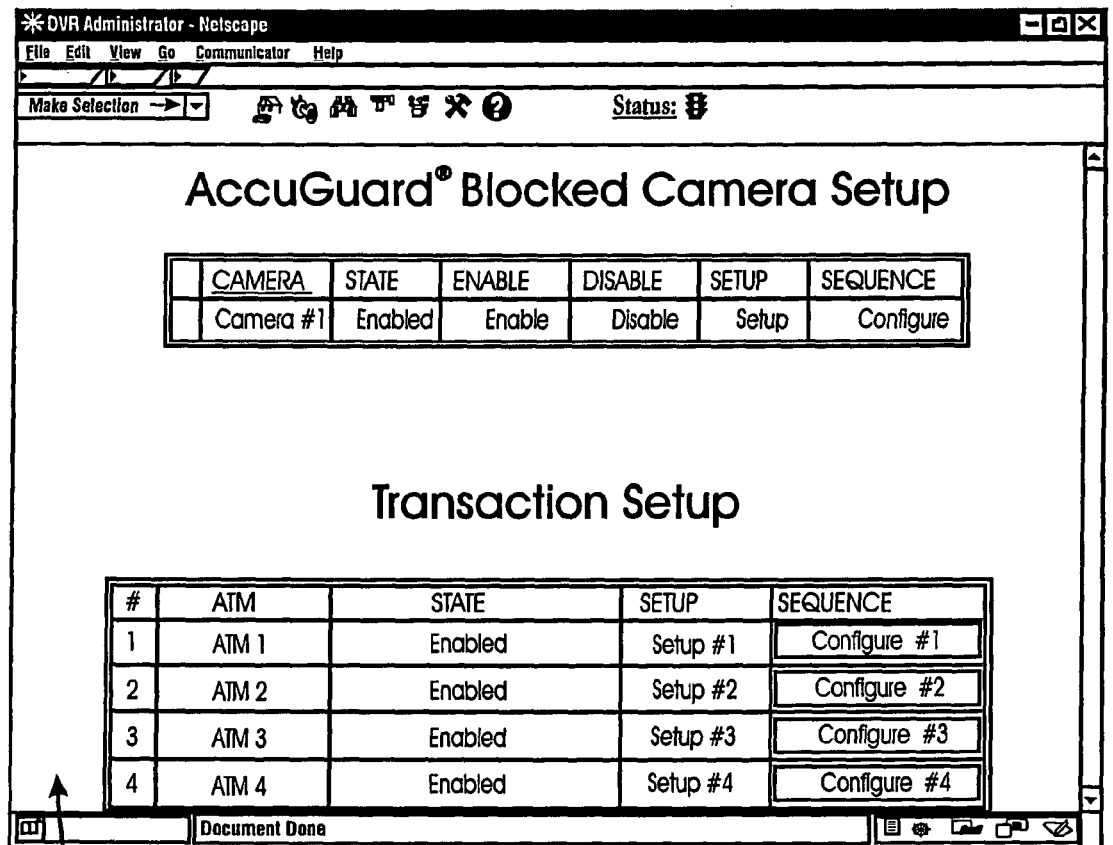
FIG. 54 is a screen similar to that in FIG. 53 showing how the screen after a camera is selected in response to presentation the screen shown in FIG. 53.

In response to the user selecting a camera in response to screen 450, the exemplary embodiment displays a screen 452 shown in FIG. 54. Through selections made in response to the presentation of screen 452 the user is enabled to set the blocked camera capability as either operative or inoperative. The user is also enabled to set up the criteria used for identifying a blocked camera as a triggering event and to configure the sequence that will be executed in response to the blocked camera event.

Figure 55:
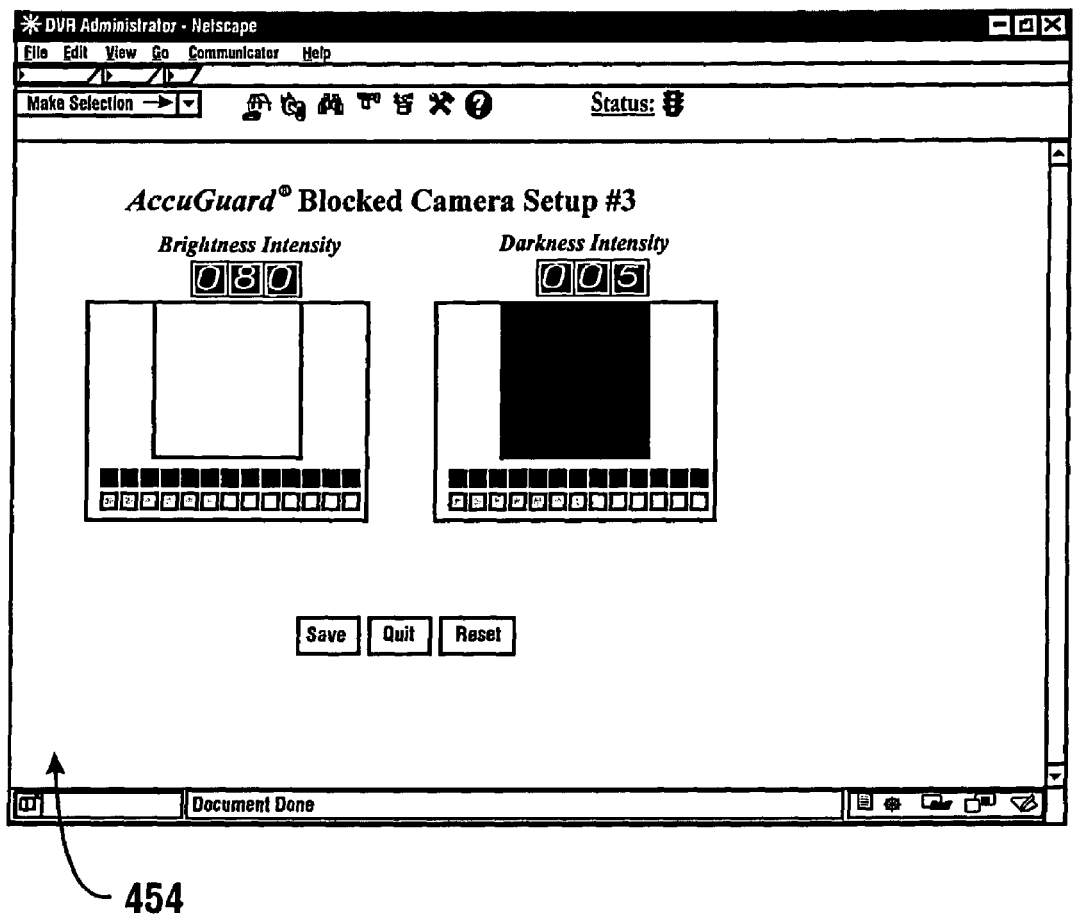
FIG. 55 is an exemplary screen presented at a user terminal for enabling a user to select a degree of change in an image for purposes of detecting motion in an image.

In response to a user selecting the set-up button from screen 452, the exemplary embodiment is operative to display a screen 454 shown in FIG. 55. In screen 454 the user is enabled to set a brightness intensity (which may represent a color level tending toward white) as well as a darkness intensity (which may represent a color tending toward black). In this exemplary embodiment if the pixels which make up the field of view of a selected camera average above the selected brightness intensity, or alternatively average below the selected darkness intensity, a triggering event indicative of lack of usable video is initiated. Alternative embodiments may look for every pixel being above or below certain thresholds. Alternatively in other embodiments the pixels which make up the field of view are analyzed by the computer on an ongoing basis for color level or contrast with pixels in other areas of the field of view. A failure of the image to have contrast above a set level for the overall field of view may in addition represent a triggering event indicative of lack of usable video. Of course, as previously discussed, other criteria may also be used for deciding that there is a lack of usable video.

Figure 56:
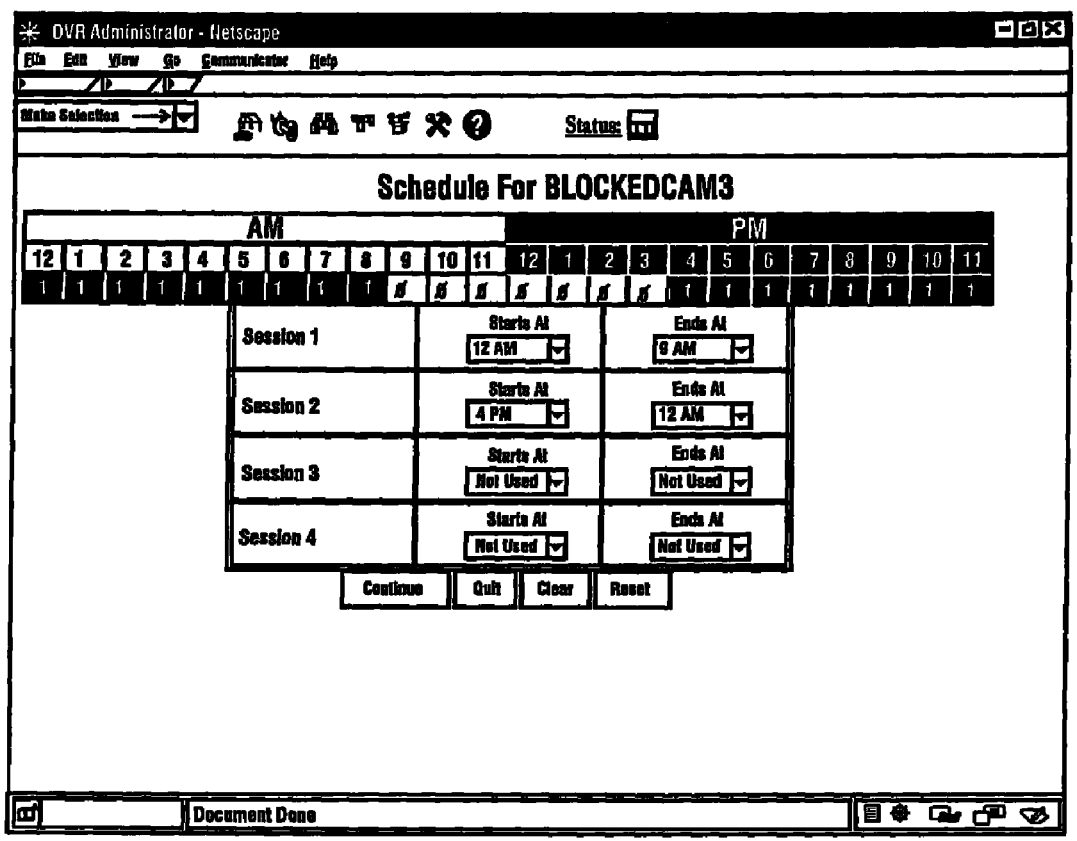
FIG. 56 is an exemplary screen presented at a user terminal indicative of when a particular motion detection sequence will be executed by the system.

Screen 456 shown in FIG. 56 is presented to a user in the exemplary embodiment to set a time period during which the sequence will be carried out if a camera is blocked. The user is enabled to set the inputs for those times of day during which a blocked camera event will be considered a triggering event for the sequence to be carried out.

Figure 57:
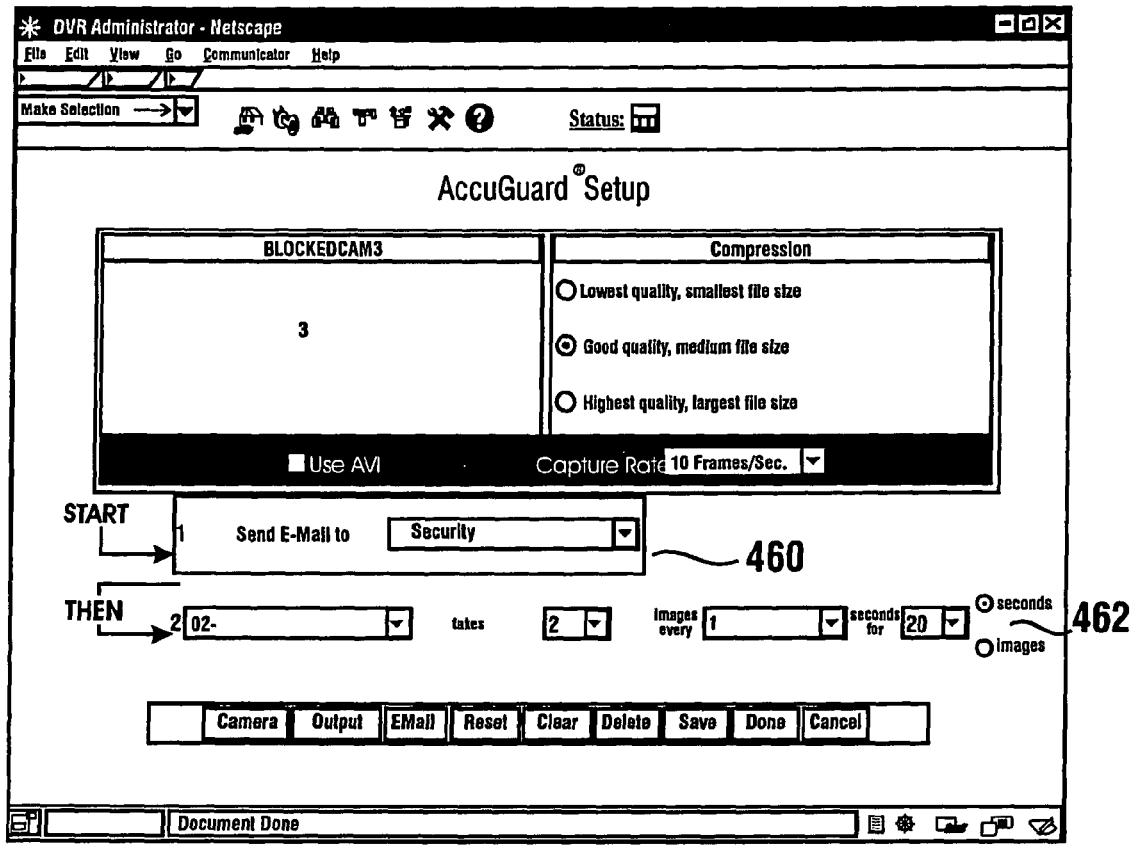
FIG. 57 is an exemplary screen presented at a user terminal for purposes of programming a sequence to be executed in response to a lack of usable video condition.
Figure 58:
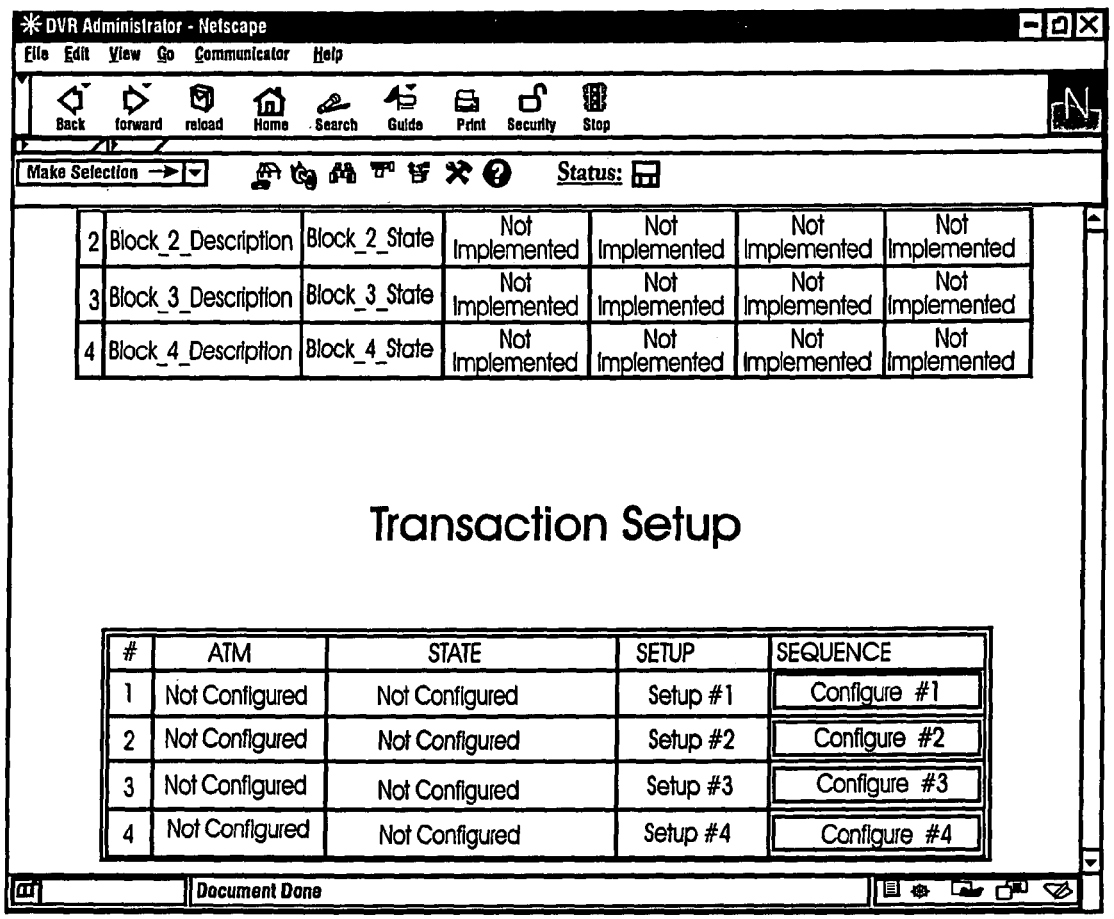
FIG. 58 is an exemplary screen presented at a user terminal for purposes of establishing a sequence for capturing images at an automated banking machine.

Screen 458 shown in FIG. 57 is displayed in the exemplary embodiment to a user to configure the sequence that is executed in response to a blocked camera event. As in the other sequence configuration screens of the exemplary embodiment, a user is enabled to set the quality of the image data that is captured in response to the triggering event. Further the selection of "buttons" in the lower portion of the screen 458 causes sequence frames to be displayed which the user is enabled to arrange and populate with data to configure the sequence. As shown in FIG. 58 the sequence frame 460 associated with sending e-mails is displayed. This sequence frame enables a user to input data identifying persons or groups of persons to which e-mails are to be sent. The ability to use the descriptive naming terminology defined by the user simplifies the programming of the sequences in the exemplary embodiment. Further as shown in screen 458 the user is enabled to employ other sequence frames such as sequence frame 462 which is associated with a camera. By populating the inputs for the camera sequence frame the user creates a sequence which is carried out in response to the indicated camera being blocked. The exemplary sequence includes sending an e-mail to the e-mail group that is designated "security." In addition to sending the e-mail, camera #2 is operated by the computer to capture and store two images every second for twenty seconds. Of course it should be understood that camera number two is a camera which preferably includes in its field of view the camera that is indicated as blocked. Of course as previously explained in other embodiments, the programming for lack of usable video may also include the retention in more permanent memory of temporary images which were taken by the blocked camera prior to the lack of usable video being detected. Such images may indicate the cause of the lack of usable video. Of course other approaches may be used in other embodiments.

In the exemplary embodiment device 330 is also configured to execute sequences in response to triggering events such as transaction steps which occur at an automated banking machine such as ATM 332 or cash register 344. In the exemplary embodiment sequences are configured to acquire images in response to the operation of transaction function devices. The images are stored in connection with transaction data regarding the transaction that is conducted at the machine. FIG. 58 shows an exemplary screen 464 which is displayed to an authorized user by device 330 in connection with configuring sequences responsive to the operation of an automated banking machine. Through inputs in response to screen 464 a user is enabled to set up and configure the sequences associated with operation of the machine.

Figure 59:
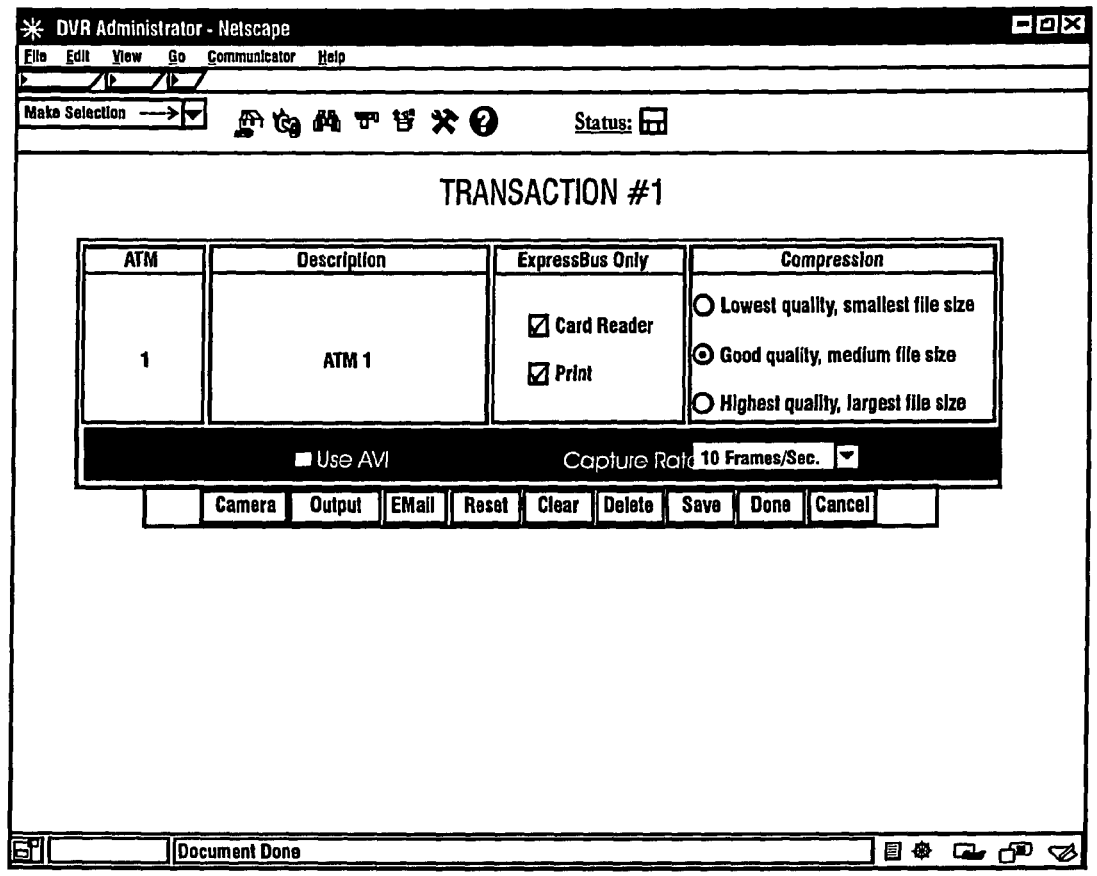
FIG. 59 is an exemplary screen for establishing a sequence for capturing images in connection with a particular type of transaction and enabling a user to selectively input times at which images will be captured as well as the rate of image capture.

In the exemplary embodiment inputs responsive to screen 464 enable the user to set up the acquisition of images from particular automated banking machines. This is done through inputs to the user terminal in response to a screen such as screen 414 shown in FIG. 39. Further from screen 464 a user is enabled to configure the parameters for the acquisition of images in connection with particular events carried out at the ATM. This is accomplished in the exemplary embodiments through inputs through a screen 466 shown in FIG. 59. Screen 466 enables a user to select triggering events for the capture of images. For example in the exemplary screen shown, the triggering events include the reading of a user's card and the printing of a receipt. The user is also enabled to configure the system to set the quality of the images stored based on the level of data compression used. Further as represented in screen 466, the user is also enabled to set sequences which include sequence frames for cameras, outputs and e-mails responsive to triggering events which occur in the course of a transaction. For example in exemplary embodiments the system may capture one or more images of a customer operating the banking machine so as to provide verification at a later date as to the identity of the particular person who has operated the machine to carry out the transaction. The number and character of images may be varied depending on transaction parameters including the transaction type, the time of day, the amount of money involved or other parameters associated with the user.

In the exemplary embodiment, transaction data is also stored in correlated relation with the captured image data. The image data is correlated with the transaction data by the particular time at which the transaction is conducted. Of course in other embodiments other approaches to correlating image and transaction data may be used. Alternatively, image and transaction data may be stored together in common files depending on the requirements of the system. Generally, in the case of a system monitoring an automated banking machine, the transaction data that is stored will often include parameters such as time, user name, account number, transaction type and amount. The storage of these parameters in connection with the images enable the selective sorting of images by transaction parameters. This enables an operator of the system to more readily recover types or ranges of transactions that may be of interest. In addition, it facilitates the selective retention or deletion of transactions in some embodiments by factors such as the transaction type and/or amount. Of course, in other embodiments other approaches may be used.

Figure 60:
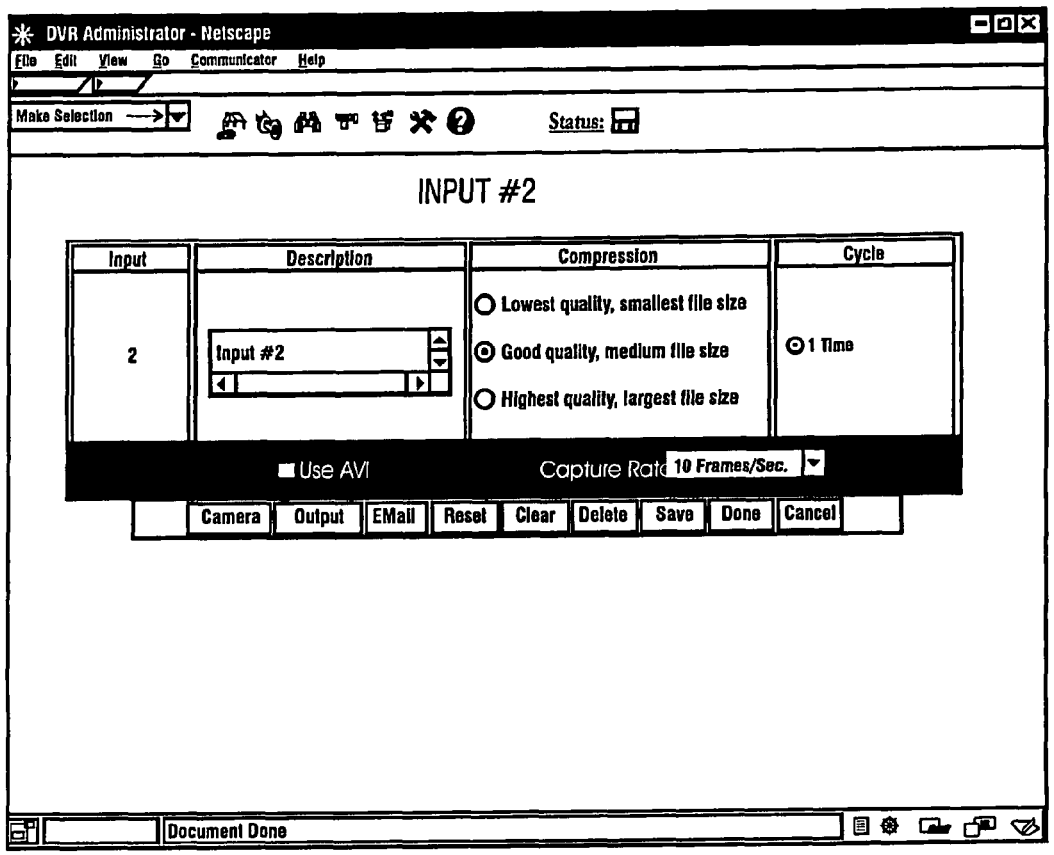
FIG. 60 is an exemplary embodiment of a screen presented at the user terminal for purposes of programming a sequence and demonstrating the capability of a user to establish the image capture rates as well as the image quality associated with storage of captured images.
Figure 62:
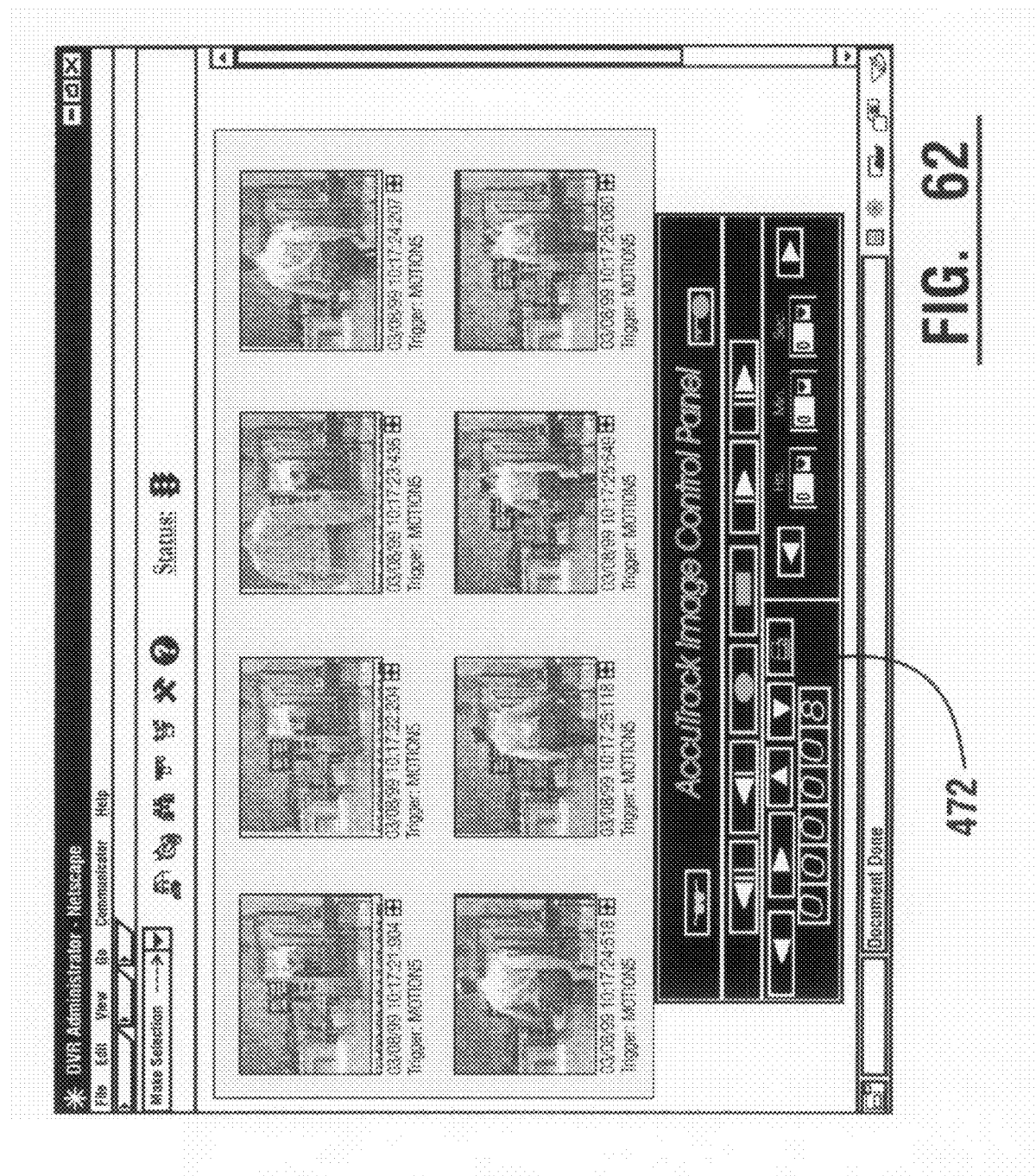
FIG. 62 is an exemplary screen presented at a user terminal showing icons presented as a control panel and images recovered in response to a search.
Figure 63:
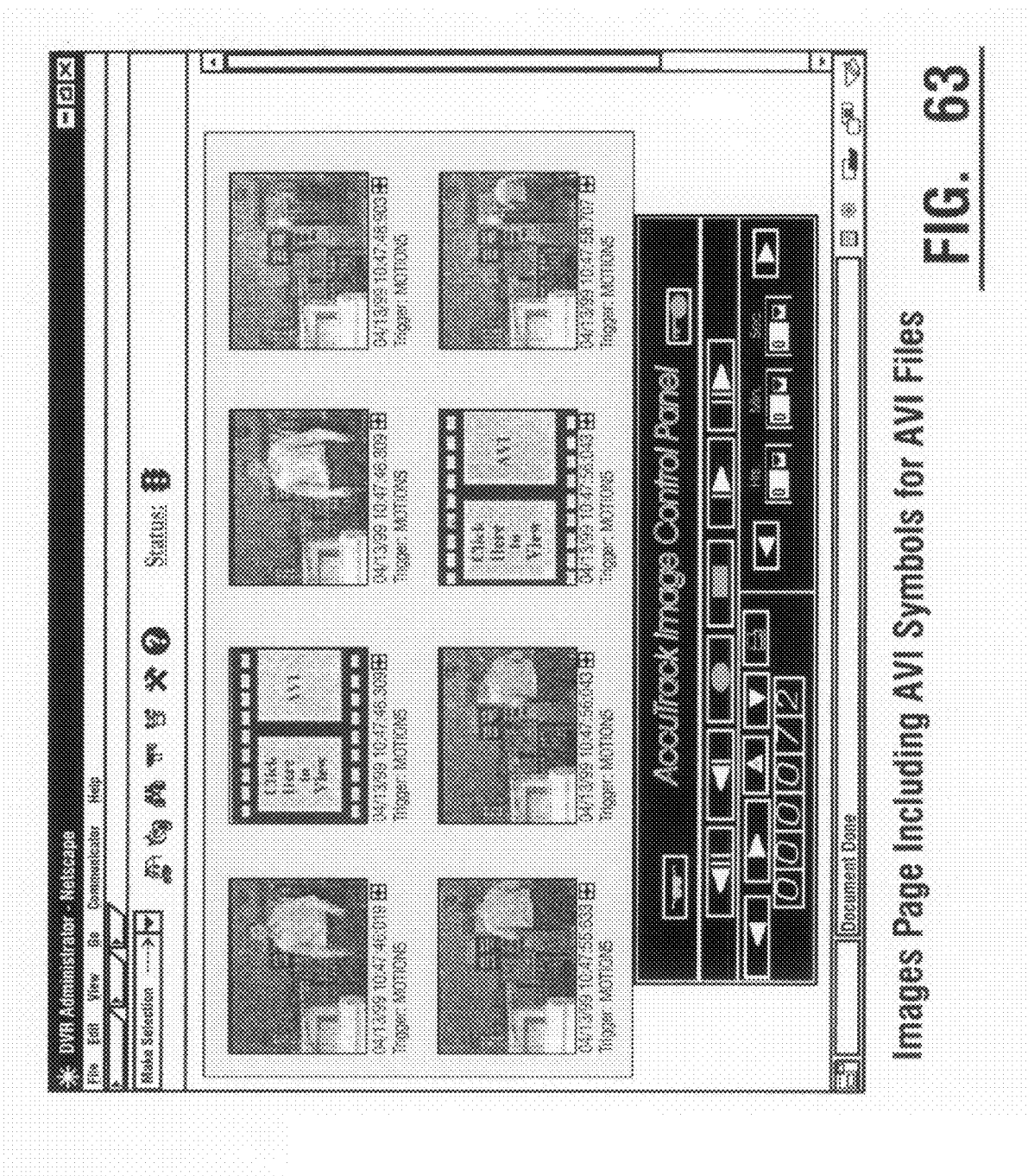
FIG. 63 is a view of the screen similar to FIG. 62 but including representations of images captured as continuous video in AVI form.
Figure 64:
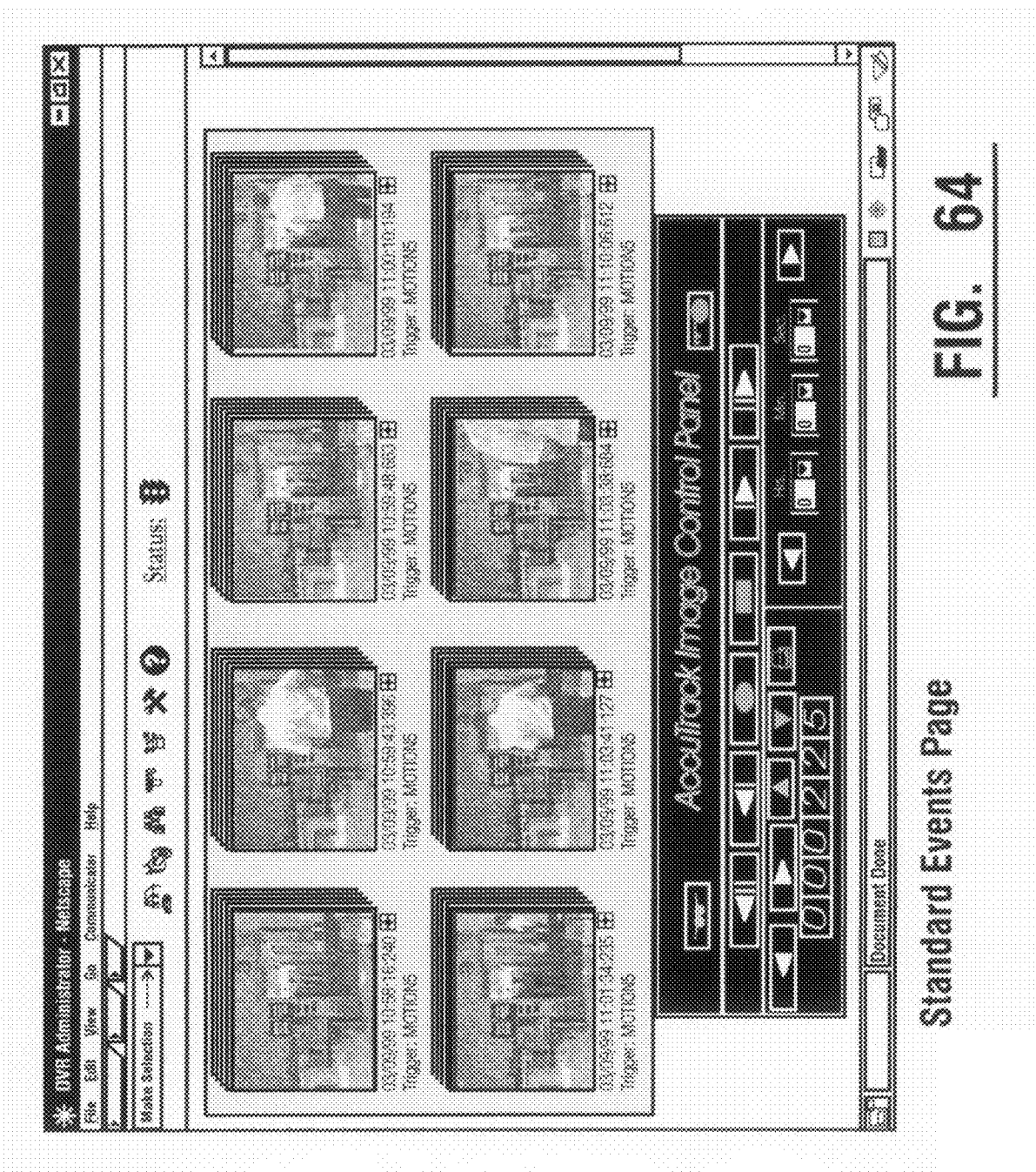
FIG. 64 is an exemplary embodiment of a screen presented at a user terminal in response to a search in which the search results show that a plurality of images have been captured in response to a triggering event.
Figure 65:
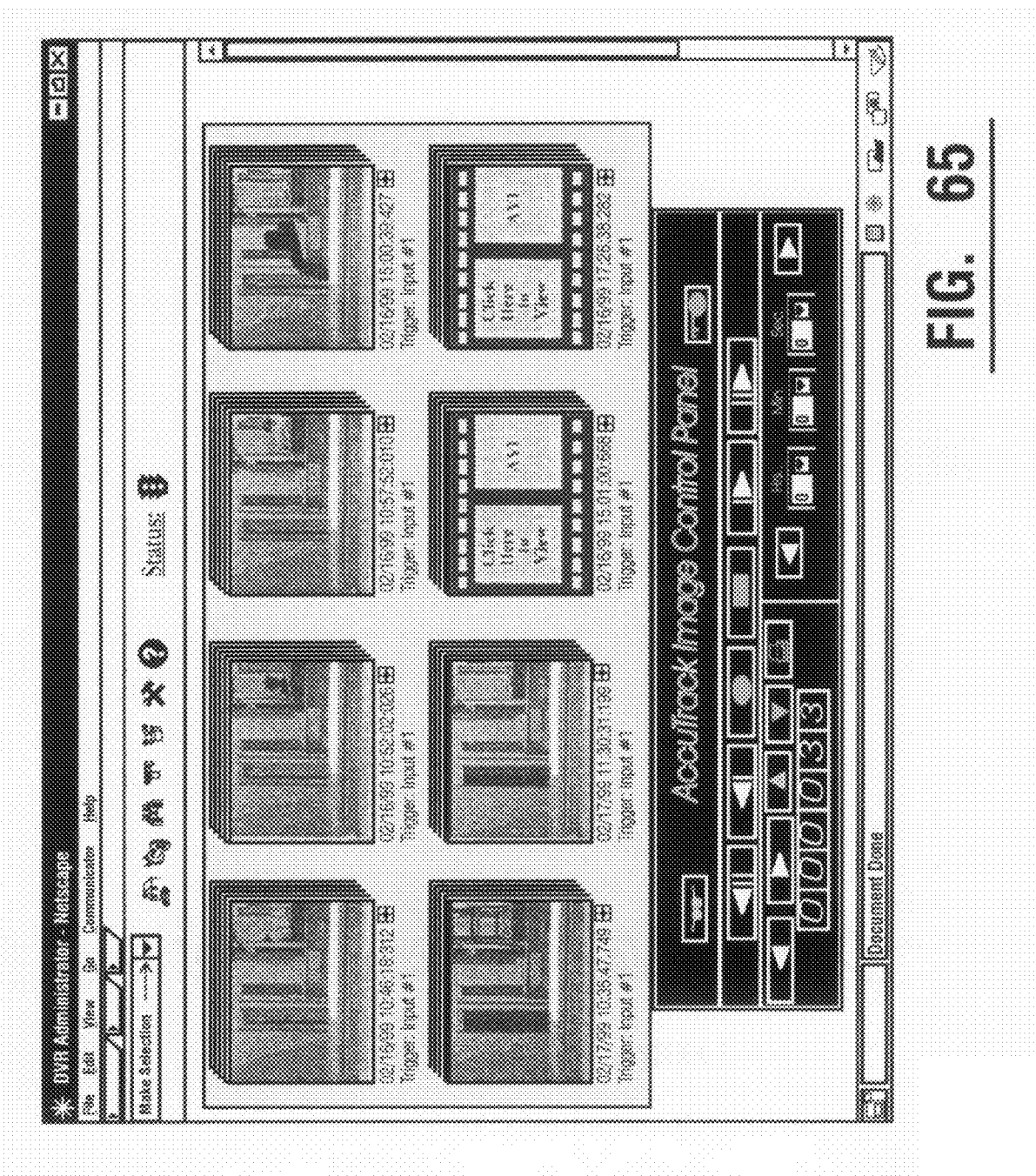
FIG. 65 is a view of a screen similar to FIG. 64 including representations that images have been captured as continuous video in response to certain triggering events.
Figure 66:
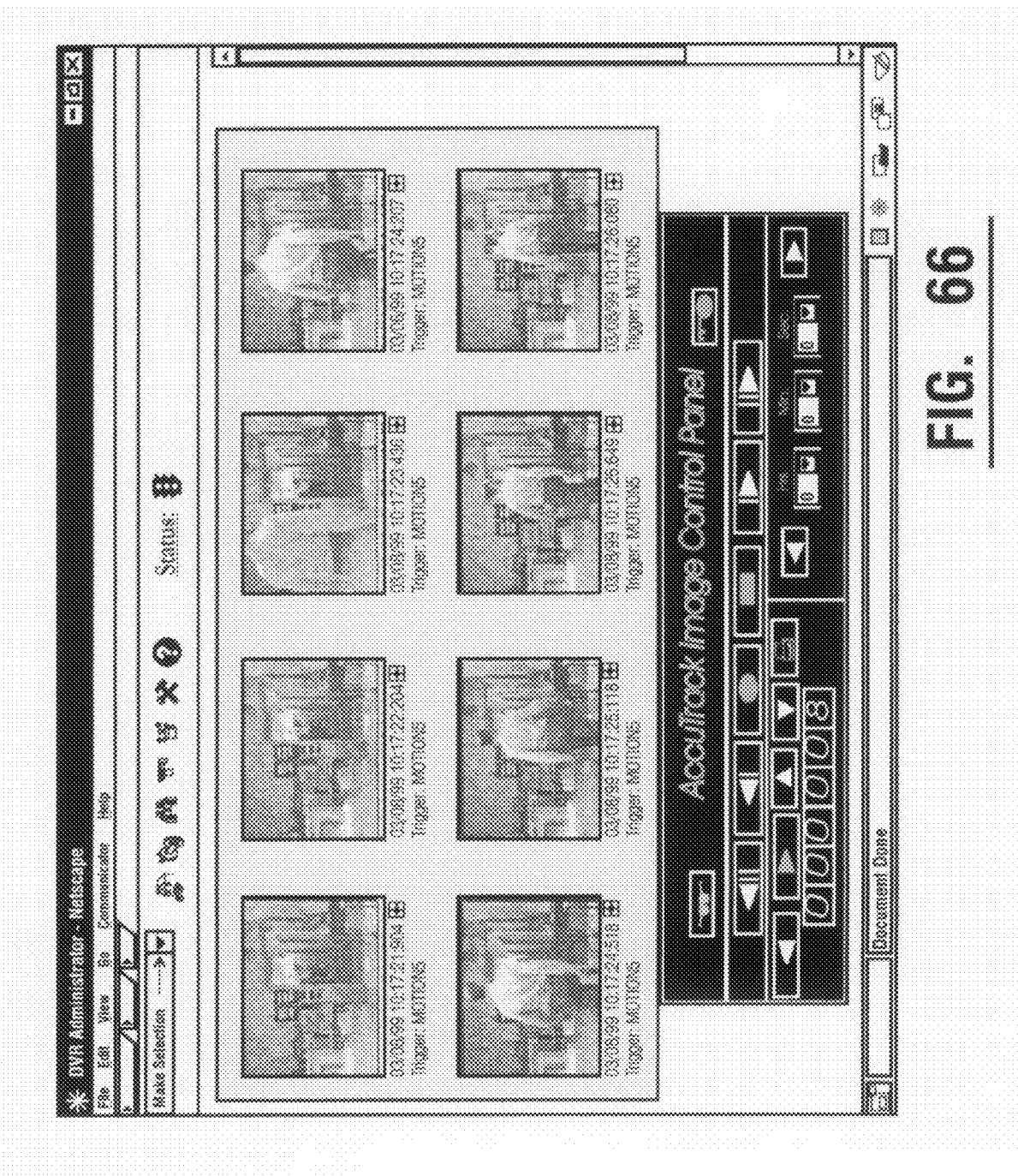
FIG. 66 is an exemplary embodiment of a screen presented at the user terminal showing a plurality of images captured in response to a single triggering event.
Figure 67:
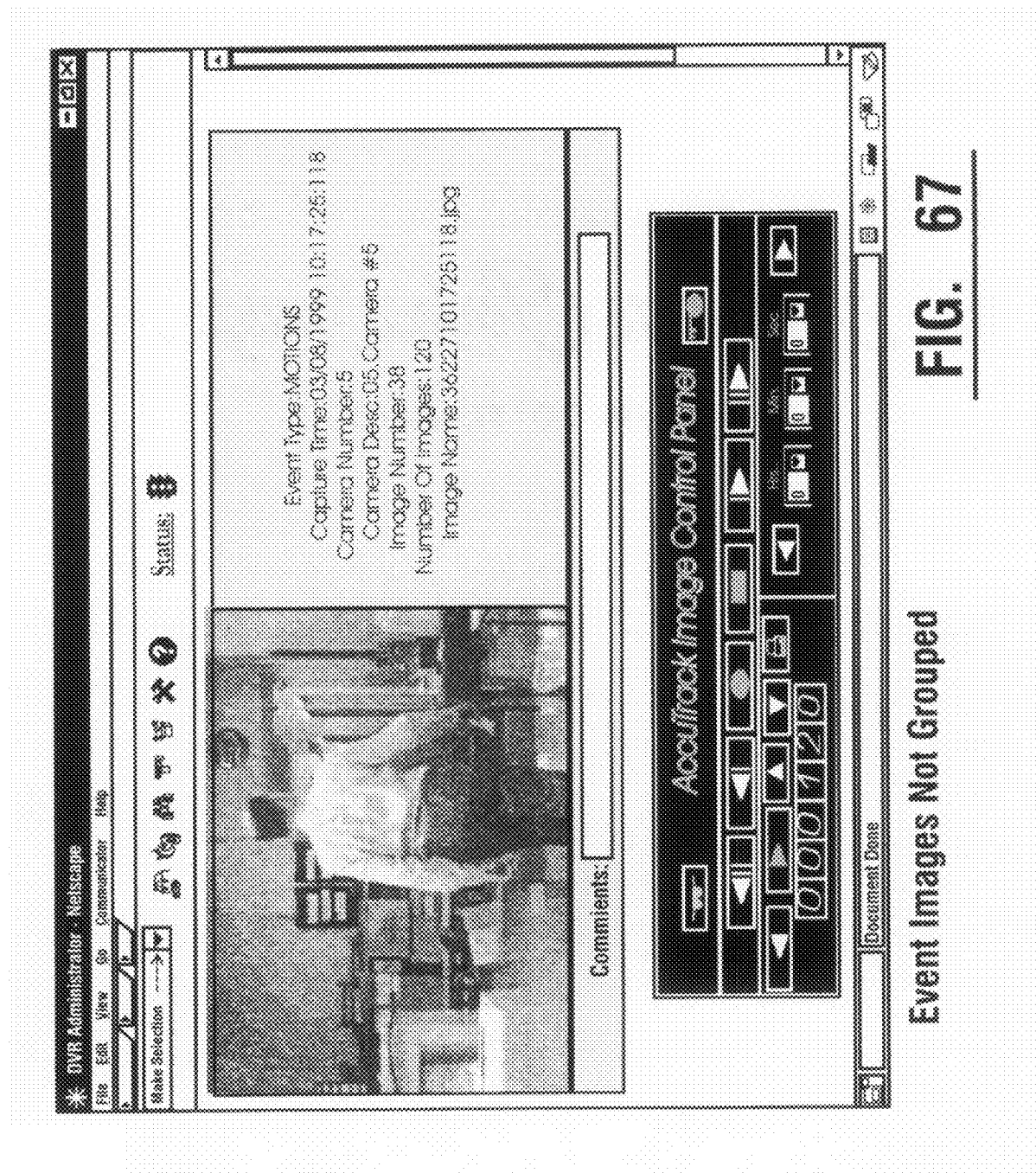
FIG. 67 is an exemplary embodiment of a screen presented at a user terminal showing an image output in which images are not grouped by particular event type.
Figure 68:
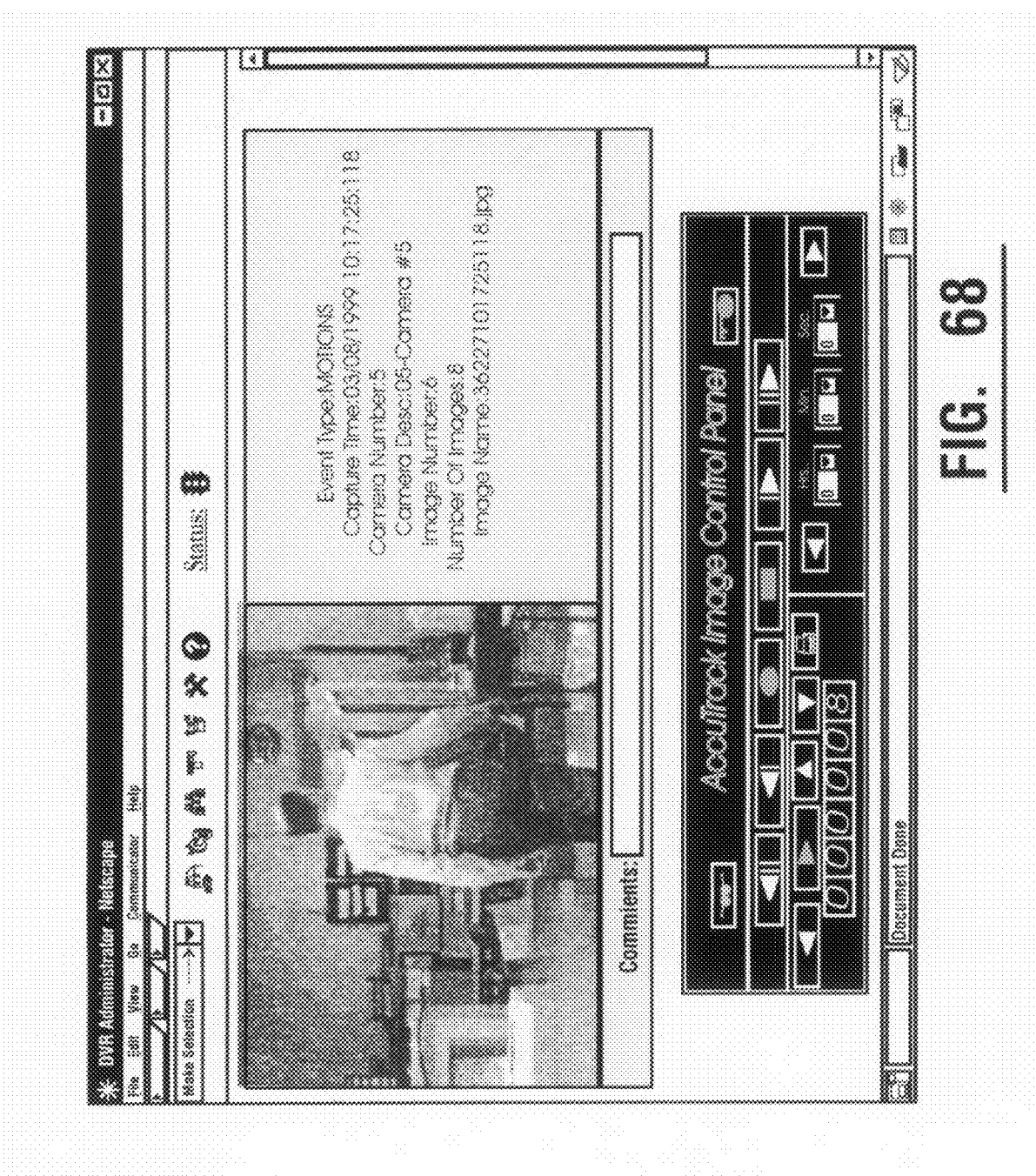
FIG. 68 is an exemplary screen similar to FIG. 67 in which the presented indicia indicates that the image has been grouped with a particular event.
Figure 69:
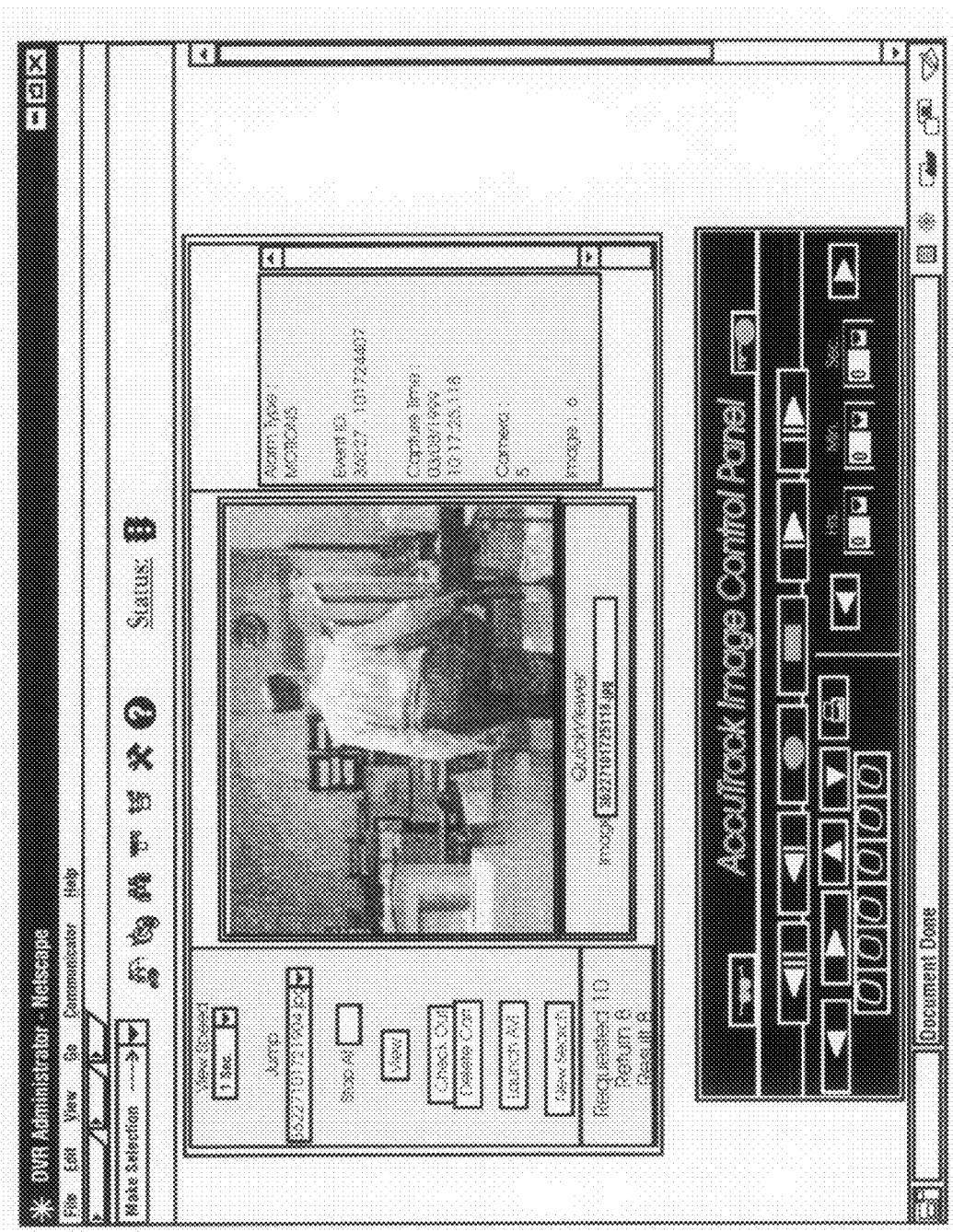
FIG. 69 is an exemplary embodiment of a screen presented at a user terminal in response to search results obtained in response to a quick viewer routine in which a user is enabled to navigate through images by selecting buttons on the control panel.
Figure 70:
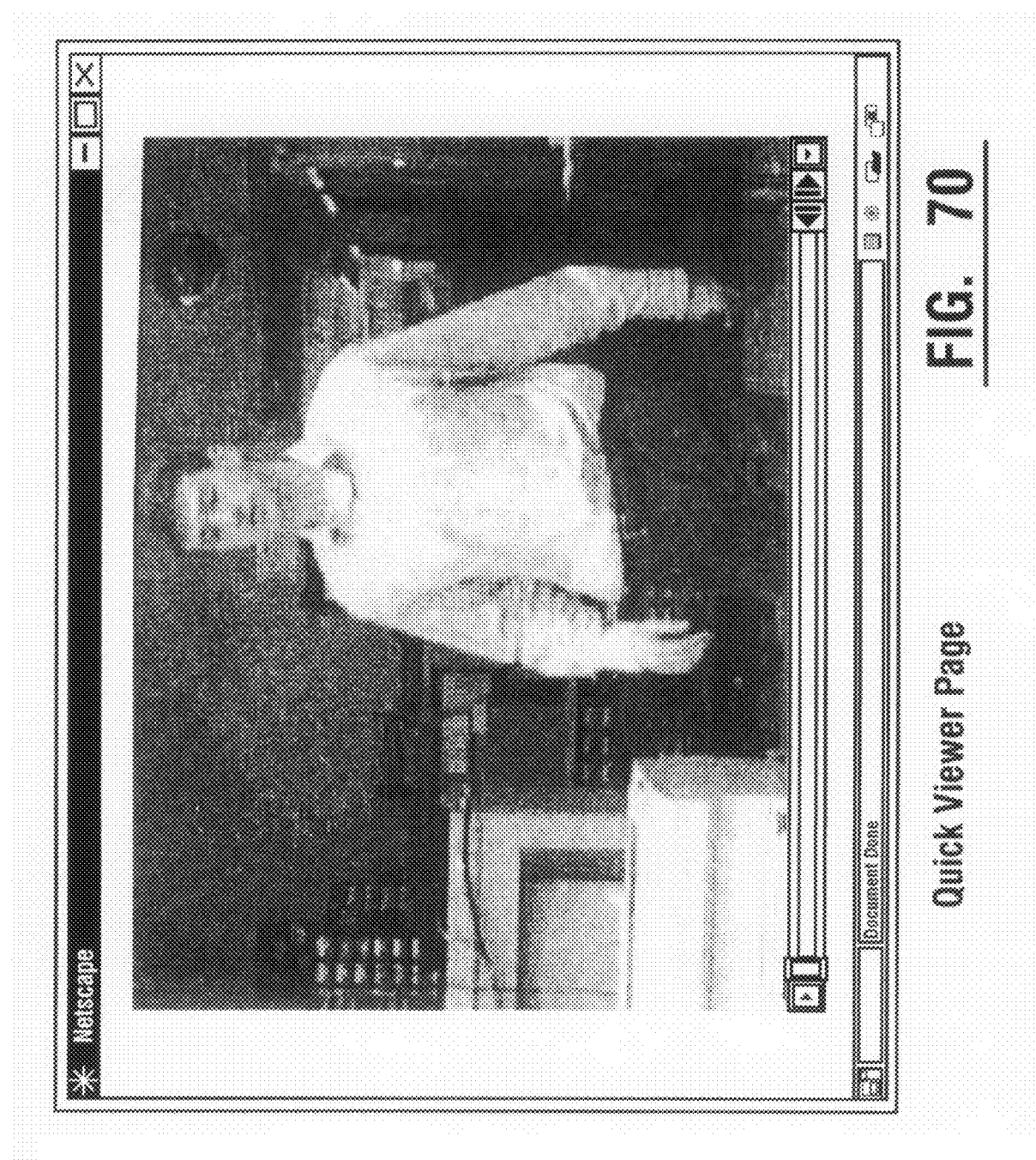
FIG. 70 is an exemplary embodiment of a screen presented at the user terminal of a quick viewer page showing a single image with the selected image in enlarged format.
Figure 71:
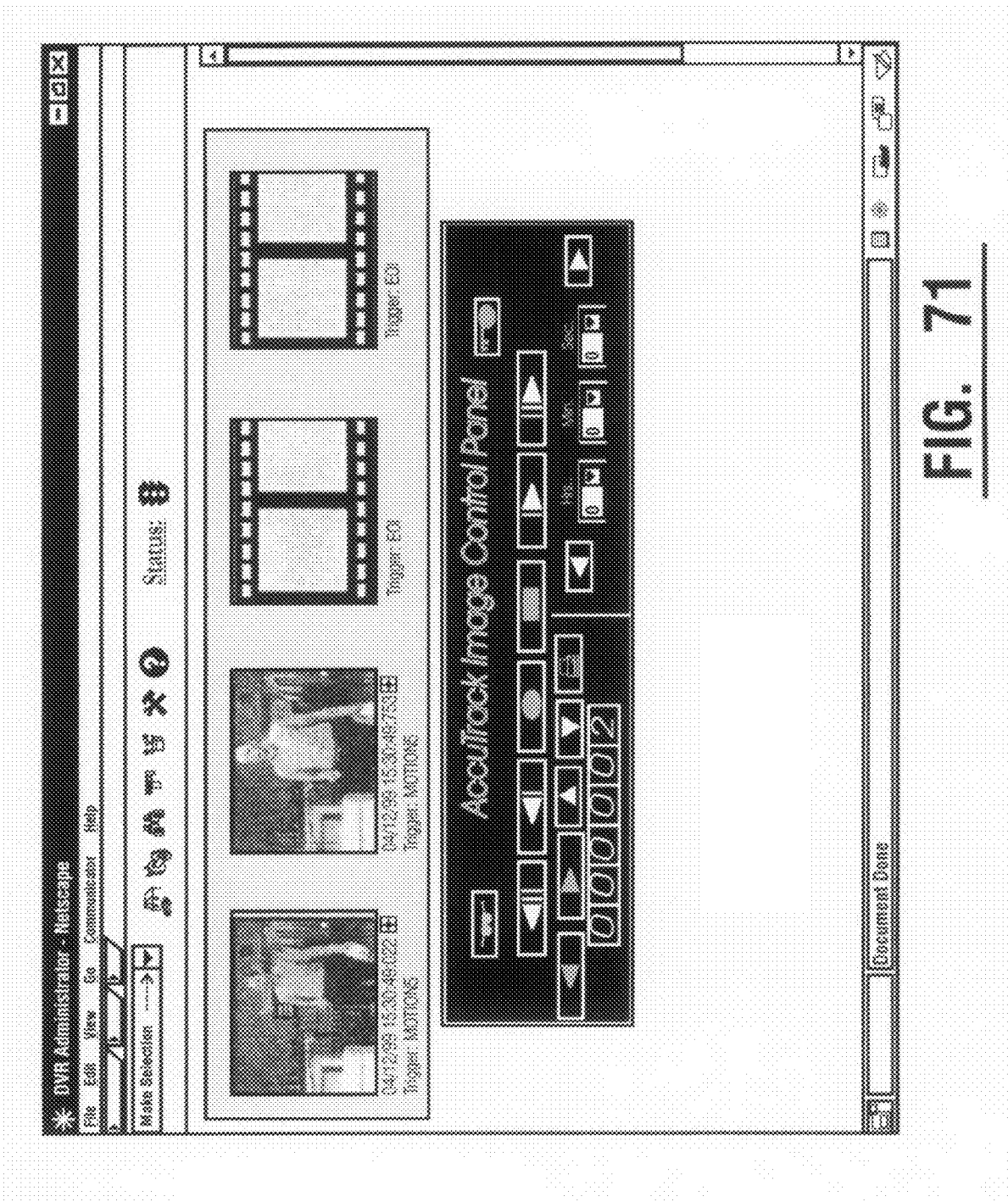
FIG. 71 is an exemplary embodiment of a screen presented on a user terminal in which a user is enabled to view images.
Figure 72:
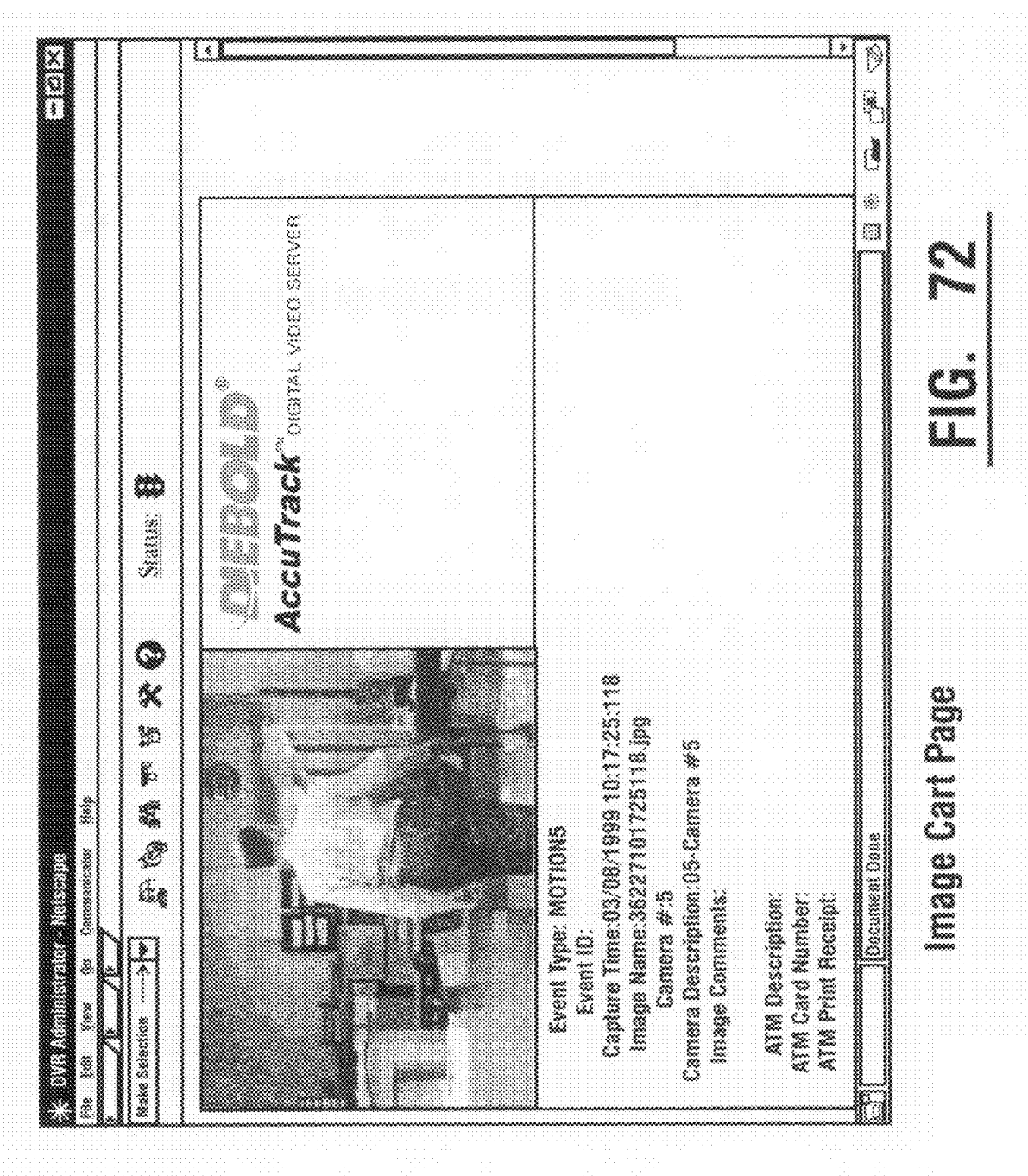
FIG. 72 is an exemplary embodiment of a screen presented at a user terminal which displays images selected for purposes of preview for printing or transfer in an "image cart" which enables such images to be downloaded.
Figure 76:
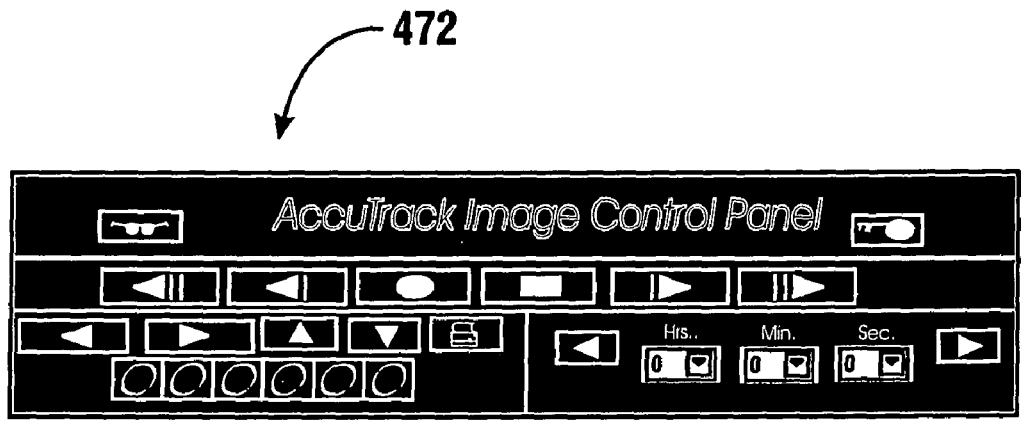
FIG. 76 is an exemplary embodiment of the control panel displayed on screens of a user terminal in connection with the presentation of search results.

It should be understood that although in the exemplary embodiment image capture from an automated banking machine is conducted responsive to signals sent to transaction function devices on the system bus of the ATM, in other embodiments other triggering events may be used. For example, in some embodiments the presence of a user adjacent to a transaction terminal may be sensed with a proximity sensor such as an ultrasonic detector or a weight sensing pad. Alternatively, automated banking machines may provide hard sensor inputs such as are obtained when a user receives cash from a cash receipt dispenser, or another device on the machine is moved. Such inputs may be configured as inputs to device 330 much in the manner of sensors 346. Such inputs may be used for purposes of configuring sequences in response to such inputs. For example a screen 468 shown in FIG. 60 represents an example where an input from a sensor is used as the basis for configuring a sequence. Such an input may correspond to the operation of the device on an automated banking machine or other transaction terminal. Through inputs responsive to screen 468 a user is enabled to configure a sequence including capturing images from cameras, providing outputs or sending e-mails in response to such inputs. Of course, numerous other alternatives for accomplishing similar functions may be used.

As previously discussed, a useful aspect of some embodiments is the ability to conduct searches for images that have been stored. Searches may be made based on one or more parameters. Image searching is accomplished responsive to selecting the icon 378 in the tool bar 370 displayed on numerous screens in the exemplary embodiment. A screen 470 shown in FIG. 61 is used for obtaining user inputs concerning exemplary parameters that are employed in the searching of images. As can be seen in screen 470 a user is enabled to select time periods during which images are to be searched. The user is also enabled to select cameras which captured the image data which will be searched. The user is enabled to select all cameras or particular cameras which are to be searched. Alternatively, a user is enabled to select a "quick viewer option" which enables a user to scan through images in a manner that is later described.

Screen 470 also enables a user to select parameters for identifying images. These include for example selecting among images captured in response to particular alarm types as well as images captured in response to particular transaction types. In this way a user is enabled to selectively search the images for a number of different parameters. Other embodiments may be operative to search for data or other features in imaged documents. The ability to search by various parameters greatly reduces the effort required to identify images that may fit a user's search criteria.

As explained in connection with other embodiments, image data may in addition be searched by visual characteristics. These may include for example searches for physical characteristics of persons shown in the images. Similarly searches may be made for certain types of apparel, certain colors or certain devices or items. The capability of some embodiments of the present invention may enable identifying particular persons or situations for which available data is otherwise incomplete. This may include for example identifying witnesses or other persons present when particular circumstances have arisen. Of course numerous different types of criteria and parameters may be used in searching for selected images.

A further aspect of the exemplary embodiment represented in screen 470 is the ability to also group images by the particular type of event which has caused the images to be captured. This provides the capabilities of allowing a person reviewing images to catalogue and review images by the triggering event which caused them to be captured together. This may provide a user with additional insights as to particular events. It may also enable a user to search an event type of most interest first before moving onto other images which meet search criteria.

In response to the conduct of searches, various image pages are displayed by the device 330. Examples of image pages are shown in FIGS. 62 through 72. Each of these image pages shows one or more images that have been captured and stored, and which are displayed in response to search requests. The nature of each of the image pages and how they are used in the exemplary embodiment are explained in detail in the charts shown in FIGS. 73 and 74. Of course it should be understood that in other embodiments other image pages may be used.

It should be noted that in the exemplary embodiment, a control panel schematically indicated 472 is displayed in connection with image pages. A control panel 472 enables a user to perform various functions to review images, as well as to download images from device 330 to other terminals in the system with a greater degree of assurance that the images have not been tampered with. It should also be noted that in image pages of the exemplary embodiment a graphical representation of a piece of movie film is included to represent to a user that a series of images were acquired at high frequency in response to an event so as to acquire a film clip that approximates full motion video.

A further aspect of some embodiments that is useful is the ability of the system to indicate that a plurality of images have been captured in response to certain triggering events. This is indicated by the image sets as represented for example in FIGS. 64 and 65. Further as represented for example in FIGS. 67 through 70, particular images may be selected for enlargement for review by a user with information concerning the nature of the triggering event which resulted in the capture of the image. A listing of the data which is included with triggering events and which can be recovered by an authorized user of the system is listed in the chart in FIG. 75. A further useful feature of the exemplary embodiment is the capability of a user to provide comments concerning particular images. Such comments may be input from the user terminal via typed input in text form. In alternative embodiments, a user may input comments by voice to text conversion input as well as to have comments stored as a voice file. Such comments may be useful later in recovering images when searching by particular comment criteria. The computer may itself be programmed to add comments to particular fields in connection with images depending on the programming of the system.

Figure 77:
FIG. 77 is an exemplary embodiment of an image counter presented in connection with the control panel shown in FIG. 76.

The control panel 472 used in the exemplary embodiment is shown in greater detail in FIGS. 76 through 80. The control panel 472 includes a plurality of icons and indicators as well as an image counter which is shown in FIG. 77. The function executed in response to selection of each of the icons in the control panel when particular image pages are being displayed is shown in detail in FIGS. 78 through 80. As will be understood from the detailed description, the control panel 472 enables a user to navigate through images in a rapid and selective manner. The user is also enabled to navigate through a series of images sequentially in varied increments and directions within the series of selected or displayed images. Further as represented in FIG. 80, the user is enabled to provide inputs to the control panel so as to identify images captured within certain time parameters. It should be understood that in some embodiments the series of images may be considered to be one dimensional. However in other embodiments the images may be arranged in a matrix or other multilayer or multidimension format based on varied parameters. By making selections and inputs users may navigate in varied directions in the series of images.

Figure 81:
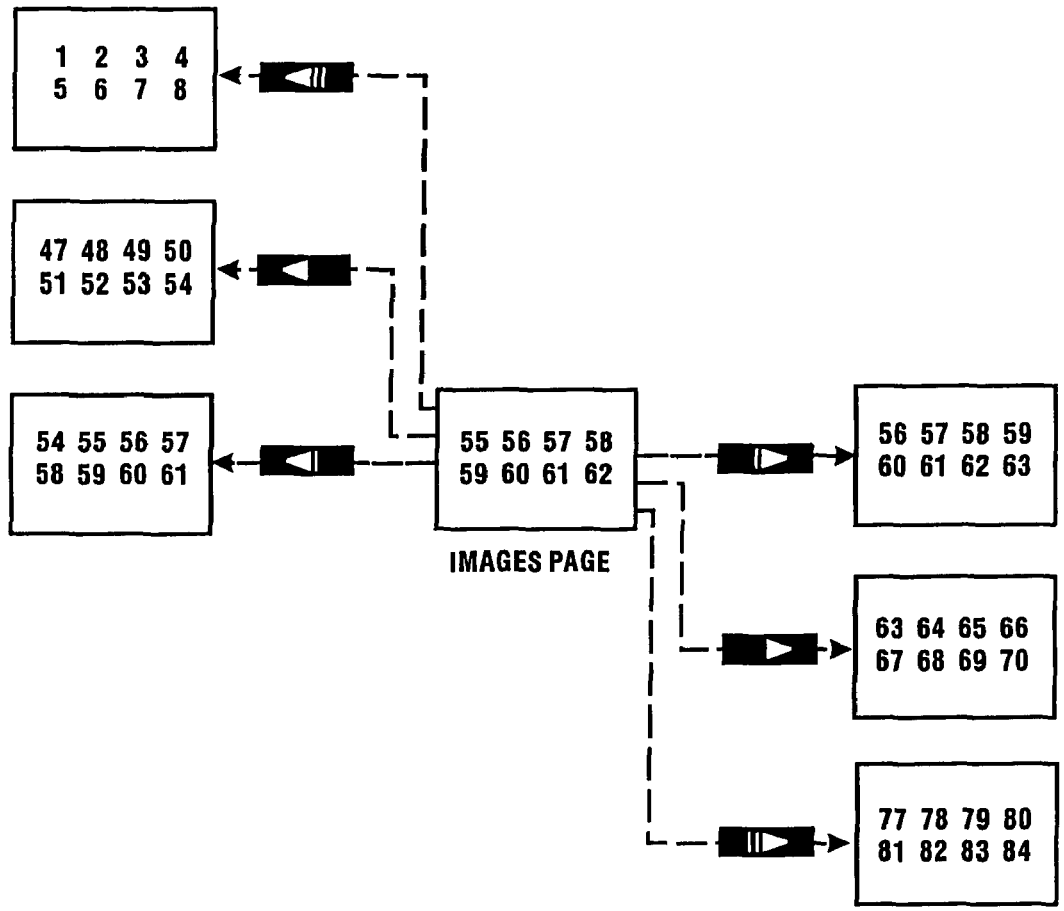

FIGS. 81 through 83 show numerical examples of the capability of the control panel 472 in enabling a user to navigate through a series of images which are displayed to a user. As represented graphically in each of these figures the selection by the user enables the user to find an image of interest to enlarge it, mark it and to print those images which are of interest.

A further useful aspect of some exemplary embodiments is the ability of a user to identify selected images for downloading from device 330 to another terminal which is connected thereto. Such downloading may be accomplished in a manner which provides greater assurance that the downloaded images are not altered. This is accomplished in the exemplary embodiment using a feature which is referred to as an image cart. In reviewing images, a user is enabled to click on a rectangular icon adjacent to images so as to change the color thereof. As represented in FIG. 84 these rectangular icons change color responsive to selection so as to place the images in the image cart. The positioning of these icons relative to images can be seen for example in displayed images represented in FIGS. 62 through 64. When scrolling through the images using the control panel 472 the user is selectively enabled to click on those images that they find of interest for purposes of downloading by changing the color of the image cart symbol 474 adjacent to the image of interest. As explained in FIG. 78 a viewer icon 476 may be selected at any time on the control panel to enable a user to quickly view those images that they have included in the image cart.

A further useful aspect of some exemplary embodiments is the ability to transfer the images in the image cart from the device 330 in a manner that provides greater assurance that the images have not been subject to tampering. In the exemplary embodiment a user is enabled to download images using the image cart feature to a terminal. However device 330 is programmed so as to include in connection with such images a warning to indicate to the viewer thereof that the image was not secure and may be subject to tampering. Given the ability of current computer equipment to do image modification and manipulation, this feature assures that images which are downloaded without security give any user thereof fair notice that the image may not be as originally captured. This notice is preferably sent with the downloaded image when the data corresponding thereto is transferred to the user terminal and the image is output on a display thereof.

Figure 85:
FIG. 85 is an exemplary embodiment of a screen presented at a user terminal for purposes of providing the user with greater image integrity assurance for downloaded images and a unique key or password for purposes of enabling the unlocking of such images.

The image cart feature however enables the application of a digital signature with images downloaded in the image cart along with the associated data. This security feature is attained by selecting a key icon 477 in the control panel as shown in FIG. 78. In response to selection of the key icon 477 a user downloading images is presented with a screen of the type shown in FIG. 85. The screen advises the user that the images are being downloaded as a secure file to assure integrity. In addition the user is provided with a password which must be input to unlock the package of image and transaction data which has been secured with the digital signature. In the exemplary embodiment, the images are also downloaded with an encryption scheme which is integrated with the digital signature technique to assure that only the authorized user may access such images. Of course it should be understood that this technique is exemplary and in other embodiments other approaches to encrypting the data as well as techniques for reducing the risk that images have not been subject to tampering may be used.

Figure 86:
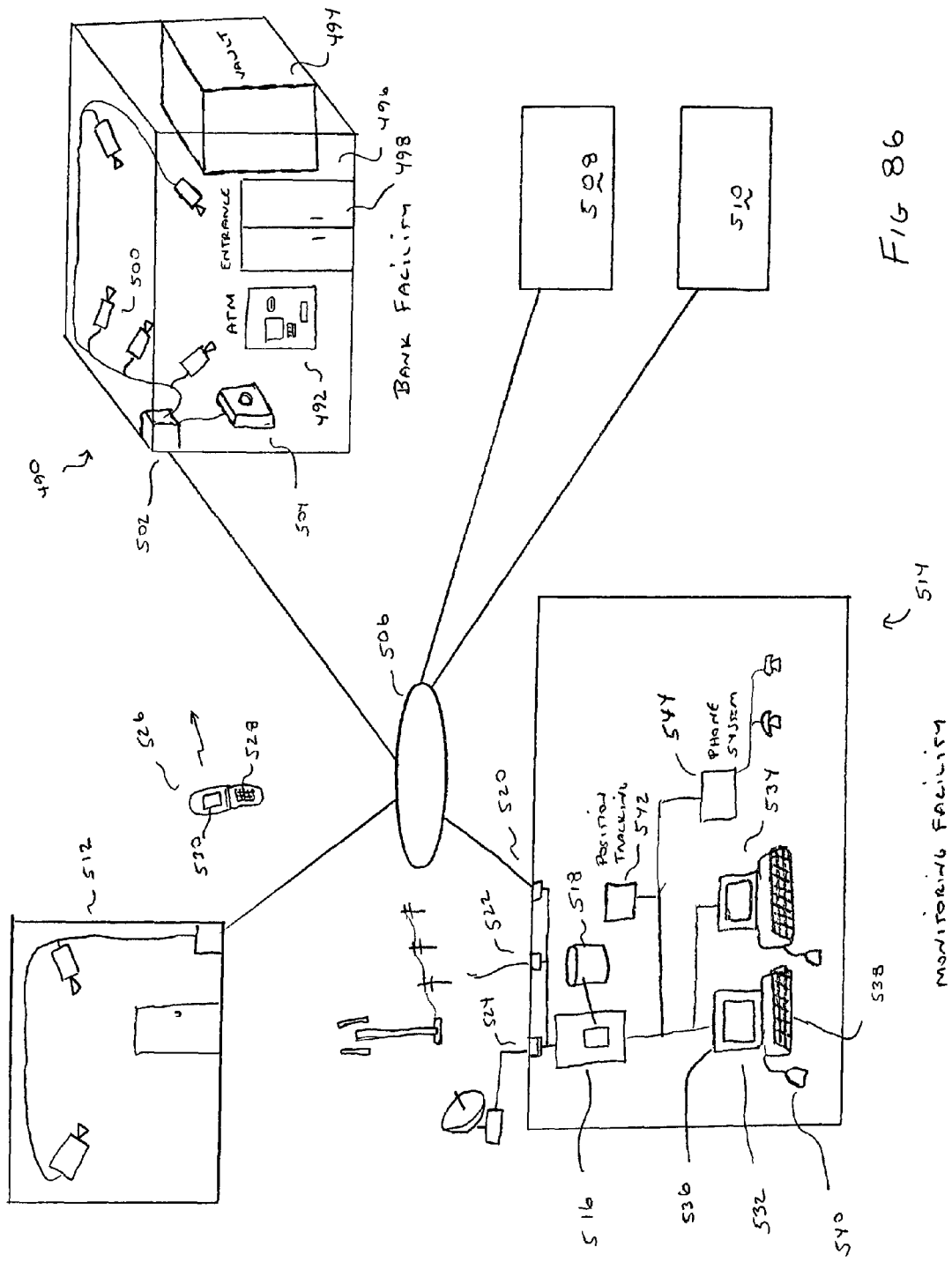
FIG. 86 is a schematic view showing a system used for monitoring facilities and authorized users.

Still other exemplary embodiments may be used in connection with monitoring facilities and users. FIG. 86 shows exemplary components that may be included in such a system.

A facility 490 such as a bank facility includes an ATM 492 which may be of a type previously discussed. The facility 490 also includes a vault or other valuables holding area 494. The facility includes an interior area 496 which is accessed through an entrance 498.

The facility 490 includes a plurality of cameras 500. In the exemplary embodiment the cameras have fields of view that include areas adjacent to the ATM, the vault, as well as other portions of the interior area of the facility. Other cameras of the exemplary embodiment include fields of view that includes an entrance area adjacent the entrance. In the exemplary embodiment cameras 500 have fields of view that includes areas both external and internal of a facility. Of course in other embodiments other approaches may be used.

The cameras 500 are in operative connection with at least one computer 502 which is alternatively referred to herein as a processor. At least one input device schematically indicated 504 is in operative connection with the computer 502. The computer 502 includes a suitable interface or other communications device that enables the computer to operatively communicate through at least one network schematically indicated 506. As represented schematically in FIG. 86 the at least one network 506 may be in operative communication with a plurality of other facilities 508, 510 and 512. Of course these facilities are exemplary and a large number of facilities may be in connection with the network. These other facilities may include other bank facilities in some embodiments. In other embodiments the other facilities may include retail establishments, distribution facilities, manufacturing facilities, residential facilities or other types of facilities that may be used in connection with various embodiments. It should also be understood that although a single network 506 is schematically represented, the facilities may be in communication in systems of various embodiments through a plurality of different networks.

The exemplary embodiment shown in FIG. 86 also includes at least one monitoring facility schematically indicated 514. The monitoring facility of the exemplary embodiment is used to monitor the conditions of facilities and to observe the activities of certain authorized users in ways that are later discussed in detail. The monitoring facility includes at least one computer schematically indicated 516. The computer 516 is in operative connection with at least one data store schematically indicated 518. It should be understood that in some exemplary embodiments the monitoring facility may include a plurality of computers and data stores.

The at least one computer 516 is in operative communication with the at least one network 506 through at least one suitable interface schematically indicated 520. In the exemplary embodiment interface 520 may be a suitable interface for connection to one or more high speed public or private wide area networks that are in operative communication with one or more of the facilities. Of course this approach is exemplary and in other embodiments other approaches may be used.

Computer 516 is also in operative connection with a telephone interface schematically indicated 522. The telephone interface is in operative connection with at least one phone service network. As schematically indicated the phone service network may include connections to land lines, cell phone communications or other phone or data networks. The exemplary embodiment also includes an interface 524. In the exemplary embodiment interface 524 includes an interface to a system which provides signals which can be used for determining a location of a position indicating device. This may be for example a GPS indicating device, such as a portable phone schematically indicated 526. However, although a portable phone with GPS tracking capabilities is discussed, other embodiments may use other types of devices as position indicating devices. Likewise other embodiments may use different types of position indicating features such as for example, location indicating capabilities based on signals received at cell towers or other suitable methodologies for determining position. Likewise in other embodiments other types of location indicating devices may be used including devices such as personal digital assistants (PDAs), laptop computers, notebook computers or other devices which include input and communication capabilities.

In the exemplary embodiment the portable phone 526 includes at least one input device including a keypad 528. The portable phone also includes other input devices such as a voice receiver. The portable phone also includes output devices including a screen 530. The portable phone also includes other output devices including a speaker. The exemplary embodiment of the portable phone 526 may also include a camera which may also serve as an input device in some embodiments. It should be understood that these devices are exemplary, and in other embodiments, other approaches may be used.

The exemplary embodiment of the monitoring facility includes a plurality of devices in operative connection with the at least one computer 516. Exemplary devices include user terminals 532 and 534. These user terminals may be of the type previously described or they alternatively have different or additional features. With reference to user terminal 532 for example, the terminal includes at least one display device 536. The display 536 is operative to output visual displays to a user. This may include graphical outputs of the types previously described as well as pictorial outputs that include images which are captured based on the fields of view of cameras at remote facilities in a manner later discussed. User terminal 532 also includes a plurality of input devices such as a keyboard 538 and a mouse 540. Of course in other embodiments additional or different input and output devices may be provided in operative connection with each user terminal.

The at least one computer 516 is also in operative connection with other devices at the monitoring facility. These include in the exemplary embodiment, a device 542 which is operative to determine a current location of a position indicating device such as a portable phone 526. The at least one computer is also in operative connection with a telephone system schematically indicated 544. In the exemplary system telephone system 544 is usable to provide voice communications for operators at the monitoring facility through the telephone interface. This may be done for example using various types of suitable telephone connections. Alternatively voice over Internet protocol (VOIP) or other types of network connections may be used for voice communications. In addition the exemplary embodiment of the telephone system is operative to provide data communications. This may include, for example, e-mail, text messaging or other suitable communications for communicating with remote computers and other devices. It should be understood that the exemplary configuration of the monitoring facility as described is merely exemplary of some components that may be included at such a facility, and in other embodiments other, different or additional components may be used.

In the exemplary embodiment the at least one data store 518 includes data pertinent to the operation of the system. Such data may include data of the types previously described including for example, sequences of actions to be performed when particular events or conditions occur. The data store may also include information concerning authorized users of the system and inputs that each user may use to gain access to features of the system. In addition in some embodiments the at least one data store may include information corresponding to the facilities which are in operative connection with the monitoring facility through the at least one network. The data regarding the facilities may include information related to the particular facility, the location thereof, items stored therein, contact data for persons or entities to be notified about conditions which may occur in the facility, and other information. In the exemplary embodiment the at least one data store is also operative to include data which associates the data corresponding to particular users with the particular facilities with which they are associated. In this way an authorized user may be determined as one associated with a particular facility through operation of the at least one computer 516. This enables the at least one computer to operate in accordance with its programming to carry out the activities for the user related to the particular facility.

In still other exemplary embodiments the at least one data store may include software instructions of various types that are suitable for carrying out the functions required by the particular system. This may include for example, speech recognition software which enables the interpretation by the at least one computer of verbal commands that are received from a user. Examples of such software include Via Voice™ by IBM and Point and Speak™ by Dragon Software. In still other embodiments the at least one data store may include voice recognition software. Such voice recognition software may be suitable for identifying a voice as associated with a particular user. An example of such software is Voice Vault™ by Biometric Security Ltd. Indeed in some embodiments a user's voice may serve as a user identifying input. In still other embodiments the at least one data store may include facial recognition software. The facial recognition software may be used in some embodiments to identify particular authorized users of the system. Of course these are merely exemplary of types of data which may be stored in the at least one data store in some exemplary embodiments.

Certain embodiments of the system shown schematically in FIG. 86 may be operated to minimize the risk of harm to a user who is required to travel to a facility. This may include for example a person who has responsibility for opening the bank facility 490 after it has been closed for the night or for an extended period of time such as over a holiday weekend. In an exemplary embodiment, operators and/or computers of the monitoring facility may review in generally real-time access, the fields of view of the plurality of cameras located at the bank facility through the at least one network 506. Alternatively or in addition, the computer at the monitoring facility may be operative to store images and other data associated with activities that have occurred at the bank facility. This may be done in a manner like that previously discussed. Such images and information may be accessed at the monitoring facility for review. Thus for example in the exemplary embodiment, the person responsible for opening the bank facility can gain access to the system and cause the monitoring facility to review images available from the cameras or other information or triggering events at the bank facility to be sure that there are no abnormal conditions before and/or at the time the user arrives. In addition in an exemplary embodiment the monitoring facility may observe the user arriving at the bank facility and observe the user until the user is within the facility and actuates an input device to indicate that they are safe and that there are no abnormal conditions. Of course if an abnormal condition is noted, the monitoring facility may operate to notify the user to stay away from the bank facility, and in addition may notify other appropriate entities and authorities about the abnormal condition or take other actions.

Figure 87:
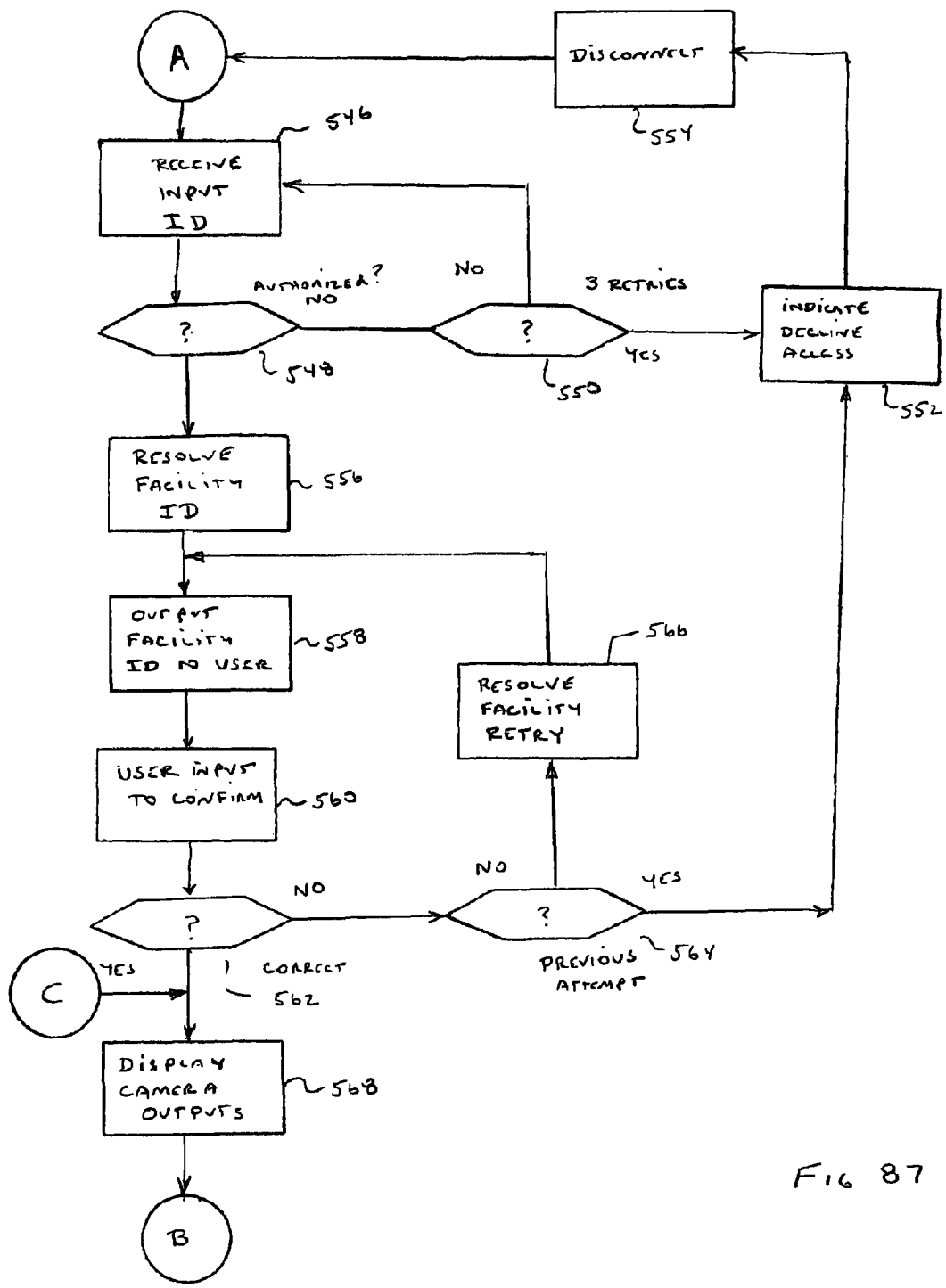
FIGS. 87 through 89 are a schematic exemplary logic flow diagram representative of logic carried out by at least one processor of exemplary systems shown in FIG. 86.
Figure 88:
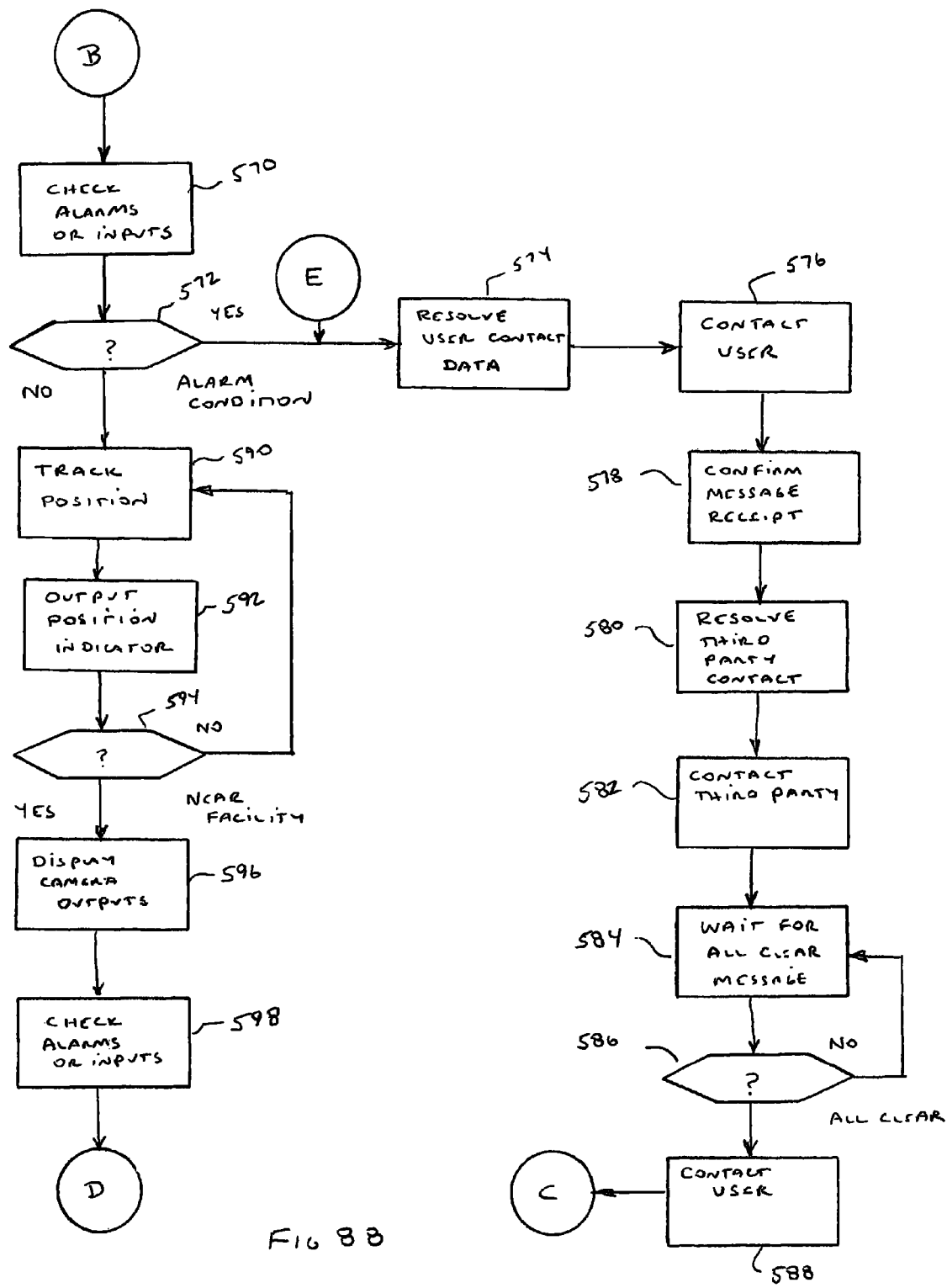
Figure 89:
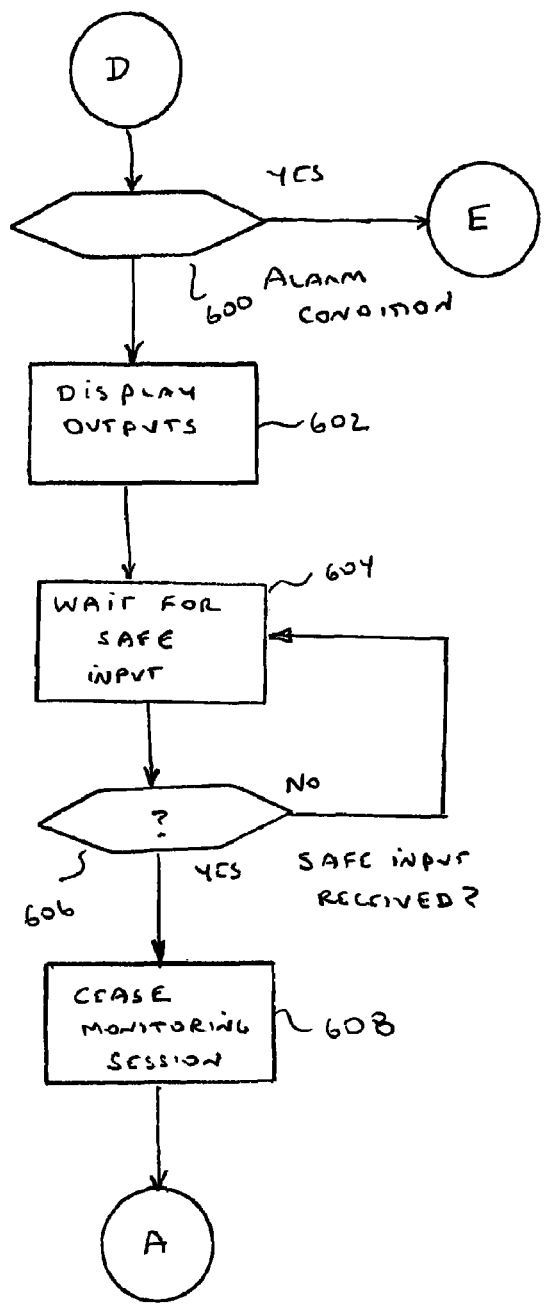
Figure 90:
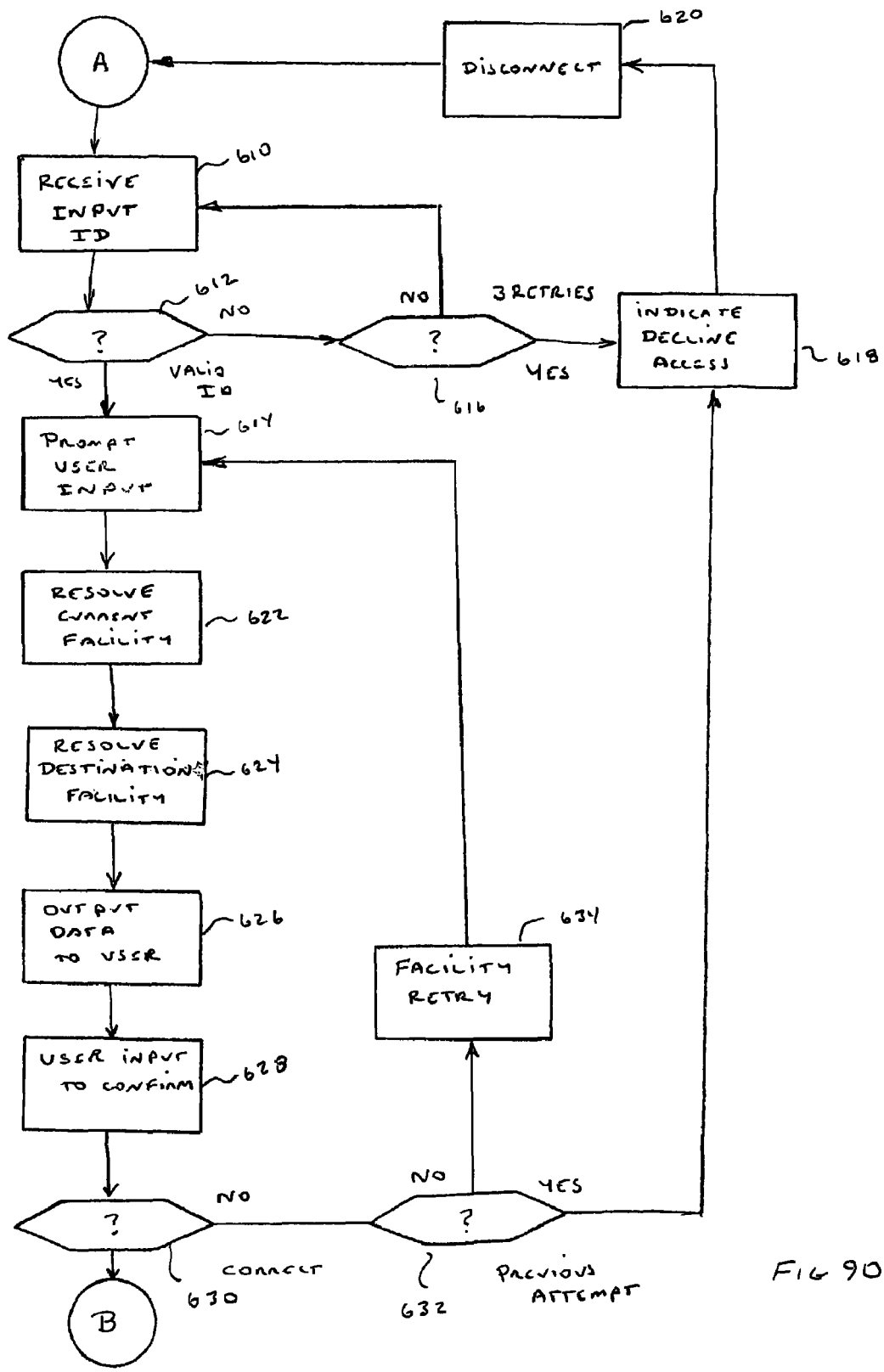
FIGS. 90 through 93 are a schematic view of logic steps carried out by an alternative embodiment of a system for monitoring facilities and/or users.
Figure 91:
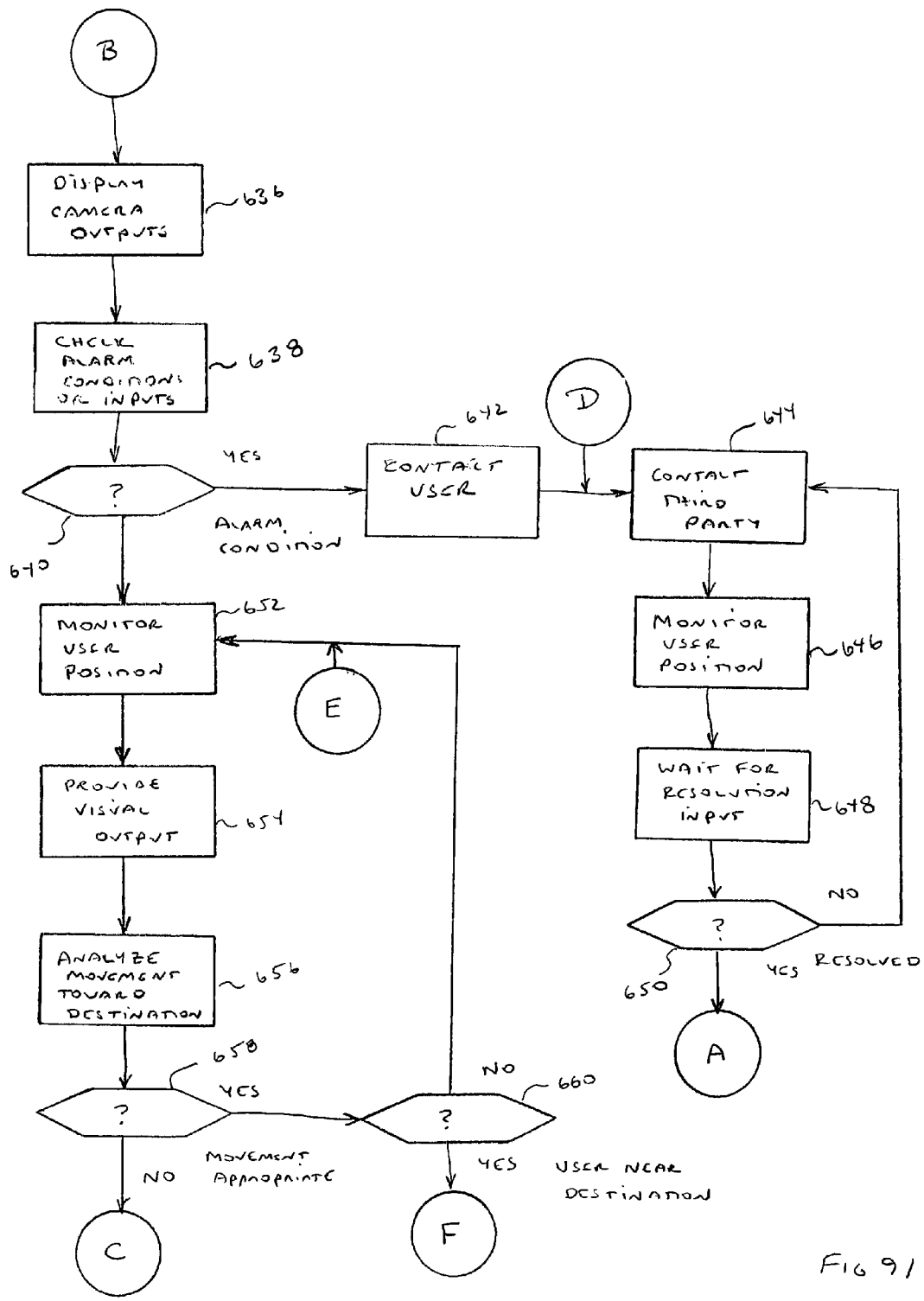
Figure 92:
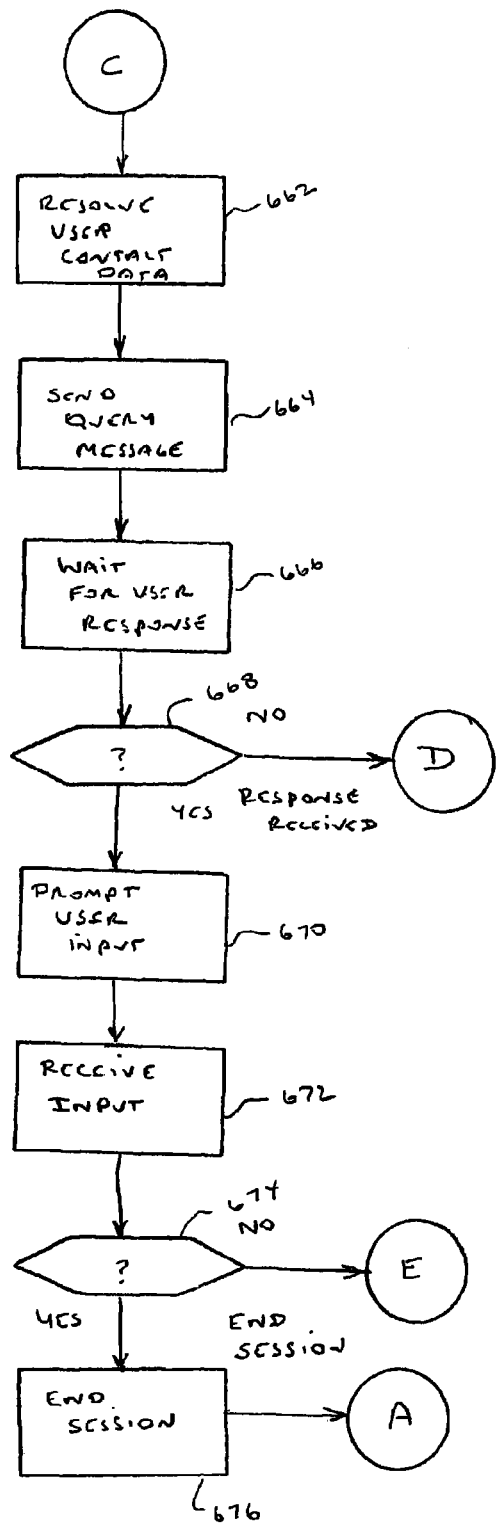
Figure 93:
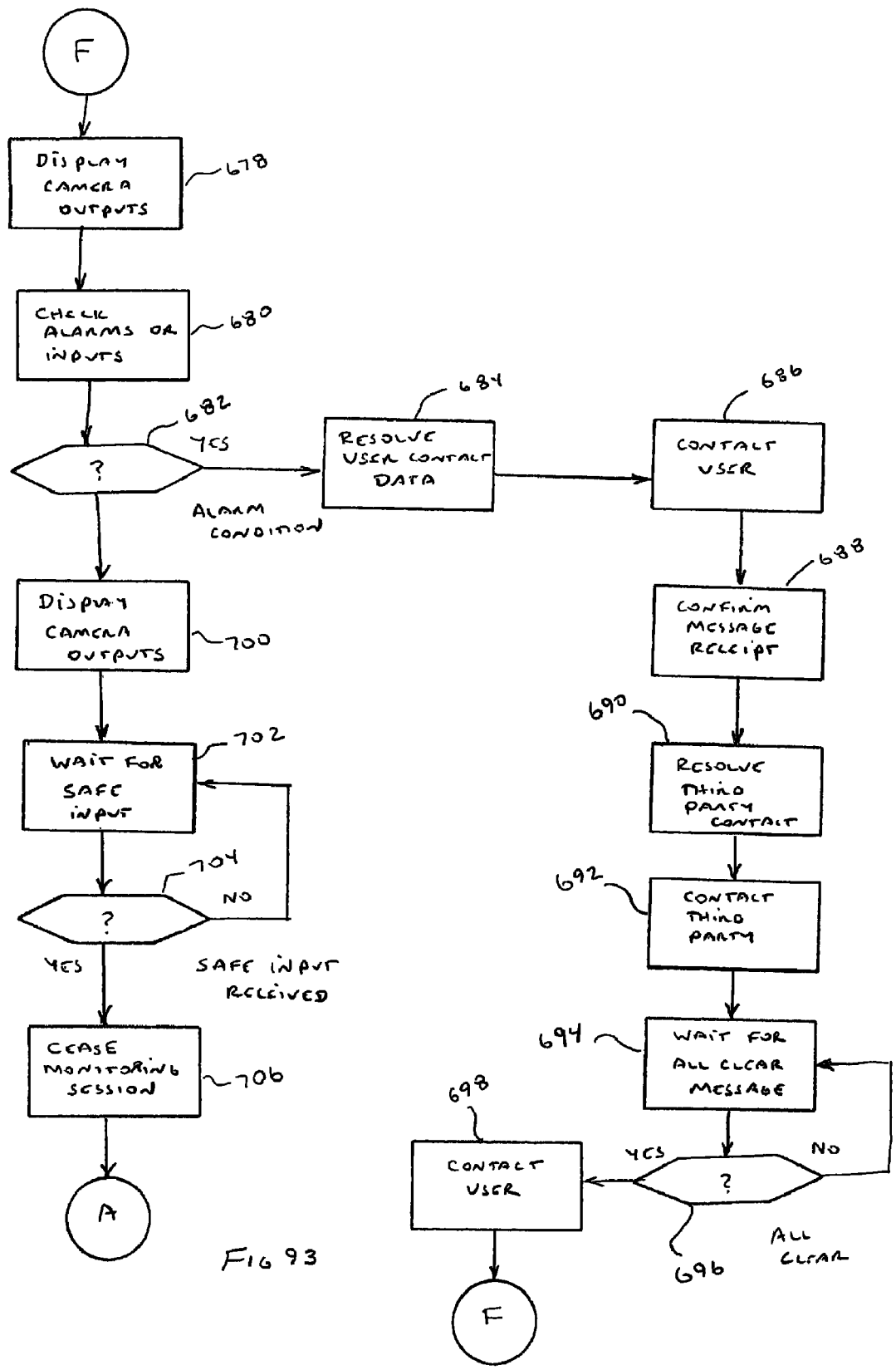

The logic executed by the at least one computer 516 in carrying out the functions of an exemplary embodiment is shown schematically in FIGS. 87 through 89. In an exemplary embodiment the at least one computer operates to receive a communication from a user that there is to be some activity. The communication in the exemplary embodiment is received from a user using a portable phone 526. The user communicates to the at least one computer at the monitoring facility through the telephone interface 522. Upon establishing a telephone connection to the monitoring facility, the user provides at least one identifying input through the phone. This is represented in a step 546. As previously discussed the identifying input may include for example the input of a code through the keypad of the portable phone. Alternatively in other embodiments the at least one user identifying input may include a particular password that is spoken by the user. In still other exemplary embodiments the identifying input may include the user's particular voice pattern which can be identified through operation of the at least one computer. In still other embodiments the user may provide a visual input through the camera on the portable phone as an identifying input. Other identifying inputs may include for example, the user's cell phone number, its particular location such as being positioned at an authorized user's house, a fingerprint scan through a fingerprint scanner on the cell phone, or other suitable device for providing inputs that can be used to identify the particular user as an authorized user of the system.

After receiving the at least one user identifying input, the at least one computer operates at a step 548 to determine that the computer can identify the at least one input provided by the user as one associated with an authorized user. This is done by the at least one computer based on information in the data store. If the computer cannot identify the at least one input as one associated with an authorized user, the computer executes a step 550 to determine if it has previously attempted a retry to obtain a validated input. In the exemplary embodiment four attempts are made to obtain from the user at least one identifying input that can be used to verify that the user is an authorized user. After three retries a message is sent through operation of the at least one computer to the person attempting to access to system, that access is denied. This is reflected in a step 552 and the system disconnects from the portable phone at a step 554. Of course it should be understood that although in the exemplary embodiment the portable phone is discussed, in other embodiments stationary phones or other types of input devices may be used.

If in step 548 the input received is verified through operation of the at least one computer as associated with an authorized user, the at least one computer then operates in the exemplary embodiment to resolve data corresponding to the facility associated with the user. This is indicated at a step 556. In some embodiments the facility may be resolved based on information stored in the at least one data store. In other embodiments the facility may be resolved based on inputs received from the user. For example in some embodiments an authorized user may be associated with only a single facility, while in other embodiments an authorized user may be associated with multiple facilities. As a result in some embodiments a particular facility which would be the destination of the user is resolved by the computer based on certain inputs provided by the user to indicate the particular destination facility in the particular session, from the plurality of destinations that may be authorized for that user by the system. Of course this approach is merely exemplary.

The at least one computer is then operative in the exemplary embodiment to provide signals which indicate to the user the particular facility or destination which the system has resolved they will be traveling to. This is represented in a step 558. The output to the user may be produced for example through a text message on the screen or the portable phone or through a computer generated voice output to the user's phone. Of course these approaches are exemplary.

The user then provides a further input in the exemplary embodiment to confirm the destination that has been resolved by the at least one computer. This is represented in a step 560. In response to the user's input the computer next determines as represented in a step 562, whether the user has confirmed that the indicated destination is accurate. If the user has indicated that the destination is not accurate, the computer next executes an operation as represented in step 564 to determine if there has been previously an unsuccessful attempt to resolve the particular facility which will be the user's destination. If there has been a previous attempt which was unsuccessful, the computer then operates to end the session. If however there has not been a previous attempt the computer operates as represented by a step 566 to again resolve a particular facility which would be the user's destination. Step 566 may include for example providing further outputs to the user and receiving other inputs in an effort to determine the proper facility to which the user will be traveling.

In this exemplary embodiment once the user has confirmed the facility which is the destination, the at least one computer operates to cause the output through at least one display of the monitoring facility, at least one image that corresponds to at least one field of view of at least one camera at the designated facility. This is represented in a step 568. In exemplary embodiments an operator at the monitoring facility may provide inputs to input devices to review images corresponding to the fields of view of a plurality of cameras that capture images of areas within and outside the facility. This may include for example in the case of the exemplary bank facility 590, the areas adjacent to the vault, the ATM, the entrance area and other areas within and outside the facility. In some embodiments a user at the monitoring facility may analyze the plurality of visual outputs generated in response to the cameras for abnormal conditions. In still other embodiments the at least one computer may operate in the manner previously discussed to analyze the images for discrepancies which may be indicative of improper or abnormal conditions. In still other embodiments communication with the bank facility may include computer 502 sending alarm or other image data which may be indicative of conditions and/or events that were sensed or detected within the facility in the past, which are not currently existing. Of course these processes are exemplary.

In the event that an abnormal condition is noted, the computer of the exemplary embodiment is operative to identify such condition. In the alternative, if an operator at the monitoring facility observes or suspects improper conditions within the field of view of one or more cameras, they may also provide at least one input to at least one input device to indicate an abnormal condition. This is represented in a step 570 in FIG. 88. The computer then proceeds in a step 572 to determine that the alarm or abnormal condition has been noted. If such a condition is noted the at least one computer will operate to resolve user contact information such as the user's portable phone number or other manner in which the user can be contacted. This is represented by a step 574.

The at least one computer then operates to cause contact to be made with the user using the user contact data. This is represented in a step 576. The user contact may include, for example, the at least one computer resolving a phone number for the user's portable phone or other user contact information based on the prior contact and/or data stored in the at least one data store. The at least one computer may establish a voice connection so that a live operator at the monitoring center may speak with the authorized user to advise them of the particular circumstances. Alternatively or in addition the at least one computer may operate to send a simulated voice message or text message to the particular user. Of course these approaches are exemplary.

As represented in a step 578 the at least one computer operates to assure that the user is notified of the abnormal condition. This may be based on a manual input provided by an operator in some embodiments. In other embodiments it may be based on a user provided input indicating that they received the text or voice message generated responsive to operation of the at least one computer.

In the exemplary embodiment the at least one computer also operates in accordance with its programming and the data in the at least one data store, to determine if another entity should be contacted concerning the abnormal condition. This is represented in a step 580. If so, the at least one computer operates to cause a message to be sent to the resolved entity. This is represented in a step 582. This further may include for example sending a message to a local police department, security company or other entity which is appropriately notified of a particular condition. Of course it should be understood that in some embodiments step 582 may include sending messages to numerous entities based on the programming of the at least one computer.

In the exemplary embodiment the at least one computer then waits for at least one inputted message to indicate that the problem at the facility has been resolved. This may include for example an input by an operator indicating that the monitoring facility has received a phone call or other contact in the from the security company or other appropriate entity has been contacted about the condition and who has determined that a potentially dangerous problem does not exist at the facility. As represented in a step 586 once a message or other input indicating that conditions are all clear has been received, the computer then operates in accordance with its programming to initiate contact with the user as represented in a step 588. This may include for example resolving the user contact data and achieving communication with the user. This communication may include an operator discussing the situation with the user in some embodiments. In other embodiments it may include the computer sending other types of automated messages to the user. Of course in some embodiments the computer may operate to send other messages, such as messages indicating that no abnormal conditions have been noted at the destination facility. In the exemplary embodiment the at least one computer then operates to again perform the functions indicated as associated with step 568. Of course this approach is exemplary.

If in step 572 it is determined that there is not abnormal condition associated with the facility which is the user's destination, the at least one computer of the exemplary embodiment operates in conjunction with the position tracking device 542 to monitor the position of the user. This is accomplished in the exemplary embodiment by tracking the location of the user's mobile phone. This is represented in a step 590. Further the exemplary embodiment operates to provide outputs through at least one visual display at the monitoring facility indicating the then current position of the user. This is represented by a step 592. As can be appreciated, in this exemplary embodiment the at least one computer is enabled to indicate to operators at the monitoring facility the then current position of the user. Thus for example an alarm condition should be indicated at the facility between the time of the initial check and the user arriving at the facility, an operator can determine that the user has not reached the facility and the user can be advised not to continue their journey. Of course this approach is exemplary.

In the exemplary embodiment the at least one computer is operative to track the location of the position indicating device being carried in proximity to the user, and determines when the user is near to the destination facility. This is represented in a step 594. It should be understood that while in the exemplary embodiment discussed, the determination that the user is near the facility is based on tracking of the position indicating device, in other embodiments it may be based on other inputs. This may include for example a field of view of a selected camera identifying a vehicle or other features associated with the authorized user in a particular location. It may also be based alternatively on identifying features of the user such as the user's face coming into a field of view of a camera at the facility. Of course these approaches are exemplary of many approaches that may be used.

When it is determined that the user is in proximity to the facility, the at least one computer operates in accordance with its programming to provide at least one visual output through the at least one display device at the monitoring facility. This enables observing the user arriving at the facility. This is represented in step 596. Further when the user arrives at the facility, the at least one computer operates to again check for alarm conditions or other conditions that may indicate that the user should not enter the facility. In addition an operator may provide inputs to view the visual images corresponding to fields of view of a plurality of cameras and may provide inputs corresponding to any abnormal conditions noted. The computer then determines if any abnormal conditions have been indicated as represented in step 598.

If an abnormal condition has been indicated, the computer operates at a step 600 to identify the alarm condition and to carry out the routine previously described to notify the user and other appropriate entities. Of course it should be understood that the particular steps executed may be tailored to the particular conditions noted. Alternatively or in addition with the user in proximity to the facility operators at the monitoring facility may take steps that are appropriate based on the circumstances. This may include for example communicating through the network to the facility to actuate alarms, loudspeakers, locking devices or other devices as appropriate to indicate to the user not to enter the facility or to avoid certain areas or activities.

In the exemplary embodiment if any abnormal conditions are noted, the at least one computer operates to provide outputs through at least one display. This may be done in accordance with one or more programmed sequences or alternatively in response to inputs from operators. In exemplary embodiments the computer will operate to enable outputs through the visual displays so that the user can be observed in the entrance area of the facility and can be generally under continuous observation until the user is safely within the facility. This is represented by a step 602. In the exemplary embodiment the at least one computer continues to operate to provide visual outputs and to monitor the user at the facility until the user provides at least one input to the at least one input device 504 within the facility. This is represented by a step 604. The receipt of the input from the user indicating that they are safely within the facility is acted upon by the computer as represented in step 606. The computer then operates in accordance with its programming to end the monitoring session for the particular user as the user has now arrived safely at the facility. This is represented by a step 608. Of course as can be appreciated the at least one computer may continue to operate in accordance with its programming in some embodiments to continue to monitor the facility to check for abnormal conditions or other circumstances that may necessitate action. Further in exemplary embodiments, images related to the user and the monitoring session may be stored in the at least one data store to later recover and analyze in the manner previously discussed. This may be useful in some embodiments when subsequent to the monitoring session questions or issues arise. Of course this approach is exemplary and in other embodiments other approaches may be used.

In still other embodiments it may be desirable to monitor user activity associated with a user leaving the facility. This may be desirable for example to assure that a person responsible for closing the facility at the end of the business day is able to safely exit the facility, leave the facility in their vehicle or otherwise, and begin traveling to their destination. In still other embodiments it may be desirable to not only monitor user activity leaving a facility but also to monitor the progress of the user when traveling to another destination and determine if there are any unusual conditions or problems that are encountered in the user's travels. In still other embodiments it may be desirable to monitor the activity of the user arriving at the destination to be sure that they have reached the destination safely. Such a system may be useful for example in tracking the movement of persons who may be carrying valuables such as currency, gems or other items between facilities. Such a system may also be valuable for purposes of monitoring deliveries such as deliveries of cash or other valuable items to banking facilities. Such systems may also be useful in connection with tracking deliveries of other items.

FIGS. 90 through 93 include exemplary logic carried out through operation of the system schematically represented in FIG. 86 in connection with monitoring the user's activity when leaving a current facility, monitoring the traveling to another destination facility, and observing the arrival of the user at the destination facility. In this exemplary logic flow the user first provides at least one identifying input at a step 610. This may be done in a manner like that previously discussed or in an alternative manner. If the at least one user input corresponds to an authorized user as indicated in a step 612, the at least one computer operates in accordance with its programming to provide messages that are output to the user to seek further information from the user including destination information. This is represented by a step 614. However, if in step 612 the identifying input from the user is not determined as corresponding to an authorized user, the at least one computer operates in accordance with its programming to carry out steps 616, 618 and/or 620. These steps are like those described in connection with the prior embodiment and through which attempts are made to receive user inputs corresponding to an authorized user. If the user cannot be verified as an authorized user by three repeat attempts, then the session is ended.

In response to the execution of step 614 by the at least one computer the user provides inputs. In the exemplary embodiment, based on these inputs the at least one computer resolves data corresponding to the current facility at which the user is located. This is represented by a step 622. This may be based in some embodiments on the location of the position indicating device maintained in proximity to the user such as the cell phone. In other embodiments it may be based on the address associated with a telephone or an IP address associated with a computer connection through which the user is communicating with the system. Of course these approaches are exemplary.

The at least one computer is also operative to resolve the destination facility to which the user will travel. This is represented in a step 624. The destination facility information may be resolved based on inputs from the user and/or information stored in the data store. The computer then operates to provide at least one output to the user. In the exemplary embodiment the at least one output asks that the user confirm the destination to which they will be traveling. This is represented in a step 626. The at least one computer then receives the user input as represented in a step 628.

The computer then operates in the exemplary embodiment to determine if the user has confirmed that the resolved destination facility is the facility to which the user will travel. This is represented in a step 630. If a user indicates that the resolved facility is not the correct facility, the computer next executes a step 632 to determine if there has been a previous inability to determine the destination facility. If not, the computer operates as represented in a step 634 to resolve the destination facility information. Alternatively if the computer has been previously unsuccessful in resolving the facility information, the computer operates to end the session.

In the exemplary embodiment if a user confirms the accuracy of the output destination information, the computer then operates in accordance with its programming to cause the output through visual displays at the monitoring facility, images corresponding to a field of view of at least one camera located at the facility at which the user is currently located. This is represented in a step 636. In the exemplary embodiment this may include an operator providing inputs to input devices that enable the operator to scan the fields of view of a plurality of cameras. In addition or in the alternative, the computer may operate in accordance with programmed sequences to review the fields of view of a plurality of cameras. Alternatively or in addition the at least one computer may operate to determine if alarm conditions have occurred at the facility where the user is currently located. In an exemplary embodiment if an operator determines if there is an abnormal or suspicious condition, they will provide at least one corresponding input to at least one input device. The at least one computer then operates in accordance with its programming to determine if the abnormal conditions have been noted. This is represented in a step 638.

If an alarm or abnormal condition is noted, as represented in step 640, the exemplary computer then operates in accordance with its programming and/or operator provided inputs as appropriate. For example in some circumstances it may be appropriate to contact the user and advise them to remain in the facility. This is represented in a step 642. Alternatively step 642 may include an instruction to the user to leave the facility immediately. The appropriate instructions may be based on the particular steps that are to be executed by the computer in a given sequence depending on the particular alarm or abnormal condition. Alternatively the activity may be taken by the computer in response to inputs from an operator.

In still other circumstances it may not be appropriate to contact the user, such as for example when observation indicates that the user is being robbed or abducted. In such cases the at least one computer may operate in accordance with a programmed sequence or operator inputs to contact one or more third parties as represented in a step 644. The at least one computer may also contact multiple third parties as appropriate such as the police, a security company or other persons. The at least one computer may also operate in accordance with its programming to monitor the user's current position based on the position of the cell phone. This is represented in a step 646. The exemplary computer then operates in accordance with its programming to maintain and monitor as appropriate as represented in a step 648 until at least one resolution input is received as represented in a step 650. The resolution input generally includes in an exemplary embodiment, an input from an operator indicating that the problem is closed or otherwise resolved. Of course it should be understood that these steps are exemplary and in other embodiments other steps may be taken.

If at 640 no alarm or abnormal condition is indicated, the at least one operator will watch the user leave the first facility on a display through the at least one visual output. Thereafter in the exemplary embodiment the at least one computer is operative to monitor the user's location based on the position of the position indicating device. This is represented in step 652. The exemplary embodiment of the system is also operative to provide visual outputs showing the then current location of the user either on a continuous or periodic basis. These visual outputs enable the operator to monitor visually the progress of the user relative to the destination. The visual outputs in some exemplary embodiments may include maps or other information to facilitate visual observation of the user's progress. This is represented in a step 654. In alternative embodiments the at least one computer may access public web cameras in areas through which the user will pass. The at least one computer may operate to cause outputs that include the user or their vehicle. The computer may further operate to highlight the user or their vehicle on the output screens based on position signals or operator inputs. Of course these approaches are exemplary.

The at least one computer is also operative to monitor the location of the user based on the position indicating device to determine if the user's movement or lack thereof is consistent with the user continuing to progress toward the destination facility. As can be appreciated, in the event that the user is determined to be taking a path that is not moving towards the destination facility or the user ceases to make progress, this may be indicative of a problem. This may include a vehicle malfunction or more serious issues such as foul play. The analysis of the movement of the position indicating device is represented in a step 656.

If the user's movement is consistent with travel to the destination facility, this is determined in a step represented 658. The computer also considers whether the user has reached a position in proximity to the destination facility. This is represented by a step 660. If the user is not in proximity to the destination facility, and the movement is appropriate, the computer continues to monitor the user's progress.

If for some reason the progress of the user towards the destination facility is not within normal parameters, the exemplary computer operates in accordance with its programming to resolve contact data to contact the user. This is represented in a step 662. The at least one computer is operative to communicate to the user. The communication of the exemplary embodiment may take the form of a query message asking the user to indicate if there are any problems or difficulties. The query message may take the form of an electronic message or alternatively may be a message provided in whole or in part by a human operator based on the circumstances. This is represented in a step 664. The computer then operates in accordance with its programming to receive a response from the user to the query message. This is represented in a step 666. As previously discussed this may be a verbal response received through an electronic system and input through the portable phone or other device or other input. The response may also be input by an operator who has communicated with the user by telephone in some embodiments. Of course these approaches are exemplary.

In response to receiving a response message from the user as represented in a step 668, the at least one computer of the exemplary embodiment is programmed to prompt the user to indicate whether they wish to continue the monitoring session or whether the session should be discontinued. This is represented in a step 670. The user provides a response as indicated in a step 672. If the user does not wish to discontinue the monitoring session the computer then operates in accordance with its programming to continue to monitor the user. This is represented in a step 674. Alternatively if the user indicates that the monitoring session is to end, the computer operates to discontinue monitoring the activity of the user as represented in a step 676. Of course in some embodiments a secret code or other verification input may be required to be input by the user to end the monitoring session. This may help to assure that the session is not ended by an unauthorized person.

Alternatively if in step 668 the user fails to respond to the query message within a given time, or the response indicates that there may be a problem, the at least one computer operates in accordance with its programming to carry out notification procedures to protect the interests of the user. This may include for example taking the steps previously discussed in resolving third parties to contact such as the police or security service, monitoring the position of the user and taking other appropriate actions as directed by an operator. Of course these approaches are exemplary and other approaches may be used, based on the particular circumstances.

If in step 660 it is determined that the user is in proximity to the destination, the at least one computer operates to cause the output of visual images at the monitoring facility corresponding to at least one field of view of at least one camera at the destination facility. This is represented by a step 678. The at least one computer also operates in accordance with its programming to determine if there are any alarm or abnormal conditions or other potential problems at the destination facility that suggest that a user should not complete the journey to the facility. In addition an operator reviewing outputs may provide inputs through input devices indicating abnormal conditions. The at least one computer operates as represented in step 680 to determine if such conditions exist. If as represented in step 682 a problematic condition is noted, the at least one computer operates in accordance with its programming to take appropriate steps.

In the exemplary embodiment the at least one computer, in response to a problem such as an alarm or abnormal condition at the destination facility, resolves the user contact data as represented in a step 684 and operates to cause contact to be made with the user as represented in step 686. The computer then determines if the user has acknowledged the message as represented in a step 688. As previously discussed in some embodiments acknowledgment by a user may be based on an input provided by the user or an input provided by an operator at the facility who has contacted the user.

In addition the at least one computer may operate to resolve third party contact data as appropriate for the condition which is represented in a step 690. The computer may then operate to contact one or more appropriate entities who are indicated based on data stored in the data store as the appropriate entities to contact in the given circumstances. This is represented by a step 692. The computer then operates to maintain a monitoring function waiting for an indication that the problem has been resolved. This is represented in a step 694. The exemplary computer then determines if it has received a message indicating if it has received a message indicating that the situation has been resolved in a step 696. If no such message has been received the computer continues to operate to monitor. If such a message has been received the at least one computer then operates in accordance with its programming to contact the user as represented in a step 698. The computer then operates to continue the monitoring function to monitor the user as they reach the destination facility. Of course it should be understood that in exemplary embodiments operators at the monitoring facility may provide inputs to override and change the sequence of activities carried out by the computer as is appropriate under the circumstances.

If in step 682 it is determined that no problems are evident at the destination facility, the at least one computer then operates to cause visual outputs through display devices corresponding to one or more fields of view of cameras at the destination facility. This enables the operator to observe the user entering the facility to assure that they have arrived safely. This is represented in a step 700. The exemplary computer then continues to monitor for an input from the user indicating that they are safely within the facility. This is represented in a step 702. Upon receipt from the user of at least one signal corresponding to the user input indicating that the user has safely arrived at the destination facility, the computer ceases monitoring. This is represented in a step 704. The computer then operates to cease monitoring and end the session in a step 706.

It should be understood that in various embodiments different types of inputs from a user who has arrived at a destination facility may be provided. These may include inputs from an input device at the facility of the type previously discussed. Alternatively the user may provide inputs to a portable phone, portable computer or other input device as is appropriate to indicate their safe arrival.

As can be appreciated the exemplary system may be used to monitor user activity and to minimize the risk of harm to users who are responsible for opening, closing and traveling between facilities. Of course the approaches described are exemplary of many approaches that may be used.

Thus embodiments may achieve at least one of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art as being capable of performing the recited function and shall not be deemed limited to the particular means shown in the foregoing description or mere equivalents thereof. The provision of an Abstract herewith shall not be construed as limiting the claims to features discussed in the Abstract.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:
1. A method comprising:
(a) operating at least one processor to cause a monitoring facility to receive responsive at least in part to at least one input provided through at least one input device by a remotely located person,
identifying data, and
data corresponding to a destination;

(b) operating the at least one processor to determine responsive at least in part to data stored in at least one data store, that the identifying data corresponds to an authorized user;

(c) operating the at least one processor to cause the monitoring facility to receive location data corresponding to locations of a location indicating device maintainable in proximity to the user as the user moves;

(d) operating the at least one processor responsive at least in part to the location data, to cause outputs to be provided through at least one visual display at the monitoring facility, wherein the outputs include at least one visual indication corresponding to the locations;

(e) determining that movement of the location indicating device is not consistent with the user moving toward the destination; and (f) operating the at least one processor to cause responsive at least in part to the determination in (e) and data stored in the at least one data store, at least one action.

2. The method according to claim 1 wherein in (f) the at least one action includes sending a query message to the user, and monitoring for a response to the query message from the user for a time period.

3. The method according to claim 2 and further comprising:
(g) responsive at least in part to not receiving a response to the query message within the time period, sending a notification message to an entity other than the user, wherein the entity is determined through operation of the at least one processor responsive at least in part to data stored in the at least one data store.

4. The method according to claim 1 wherein (f) includes sending a notification message to an entity other than the user responsive at least in part to data stored in the at least one data store.

5. The method according to claim 1 and further comprising:
(g) determining that the user is currently located at a first facility remote from the monitoring facility, wherein the first facility includes at least one first camera, wherein the at least one first camera is in operative connection with the monitoring facility;
(h) responsive at least in part to the determination in (g), operating the at least one processor to cause at least one output through the at least one visual display that shows the user at the first facility.

6. The method according to claim 5 wherein in (h) the at least one output through the at least one visual display includes a visual image of the user leaving the first facility.

7. The method according to claim 6 wherein the at least one processor is operative to determine a destination as being a second facility remote from the monitoring facility, and further comprising:
(i) determining that the user is in proximity to the second facility, wherein the second facility includes at least one camera in operative connection with the monitoring facility;
(j) responsive at least in part to (i), operating the at least one processor to cause at least one output through at least one visual display that shows a visual image of the user at the second facility.

8. The method according to claim 7 wherein in (j) the at least one output includes a visual image of the user arriving at the second facility.

9. The method according to claim 1 wherein in (a) the at least one input device includes a portable phone, and wherein the portable phone includes the location indicating device.

10. The method according to claim 9 and further comprising:
(g) subsequent to (d), operating the at least one processor to cease causing outputs to be provided through the at least one visual display, responsive at least in part to at least one further input provided by the user through the portable phone.

11. The method according to claim 1 wherein in (e) the destination comprises a bank facility, wherein the bank facility includes an entrance area, and further comprising
(g) operating the at least one processor to cause the at least one visual display to provide at least one visual output that shows the user in the entrance area.

12. The method according to claim 1 wherein in (e) the destination comprises a bank facility, wherein the bank facility includes an automated banking machine and a vault, and wherein the bank facility includes at least one camera, wherein the at least one camera has a field of view that includes an area adjacent at least one of the automated banking machine and the vault, and further comprising
(g) operating the at least one processor to cause the at least one visual display to provide at least one visual output that shows the user in an area adjacent at least one of the automated banking machine and the vault.

13. The method according to claim 1 wherein the destination comprises a building facility, and further comprising:
(g) subsequent to (d), operating the at least one processor to cease causing outputs to be provided through the at least one visual display, responsive at least in part to at least one further input provided by the user through at least one facility input device at the building facility.

14. The method according to claim 1 wherein in (e) the determining is responsive at least in part to the at least one visual indication.

15. A method comprising:
(a) operating at least one processor to cause a monitoring facility to receive responsive at least in part to at least one input provided through at least one input device by a remotely located person,
identifying data, and
data corresponding to a destination;
(b) operating the at least one processor to determine responsive at least in part to data stored in at least one data store, that the identifying data corresponds to an authorized user;
(c) operating the at least one processor to cause the monitoring facility to receive location data corresponding to locations of a location indicating device maintainable in proximity to the user as the user moves;
(d) operating the at least one processor responsive at least in part to the location data, to cause outputs to be provided through at least one visual display at the monitoring facility, wherein the outputs include at least one visual indication corresponding to the locations;
(e) determining that the location indicating device is located adjacent a building facility, wherein the building facility includes at least one camera in operative connection with the monitoring facility; and
(f) responsive at least in part to the determination in (e), operating the at least one processor to cause at least one visual output to be provided through the at least one visual display of the user at the building facility.

16. The method according to claim 15
wherein the at least one camera has a field of view inside the building facility and a field of view outside the building facility,
wherein (f) includes providing at least one visual output including an image of the user inside the building facility and at least one visual output including an image of the user outside the building facility.

17. The method according to claim 15 and further comprising:
   (g) subsequent to (d), operating the at least one processor to cease causing outputs to be provided through the at least one visual display responsive at least in part to at least one further input provided by the user through at least one facility input device at the building facility.

18. The method according to claim 15 wherein in (a) the at least one input device includes a portable phone, and wherein the portable phone includes the location indicating device, and further comprising:
   (g) subsequent to (d), operating the at least one processor to cease causing outputs to be provided through the at least one visual display, responsive at least in part to at least one further input provided by the user through the portable phone.

19. The method according to claim 15 wherein in (e) the determining is responsive at least in part to the at least one visual indication.

20. A method comprising:
   (a) obtaining information at a monitoring facility associated with a monitoring service, responsive at least in part to at least one input provided to a mobile phone by a person, wherein the information includes
      identifying data, and
      data corresponding to a destination;
   (b) determining that the identifying data corresponds to an authorized user of the monitoring service;
   (c) receiving in real time at the monitoring facility, location data corresponding to different locations of the mobile phone during movement of the mobile phone;
   (d) displaying at the monitoring facility responsive at least in part to the location data received in (c), visual indications corresponding to the different locations, wherein current location of the authorized user is determinable based at least in part on current location of the mobile phone;
   (e) determining responsive at least in part to the visual indications displayed, if movement of the mobile phone is consistent with travel toward the destination; and
   (f) responsive at least in part to the determination in (e), causing at least one action,
      wherein responsive at least in part to a negative determination in (e), the at least one action includes sending at least one message to the mobile phone,
      wherein responsive at least in part to a positive determination in (e), the at least one action includes determining if further movement of the mobile phone is consistent with travel toward the destination.

21. The method according to claim 20 wherein the monitoring service comprises a delivery monitoring service, wherein (e) includes determining whether travel movement of a courier is consistent with travel movement toward a particular delivery destination.

* * * * *